US012804064B2

(12) United States Patent
Housour et al.

(10) Patent No.: US 12,804,064 B2
(45) Date of Patent: Nov. 17, 2026

(54) HANDHELD ELECTRONIC DEVICE

(71) Applicant: Apple Inc., Cupertino, CA (US)

(72) Inventors: Jon F. Housour, San Francisco, CA (US); Macey E. Dade, Burlingame, CA (US); Benjamin R. Gray, Millbrae, CA (US); Reema Shalan, Cupertino, CA (US); Daniel W. Jarvis, Sunnyvale, CA (US); Jason P. Shannon, Sunnyvale, CA (US); Marwan Rammah, San Francisco, CA (US); Robert F. Meyer, Palo Alto, CA (US); Richard H. Koch, Cupertino, CA (US); Anthony B. Sinclair, Cupertino, CA (US); Gareth L. Rose, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 319 days.

(21) Appl. No.: 18/243,426

(22) Filed: Sep. 7, 2023

(65) Prior Publication Data

US 2023/0421676 A1 Dec. 28, 2023

Related U.S. Application Data

(60) Provisional application No. 63/441,756, filed on Jan. 27, 2023.

(51) Int. Cl.

*G06F 1/16* (2006.01)
*G06F 1/18* (2006.01)
(Continued)

(52) U.S. Cl.

CPC ........ *H04M 1/0266* (2013.01); *G06F 1/1643* (2013.01); *G06F 1/1656* (2013.01);
(Continued)

(58) Field of Classification Search

CPC ........... H04M 1/0266; H04M 1/72466; H04M 1/724631; H04M 1/0262; H04M 1/0264;
(Continued)

(56) References Cited

U.S. PATENT DOCUMENTS 4,567,318 A 1/1986 Shu
6,532,152 B1 3/2003 White et al.
(Continued)

FOREIGN PATENT DOCUMENTS

CN 102076189 5/2011
CN 202540623 11/2012
(Continued)

OTHER PUBLICATIONS

Bourchak et al., "Effect of Preheating and Post-Curing Time on the Mechanical Properties of Epoxy Resin," Advanced Composites Letters, vol. 22, Issue 5, 2013.
(Continued)

*Primary Examiner* — Anthony M Haughton
(74) *Attorney, Agent, or Firm* — Brownstein Hyatt Farber Schreck, LLP

(57) ABSTRACT

A mobile phone may include an enclosure including a front cover assembly defining a front exterior surface of the enclosure, a rear cover assembly defining a rear exterior surface of the enclosure, and a housing subassembly positioned between the front cover assembly and the rear cover assembly. The housing subassembly may include a first housing component defining a first side exterior surface of the enclosure, a second housing component defining a second side exterior surface of the enclosure opposite the first side exterior surface of the enclosure, and a lower chassis section extending between the first housing component and the second housing component. The mobile phone may further include a camera array coupled to the lower
(Continued)

chassis section and positioned in an interior cavity defined between the lower chassis section and the front cover assembly.

20 Claims, 64 Drawing Sheets

(51) Int. Cl.

| | |
|---|---|
| ***G06T 7/50*** | (2017.01) |
| ***G06V 40/16*** | (2022.01) |
| ***H04M 1/02*** | (2006.01) |
| ***H04M 1/22*** | (2006.01) |
| ***H04M 1/72463*** | (2021.01) |
| ***H04M 1/72466*** | (2021.01) |
| ***H04N 23/90*** | (2023.01) |
| ***H05K 5/00*** | (2025.01) |
| ***H05K 7/00*** | (2006.01) |

(52) U.S. Cl.
CPC ............ *G06F 1/1683* (2013.01); *G06F 1/169* (2013.01); *G06F 1/181* (2013.01); *G06T 7/50* (2017.01); *G06V 40/161* (2022.01); *G06V 40/172* (2022.01); *H04M 1/0262* (2013.01); *H04M 1/0264* (2013.01); *H04M 1/0268* (2013.01); *H04M 1/0283* (2013.01); *H04M 1/22* (2013.01); *H04M 1/724631* (2022.02); *H04M 1/72466* (2021.01); *H04N 23/90* (2023.01); *G06T 2207/10028* (2013.01); *H04M 2201/38* (2013.01); *H04M 2207/18* (2013.01)

(58) Field of Classification Search
CPC .... H04M 1/0268; H04M 1/0283; H04M 1/22; G06F 1/1643; G06F 1/1656; G06F 1/1683; G06F 1/169; G06F 1/181
See application file for complete search history.

(56) References Cited

U.S. PATENT DOCUMENTS

| | | | |
|---|---|---|---|
| 6,625,394 | B2 | 9/2003 | Smith et al. |
| 6,775,133 | B2 | 8/2004 | Konishi |
| 7,377,767 | B2 | 5/2008 | Dubuis et al. |
| 7,684,178 | B2 | 3/2010 | Hsu et al. |
| 7,697,281 | B2 | 4/2010 | Dabov et al. |
| 7,713,054 | B2 | 5/2010 | Mai |
| 7,798,804 | B2 | 9/2010 | Kmoch et al. |
| 7,829,786 | B2 | 11/2010 | Fuerstenberg et al. |
| 7,830,317 | B2 | 11/2010 | Yamazaki |
| 7,907,093 | B2 | 3/2011 | Honda et al. |
| 8,191,756 | B2 | 6/2012 | Coppeta et al. |
| 8,345,410 | B2 | 1/2013 | Ternus et al. |
| 8,368,602 | B2 | 2/2013 | Hill et al. |
| 8,373,980 | B2 | 2/2013 | Reber |
| 8,380,258 | B2 | 2/2013 | Kim et al. |
| 8,506,327 | B2 | 8/2013 | Jol |
| 8,519,286 | B1 | 8/2013 | Bloch |
| 8,537,543 | B2 | 9/2013 | Wang et al. |
| 8,553,907 | B2 | 10/2013 | Thomason et al. |
| 8,620,395 | B2 | 12/2013 | Kang et al. |
| 8,654,029 | B2 | 2/2014 | Fan et al. |
| 8,665,160 | B2 | 3/2014 | Uttermann et al. |
| 8,686,297 | B2 | 4/2014 | Shiu et al. |
| 8,773,847 | B2 | 7/2014 | Byun et al. |
| 8,878,060 | B2 | 11/2014 | Wright et al. |
| 8,884,826 | B2 | 11/2014 | Wu et al. |
| 8,902,108 | B2 | 12/2014 | Spiess et al. |
| 8,947,303 | B2 | 2/2015 | Golko et al. |
| 8,947,304 | B2 | 2/2015 | Park et al. |
| 8,980,026 | B2 | 3/2015 | Ely |
| 8,982,009 | B2 | 3/2015 | Sung et al. |
| 9,036,358 | B2 | 5/2015 | Shoji et al. |
| 9,049,801 | B2 | 6/2015 | Rothkopf et al. |
| 9,075,567 | B2 | 7/2015 | Mathew et al. |
| 9,109,093 | B2 | 8/2015 | Pilliod et al. |
| 9,146,588 | B2 | 9/2015 | Kole et al. |
| 9,209,513 | B2 | 12/2015 | Ely et al. |
| 9,223,349 | B2 | 12/2015 | Franklin et al. |
| 9,229,675 | B2 | 1/2016 | Beeze et al. |
| 9,282,657 | B2 | 3/2016 | Miyaoka et al. |
| 9,338,909 | B2 | 5/2016 | Tanaka |
| 9,338,910 | B2 | 5/2016 | Hattori |
| 9,360,889 | B2 | 6/2016 | Idsinga et al. |
| 9,408,009 | B1 | 8/2016 | Witte et al. |
| 9,469,469 | B2 | 10/2016 | Rayner |
| 9,516,150 | B2 | 12/2016 | Jeon et al. |
| 9,520,638 | B2 | 12/2016 | Baringer et al. |
| 9,537,526 | B2 | 1/2017 | Wilson et al. |
| 9,564,677 | B2 | 2/2017 | Tian et al. |
| 9,578,145 | B2 | 2/2017 | Chang |
| 9,591,110 | B2 | 3/2017 | Hill et al. |
| 9,606,579 | B2 | 3/2017 | Pakula et al. |
| 9,629,268 | B2 | 4/2017 | Lee et al. |
| 9,643,349 | B2 | 5/2017 | Montevirgen |
| 9,680,206 | B2 | 6/2017 | Youn et al. |
| 9,730,370 | B2 | 8/2017 | Tsao et al. |
| 9,791,893 | B2 | 10/2017 | Yamaguchi et al. |
| 9,795,044 | B2 | 10/2017 | Lai et al. |
| 9,871,898 | B2 | 1/2018 | Kwong |
| 9,907,191 | B2 | 2/2018 | Shi et al. |
| 9,977,460 | B2 | 5/2018 | Wagman et al. |
| 9,985,345 | B2 | 5/2018 | Ferretti et al. |
| 10,144,000 | B2 | 12/2018 | Goyal et al. |
| 10,158,384 | B1 | 12/2018 | Yarga et al. |
| 10,180,702 | B2 | 1/2019 | Dabov et al. |
| 10,191,519 | B2 | 1/2019 | Lilje |
| 10,218,827 | B2 | 2/2019 | Hill et al. |
| 10,264,685 | B2 | 4/2019 | Shi et al. |
| 10,367,538 | B2 | 7/2019 | Lai et al. |
| 10,368,456 | B2 | 7/2019 | Shinn |
| 10,372,166 | B2 | 8/2019 | Gable et al. |
| 10,418,693 | B2 | 9/2019 | Xu et al. |
| 10,559,872 | B2 | 2/2020 | Hill et al. |
| 10,617,016 | B2 | 4/2020 | Shi et al. |
| 10,897,825 | B2 | 1/2021 | Shi et al. |
| 11,223,105 | B2 | 1/2022 | Hill et al. |
| 11,303,022 | B2 * | 4/2022 | Avser ...................... H01Q 5/40 |
| 11,487,322 | B2 | 11/2022 | Kuna et al. |
| 11,522,983 | B2 | 12/2022 | Bates et al. |
| 11,581,629 | B2 | 2/2023 | Hill et al. |
| 11,769,940 | B2 | 9/2023 | Renda et al. |
| 11,784,673 | B2 | 10/2023 | Bloom et al. |
| 12,074,363 | B2 | 8/2024 | Hill et al. |
| 12,362,777 | B2 | 7/2025 | Bloom et al. |
| 12,388,168 | B2 | 8/2025 | Parker et al. |
| 2007/0241971 | A1 | 10/2007 | Tsujimura et al. |
| 2008/0268083 | A1 | 10/2008 | Ferenc |
| 2009/0141436 | A1 | 6/2009 | Matsuoka et al. |
| 2009/0257207 | A1 | 10/2009 | Wang et al. |
| 2010/0230155 | A1 | 9/2010 | Hashizume et al. |
| 2011/0186345 | A1 * | 8/2011 | Pakula ................. G06F 1/1626 156/60 |
| 2012/0041170 | A1 | 2/2012 | Benes et al. |
| 2012/0044635 | A1 | 2/2012 | Rothkopf et al. |
| 2012/0319907 | A1 | 12/2012 | Wu et al. |
| 2013/0235538 | A1 | 9/2013 | Hashimoto et al. |
| 2013/0250504 | A1 | 9/2013 | Choi et al. |
| 2014/0004294 | A1 | 1/2014 | Christophy et al. |
| 2014/0023430 | A1 | 1/2014 | Prest et al. |
| 2014/0071651 | A1 | 3/2014 | Wittenberg et al. |
| 2014/0206420 | A1 | 7/2014 | Neichi |
| 2014/0247188 | A1 | 9/2014 | Nakano et al. |
| 2014/0334077 | A1 | 11/2014 | Kwong et al. |
| 2014/0361945 | A1 | 12/2014 | Misra et al. |
| 2015/0050968 | A1 | 2/2015 | Jeon et al. |
| 2015/0062807 | A1 | 3/2015 | Gwin et al. |
| 2015/0093527 | A1 | 4/2015 | Montevirgen et al. |
| 2015/0109170 | A1 | 4/2015 | Kang et al. |
| 2015/0167193 | A1 | 6/2015 | Demers |
| 2015/0188215 | A1 | 7/2015 | Jarvis |
| 2016/0006109 | A1 | 1/2016 | Nil et al. |

(56) References Cited

U.S. PATENT DOCUMENTS

| | | | |
|---|---|---|---|
| 2016/0113113 | A1 | 4/2016 | Sethumadhavan et al. |
| 2016/0120046 | A1 | 4/2016 | Ou et al. |
| 2016/0192517 | A1 | 6/2016 | Tsao et al. |
| 2017/0048991 | A1 | 2/2017 | Young et al. |
| 2017/0069956 | A1 | 3/2017 | Hill et al. |
| 2017/0149171 | A1 | 5/2017 | Szeto et al. |
| 2017/0308123 | A1 | 10/2017 | McClure et al. |
| 2017/0347470 | A1 | 11/2017 | Seo et al. |
| 2018/0004247 | A1 | 1/2018 | Qing et al. |
| 2018/0026341 | A1 | 1/2018 | Mow et al. |
| 2018/0081400 | A1 | 3/2018 | Pandya et al. |
| 2018/0084680 | A1 * | 3/2018 | Jarvis .................... G06F 1/1637 |
| 2018/0129170 | A1 | 5/2018 | Min et al. |
| 2018/0189468 | A1 | 7/2018 | Shim et al. |
| 2018/0262226 | A1 | 9/2018 | Aycan et al. |
| 2019/0082555 | A1 * | 3/2019 | Hooton ................ H05K 9/0007 |
| 2019/0165472 | A1 | 5/2019 | Yun et al. |
| 2019/0222683 | A1 | 7/2019 | Choi et al. |
| 2019/0254185 | A1 | 8/2019 | Cater et al. |
| 2020/0014098 | A1 | 1/2020 | Xu et al. |
| 2020/0026108 | A1 | 1/2020 | Metin et al. |
| 2020/0073445 | A1 | 3/2020 | Kuna et al. |
| 2020/0100402 | A1 | 3/2020 | Schmitt et al. |
| 2020/0205307 | A1 * | 6/2020 | Hooton ................... B23P 13/02 |
| 2020/0221002 | A1 | 7/2020 | Akana et al. |
| 2020/0249724 | A1 | 8/2020 | Myers et al. |
| 2020/0310489 | A1 * | 10/2020 | Spraggs ................. H04N 23/45 |
| 2020/0337184 | A1 * | 10/2020 | Meyer ................ H05K 7/20436 |
| 2021/0250670 | A1 | 8/2021 | Jun et al. |
| 2022/0024182 | A1 | 1/2022 | Liao et al. |
| 2022/0329678 | A1 | 10/2022 | Zhang et al. |
| 2022/0413565 | A1 | 12/2022 | Mao et al. |
| 2024/0267637 | A1 | 8/2024 | Lee et al. |
| 2024/0372245 | A1 | 11/2024 | Hill et al. |
| 2025/0174878 | A1 | 5/2025 | Hill et al. |

FOREIGN PATENT DOCUMENTS

| | | |
|---|---|---|
| CN | 111052502 | 4/2020 |
| EP | 1225652 | 7/2002 |
| EP | 2838157 | 2/2015 |
| EP | 2993730 | 7/2019 |
| EP | 3832993 | 6/2021 |
| KR | 20130126094 | 11/2013 |
| KR | 20190098607 | 8/2019 |
| KR | 20200101240 | 8/2020 |
| KR | 20210069596 | 6/2021 |
| KR | 20210069598 | 6/2021 |
| WO | WO2020/055377 | 3/2020 |
| WO | WO2020/076449 | 4/2020 |

OTHER PUBLICATIONS

Domun et al., “Improving the fracture toughness and the strength of epoxy using nanomaterials—a review of the current status,” Royal Society of Chemistry, Nanoscale, 7, pp. 10294-10329, 2015.

Gao et al., “A Compact UWB and Bluetooth Slot Antenna for MIMO/Diversity Applications,” ETRI Journal, vol. 36, No. 2, pp. 309-312, Apr. 2024.

* cited by examiner

HANDHELD ELECTRONIC DEVICE

CROSS-REFERENCE TO RELATED APPLICATION(S)

This application is a nonprovisional patent application of and claims the benefit of U.S. Provisional Patent Application No. 63/441,756, filed Jan. 27, 2023 and titled "Handheld Electronic Device," the disclosure of which is hereby incorporated herein by reference in its entirety.

FIELD

The subject matter of this disclosure relates generally to handheld electronic devices, and more particularly, to mobile phones.

BACKGROUND

Modern consumer electronic devices take many shapes and forms, and have numerous uses and functions. Smartphones, for example, provide various ways for users to interact with other people that extend beyond telephone communications. Such devices may include numerous systems to facilitate such interactions. For example, a smartphone may include a touch-sensitive display for providing graphical outputs and for accepting touch inputs, wireless communications systems for connecting with other devices to send and receive voice and data content, cameras for capturing photographs and videos, and so forth. However, integrating these subsystems into a compact and reliable product that is able to withstand daily use presents a variety of technical challenges. The systems and techniques described herein may address many of these challenges while providing a device that offers a wide range of functionality.

SUMMARY

A mobile phone may include an enclosure including a front cover assembly defining a front exterior surface of the enclosure, a rear cover assembly defining a rear exterior surface of the enclosure, and a housing subassembly positioned between the front cover assembly and the rear cover assembly. The housing subassembly may include a first housing component defining a first side exterior surface of the enclosure, a second housing component defining a second side exterior surface of the enclosure opposite the first side exterior surface of the enclosure, and a lower chassis section extending between the first housing component and the second housing component. The mobile phone may further include a camera array coupled to the lower chassis section and positioned in an interior cavity defined between the lower chassis section and the front cover assembly, the camera array including at least one camera that extends through the lower chassis section and toward the rear cover assembly, and a display coupled to the front cover assembly.

The mobile phone may further include a battery positioned in the interior cavity defined between the lower chassis section and the front cover assembly. The lower chassis section may define a first side facing the front cover assembly and a second side facing the rear cover assembly. The camera array may be coupled to the first side of the lower chassis section, and the battery may be coupled to the first side of the lower chassis section. The rear cover assembly may include a rear cover, and the mobile phone may further include a charging coil positioned between the rear cover and the second side of the lower chassis section, the charging coil configured to wirelessly couple to a charging accessory to receive power for the mobile phone.

The lower chassis section may define a first hole extending therethrough, a second hole extending therethrough, and a third hole extending therethrough, and the camera array may include a first camera extending at least partially through the first hole, a second camera extending at least partially through the second hole, and a third camera extending at least partially through the third hole.

The lower chassis section may further define an alignment feature. The camera array may further include a camera bracket configured to engage with the alignment feature to align the camera bracket relative to the lower chassis section and a camera coupled to the camera bracket.

The lower chassis section may be welded to the first housing component and to the second housing component. The rear cover assembly may further include a rear cover defining a first hole extending therethrough and a metal anchor plate positioned on an interior side of the rear cover and defining a second hole aligned with the first hole. A camera of the camera array may extend through the second hole and at least partially into the first hole.

A portable electronic device may include a display, wireless communication circuitry, a battery, and an enclosure enclosing the display, the wireless communication circuitry, and the battery. The enclosure may include a housing subassembly including a first wall section defining at least a portion of a first side exterior surface of the portable electronic device, a second wall section defining at least a portion of a second side exterior surface of the portable electronic device opposite to the first side exterior surface, and a lower chassis section welded to the first wall section along a first side of the lower chassis section and welded to the second wall section along a second side of the lower chassis section. The enclosure may further include a first housing component coupled to a first end of the housing subassembly and defining a first exterior corner surface of the portable electronic device, and a second housing component coupled to the first end of the housing subassembly and defining a second exterior corner surface of the portable electronic device. The enclosure may further include a front cover coupled to the housing subassembly and defining a front exterior surface of the portable electronic device, and a rear cover coupled to the housing subassembly and defining a rear exterior surface of the portable electronic device.

The first wall section may include a core portion formed from a first metal and defining a portion of an interior surface of the portable electronic device and a cladding portion bonded to the core portion and defining the first side exterior surface of the portable electronic device. The lower chassis section may be welded to the core portion of the first wall section. The core portion may include aluminum alloy, the lower chassis section may include aluminum alloy, and the cladding portion may include titanium alloy.

The lower chassis section may define a first side facing the front cover and a second side facing the rear cover, the battery may be coupled to the first side of the lower chassis section and positioned between the lower chassis section and the front cover, and the portable electronic device may further include a charging coil coupled to the rear cover and positioned between the lower chassis section and the rear cover.

The lower chassis section may define a first interlock structure, the first housing component may define a second interlock structure, and the portable electronic device may further include a molded polymer structure engaged with the first interlock structure and the second interlock structure and retaining the first housing component to the lower chassis section. The molded polymer structure may be a first molded polymer structure, and the portable electronic device may further include a second molded polymer structure positioned between an end of the first wall section and an end of the first housing component and defining a portion of the first side exterior surface of the portable electronic device.

An electronic device may include an enclosure including a front cover assembly including a transparent cover defining a front exterior surface of the enclosure and a display positioned below the transparent cover. The enclosure may further include a rear cover assembly including a dielectric member defining a rear exterior surface of the enclosure. The enclosure may further include a housing subassembly including a lower chassis section at least partially defining a first cavity between the lower chassis section and the front cover assembly and at least partially defining a second cavity between the lower chassis section and the rear cover assembly, a first wall positioned at a first side of the lower chassis section and defining a first side exterior surface of the enclosure, a second wall positioned at a second side of the lower chassis section and defining a second side exterior surface of the enclosure, a battery positioned in the first cavity, and a charging coil positioned in the second cavity.

The first wall may be welded to the lower chassis section along a first lateral side of the lower chassis section and the second wall may be welded to the lower chassis section along a second lateral side of the lower chassis section opposite the first lateral side.

The lower chassis section may define a first side facing the front cover assembly and a second side facing the rear cover assembly, and a hole extending from the first side of the lower chassis section to the second side of the lower chassis section, and the electronic device may further include a camera positioned on the first side of the lower chassis section and extending through the hole in the lower chassis section. The hole may be a first hole, the rear cover assembly may include a rear cover defining a second hole and an anchor plate coupled to the rear cover and defining a third hole, and the camera may extend through the third hole and at least partially through the second hole.

The lower chassis section may at least partially define a hole, the electronic device may further include a spring coupling element coupled to the housing subassembly and positioned at least partially in the hole, and the rear cover assembly may include a rear cover and a fastening feature coupled to the rear cover. The fastening feature may include a base portion coupled to the rear cover and a tab extending from the base portion and configured to engage the spring coupling element. The base portion of the fastening feature may be conductively coupled to an electrical component of the rear cover assembly and to the spring coupling element.

A mobile phone may include a front cover defining a front exterior surface of the mobile phone, a display below the front cover, a rear cover defining a rear exterior surface of the mobile phone, and a housing positioned between the front cover and the rear cover. The housing may include a first housing component including a cladding portion formed from a first metal and defining a first portion of a side exterior surface of the mobile phone, and a core portion coupled to the cladding portion, the core portion defining a portion of an interior surface of the mobile phone and formed from a second metal different from the first metal, a second housing component defining a second portion of the side exterior surface of the mobile phone, and a joint structure coupled to the first housing component and the second housing component and defining a third portion of the side exterior surface of the mobile phone between the first portion of the side exterior surface and the second portion of the side exterior surface. The cladding portion may be bonded directly to the core portion.

The cladding portion may be a first cladding portion and the core portion may be a first core portion. The second housing component may include a second cladding portion formed from the first metal and defining the second portion of the side exterior surface of the mobile phone and a second core portion coupled to the second cladding portion, the second core portion formed from the second metal. The first metal may be a titanium alloy and the second metal may be an aluminum alloy.

The cladding portion may define a first portion of a mounting surface, the core portion may define a second portion of the mounting surface, and the front cover may be coupled to the mounting surface. The mounting surface may be a first mounting surface, the cladding portion may define a first portion of a second mounting surface, the core portion may define a second portion of the second mounting surface, and the rear cover may be coupled to the second mounting surface.

The cladding portion may be a first cladding portion, the core portion may be a first core portion, the side exterior surface may be a first side exterior surface, and the housing may further include a third housing component. The third housing component may include a second cladding portion formed from the first metal and defining a portion of a second side exterior surface of the mobile phone and a second core portion coupled to the second cladding portion and formed from the second metal. The housing may further include a lower chassis section welded to the first core portion along a first side of the lower chassis section and welded to the second core portion along a second side of the lower chassis section, the lower chassis section defining a component mounting structure extending between the first housing component and the third housing component.

A portable electronic device may include a housing defining a portion of a side exterior surface of the portable electronic device and including a first housing component. The first housing component may include a first cladding portion formed from a first metal and defining a first portion of the side exterior surface of the portable electronic device and a first core portion formed from a second metal and defining a first portion of a mounting surface, the second metal different from the first metal. The housing may further include a second housing component coupled to the first housing component and including a second cladding portion formed from the first metal and defining a second portion of the side exterior surface of the portable electronic device, and a second core portion formed from the second metal and defining a second portion of the mounting surface. The portable electronic device may further include a front cover assembly coupled to the mounting surface and including a transparent cover defining a front surface of the portable electronic device, and a display coupled to the transparent cover. The portable electronic device may further include a rear cover assembly coupled to the housing and defining a rear surface of the portable electronic device. The first housing component may be an extrudate member that includes the first cladding portion bonded directly to the first core portion. The second housing component may define an exterior corner surface of the portable electronic device. The first cladding portion may define a third portion of the mounting surface, and the second cladding portion may define a fourth portion of the mounting surface. The first cladding portion may define a first portion of a flange extending along a peripheral side surface of the transparent cover, and the second cladding portion may define a second portion of the flange extending along the peripheral side surface of the transparent cover.

The housing may further include a joint structure coupled to the first housing component and the second housing component and defining a third portion of the side exterior surface of the portable electronic device between the first portion of the side exterior surface and the second portion of the side exterior surface. The first housing component may define a first interlock structure, the second housing component may define a second interlock structure, and the joint structure may engage the first interlock structure and the second interlock structure.

An electronic device may include a front cover defining a front exterior surface of the electronic device, a display below the front cover, a rear cover defining a rear exterior surface of the electronic device, and a housing positioned between the front cover and the rear cover. The housing may include a wall segment. The wall segment may include a cladding portion formed from a first metal and defining a portion of a side surface of the electronic device, a portion of a first flange extending along a peripheral side surface of the front cover, and a portion of a second flange extending along a peripheral side surface of the rear cover. The wall segment may further include a core portion formed from a second metal and fused to the cladding portion, the core portion defining at least a portion of an interior cavity of the electronic device. The core portion may define a portion of a first mounting surface, the front cover coupled to the first mounting surface, and a portion of a second mounting surface, the rear cover coupled to the second mounting surface. The first metal may be a titanium alloy, and the second metal may be an aluminum alloy.

The wall segment may be a first wall segment, the portion of the side surface may be a first portion of the side surface, the portion of the first flange may be a first portion of the first flange, the portion of the second flange may be a first portion of the second flange, and the housing may further include a second wall segment. The second wall segment may include a second cladding portion formed from the first metal and defining a second portion of the side surface of the electronic device, a second portion of the first flange, and a second portion of the second flange. The housing may further include a second core portion formed from the second metal and fused to the second cladding portion. The housing may further include a molded polymer member positioned between the first wall segment and the second wall segment and defining a third portion of the side surface of the electronic device. The molded polymer member may further define a third portion of the first flange and a third portion of the second flange.

A mobile phone may include an enclosure including a housing component and a front cover coupled to the housing component and defining a front exterior surface of the mobile phone. The mobile phone may further include a display positioned below the front cover and a sensor module positioned below a front-facing sensor region of the front cover and including a biometric sensing system. The biometric sensing system may include a first lens, a light emitter positioned below the first lens and configured to emit light onto an object, a second lens, and a light sensor below the second lens and configured to capture an image of the object. The sensor module may further include a proximity sensing system positioned between the first lens of the biometric sensing system and the second lens of the biometric sensing system.

The light sensor may be a first light sensor, the light emitter may be a first light emitter, and the proximity sensing system may include a first light guide, a second light emitter positioned below the first light guide and configured to emit light into the first light guide, a second light guide, and a second light sensor positioned below the second light guide and configured to receive light from the second light guide. The light emitted by the first light emitter may include a pattern of infrared light, the first light sensor may be configured to capture the image of the object while the object is illuminated with the pattern of infrared light, the biometric sensing system may be configured to authenticate a user based on an image captured by the first light sensor, and the proximity sensing system may be configured to detect a proximity of the mobile phone to a user's face.

The sensor module may further include a molded housing member defining a first hole, a second hole, and a third hole, the first light guide may be positioned in the first hole, the second light guide may be positioned in the second hole, and the first lens may be positioned in the third hole. The molded housing member may further define a light-blocking wall positioned between the second light emitter and the second light sensor.

The first light emitter may be configured to project, through the first lens, a dot pattern on the object, and the biometric sensing system may further include a third light emitter positioned below the first lens and configured to illuminate, through the first lens, the object with a flood of light. The sensor module may further include a molded housing member defining a light-blocking wall positioned between the third light emitter and the second light sensor. The light-blocking wall may be further positioned between the second light emitter and the light sensor.

A portable electronic device may include a housing component and a front cover assembly coupled to the housing component. The front cover assembly may include a front cover defining a display region and a front-facing sensor region at least partially surrounded by the display region, and a display positioned below the display region. The portable electronic device may further include a sensor module positioned below the front-facing sensor region and including a housing member, a lens coupled to the housing member, a first light emitter below the lens and configured to emit first light through the lens, a first light guide coupled to the housing member, a second light emitter below the first light guide and configured to emit second light through the first light guide, a second light guide coupled to the housing member, and a light sensor below the second light guide and configured to receive a reflected portion of the second light. The housing member may define a light-blocking wall positioned between the first light emitter and the light sensor.

The portable electronic device may be configured to detect a proximity of an object to the portable electronic device based at least in part on information from the light sensor. The first light emitter may be configured to project a dot pattern onto a user's face, and the portable electronic device may be further configured to determine a depth map of the user's face using the dot pattern projected onto the user's face, and authenticate the user based at least in part on the depth map of the user's face.

The housing member may define a first hole and a second hole, the first light guide may be positioned in the first hole, and the second light guide may be positioned in the second hole. The housing member may be formed from an optically opaque material, the first light guide may be formed from a first optically transparent material, and the second light guide may be formed from a second optically transparent material.

An electronic device may include a housing component, a front cover coupled to the housing component and defining a display region and a front-facing sensor region surrounded by the display region, a display defining a hole extending therethrough, the hole positioned below the front-facing sensor region, and a front-facing sensor module positioned below the front-facing sensor region. The front-facing sensor module may include a front-facing camera and a biometric sensing system positioned below the hole in the display and configured to illuminate a first object and capture an image of the first object through the front cover. The biometric sensor module may include a first light emitter configured to emit light onto the first object and a first light sensor configured to capture an image of the first object. The front=facing sensor module may further include a proximity sensing system including a second light emitter configured to emit light onto a second object, and a second light sensor configured to receive a portion of the light reflected by the second object. The biometric sensing system may be configured to authenticate a user based at least in part on the image of the first object.

The front-facing sensor module may further include a housing member, a first light guide coupled to the housing member and positioned over the second light emitter, and a second light guide coupled to the housing member and positioned over the second light sensor. The front-facing sensor module may further include a lens coupled to the housing member and positioned over the first light emitter.

The housing member may define a light-blocking wall positioned between the second light emitter and the second light sensor. The hole may be a first hole and the housing member may be formed from a unitary polymer structure and may define a second hole and a third hole. The first light guide may be positioned in the second hole and the second light guide may be positioned in the third hole.

A portable electronic device may include a housing component defining a side exterior surface of the portable electronic device and a front cover assembly coupled to the housing component and including a front cover defining a front exterior surface of the portable electronic device and an interior surface opposite to the front exterior surface, a display stack attached to the interior surface of the front cover, a support frame coupled to the display stack and defining a plurality of engagement features, and a molded frame member coupled to the interior surface of the front cover and extending at least partially around a periphery of the display stack, the molded frame member encapsulating at least a portion of the support frame and engaging the plurality of engagement features.

The support frame may include a metal structure adhered to the display stack. The support frame may define a flange extending outwardly from a peripheral side of the display stack. The plurality of engagement features includes a set of holes formed through the flange.

The front cover assembly may further include a coating structure positioned on a peripheral portion of the interior surface of the front cover and the molded frame member may be bonded to the coating structure.

The display stack may include a flexible circuit element, the flexible circuit element defining a loop portion extending from a side of the display stack and at least partially enclosing a loop volume, and the molded frame member may conform to an outer surface of the loop portion and fills the loop volume. The molded frame member may be formed of a material having a curing wavelength range, and the loop portion may be optically transmissive within the curing wavelength range.

A mobile phone may include a housing component, a front cover coupled to the housing component and defining an exterior surface and an interior surface opposite to the exterior surface, a display stack attached to the interior surface of the front cover, a support frame coupled to the display stack and defining a flange extending outwardly from a peripheral side of the display stack, and a frame member formed from a molded polymer material, the molded polymer material at least partially encapsulating the flange and defining an upper surface coupled to the front cover and a lower surface coupled to the housing component. The support frame may be formed of metal.

The flange may define a plurality of engagement features, and the molded polymer material interlocks with the plurality of engagement features. The plurality of engagement features may include a set of holes formed through the flange. The molded polymer material may at least partially encapsulate a side of the display stack.

The mobile phone may further include an opaque coating structure positioned on a peripheral portion of the interior surface of the front cover and defining an opaque border around an active area of the display stack, and the frame member may be bonded to the opaque coating structure. The frame member may be bonded to a first portion of the opaque coating structure, and a portion of the display stack may be coupled to a second portion of the opaque coating structure.

A portable electronic device may include a housing component defining a portion of a side exterior surface of the portable electronic device, and a mounting surface within an interior volume of the portable electronic device. The portable electronic device may further include a front cover assembly coupled to the housing component and including a front cover defining an exterior surface and an interior surface opposite to the exterior surface, a display stack coupled to a first portion of the interior surface of the front cover, and a coating structure positioned on a second portion of the interior surface of the front cover, the second portion extending about a periphery of the first portion. The second portion may include an opaque mask coupled to the front cover and an outer layer coupled to the opaque mask. The front cover assembly may further include a molded frame member bonded to the outer layer of the coating structure and at least partially encapsulating a peripheral side of the display stack, the molded frame member adhered to the mounting surface of the housing component, thereby coupling the front cover assembly to the housing component. The outer layer may include a transparent coating layer.

The molded frame member may be bonded to a first portion of the outer layer of the coating structure, and the display stack may be coupled to a second portion of the outer layer of the coating structure.

The front cover assembly may further include a support frame coupled to the display stack and defining a plurality of engagement features, and the molded frame member may encapsulate at least a portion of the support frame and engages the plurality of engagement features.

The display stack may include a flexible circuit element, the flexible circuit element defining a loop portion extending from a side of the display stack, and the molded frame member may rigidly encapsulate the loop portion. The molded frame member may include a light-cured polymer material that absorbs light within a wavelength range, and the loop portion may be optically transmissive within the wavelength range.

A mobile phone may include an enclosure defining a front exterior surface of the mobile phone, a rear exterior surface of the mobile phone, and a side exterior surface of the mobile phone. The enclosure may include a front cover assembly defining the front exterior surface of the mobile phone and a housing component coupled to the front cover assembly and defining the side exterior surface of the mobile phone. The mobile phone may further include an audio output system configured to produce an audible alert in response to the mobile phone receiving an incoming call, a momentary ringer-control button positioned along the side exterior surface of the housing component, and a processing system configured to, in response to detecting an actuation of the momentary ringer-control button while a first ringer mode of the mobile phone is active, transition the mobile phone to a second ringer mode, and in response to detecting the actuation of the momentary ringer-control button while a second ringer mode of the mobile phone is active, transition the mobile phone to the first ringer mode.

In the first ringer mode, the audio output system produces the audible alert in response to the mobile phone receiving the incoming call, and in the second ringer mode, the audio output system does not produce the audible alert in response to the mobile phone receiving the incoming call.

The mobile phone may further include a first volume button positioned along the side exterior surface of the housing component and configured to increase a volume of an audio output of the mobile phone, and a second volume button positioned along the side surface of the housing component and configured to decrease the volume of the audio output of the mobile phone.

The front cover assembly may include a front cover defining a primary display region, a front-facing sensor region surrounded by the primary display region, and a supplemental display region within the front-facing sensor region. The processing system may be further configured to, in response to detecting the actuation of the momentary ringer-control button while the first ringer mode of the mobile phone is active, cause a graphical element indicative of the second ringer mode to be displayed in the supplemental display region. The mobile phone may further include a display below the front cover, the display operable in a first state in which graphical outputs are displayed in the primary display region, and a second state in which graphical outputs are not displayed in the primary display region. The graphical element may be displayed in the supplemental display region when the display is operating in the first state and in the second state.

The actuation of the momentary ringer-control button may be a first actuation of the momentary ringer-control button, the first actuation may occur while the mobile phone is in a first mode of operation, transitioning between the first ringer mode and the second ringer mode may be a first device function, and the processing system may be further configured to in response to detecting a second actuation of the momentary ringer-control button while the mobile phone is in a second mode of operation, initiate a second device function different than the first device function. The mobile phone may further include a camera, the second mode of operation may be an image capture mode, and the second device function includes capturing an image with the camera.

A portable electronic device may include a touchscreen display, wireless communication circuitry, a battery, and an enclosure enclosing the touchscreen display, the wireless communication circuitry, and the battery. The enclosure may include a front cover positioned over the touchscreen display and defining a front exterior surface of the enclosure and a housing component coupled to the front cover and defining a side exterior surface of the enclosure, the side exterior surface extending from the front exterior surface of the enclosure to a rear exterior surface of the enclosure. The portable electronic device may further include a momentary button positioned along the side exterior surface of the enclosure, wherein while the portable electronic device is in a first mode of operation, actuation of the momentary button toggles between a first ringer mode of the portable electronic device and a second ringer mode of the portable electronic device, and while the portable electronic device is in a second mode of operation different than the first mode of operation, actuation of the momentary button may initiate a device function other than toggling between the first ringer mode and the second ringer mode.

When the portable electronic device is in the first ringer mode, actuation of the momentary button may transition the portable electronic device to the second ringer mode, and when the portable electronic device is in the second ringer mode, actuation of the momentary button may transition the portable electronic device to the first ringer mode. The portable electronic device may further include an audio output system configured to produce an audible alert in response to the portable electronic device receiving an incoming call. In the first ringer mode, the audio output system may produce the audible alert in response to the portable electronic device receiving the incoming call, and in the second ringer mode, the audio output system may not produce the audible alert in response to the portable electronic device receiving the incoming call.

In response to transitioning to the second ringer mode, the portable electronic device may display a graphical output indicative of the second ringer mode. The graphical output may be displayed by the touchscreen display. The front cover may define a primary display region and a supplemental display region at least partially surrounded by the primary display region, and the graphical output may be displayed in the supplemental display region when the primary display region may be inactive. The front cover may further define a front-facing sensor region at least partially surrounded by the primary display region, the supplemental display region may be within the front-facing sensor region, and the portable electronic device may further include a front-facing camera positioned in the front-facing sensor region.

A mobile phone may include a housing component defining a side surface of the mobile phone, a front cover coupled to the housing component, a display positioned below the front cover, a momentary button positioned along the side surface of the mobile phone, and a processing system. The processing system may be configured to, in response to detecting a first actuation of the momentary button while a first ringer mode of the mobile phone is active, transition the mobile phone from the first ringer mode to a second ringer mode and cause a first graphical element indicating the second ringer mode to be displayed on the display. The processing system may be further configured to, in response to detecting a second actuation of the momentary button while the second ringer mode of the mobile phone is active, transition the mobile phone from the second ringer mode to the first ringer mode and cause a second graphical element indicating the first ringer mode to be displayed on the display.

The front cover may define a primary display region, a front-facing sensor region surrounded by the primary display region, and a supplemental display region within the front-facing sensor region, and the first graphical element may be displayed in the supplemental display region. The display may be operable in a first state in which the display displays graphical outputs in the primary display region, and a second state in which the primary display region is blank, and the first graphical element may be displayed in the supplemental display region when the display is operating in the first state and when the display is operating in the second state.

The mobile phone may further include a first volume button positioned along the side surface of the mobile phone and configured to increase a volume of an audio output of the mobile phone and a second volume button positioned along the side surface of the mobile phone and configured to decrease the volume of the audio output of the mobile phone.

The mobile phone may include a dome switch, and actuation of the momentary button may cause the dome switch to collapse. The mobile phone may further include a haptic actuator configured to produce a haptic output, and the processing system may be configured to, in accordance with a determination that the momentary button remains actuated for a predetermined duration, cause the haptic actuator to produce the haptic output.

An electronic device may include a display and an enclosure. The enclosure may include a housing, a front cover coupled to the housing and comprising a front cover member positioned over the display, and a rear cover coupled to the housing and including a rear cover member. The rear cover member may be formed from a glass material including metal nanoparticles configured to impart color to the glass material and having a dielectric constant from 5.5 to 7.5 in a frequency band from 5 GHz to 45 GHz. The rear cover member may include a first portion defining a first thickness and characterized by a first color, and a second portion defining a second thickness, greater than the first thickness, and characterized by a second color, different from the first color. The rear cover may further include a coating disposed along an interior surface of the rear cover member. The first portion of the rear cover member may have n L* value of at least 90 and an L* difference between the first and the second portions of the rear cover member may be at least 10. The electronic device may further include a radio frequency antenna assembly configured to operate in the frequency band.

The electronic device may further include a rear-facing camera array. The second portion of the rear cover member may define an array of holes, and each camera of the rear-facing camera array may extend into a respective hole of the array of holes. The first portion of the rear cover member may define a first texture along an exterior surface of the rear cover member, the second portion of the rear cover member may define a second texture along the exterior surface of the rear cover member, and a third portion of the rear cover member may define a third texture along the exterior surface of the rear cover member that is different from the first texture and the second texture. The third portion of the rear cover member may at least partially surround the first portion of the rear cover member and a boundary between the third texture and the first texture defines an outline of a graphic. The third texture may have a root mean square height that is greater than a root mean square height of each of the first texture and the second texture. A region of the coating interior to the first portion of the rear cover member may have a number of color layers that differs from a number of color layers in a region of the coating interior to the third portion of the rear cover member.

An electronic device may include an enclosure including a housing defining a side surface of the electronic device, a front cover coupled to the housing, defining a front surface of the electronic device, and comprising a front cover member, and a rear cover coupled to the housing, defining a rear surface of the electronic device. The rear cover may include a rear cover member formed from a colored glass material and having a dielectric constant from 5 to 6.5 in a frequency band from 5 GHz to 45 GHz, at least a portion of the rear cover member having an average transmission for visible light greater than 35%, and a coating comprising a plurality of color layers disposed along an interior surface of the rear cover member. The electronic device may further include a display positioned below the front cover and an antenna element of a wireless communication system positioned below the rear cover. The average transmission may range from 65% to 90% over a wavelength range from 360 nm to 740 nm. The portion of the rear cover member may have a chroma value of at least 1.75.

The portion of the rear cover member may be a second portion having a second thickness and a second chroma value, and the rear cover member may further include a first portion having a first thickness that is less than the second thickness, an average transmission for visible light that is greater than the average transmission for visible light of the second portion, and a first chroma value that is less than the second chroma value. The rear cover member may further include a third portion at least partially surrounding and visually distinct from each of the first portion and the second portion. The third portion of the rear cover member may have a gloss value that is lower than a gloss value of the first portion of the rear cover member. The first portion of the rear cover member and a first portion of the coating positioned under the first portion of the rear cover member may together at least partially define a graphic.

An electronic device may include a display, a rear-facing camera array, and an enclosure. The enclosure may include a housing defining a side surface of the electronic device, a first cover defining a front surface of the electronic device, the first cover comprising a first cover member positioned over the display, and a second cover defining a rear surface of the electronic device. The second cover may include a second cover member formed of a colored glass. A first portion of the second cover member may have a first L* value and a second portion of the second cover member may have a second L* value, less than the first L* value. The second portion of the second cover member may define an array of holes, each camera of the rear-facing camera array extending into a respective hole of the array of holes. The second cover may further include a coating disposed along an interior surface of the second cover member.

The second portion of the second cover member may have a transmission for visible light that is less than or equal to 90%. Each of the first and the second portions of the second cover member may have a polished texture along an exterior surface of the second cover member. The second cover member may further include a third portion that at least partially surrounds the first portion of the second cover member and that defines a texture along the exterior surface that has a root mean square height that is greater than a root mean square height of the polished textures of the first and the second portions of the second cover member. The first portion of the second cover member may have a first hue, and the coating may be configured so that a corresponding portion of the second cover has a second hue different from the first hue. A hue difference (ΔH*) between the first and the third portions of the second cover member may be less than 15 degrees. The first portion of the second cover member may have a thickness greater than 0.3 mm and less than 0.75 mm, and the second portion of the second cover member may have a thickness greater than 1 mm and less than or equal to 3 mm.

A mobile phone may include a front cover defining a front exterior surface of the mobile phone, a rear cover defining a rear exterior surface of the mobile phone, and a housing positioned between the front cover and the rear cover and including a first housing component and a second housing component coupled to the first housing component and defining a hole extending therethrough. The mobile phone may further include a connector module configured to couple to a charging cable through the hole in the second housing component, antenna circuitry conductively coupled to the first housing component and the second housing component, and a processing system configured to, in accordance with a determination that the connector module is decoupled from the charging cable, cause the second housing component to operate as a first radiating element for the antenna circuitry, and in accordance with a determination that the connector module is coupled to the charging cable and that an operational condition of the connector module is satisfied, cause the first housing component to operate as at least a portion of a second radiating element for the antenna circuitry. The operational condition of the connector module may correspond to a communication operation between the mobile phone and an external device.

The mobile phone may further include an auxiliary conductive element selectively couplable to the first housing component, the processing system may be further configured to, in accordance with the determination that the connector module is coupled to the charging cable and that the operational condition of the connector module is satisfied, selectively couple the auxiliary conductive element to the first housing component. The first housing component and the auxiliary conductive element may form the second radiating element for the antenna circuitry. The first radiating element may be configured to radiate within a particular frequency band and the second radiating element may be configured to radiate within the particular frequency band. The mobile phone may further include a circuit substrate and the auxiliary conductive element may be a conductive trace on the circuit substrate.

The housing may further include a third housing component formed from a molded polymer material, the third housing component may be positioned between the first housing component and the second housing component, and the first housing component, the second housing component, and the third housing component may each define a respective portion of a side exterior surface of the mobile phone.

The hole may be a first hole, and the first housing component may define a second hole extending therethrough. The mobile phone may further include a flexible circuit element and a speaker module. The speaker module may include a speaker including a speaker diaphragm and a speaker module housing at least partially enclosing the speaker. The speaker module housing may define a first acoustic volume on a first side of the speaker diaphragm, a second acoustic volume on a second side of the speaker diaphragm, and a speaker port acoustically coupling the second acoustic volume to the second hole to emit sound through the second hole. The speaker module may further include a connector assembly coupled to the speaker module housing and conductively coupling the antenna circuitry to the first housing component, the connector assembly including a first connection element conductively coupled to the first housing component, a second connection element conductively coupled to the antenna circuitry, and a spring connector conductively coupled to at least one of the first connection element or the second connection element and conductively coupled to the antenna circuitry.

A portable electronic device may include a housing including a first conductive housing component defining a first portion of a side exterior surface of the portable electronic device and a second conductive housing component defining a second portion of the side exterior surface of the portable electronic device. The portable electronic device may further include an auxiliary conductive element selectively couplable to the first conductive housing component, antenna circuitry coupled to the first conductive housing component, the second conductive housing component, and the auxiliary conductive element. The portable electronic device may further include a processing system configured to, in a first mode of operation cause the first conductive housing component to operate as a radiating element for a first frequency band, and cause the second conductive housing component to operate as a radiating element for a second frequency band, and in second mode of operation, selectively couple the auxiliary conductive element to the second conductive housing component and use the second conductive housing component and the auxiliary conductive element as a radiating element for the first frequency band.

The processing system may be further configured to, in the second mode of operation, disable operation of the first conductive housing component as the radiating element for the first frequency band.

The first conductive housing component may define a hole extending therethrough, and the portable electronic device may further include a connector module configured to couple to a charging cable through the hole in the first conductive housing component. In the first mode of operation, the charging cable is decoupled from the connector module, and in the second mode of operation, the charging cable is coupled to the connector module.

The first frequency band may be lower frequency than the second frequency band. A conductive length of the first conductive housing component may be longer than a conductive length of the second conductive housing component. The portable electronic device may further include a molded polymer structure positioned within the housing, and the auxiliary conductive element may be a metal member at least partially encapsulated in the molded polymer structure.

The portable electronic device may further include a molded polymer structure positioned within the housing and defining a first passage, a second passage, and a third passage. The portable electronic device may further include a first flexible circuit element coupled to the connector module, and a sensor subassembly mounted to the molded polymer structure. The sensor subassembly may include a second flexible circuit element, a pressure sensor conductively coupled to the second flexible circuit element and fluidly coupled to the first passage, a barometric venting system fluidly coupled to the second passage, a microphone conductively coupled to the second flexible circuit element and fluidly coupled to the third passage, and a circuit board connector conductively coupling the first flexible circuit element to the second flexible circuit element.

A mobile phone may include a front cover assembly defining a front exterior surface of the mobile phone, a rear cover assembly defining a rear exterior surface of the mobile phone, and a housing subassembly coupled to the front cover assembly and the rear cover assembly. The housing subassembly may include a first conductive housing component defining a first portion of a side exterior surface of the mobile phone and configured to operate as at least a portion of a first radiating element for an antenna array of the mobile phone, a second conductive housing component defining a second portion of the side exterior surface of the mobile phone and configured to operate as a second radiating element for the antenna array of the mobile phone, and a third conductive housing component defining a third portion of the side exterior surface of the mobile phone. The third conductive housing component may be positioned between the first conductive housing component and the second conductive housing component and defining a hole extending therethrough, a first molded member positioned between the first conductive housing component and the third conductive housing component and defining a fourth portion of the side exterior surface of the mobile phone, and a second molded member positioned between the second conductive housing component and the third conductive housing component and defining a fifth portion of the side exterior surface of the mobile phone. The mobile phone may further include a connector module configured to couple to a charging cable through the hole in the third conductive housing component. The first conductive housing component may define a first corner of the housing subassembly and the second conductive housing component may define a second corner of the housing subassembly.

The first conductive housing component may be configured to operate as a first portion of the first radiating element, and the mobile phone may further include an auxiliary conductive element coupled to the first conductive housing component and configured to operate as a second portion of the first radiating element. A conductive length of the first radiating element may be longer than a conductive length of the second radiating element. The auxiliary conductive element may be at least partially encapsulated in the first molded member.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Mobile phones as described herein may include complex, sophisticated components and systems that facilitate a multitude of functions. For example, mobile phones according to the instant disclosure may include touch- and/or force-sensitive displays, numerous cameras (including both front- and rear-facing cameras), GPS systems, haptic actuators, wireless charging systems, and all requisite computing components and software to operate these (and other) systems and otherwise provide the functionality of the mobile phones.

Figure 1A:
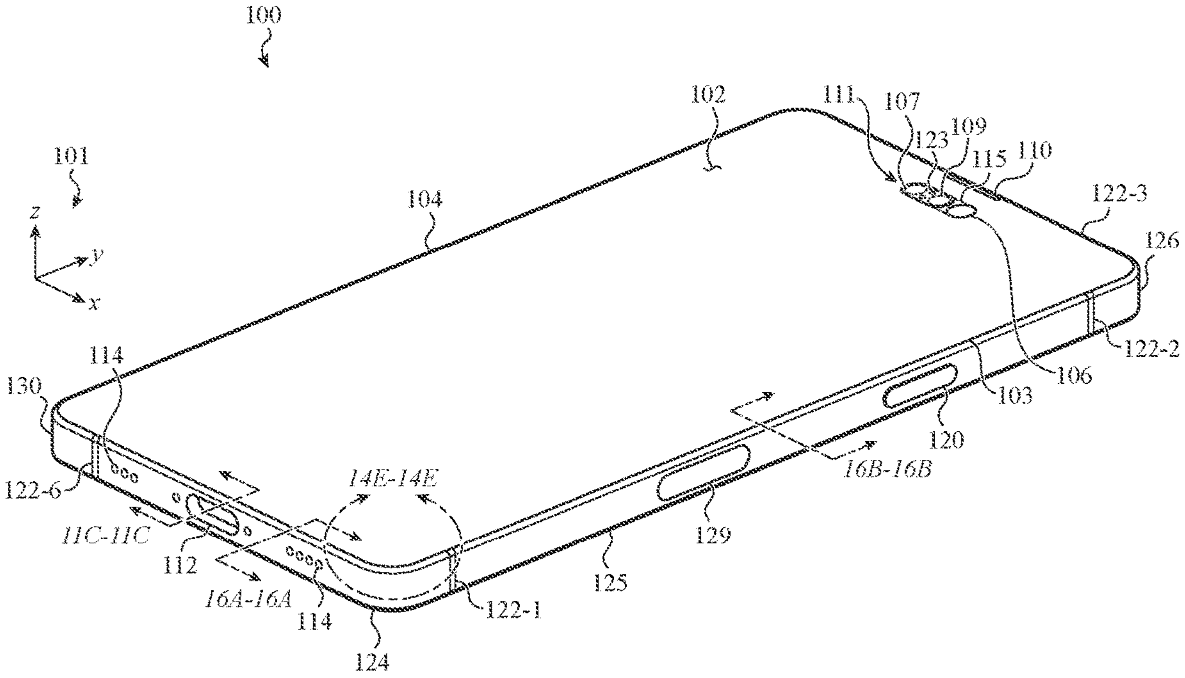
FIGS. 1A-1B depict an example electronic device.
Figure 1B:
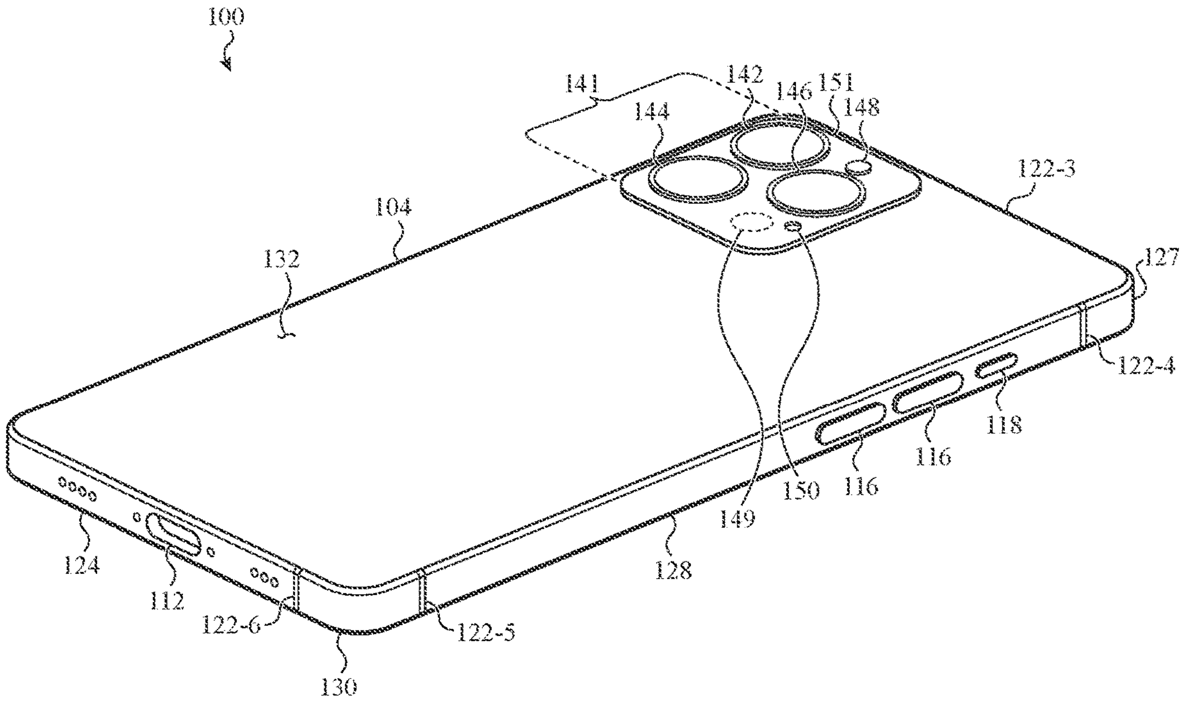

FIGS. 1A and 1B show an example electronic device 100 embodied as a mobile phone. FIG. 1A illustrates a front of the device 100, while FIG. 1B illustrates a back side of the device. While the device 100 is a mobile phone, the concepts presented herein may apply to any appropriate electronic devices, including portable electronic devices, wearable devices (e.g., watches), laptop computers, handheld gaming devices, tablet computers, computing peripherals (e.g., mice, touchpads, keyboards), or any other device. Accordingly, any reference to an "electronic device" encompasses any and all of the foregoing.

The electronic device 100 includes a cover 102 (e.g., a front cover) attached to a housing 104 (which may include a housing structure defined by one or more housing components). The cover 102 may be positioned over a display 103. The cover 102 may be a sheet or sheet-like structure formed from or including a transparent or optically transmissive material. The cover 102 may define a front exterior surface of the device, and an interior surface opposite the exterior surface. In some cases, the cover 102 is formed from or includes a glass material and may therefore be referred to as a glass cover member. The glass material may be a silica-based glass material, an aluminosilicate glass, a boroaluminosilicate glass, an alkali metal aluminosilicate glass (e.g., a lithium aluminosilicate glass), or a chemically strengthened glass. Other example materials for the cover 102 include, without limitation, sapphire, ceramic, glass-ceramic, crystallizable glass materials, or plastic (e.g., polycarbonate). A glass-ceramic material may be a silica-based glass ceramic material, such as an aluminosilicate glass ceramic material or a boroaluminosilicate glass ceramic material. The glass-ceramic material may be chemically strengthened by ion exchange. The cover 102 may be formed as a monolithic or unitary sheet. The cover 102 may also be formed as a composite of multiple layers of different materials, coatings, and other elements.

The display 103 may be at least partially positioned within the interior volume of the housing 104. The display 103 may be coupled to the cover 102, such as via an adhesive or other coupling scheme. The display 103 may include a liquid-crystal display (LCD), a light-emitting diode (LED) display, an organic light-emitting diode (OLED) display, an active layer organic light-emitting diode (AMOLED) display, an organic electroluminescent (EL) display, an electrophoretic ink display, or the like. The display 103 may be configured to display graphical outputs, such as graphical user interfaces, that the user may view and interact with. Graphical outputs may be displayed in a graphically active region of the display 103 (e.g., an active display region). The display 103 may also define a primary display region, which may generally correspond to the main front-facing, contiguous display region, in which graphical user interfaces, images, videos, applications, and other graphical outputs may be displayed.

The device 100 may also include an ambient light sensor that can determine properties of the ambient light conditions surrounding the device 100. The device 100 may use information from the ambient light sensor to change, modify, adjust, or otherwise control the display 103 (e.g., by changing a hue, brightness, saturation, or other optical aspect of the display based on information from the ambient light sensor). The ambient light sensor may be positioned below an active area of the display 103 (e.g., below a portion of the display that produces graphical output). The ambient light sensor may transmit and/or receive light through the active area of the display 103 to perform sensing functions.

The display 103 may include or be associated with one or more touch- and/or force-sensing systems. In some cases, components of the touch- and/or force-sensing systems are integrated with the display stack. For example, touch-sensing components such as electrode layers of a touch and/or force sensor may be provided in a stack that includes display components (and is optionally attached to or at least viewable through the cover 102). The touch- and/or force-sensing systems may use any suitable type of sensing technology and touch-sensing components, including capacitive sensors, resistive sensors, surface acoustic wave sensors, piezoelectric sensors, strain gauges, or the like. The outer or exterior surface of the cover 102 may define an input surface (e.g., a touch- and/or force-sensitive input surface) of the device. While both touch- and force-sensing systems may be included, in some cases the device 100 includes a touch-sensing system and does not include a force-sensing system.

The device 100 may also include a front-facing camera 106. The front-facing camera 106 may be positioned below or otherwise covered and/or protected by the cover 102. The front-facing camera 106 may have any suitable operational parameters. For example, the front-facing camera 106 may include a 12-megapixel sensor (with 1 micron pixel size), and an 80-90° field of view. The front-facing camera 106 may have an aperture number of f/1.9. The front-facing camera 106 may include auto-focus functionality (e.g., one or more lens elements may move relative to an optical sensor to focus an image on the sensor). Other types of cameras may also be used for the front-facing camera 106, such as a fixed-focus camera.

The front-facing camera 106 (as well as other components) may be positioned in a front-facing sensor region 111. The front-facing sensor region 111 may be positioned in an island-like area of the front of the device 100 and may be surrounded by a display region (e.g., a main display region) of the device 100. In some cases, as described herein, the front-facing sensor region 111 may be positioned in or defined by one or more holes formed through the display 103. In such cases, the front-facing sensor region 111 may be bordered on all sides by active areas or regions of the display 103. Stated another way, the front-facing sensor region 111 may be completely surrounded by active display areas (e.g., an outer periphery of the front-facing sensor region 111 may be surrounded by active areas of the display). In some cases, the front-facing sensor region 111 includes or is defined by one or more masks or other visually opaque component(s) or treatment(s) that define openings for the sensors of the front-facing sensor region 111. The front-facing sensor region 111 may include components such as an infrared illuminator module 107 (which may include a flood illuminator and a dot projector), an infrared image capture device 109, components of a proximity sensing system 123, and the front-facing camera 106. The infrared illuminator module 107 is an example of a light emitter, and the infrared image capture device 109 is an example of an optical receiver.

The proximity sensing system 123 may determine the proximity of an object (e.g., a user's face) to the device 100. The device 100 may use information from the proximity sensing system 123 to change, modify, adjust, or otherwise control the display 103 or other function of the device 100 (e.g., to deactivate the display when the device 100 is held near a user's face during a telephone call). The proximity sensing system 123 may be part of an integrated module that includes components of the proximity sensing system 123 as well as the illuminator module 107 and the infrared image capture device 109. The proximity sensing system 123 may include an optical emitter and an optical receiver, each of which may be associated with its own light guide. The proximity sensing system 123 may estimate a distance between the device and a separate object or target using lasers and time-of-flight calculations or using other types of proximity sensing components or techniques.

In some cases, the front-facing sensor region 111 is defined by or includes two holes formed through the display 103, such as a first hole to provide optical access for the front facing camera 106 and a second hole to provide access for the infrared illuminator module 107, the infrared image capture device 109, and the proximity sensing system 123. A supplemental display region 115 may be located between the first and second holes. The supplemental display region 115 may provide graphical output and touch- and/or force-sensing functionality to the front-facing sensor region 111. For example, the supplemental display region 115 may be used to display graphical outputs such as lights, shapes, icons, or other elements (e.g., to provide notifications and/or information to the user). In some cases, the supplemental display region 115 may be visually distinguished from other active regions of the display, such that the supplemental display region 115 does not appear to be part of the display. For example, graphical outputs (e.g., graphical user interfaces, images, videos, etc.) displayed on the display 103 may not extend into the supplemental display region 115. In such cases, the front-facing sensor region 111 may appear visually as a single continuous area of the display, despite the display having two separate holes separated by an active display region or area. The supplemental display region 115, and optionally the touch-sensing components of the display that surround the front-facing sensor region 111, may also include touch- and/or force-sensing functionality, such that a user can touch the front-facing sensor region 111 to provide an input to the device. In some cases, touch inputs applied anywhere in the front-facing sensor region 111 (e.g., even directly over the optical components) may be detected by the device. These and other features of the front-facing sensor region 111 are described herein.

The device 100 may also include one or more buttons (e.g., button 120, and buttons 116 and 118 in FIG. 1B), switches, and/or other physical input systems. Such input systems may be used to control power states (e.g., the button 120), change speaker volume (e.g., the button 116), switch between "ring" and "silent" modes (e.g., the button 118), and the like. The buttons 116, 118, and 120 may include strain-sensing systems that detect inputs to the buttons based on a detected strain. The buttons 116, 118, and 120 may also be associated with haptic actuation systems that produce a tactile output in response to a detection of a strain that satisfies a condition. Thus, for example, upon detecting a strain that satisfies a condition (and/or an electrical parameter that is indicative of a strain satisfying the condition), a haptic actuation system may impart a force on a button to produce a tactile output (e.g., resembling a "click"). This tactile output or response may provide tactile feedback to the user to indicate that the input has been recognized by the device. In some cases, one or more of the buttons 116, 118, and 120 may use switch members, such as collapsible dome switches, to detect button presses. In some cases, one or more of the buttons 116, 118, and 120 may use touch-sensing systems, such as capacitive touch sensing systems, to detect inputs. Other sensing techniques may also be used to detect inputs to the buttons. In some cases, a switch or other input device is used in place of one or more of the buttons.

The device 100 may also include a speaker port 110 to provide audio output to a user, such as to a user's ear during voice calls. The speaker port 110, which is an example of an audio port, may also be referred to as a receiver, receiver port, or an earpiece in the context of a mobile phone. The speaker port 110 may be defined by an opening that is defined, along at least one side, by the housing 104, and along at least another side, by the cover 102. In some cases, the cover 102 defines a notch along an edge of the cover, and the notch (also referred to as a recess or cutout) defines at least three sides of the speaker port 110. The speaker port 110 may lack a mesh or other covering that is flush with the front surface of the cover 102. In some cases, a protective grill or grate is positioned within the device 100 and in an audio path between a speaker and the speaker port 110 to inhibit ingress of debris into the device 100. The protective grill or grate may be recessed relative to the front surface or front face of the cover 102.

The device 100 may also include a charging port 112 (e.g., for receiving a connector of a charging cable or power cable for providing power to the device 100 and charging the battery of the device 100). The charging port 112 may receive a connector of any suitable design. In some cases, the charging port 112 receives a connector corresponding to a USB connector type, such as a USB-C connector. The charging port 112 may also be configured to send and/or receive data via a cable, such as with a USB or other communication protocol. The charging port 112 may be or may include a connector module, such as the connector module 1100 described herein.

The device 100 may also include audio openings 114. The audio openings 114 may allow sound output from an internal speaker system (e.g., the speaker system 224, FIG. 2) to exit the housing 104. The device 100 may also include one or more microphones. In some cases, a microphone within the housing 104 may be acoustically coupled to the surrounding environment through an audio opening 114.

The housing 104 may be a multi-piece housing. For example, the housing 104 may be formed from multiple housing components 124, 125, 126, 127, 128, and 130, which are structurally coupled together via one or more intermediate elements, such as joint structures 122 (e.g., 122-1-122-6). Together, the housing components 124, 125, 126, 127, 128, and 130 and the joint structures 122 may define a band-like housing structure that defines four side walls (and thus four exterior side surfaces) of the device 100. Thus, both the housing components and the joint structures define portions of the exterior side surfaces of the device 100.

The housing components 124, 125, 126, 127, 128, and 130 may be formed of a conductive material (e.g., a metal), and the joint structures 122 may be formed of one or more polymer materials (e.g., glass-reinforced polymer). The joint structures 122 may include two or more molded elements, which may be formed of different materials. For example, an inner molded element may be formed of a first material (e.g., a polymer material), and an outer molded element may be formed of a second material that is different from the first (e.g., a different polymer material). The materials may have different properties, which may be selected based on the different functions of the inner and outer molded elements. For example, the inner molded element may be configured to make the main structural connection between housing components, and may have a higher mechanical strength and/or toughness than the outer molded element. On the other hand, the outer molded element may be configured to have a particular appearance, surface finish, chemical resistance, water-sealing function, or the like, and its composition may be selected to prioritize those functions over mechanical strength. The joint structures 122 may be mechanically interlocked with the housing components to structurally couple the housing components and form a structural housing assembly.

The housing components 124, 125, 126, 127, 128, and 130 may be formed from a clad structure that includes multiple materials. For example, the housing components may include a core portion formed from a first metal and a cladding portion formed from a second metal. The cladding portion may define exterior surfaces of the housing components. The exterior surface defined by the cladding portion may have a surface texture that produces a certain visual appearance and/or tactile feel. For example, the surface texture may have a texture that produces diffuse reflections. The surface texture may be produced by grinding, lapping, machining, ablation, blasting (e.g., sand blasting, bead blasting), etching (via mechanical etching, laser etching, chemical etching), or any other suitable texturing operation(s). The exterior surface of the housing components may also include a coating, such as a deposited coating. In some cases, the cladding portion is polished. A deposited coating may be deposited on the housing components via plasma vapor deposition (PVD), chemical vapor deposition (CVD), or the like.

The core portions of the housing components may be aluminum (e.g., an aluminum alloy), and the cladding portions may be titanium (e.g., a titanium alloy). In some cases, the core portions of the housing components are aluminum and the cladding portions are stainless steel. The cladding portions may have an average thickness of between about 0.1 mm and about 1.0 mm.

As used herein, unless otherwise specified, a reference to a metal (e.g., aluminum, titanium) includes both pure metals as well as metal alloys. Thus, for example, a component that is formed from aluminum may be formed from pure aluminum, 6061 aluminum alloy, 7071 aluminum alloy, or another aluminum alloy. Similarly, a component that is formed from titanium may be formed from pure titanium, Ti 6Al-4V titanium alloy, Ti 5Al-2.5Sn titanium alloy, or another titanium alloy. References to steel may include various types and/or alloys of steel, including but not limited low carbon steel, stainless steel, high carbon steel, etc.

In some cases, one or more of the housing components 124, 125, 126, 127, 128, and 130 (or portions thereof) are configured to operate as antennas (e.g., components that are configured to transmit and/or receive electromagnetic waves to facilitate wireless communications with other computers and/or devices). To facilitate the use of the housing components as antennas, feed and ground lines may be conductively coupled to the housing components to couple the housing components to other antennas and/or communication circuitry. The joint structures 122 may be substantially non-conductive to provide suitable separation and/or electrical isolation between the housing components (which may be used to tune the radiating portions, reduce capacitive coupling between radiating portions and other structures, and the like). In some cases, supplemental antenna segments are conductively coupled to the housing components to change an antenna performance parameter of the housing component. Supplemental antenna segments may be coupled to the housing components via switching circuitry that allows the supplemental antenna segments to be selectively coupled or decoupled from the housing components.

The device 100 may include various internal antenna elements that are configured to transmit and receive wireless communication signals through various regions of the housing 104. As shown in FIG. 1A, the device 100 may include an antenna window 129 that allows for the passage of radio-frequency communication signals through a corresponding region of the housing 104.

The exterior surfaces of the housing components 124, 125, 126, 127, 128, and 130 may have substantially a same color, surface texture, and overall appearance as the exterior surfaces of the joint structures 122. In some cases, the exterior surfaces of the housing components 124, 125, 126, 127, 128, and 130 and the exterior surfaces of the joint structures 122 are subjected to at least one common finishing procedure, such as abrasive-blasting, machining, polishing, grinding, or the like. Accordingly, the exterior surfaces of the housing components and the joint structures may have a same or similar surface finish (e.g., surface texture, roughness, pattern, etc.). In some cases, the exterior surfaces of the housing components and the joint structures may be subjected to a two-stage blasting process to produce the target surface finish.

FIG. 1A also includes an example coordinate system 101 that may define directions with reference to the device 100 (or other electronic devices described herein). The coordinate system 101 defines a positive x direction, a positive y direction, and a positive z direction. Unless stated otherwise, references herein to a positive x, positive y, or positive z direction will be understood to refer generally to the coordinate system 101 and its relationship to the device 100 in FIG. 1A. Negative x, y, and z directions will be understood to be opposite to the positive x, y, and z directions shown in the coordinate system in FIG. 1A.

FIG. 1B illustrates a back side of the device 100. The device 100 may include a back or rear cover 132 coupled to the housing 104 and defining at least a portion of the exterior rear surface of the device 100. The cover 102 (e.g., the front cover), the rear cover 132, and the housing 104 may at least partially define an enclosure of the device 100. The enclosure may define an internal volume in which components of the device 100 are positioned. The rear cover 132 may be formed from or include a transparent or optically transmissive material. For example, the rear cover 132 may include a substrate formed of a glass material. The glass material may be a silica-based glass material, an aluminosilicate glass, a boroaluminosilicate glass, an alkali metal aluminosilicate glass (e.g., a lithium aluminosilicate glass), or a chemically strengthened glass. Other example materials for the rear cover 132 include, without limitation, sapphire, ceramic, glass-ceramic, crystallizable glass materials, and plastic (e.g., polycarbonate). A glass-ceramic material may be a silica-based glass ceramic material, such as an aluminosilicate glass ceramic material or a boroaluminosilicate glass ceramic material. The glass-ceramic material may be chemically strengthened by ion exchange.

The rear cover 132 may be formed as a monolithic or unitary sheet. The rear cover 132 may also be formed as a composite of multiple layers of different materials, coatings, and other elements. The rear cover 132 may include one or more decorative layers on the exterior or interior surface of the substrate. For example, one or more coating layers may be applied to the interior surface of the substrate (or otherwise positioned along the interior surface of the substrate) to provide a particular appearance to the back side of the device 100. The coating layer(s) may include a sheet, ink, dye, or combinations of these (or other) layers, materials, or the like. In some cases one or more of the coating layer(s) have a color that substantially matches a color of the housing 104 (e.g., the exterior surfaces of the housing components and the joint structures). In some cases, the material of the substrate of the rear cover 132 may be colored, and may include one or more coatings that contribute to the colored appearance of the rear cover, as described with respect to the rear cover 154 in FIG. 1D. Moreover, the rear cover 132 may be formed from or may include a dielectric material (e.g., the rear cover 132 may be a dielectric member, such as a glass member, sapphire member, polymer member, glass-ceramic member, etc.).

The device 100 may include a wireless charging system, whereby the device 100 can be powered and/or its battery recharged by an inductive (or other electromagnetic) coupling between a charger (e.g., a wireless charging accessory) and a wireless charging system within the device 100. In such cases, the rear cover 132 may be formed of a material that allows and/or facilitates the wireless coupling between the charger and the wireless charging system.

Figure 2:
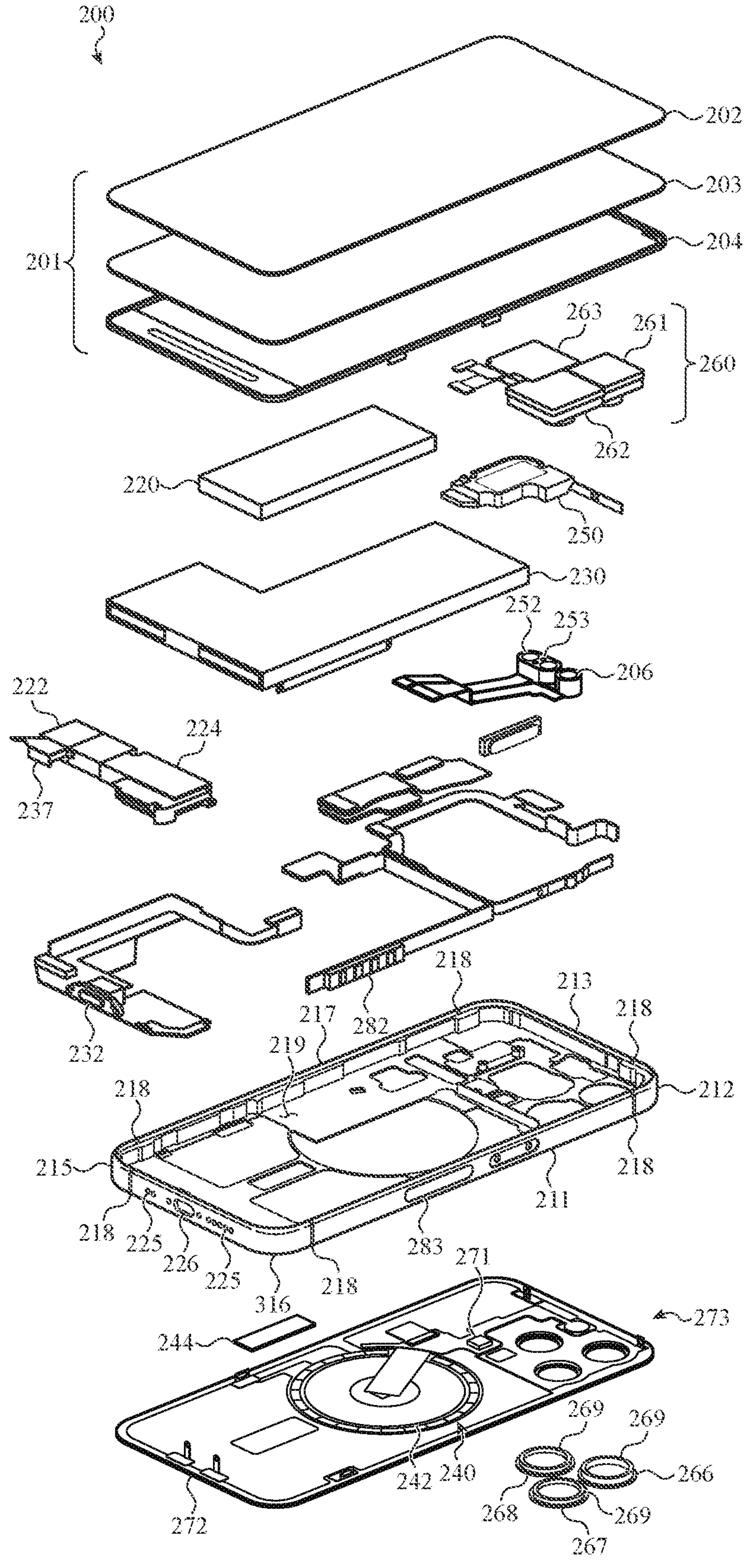
FIG. 2 depicts an exploded view of an example electronic device.

The device 100 may also include a sensor array 141 (e.g., a rear-facing sensor array in a rear-facing sensor array region) that includes three cameras (as shown, for example, in FIG. 2, described herein). The sensor array 141 may be in a sensor array region that is defined by a protrusion 151 in a rear cover of the device 100. The protrusion 151 may define a portion of the rear exterior surface of the device 100, and may at least partially define a raised sensor array region of the sensor array 141. In some cases, the protrusion 151 may be formed by attaching a piece of material (e.g., glass) to another piece of material (e.g., glass). In other cases, the rear cover 132 may include a monolithic structure, and the protrusion 151 may be part of the monolithic structure. For example, the rear cover 132 may include a monolithic glass structure (or glass ceramic structure or alkali-aluminosilicate structure, or other suitable material) that defines the protrusion 151 as well as the surrounding area. In such cases, the protrusion 151 may be an area of increased thickness of the monolithic structure, or it may have a same or substantially same thickness as the rest of the cover (e.g., the protrusion 151 may correspond to or generally be opposite a recessed region along an interior side of the monolithic structure, such that the monolithic structure has a uniform thickness while also defining the protrusion 151).

A first camera 142 may include a 12-megapixel sensor and a telephoto lens with a 3× optical zoom and an aperture number of f/2.8. In some cases, the first camera 142 has a telephoto lens with a 5× optical zoom. A second camera 144 may include a 48-megapixel sensor (optionally with a three-layer sensor arrangement) with sensor-shift image stabilization and a wide-angle lens having an aperture number of f/1.7. A third camera 146 may include a 12-megapixel sensor and a super-wide camera with a wide field of view (e.g., 120° FOV) and an aperture number of f/2.2. One or more of the cameras of the sensor array 141 may also include lens-based optical image stabilization, whereby the lens is dynamically moved relative to a fixed structure within the device 100 to reduce the effects of "camera shake" or other movements on images captured by the camera, and/or sensor-based image stabilization, whereby the image sensor is moved relative to a fixed lens or optical assembly. One or more of the cameras may include autofocus functionality, in which one or more lens elements (and/or sensors) are movable to focus an image on a sensor.

The first camera 142 may include an image sensor with a pixel size between about 0.8 microns and about 1.4 microns. The second camera 144 may include an image sensor with a pixel size between about 1.6 microns and about 2.3 microns. The third camera 146 may include an image sensor with a pixel size between about 0.8 microns and about 1.4 microns.

The sensor array 141, along with associated processors and software, may provide several image-capture features. For example, the sensor array 141 may be configured to capture full-resolution video clips of a certain duration each time a user captures a still image. As used herein, capturing full-resolution images (e.g., video images or still images) may refer to capturing images using all or substantially all of the pixels of an image sensor, or otherwise capturing images using the maximum resolution of the camera (regardless of whether the maximum resolution is limited by the hardware or software).

The captured video clips may be associated with the still image. In some cases, users may be able to select individual frames from the video clip as the representative still image associated with the video clip. In this way, when the user takes a snapshot of a scene, the camera will actually record a short video clip (e.g., 1 second, 2 seconds, or the like), and the user can select the exact frame from the video to use as the captured still image (in addition to simply viewing the video clip as a video).

The cameras of the sensor array 141 may also have or provide a high-dynamic-range (HDR) mode, in which the camera captures images having a dynamic range of luminosity that is greater than what is captured when the camera is not in the HDR mode. In some cases, the sensor array 141 automatically determines whether to capture images in an HDR or non-HDR mode. Such determination may be based on various factors, such as the ambient light of the scene, detected ranges of luminosity, tone, or other optical parameters in the scene, or the like. HDR images may be produced by capturing multiple images, each using different exposure or other image-capture parameters, and producing a composite image from the multiple captured images.

The cameras of the sensor array 141 may also include software-based color balance correction. For example, when a flash (e.g., the flash 148) is used during image capture, the cameras (and/or associated processing functionality of the device 100) may adjust the image to compensate for differences in color temperature between the flash output and the ambient lighting in the image. Thus, for example, if a background of an image has a different color temperature than a foreground subject (e.g., because the foreground subject is illuminated by the flash output), the cameras may modify the background and/or the foreground of the image to produce a more consistent color temperature across the image.

The sensor array 141 may also include or be configured to operate in an object detection mode, in which a user can select (and/or the device 100 can automatically identify) objects within a scene to facilitate those objects being processed, displayed, or captured differently than other parts of the scene. For example, a user may select (or the device 100 may automatically identify) a person's face in a scene, and the device 100 may focus on the person's face while selectively blurring the portions of the scene other than the person's face. Notably, features such as the HDR mode and the object detection mode may be provided with a single camera (e.g., a single lens and sensor).

The sensor array 141 may also include a depth sensing device 149 that is configured to estimate a distance between the device and a separate object or target. The depth sensing device 149 may estimate a distance between the device and a separate object or target using lasers and time-of-flight calculations, or using other types of depth sensing components or techniques.

The device 100 may also include a flash 148 (e.g., a rear-facing flash) that is configured to illuminate a scene to facilitate capturing images with the cameras of the sensor array 141. The flash 148 is configured to illuminate a scene to facilitate capturing images with the sensor array 141. The flash 148 may include one or more light sources, such as one or more light-emitting diodes (e.g., 1, 2, 3, 4, or more LEDs). In some cases, the light source(s) may be illuminable in multiple different illumination patterns, which, along with a lens positioned over the light source(s), can produce different fields of illumination on a subject or scene. For example, a light source may be segmented into a plurality of illuminable regions, with the illuminable regions positioned under different regions of the lens. When a first illumination pattern is active (e.g., one or more central illuminable regions), the emitted light may pass through a first region of the lens (e.g., a central region) and produce a first field of illumination on a subject or scene (e.g., a relatively narrow light distribution corresponding to a field of view of a telephoto lens). When a second illumination pattern is active (e.g., one or more peripheral illuminable regions), the emitted light may pass through a second region of the lens (e.g., a peripheral region) and produce a second field of illumination on a subject or scene (e.g., a relatively wider light distribution corresponding to a field of view of a wide angle lens). The flash 148 may be configured to produce two, three, or more different fields of illumination, each corresponding to a field of view of one of the cameras of the sensor array 141. Thus, for example, the flash 148 may produce a first field of illumination that corresponds to (e.g., is substantially equal to or greater than) a field of view of the first camera 142, a second field of illumination that corresponds to (e.g., is substantially equal to or greater than) a field of view of the second camera 144, and a third field of illumination that corresponds to (e.g., is substantially equal to or greater than) a field of view of the third camera 146.

The sensor array 141 may also include a microphone 150. The microphone 150 may be acoustically coupled to the exterior environment through a hole defined in the rear cover of the device 100 (e.g., through the portion of the rear cover that defines the protrusion 151).

Figure 1C:
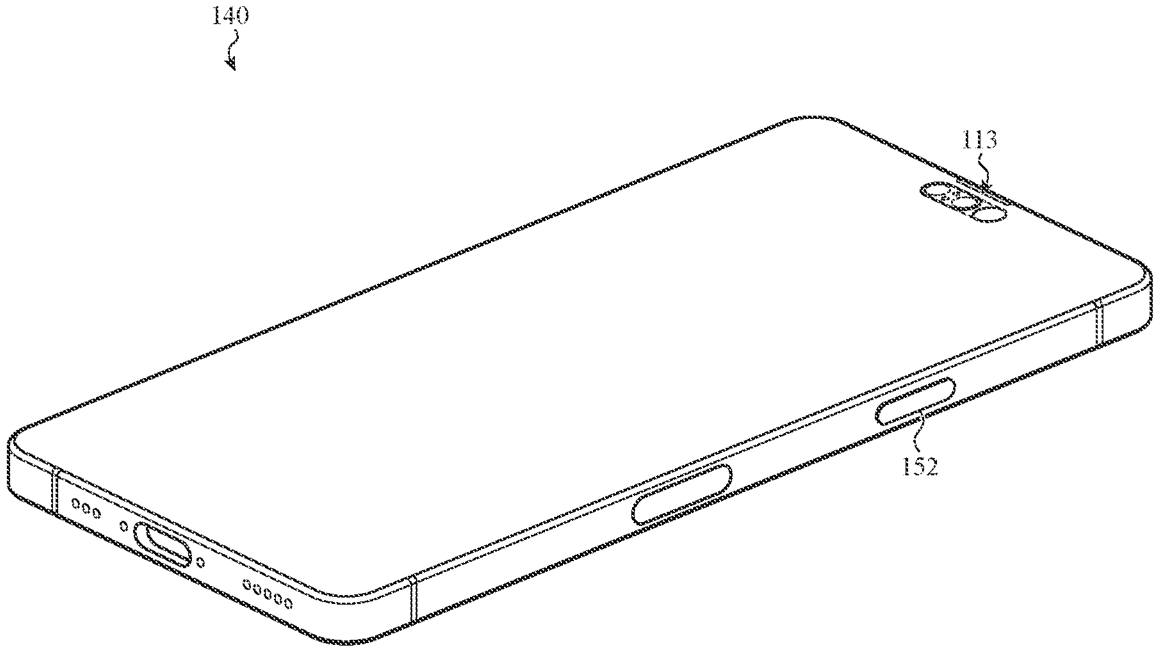
FIGS. 1C-1D depict another example electronic device.
Figure 1D:
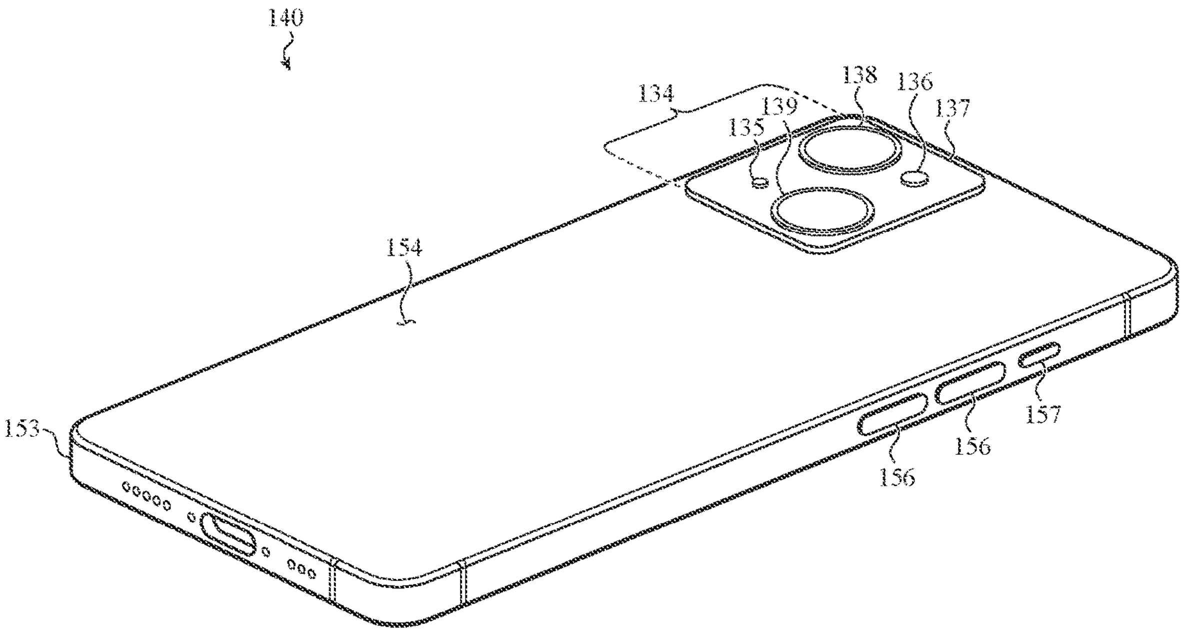

FIGS. 1C and 1D show another example electronic device 140 embodied as a mobile phone. The electronic device 140 may have many of the same or similar outward-facing components as the electronic device 100. Accordingly, descriptions and details of such components from FIGS. 1A-1B (e.g., displays, buttons, switches, housings, covers, charging ports, joint structures, etc.) apply equally to the corresponding components shown in FIGS. 1C and 1D.

The device 140 may include a front-facing sensor region 113, which may generally correspond to the front-facing sensor region 111 in FIG. 1A. The front-facing sensor region 113 may be positioned in an island-like area of the front of the device 140, and may be surrounded by a display region (e.g., a main display region) of the device 140. In some cases, as described herein, the front-facing sensor region 113 may be positioned in or defined by one or more holes formed through a display. In such cases, the front-facing sensor region 113 may be bordered on all sides by active areas or regions of the display. Stated another way, the front-facing sensor region 113 may be completely surrounded by active display areas (e.g., an outer periphery of the front-facing sensor region 113 may be surrounded by active areas of the display). In some cases, the front-facing sensor region 113 includes or is defined by one or more masks or other visually opaque component(s) or treatment(s) that define openings for the sensors of the front-facing sensor region 113. The front-facing sensor region 113 may include components such as an infrared illuminator module (which may include a flood illuminator and a dot projector), an infrared image capture device, components of a proximity sensing system, and a front-facing camera.

While the device 100 in FIG. 1B is shown as including a sensor array 141 with three cameras, the device 140 as shown in FIG. 1D includes a sensor array 134 (e.g., a rear-facing sensor array in a rear-facing sensor array region) that includes two cameras. The sensor array 134 may be in a sensor array region that is defined by a protrusion 137 in a rear cover of the device 140. The protrusion 137 may have the same or similar construction as the protrusion 151 in FIG. 1B.

The device 140 may also include, as part of the sensor array 134, one or more rear-facing devices, which may include an ambient light sensor (ALS), a microphone 135, and/or a depth sensing device that is configured to estimate a distance between the device 140 and a separate object or target. The sensor array 134 may also include multiple cameras, such as a first camera 138 and a second camera 139. Therefore, the sensor array 134 may include a camera array (which may include one or more cameras). The first camera 138 may include a super-wide camera having a 12 megapixel sensor and a wide field of view (e.g., 120° FOV) optical stack with an aperture number of f/2.4. The second camera 139 may include a wide view camera having a 48.8 megapixel sensor and an aperture number of f/1.6. In some cases, the sensor array 134 may include a telephoto lens having a 12 megapixel sensor with a 3× optical zoom optical stack having an aperture number ranging from f/2.0 to f/2.8 (e.g., in addition to the first and second cameras 138, 139, or in place of one of the first or second cameras). One or more of the cameras (e.g., cameras 138, 139) of the sensor array 134 may also include optical image stabilization, whereby the lens is dynamically moved relative to a fixed structure within the device 140 to reduce the effects of "camera shake" on images captured by the camera. The camera(s) may also perform optical image stabilization by moving the image sensor relative to a fixed lens or optical assembly. One or more of the cameras may include autofocus functionality, in which one or more lens elements (and/or sensors) are movable to focus an image on a sensor. The sensor array 134 may also include a flash 136 (e.g., a rear-facing flash). The flash 136 may include a multi-segment LED, or a single LED, or other light emitting component.

As shown in FIG. 1D, the cameras of the sensor array 134 may be positioned diagonally with respect to the protrusion 137 (e.g., the raised sensor array). For example, a first hole may extend through the rear cover 132 at a location proximate a first corner region of the sensor array 134, and the first camera 138 may be positioned at least partially in the first hole, and a second hole may extend through the rear cover 132 at a location proximate a second corner region diagonal from the first corner region of the sensor array 134, and the second camera 139 may be positioned at least partially in the second hole. Thus, the first and second holes, and therefore the first and second cameras, may be positioned along a diagonal path from the first corner to the second corner of the sensor array 134.

The second camera 139 may have an image sensor with a pixel size between about 1.5 microns and about 2.0 microns, and the first camera 138 may have an image sensor with a pixel size between about 0.8 microns and about 1.4 microns. If a camera with a telephoto lens is provided, it may have an image sensor with a pixel size between about 0.8 microns and about 1.4 microns.

Other details about the sensor array, the individual cameras of the sensor array, and/or the flash described with respect to the device 100 may be applicable to the sensor array, the individual cameras, and/or the flash of the device 140, and such details will not be repeated here to avoid redundancy.

With reference to FIG. 1D, the device 140 may include a back or rear cover 154 coupled to the housing 153 and defining at least a portion of the exterior rear surface of the device 140. The rear cover 154 may be formed from or include an optically transmissive material. The optically transmissive material may be colored and in some cases may be a colored glass material. The color of the optically transmissive material may be characterized by one or more color space coordinates, which in some cases may be a chroma value.

The rear cover 154 may include a substrate, alternately referred to herein as a rear cover member, formed of an optically transmissive glass material. The glass material may be a silica-based glass material, such as an aluminosilicate glass, a boroaluminosilicate glass, an alkali metal aluminosilicate glass (e.g., a lithium aluminosilicate glass). Other examples of optically transmissive materials for the rear cover 154 include, without limitation, sapphire, ceramic, glass-ceramic, crystallizable glass materials, and plastic (e.g., polycarbonate). A glass-ceramic material may be a silica-based glass ceramic material, such as an aluminosilicate glass ceramic material or a boroaluminosilicate glass ceramic material. The glass or glass-ceramic material may be chemically strengthened by ion exchange. The rear cover 154 may be formed as a monolithic or unitary sheet. The rear cover 154 may also be formed as a composite of multiple layers of different materials, coatings, and other elements.

In some examples, an exterior surface of the rear cover may define different textures at different regions of the cover. In some cases, the different textures may produce different optical effects, such as a matte effect at a first region of the exterior surface and a glossy effect at a second region of the exterior surface. The difference between the matte and glossy effects may be used to define graphics, words, images, logos, or the like. For example, a visible logo may be defined by a glossy region (in the shape of the logo) surrounded by a matte region.

The rear cover 154 may include a coating on the exterior surface of the substrate, the interior surface of the substrate, or both. The coating may contribute to the appearance, such as the color, of the rear cover 154. For example, a coating along an interior surface of the substrate may include one or more color layers. The color layer may include a colorant such as a pigment or dye and may have a distinct hue or may be near neutral in color. In some examples, the color layer includes a polymeric binder, which may be polyester-based, epoxy-based, urethane-based, or based on another suitable type of polymer or copolymer. Alternately, or additionally, the coating may include one or more opaque layers applied to the interior surface of the substrate (or otherwise positioned along the interior side of the substrate) to provide a particular appearance to the back side of the device 140. The opaque layer(s) may include a sheet, ink, dye, or combinations of these (or other) layers, materials, or the like and in some cases may be optically dense. In some cases, the color of the coating along the interior surface of the substrate and the color of the substrate itself (e.g., the color of the optically transmissive material defining the rear cover substrate) together define the apparent color of the back side of the device 140.

In some cases, the coating on the rear cover and/or the material of the rear cover 154 itself present a color that substantially matches a color of the housing 153 (e.g., the exterior surfaces of the housing components and the joint structures). In such cases, the coating on the rear cover and the material of the rear cover may have substantially matching colors, or they may have different colors.

A coating along an exterior surface of the substrate may be a smudge-resistant (e.g., oleophobic) coating. The device 140 may include a wireless charging system, whereby the device 140 can be powered and/or its battery recharged by an inductive (or other electromagnetic) coupling between a charger (e.g., a wireless charging accessory) and a wireless charging system within the device 140. In such cases, the rear cover 154 may be formed of a material that allows and/or facilitates the wireless coupling between the charger and the wireless charging system (e.g., glass).

The device 140 may also include one or more buttons (e.g., button 152 in FIG. 1C and buttons 156 and 157 in FIG. 1D), switches, and/or other physical input systems. Such input systems may be used to control power states (e.g., the button 152), change speaker volume (e.g., the button 156), switch between "ring" and "silent" modes (e.g., the button 157), and the like. The buttons 152, 156, and 157 may include strain-sensing systems that detect inputs to the buttons based on a detected strain. The buttons 152, 156, and 157 may also be associated with haptic actuation systems that produce a tactile output in response to a detection of a strain that satisfies a condition. Thus, for example, upon detecting a strain that satisfies a condition (and/or an electrical parameter that is indicative of a strain satisfying the condition), a haptic actuation system may impart a force on a button to produce a tactile output (e.g., resembling a "click"). This tactile output or response may provide tactile feedback to the user to indicate that the input has been recognized by the device. In some cases, one or more of the buttons 152, 156, and 157 may use switch members, such as collapsible dome switches, to detect button presses. In some cases, one or more of the buttons 152, 156, and 157 may use touch-sensing systems, such as capacitive touch sensing systems, to detect inputs. Other sensing techniques may also be used to detect inputs to the buttons. In some cases, a switch or other input device is used in place of one or more of the buttons.

FIG. 2 depicts an exploded view of an example electronic device. In particular, FIG. 2 depicts an exploded view of a device 200, showing various components of the device 200 and example arrangements and configurations of the components. The device 200 may be an embodiment of the device 100, and the description of the various components and elements of the device 100 of FIGS. 1A and 1B may also be applicable to the device 200 depicted in FIG. 2. A redundant description of some of the components is not repeated herein for clarity.

As shown in FIG. 2, the device 200 includes a cover 202 (e.g., a front cover), which may be formed from or include a transparent or optically transmissive material. In some cases, the cover 202 is formed from or includes a glass material and may therefore be referred to as a glass cover member. The glass material may be a silica-based glass material, an aluminosilicate glass, a boroaluminosilicate glass, an alkali metal aluminosilicate glass (e.g., a lithium aluminosilicate glass), or a chemically strengthened glass. Other example materials for the cover 202 include, without limitation, sapphire, ceramic, glass-ceramic, crystallizable glass materials, and plastic (e.g., polycarbonate). The cover 202 may be formed as a monolithic or unitary sheet. The cover 202 may also be formed as a composite of multiple layers of different materials, coatings, and other elements. In this example, the cover 202 may be formed from a glass-ceramic material. A glass-ceramic material may include both amorphous and crystalline or non-amorphous phases of one or more materials and may be formulated to improve strength or other properties of the cover 202. A glass-ceramic material may be a silica-based glass ceramic material, such as an aluminosilicate glass ceramic material or a boroaluminosilicate glass ceramic material. The glass-ceramic material may be chemically strengthened by ion exchange. In some cases, the cover 202 may include a sheet of chemically strengthened glass or glass-ceramic having one or more coatings including an anti-reflective (AR) coating, an oleophobic coating, or other type of coating or optical treatment. In some cases, the cover 202 includes a sheet of material that is less than 1 mm thick. In some cases, the sheet of material is less than 0.80 mm. In some cases, the sheet of material is approximately 0.60 mm or less. The cover 202 may be chemically strengthened using an ion exchange process to form a compressive stress layer along exterior surfaces of the cover 202.

The cover 202 extends over a substantial entirety of the front surface of the device and may be positioned within an opening defined by a housing structure 210. As described in more detail below, the edges or sides of the cover 202 may be surrounded by a protective flange or lip of the housing structure 210 without an interstitial component between the edges of the cover 202 and the respective flanges of the housing structure 210. This configuration may allow an impact or force applied to the housing structure 210 to be transferred to the cover 202 without directly transferring shear stress through the display 203 or frame 204.

As shown in FIG. 2, the display 203 is coupled to an internal surface of the cover 202. The display 203 may include an edge-to-edge organic light-emitting diode (OLED) display that measures 16.97 cm (6.69 inches) corner-to-corner (or 6.12 inches corner-to-corner). The perimeter or non-active area of the display 203 may be reduced to allow for very thin device borders around the active area of the display 203. In some cases, the display 203 allows for border regions of 1.5 mm or less. In some cases, the display 203 allows for border regions of 1 mm or less. In one example implementation, the border region is approximately 0.9 mm. The display 203 may have a relatively high pixel density of approximately 460 pixels per inch (PPI) or greater. The display 203 may use a low temperature polycrystalline silicone (LTPS) or low temperature polycrystalline oxide (LTPO) backplane.

The display 203 may have an integrated (on-cell) touch-sensing system. For example, an array of electrodes (or other touch-sensing components) that are integrated into the OLED display may be time and/or frequency multiplexed in order to provide both display and touch-sensing functionality. The electrodes may be configured to detect a location of a touch, a gesture input, multi-touch input, or other types of touch input along the external surface of the cover 202. In some cases, the display 203 includes another type of display element, such as a liquid-crystal display (LCD) without an integrated touch-sensing system. That is, the device 200 may include one or more touch- and/or force-sensing components or layers that are positioned between the display 203 and the cover 202.

The display 203, also referred to as a display stack, may include always-on-display (AOD) functionality. For example, the display 203 may be configurable to allow designated regions or subsets of pixels to be displayed when the device 200 is powered on such that graphical content is visible to the user even when the device 200 is in a low-power or sleep mode. This may allow the time, date, battery status, recent notifications, and other graphical content to be displayed in a lower-power or sleep mode. This graphical content may be referred to as persistent or always-on graphical output. While some battery power may be consumed when displaying persistent or always-on graphical output, the power consumption is typically less than during normal or full-power operation of the display 203. This functionality may be enabled by only operating a subset of the display pixels and/or at a reduced resolution in order to reduce power consumption by the display 203.

The display 203 may include multiple layers, including touch-sensing layers or components, optional force-sensing layers or components, display layers, and the like. The display 203 may define a graphically active region in which graphical outputs may be displayed. In some cases, portions of the display 203 may include graphically inactive regions, such as portions of the display layers that do not include active display components (e.g., pixels) or are otherwise not configured to display graphical outputs. In some cases, graphically inactive regions may be located along the peripheral borders or other edges of the display stack 203.

As shown in FIG. 2, the device 200 may also include a molded frame member 204, also referred to simply as a molded frame 204, that is positioned below the cover 202 and that extends around at least an outer periphery of the display 203. The molded frame 204 may at least partially encapsulate the edges of the display 203, and may define a structural feature that provides strength and rigidity to the cover 202 and the display 203, and that serves as a mounting structure to couple the cover 202 to a housing (e.g., the housing structure 210).

The molded frame 204 may be produced by molding a moldable material onto a subassembly that includes the cover 202, the display 203, and optionally other structural components. The subassembly may be positioned in a mold or other fixture, and a flowable material may be introduced into a mold cavity such that the material flows around the edges of the display 203, contacts an interior surface of the cover 202, and optionally engages other components of the subassembly (e.g., a back plate that covers the display 203 and acts as a shield and/or support structure for the display and cover). The flowable material then hardens to form the molded frame 204. As a result of the hardening, the molded frame 204 (e.g., an overmolded frame) will become secured to the display 203, the cover 202, and other components of the subassembly (e.g., via mechanical interlocking and/or adhesive bonding).

The molded frame 204 may be attached to a lower or inner surface of the cover 202. A portion of the molded frame 204 may extend below the display 203 and may attach the cover 202 to the housing structure 210. Because the display 203 is attached to a lower or inner surface of the cover 202, the molded frame 204 may also be described as attaching both the display 203 and the cover 202 to the housing structure 210.

The cover 202, display stack 203, and molded frame 204 may be part of a front cover assembly 201 of the device 200. The front cover assembly 201 (and more particularly the cover 202 of the front cover assembly 201) may define a front exterior surface of the device. The cover 202 may define an interior surface opposite the exterior surface.

The front cover assembly 201 may be assembled as a subassembly, which may then be attached to a housing component. For example, as described herein, the display 203 may be attached to the cover 202 (e.g., via a transparent adhesive), and the molded frame 204 may be formed around a periphery of the display stack 203. The front cover assembly 201 may then be attached to a housing component of the device 200 by mounting and adhering the molded frame 204 to a ledge defined by the housing component.

The device 200 also includes a speaker module 250 that is configured to output sound via a speaker port. The speaker port may be positioned in and/or at least partially defined by a recess of the cover 202. As described herein, a trim piece may be positioned at least partially in the recess to facilitate the output of sound while also inhibiting the ingress of debris, liquid, or other materials or contaminants into the device 200. Output from the speaker module 250 may pass through an audio passage or acoustic path defined at least in part by the speaker module 250 itself, and the trim piece. In some cases, part of the acoustic path (e.g., between the speaker module 250 and the trim piece) is defined by the housing structure 210 and/or a molded material that is coupled to the housing structure 210. For example, a molded material (e.g., a fiber-reinforced polymer) may be molded against a metal portion of the housing structure 210 (e.g., the housing component 213, described herein). The molded material may also form one or more intermediate elements, such as joint structures, that also structurally join housing components together (e.g., the joint structures 218). A port or passage (e.g., a tube-like tunnel) may be defined through the molded material to acoustically couple the speaker module 250 to the trim piece and/or the recess more generally, thereby directing sound from the speaker module 250 to the exterior of the device 200.

As shown in FIG. 2, the device 200 also includes one or more cameras, optical emitters, and/or sensing elements that are configured to transmit signals, receive signals, or otherwise operate along the front surface of the device. In this example, the device 200 includes a front camera 206 that includes a high-resolution camera sensor. The front camera 206 may have a 12 megapixel resolution sensor with optical elements that provide an 85° field of view and an aperture number of f/1.9. The front camera 206 may include autofocus functionality in which one or more of the lens elements move (e.g., up to about 100 microns perpendicular to the cover) in order to focus an image on the camera's sensor. In some cases, the autofocusing front-facing camera is capable of providing continuous autofocus functionality during video capture. The device 200 also includes an optical facial recognition system 252 that includes an infrared light projector (for projecting light), and an infrared light sensor that is configured to sense an array of depth points or regions along the face of the user. The array of depth points may be characterized as a unique signature or bio-identifier, which may be used to identify and/or authenticate the user and unlock the device 200 (and/or authorize functionality on the device 200 like the purchase of software apps or the use of payment functionality provided by the device 200).

The device 200 may also include one or more other sensors or components. For example, the device 200 may include a front light illuminator element for providing a flash or illumination for the front camera 206. The device 200 may also include an ambient light sensor (ALS) that is used to detect ambient light conditions for setting exposure aspects of the front camera 206 and/or for controlling the operation of the display. The device 200 may also include a proximity sensing system 253 for detecting the proximity of a user or other object to the device 200. In some cases, as described herein, the proximity sensing system 253 detects proximity to other objects through an active region of the display. The proximity sensing system 253 and the optical facial recognition system 252 may be integrated in a common module. In some cases, information from both the proximity sensing system and the ambient light sensor is used to determine ambient light conditions and/or the proximity of objects to the device 200. For example, information from the proximity sensing system may be used to determine whether a detection by the ambient light sensor of low ambient lighting is due to low ambient lighting, or an object locally or temporarily covering the ambient light sensor (e.g., a finger providing a touch input or a palm during a typing input). Information from both sensing systems may be used to disambiguate between potentially ambiguous conditions, and generally improve the accuracy with which the device can sense or detect certain conditions.

The display 203 may include one or more holes extending through the display to accommodate the front camera 206, the facial recognition system 252, the proximity sensing system 253, and optionally other front-facing sensors or other components. In some cases, the display 203 includes two holes, including a first hole for the front camera 206 and a second hole for the facial recognition system 252 and the proximity sensing system 253. In some cases, the display 203 includes one hole (e.g., a single hole shared by the front camera 206 and the facial recognition system 252). In some cases, the display 203 includes three holes (e.g., a first hole for the front camera 206, a second hole for an emitter of the facial recognition system 252 and optionally the proximity sensing system 253, and a third hole for a receiver of the facial recognition system 252).

FIG. 2 also illustrates one or more cameras, optical emitters, and/or sensing elements that are configured to transmit signals, receive signals, or otherwise operate along the rear surface of the device. As depicted in FIG. 2, these elements may be integrated in a sensor array 260. In this example, the sensor array 260 (or camera array) includes a first camera 263 having a 12 megapixel sensor and a telephoto lens with a 3× optical zoom (or a 5× optical zoom) and an aperture number of f/2.8. The sensor array 260 also includes a second camera 262 having a 48 megapixel sensor with a wide angle lens having an aperture number of f/1.7. The sensor array 260 may also include a third camera 261 having a 12 megapixel sensor and a super-wide camera with a wide field of view (e.g., 120° FOV) and an aperture number of f/2.2. The third camera 261 may also have an aperture number of f/2.4. The first, second, and third cameras may include lens-based or sensor-based image stabilization.

The sensor array 260 also includes a light illuminator that may be used as a flash for photography or as an auxiliary light source (e.g., a flashlight). In some cases, the sensor array 260 also includes a microphone, an ambient light sensor, and other sensors that are adapted to sense along the rear surface of the device 200.

The sensor array 260 may also include a depth sensing device 281 (which may correspond to or be an embodiment of the depth sensing device 149, FIG. 1B, or any other depth sensing device described herein) that is able to estimate a distance to objects positioned behind the device 200. The depth sensing device 281 may include an optical sensor that uses time-of-flight or other optical effect to measure a distance between the device 200 and an external object. The depth sensing device 281 may include one or more optical emitters that are adapted to emit one or more beams of light, which may be used to estimate the distance. In some cases, the one or more beams of light are coherent light beams having a substantially uniform wavelength/frequency. A coherent light source may facilitate depth measurements using a time of flight, phase shift, or other optical effect. In some cases, the depth sensing device 281 uses a sonic output, radio output, or other type of output that may be used to measure the distance between the device 200 and one or more external objects. The depth sensing device 281 may be positioned proximate a window 271 (e.g., a region of the rear cover 272 or other component that covers the components of the sensor array 260) through which the depth sensing device 281 may send and/or receive signals (e.g., laser light, infrared light, visible light, etc.).

As shown in FIG. 2, the cameras 261, 262, 263 may be aligned with camera covers 266, 267, 268, respectively. The covers 266, 267, 268 may be formed from a glass or sapphire material and may provide a clear (e.g., transparent or optically transmissive) window through which the cameras 261, 262, 263 are able to capture a photographic image. In other cases, the covers 266, 267, 268 are optical lenses that filter, magnify, or otherwise condition light received by the respective camera 261, 262, 263. The other sensing or transmitting elements of the sensor array 260 may transmit and/or receive signals through a region of the rear cover 272 or through a separate cover that is coupled to the rear cover 272. As shown in FIG. 2, the covers 266, 267, 268 may extend beyond the exterior surface of the cover 272, and may define a recess along the interior side of the cover 272, such that the lens or other element of the cameras 261, 262, 263 can extend into the respective recesses. In this way, the device 200 may accommodate a larger lens or other elements of the cameras 261, 262, 263 than would be possible if the recess were not provided. In some cases, trim assemblies (e.g., trim assembly 269) may be coupled to the rear cover 272 and may support the covers 266, 267, 268.

The device 200 also includes a battery 230. The battery 230 provides electrical power to the device 200 and its various systems and components. The battery 230 may include a 4.45 V lithium ion battery that is encased in a foil or other enclosing element (e.g., a pouch). The battery 230 may include a rolled electrode configuration, sometimes referred to as a "jelly roll" or a folded or stacked electrode configuration. The battery 230 may be attached to the device 200 (e.g., to a lower chassis section 219) with one or more adhesives and/or other attachment techniques. In one example, the battery 230 may be attached to the lower chassis section 219, or another structure of the device 200, with a two-layer adhesive, where a first adhesive is adhered to the battery 230 and to a second adhesive, and the second adhesive is bonded to the first adhesive and to the lower chassis section 219 (or other structure of the device 200). The first and second adhesives may have different properties, such as different stiffness (e.g., Young's modulus), different adhesive properties, or the like. For example, in some cases, the first adhesive is configured to adhere to the material of the battery 230 (e.g., with a bond strength above a threshold value), while the second adhesive is configured to adhere to the lower chassis section 219 or other structure of the device (e.g., with a bond strength above the threshold value). In such cases, the first adhesive may not form a sufficiently strong bond with the lower chassis section 219, and the second adhesive may not form a sufficiently strong bond with the battery 230, though the first and second adhesives may form a sufficiently strong bond with one another. Accordingly, by using the two different adhesives (e.g., in the layered configuration described) to ultimately secure the battery 230 to the lower chassis section 219, the overall strength and/or security of the attachment may be greater than if a single adhesive were used.

The battery 230 may be recharged via a charging port 232 (e.g., from a charging cable plugged into the charging port 232 through a charging access opening 226), and/or via a wireless charging system 240. The battery 230 may be coupled to the charging port 232 and/or the wireless charging system 240 via battery control circuitry that controls the power provided to the battery and the power provided by the battery to the device 200. The battery 230 may include one or more lithium ion battery cells or any other suitable type of rechargeable battery element. The charging port 232 may be or may include a connector module, such as the connector module 1100 described herein.

The wireless charging system 240 may include a coil that inductively couples to an output or transmitting coil of a wireless charger. The coil may provide current to the device 200 to charge the battery 230 and/or power the device. In this example, the wireless charging system 240 includes a coil assembly 242 that includes multiple wraps of a conductive wire or other conduit that is configured to produce a (charging) current in response to being placed in an inductive charging electromagnetic field produced by a separate wireless charging device or accessory. The coil assembly 242 also includes or is associated with an array of magnetic elements that are arranged in a circular or radial pattern. The magnetic elements may help to locate the device 200 with respect to a separate wireless charging device or other accessory. In some implementations, the array of magnets also help to radially locate, orient, or "clock" the device 200 with respect to the separate wireless charging device or other accessory. For example, the array of magnets may include multiple magnetic elements having alternating magnetic polarity that are arranged in a radial pattern. The magnetic elements may be arranged to provide a magnetic coupling to the separate charging device in a particular orientation or set of discrete orientations to help locate the device 200 with respect to the separate charging device or other accessory. This functionality may be described as self-aligning or self-locating wireless charging. As shown in FIG. 2, the device 200 also includes a magnetic fiducial 244 for helping to locate the separate wireless charging device or accessory. In one example, the magnetic fiducial 244 is adapted to magnetically couple to a separate wireless charging device or other accessory. By coupling to the separate wireless charging device/accessory, the rotational alignment of the device 200 and the separate wireless charging device/accessory may be maintained with respect to an absolute or single position. Also, by magnetically coupling the charging device/accessory to the rear surface of the device 200, the charging device or other accessory may be more securely coupled to the device 200.

In some implementations, the wireless charging system 240 includes an antenna or other element that detects the presence of a charging device or other accessory. In some cases, the charging system includes a near-field communications (NFC) antenna that is adapted to receive and/or send wireless communications between the device 200 and the wireless charger or other accessory. In some cases, the device 200 is adapted to perform wireless communications to detect or sense the presence of the wireless charger or other accessory without using a dedicated NFC antenna. The communications may also include information regarding the status of the device, the amount of charge held by the battery 230, and/or control signals to increase charging, decrease charging, start charging, and/or stop charging for a wireless charging operation.

The device 200 may also include a speaker system 224. The speaker system 224 may be positioned in the device 200 so that a respective port 235 is aligned with or otherwise proximate an audio output of the speaker system 224. Accordingly, sound that is output by the speaker system 224 exits the housing structure 210 via the respective port 235. The speaker system 224 may include a speaker positioned in a housing that defines a speaker volume (e.g., an empty space in front of or behind a speaker diaphragm). The speaker volume may be used to tune the audio output from the speaker and optionally mitigate destructive interference of the sound produced by the speaker.

The device 200 may also include a haptic actuator 222. The haptic actuator 222 may include a movable mass and an actuation system that is configured to move the mass to produce a haptic output. The actuation system may include one or more coils and one or more magnets (e.g., permanent and/or electromagnets) that interact to produce motion. The magnets may be or may include recycled magnetic material.

When the coil(s) are energized, the coil(s) may cause the mass to move, which results in a force being imparted on the device 200. The motion of the mass may be configured to cause a vibration, pulse, tap, or other tactile output detectable via an exterior surface of the device 200. The haptic actuator 222 may be configured to move the mass linearly, though other movements (e.g., rotational) are also contemplated. Other types of haptic actuators may be used instead of or in addition to the haptic actuator 222.

The device 200 also includes a circuit board assembly 220. The circuit board assembly 220 may include a substrate, and processors, memory, and other circuit elements coupled to the substrate. The circuit board assembly 220 may include multiple circuit substrates that are stacked and coupled together in order to maximize the area available for electronic components and circuitry in a compact form factor. The circuit board assembly 220 may include provisions for a subscriber identity module (SIM). The circuit board assembly 220 may include electrical contacts and/or a SIM tray assembly for receiving a physical SIM card and/or the circuit board assembly 220 may include provisions for an electronic SIM. Where an electronic SIM is used, a SIM tray may be omitted from the device 200 (e.g., the device may not include openings, trays, slots, doors, or other mechanical means to insert or otherwise access a SIM card). The circuit board assembly 220 may be wholly or partially encapsulated to reduce the chance of damage due to ingress of water or other fluid.

The circuit board assembly 220 may also include wireless communication circuitry, which may be operably coupled to and/or otherwise use the housing components 211, 212, 213, 214, 215, or 216 (or portions thereof) as radiating members to provide wireless communications. The circuit board assembly 220 may also include components such as accelerometers, gyroscopes, near-field communications circuitry and/or antennas, compasses, and the like. In some implementations, the circuit board assembly 220 may include a magnetometer that is adapted to detect and/or locate an accessory. For example, the magnetometer may be adapted to detect a magnetic (or non-magnetic) signal produced by an accessory of the device 200 or other device. The output of the magnetometer may include a direction output that may be used to display a directional indicia or other navigational guidance on the display 203 in order to guide the user toward a location of the accessory or other device.

The device 200 may also include one or more pressure transducers that may be operable to detect changes in external pressure in order to determine changes in altitude or height. The pressure sensors may be externally ported and/or positioned within a water-sealed internal volume of the housing structure 210. The output of the pressure sensors may be used to track flights of stairs climbed, a location (e.g., a floor) of a multi-story structure, movement performed during an activity in order to estimate physical effort or calories burned, or other relative movement of the device 200. A pressure transducer may be positioned in a module 237 that is in fluidic communication with the exterior environment through ports 225 in the housing structure 210. The module 237 may include additional components, such as a microphone and a barometric vent (e.g., to allow pressure equalization between the interior of the device 200 and the exterior environment, while inhibiting water ingress).

The circuit board assembly 220 may also include global positioning system (GPS) electronics that may be used to determine the location of the device 200 with respect to one or more satellites (e.g., a Global Navigation Satellite System (GNSS)) in order to estimate an absolution location of the device 200. In some implementations, the GPS electronics are operable to utilize dual frequency bands. For example, the GPS electronics may use L1 (L1C), L2 (L2C), L5, L1+L5, and other GPS signal bands in order to estimate the location of the device 200.

The housing structure 210 may also include a lower chassis section 219. As described herein, the lower chassis section 219, also referred to simply as a chassis 219, may be part of a housing subassembly 217 that includes the lower chassis section 219, a housing component 211 that defines a first side exterior surface of the device 200, and a housing component 214 that defines a second side exterior surface of the device 200. The lower chassis section 219 may extend between the housing component 211 and the housing component 214. The lower chassis section 219 may define a component mounting structure of the housing structure 210 (e.g., various components may be mounted to the lower chassis section 219, as shown and described herein).

The housing structure 210 may include a housing subassembly 217. The housing subassembly 217 includes the housing components 211, 214 and the lower chassis section 219 (e.g., a metal plate-like structure that extends between the housing components 211 and 214). The lower chassis section 219 may define a mounting structure for components of the device 200. For example, as described herein, components such as the circuit board assembly 220, battery 230, sensor array 260, receiver 250, speaker module 224, haptic actuator 222, and the like, may be coupled to the lower chassis section 219 (e.g., along a front-facing side of the lower chassis section 219). By coupling components to the lower chassis section 219 instead of the front cover assembly 201 and/or the rear cover assembly 273, the cost and complexity of the front cover assembly 201 and rear cover assembly 273 may be reduced, and removal and/or replacement of the front cover assembly 201 and/or rear cover assembly 273 may be simplified. The lower chassis section 219 may also define one or more holes extending therethrough to facilitate the coupling of components on one side of the lower chassis section 219 (e.g., the wireless charging system 240 and/or other components of the rear cover assembly 273) to components on the other side of the lower chassis section 219 (e.g., the circuit board assembly 220). Additionally, as noted above, the lower chassis section 219 may also be thermally coupled to components of the device 300, such as the circuit board assembly 220 and the battery 230 to conduct heat away from the thermally coupled components.

As shown in FIG. 2, the housing may include a cover 272 (e.g., back or rear cover 272) that may define a substantial entirety of the rear surface of the device 200. The rear cover 272, the front cover 202, and the housing structure 210 may at least partially define an enclosure of the device 200, which may define an internal volume in which components of the device 200 are positioned. The cover 272 may be formed from or include a transparent or optically transmissive material. For example, the cover 272 may include a substrate formed from or including a glass material or other suitable material (e.g., a silica-based glass material, an aluminosilicate glass, a boroaluminosilicate glass, an alkali metal aluminosilicate glass, a chemically strengthened glass, sapphire, ceramic, glass-ceramic, crystallizable glass materials, or plastic). A glass-ceramic material may be a silica-based glass ceramic material, such as an aluminosilicate glass ceramic material or a boroaluminosilicate glass ceramic material. The glass-ceramic material may be chemically strengthened by ion exchange. The substrate may have portions that are less than 1 mm thick. In some cases, the substrate has portions that are less than 0.80 mm. In some cases, the substrate has portions that are approximately 0.60 mm or less. The cover 272 may have a uniform thickness or, in some cases, may have a thickened or raised portion that surrounds the camera covers 263, 264. The cover 272 may be machined (e.g., ground) into a final shape before being polished and/or textured to provide the desired surface finish. The texture may be specially configured to provide a matte appearance while also being resistant to collecting a buildup of skin, lint, or other debris.

The cover 272 may be formed of a colored optically transmissive material, and may include a coating along an interior side of the cover 272 that, together with the color (or lack of color) of the optically transmissive material, define the color of the rear side of the device. For example, a coating along an interior surface of the cover may include one or more color layers. The color layer may include a colorant such as a pigment or dye and may have a distinct hue or may be near neutral in color. Alternately, or additionally, the coating may include one or more opaque layers applied to the interior surface of the substrate (or otherwise positioned along the interior side of the substrate) to provide a particular appearance to the back side of the device. The opaque layer(s) may include a sheet, ink, dye, or combinations of these (or other) layers, materials, or the like and in some cases may be optically dense.

The cover 272 may be part of a rear cover assembly 273. The rear cover assembly 273 may be coupled to the housing structure 210. In some cases, the rear cover assembly 273 includes components such as the camera covers 266, 267, 268, the trim assemblies (e.g., trim assemblies 269) components of a wireless charging system, structural components (e.g., frames), mounting clips, and/or other components, systems, subsystems, and/or materials. The rear cover assembly 273 may be removable from the housing structure 210 to facilitate repair and/or replacement of the rear cover assembly 273 and/or internal components of the device 200. In some cases, the wireless charging system 240, a microphone, and a flash module are the only components of the rear cover assembly 273 that need to be electrically coupled to the circuit board assembly 220 (which is coupled to the lower chassis section 219). Accordingly, the rear cover assembly 273 may be completely removed from the device by unfastening the rear cover assembly 273 from the remainder of the housing (e.g., from the housing structure 210) and decoupling an electrical connector (e.g., on a flexible circuit element). In this way, the device 200 may provide improved reparability.

Similar to the description of the cover 202, the cover 272 may be positioned at least partially within an opening defined in the housing structure 210. Also, the edges or sides of the cover 272 may be surrounded by a protective flange or lip of the housing structure 210 without an interstitial component between the edges of the cover 272 and the respective flanges of the housing structure 210. The cover 272 is typically chemically strengthened using an ion exchange process to form a compressive stress layer along exterior surfaces of the cover 272.

As described above, the housing structure 210 may include housing components 211, 212, 213, 214, 215, and 216 structurally joined together via joint structures 218. The joint structures 218 (e.g., the material of the joint structures) may extend over inner surfaces of the housing components. More particularly, a portion of the joint structures 218 may contact, cover, encapsulate, and/or engage with retention features of the housing components that extend from the inner surfaces of the housing components.

Housing components 211, 212, 213, 214, 215, and 216, which may also be referred to herein as housing segments, may be formed from a clad metal structure. For example, the housing components may include a core portion formed from a first metal (e.g., aluminum) and a cladding portion formed from a second metal (e.g., titanium, stainless steel). The cladding portion may define exterior surfaces of the housing components. The housing components may be formed by co-extruding the core portion and the cladding portion to form a clad precursor material. The precursor material may then be formed into the housing components (e.g., extrudate members) using various processes. For example, the precursor material may be forged and/or machined to define the overall shape and the mechanical features of the housing components, and then subjected to polishing, texturing, and/or coating operations. The mechanical features may include interlock structures for interlocking with joint structures (e.g., to mechanically couple housing components together), attachment features (e.g., holes for receiving fasteners), mounting surfaces, antenna feed and ground points, and the like. In some cases, the exterior surface of the housing components are subjected to a texturing operation, such as grinding, lapping, machining, ablation, blasting (e.g., sand blasting, bead blasting), etching (via mechanical etching, laser etching, chemical etching, or the like), or the like. Some or all surfaces of the housing components may also be coated, such as using PVD or CVD operations. For housing components that are curved (e.g., the portions 212, 213, 215 and 216, which define corner portions of the housing structure 210), the clad precursor material may be bent prior to other processing operations such as machining, forging, polishing, grinding, coating, and the like. After formation, the housing components (including the housing subassembly 217) may be inserted into a mold and joined together by injection molding a moldable material to form the joint structures 218 that engage with the housing components and secure the components together to define the housing structure 210.

The housing subassembly 217 may be formed by welding the housing components 211, 214 to the lower chassis section 219. The lower chassis section 219 may be formed from metal, such as aluminum, and may be welded to an aluminum core portion of the housing components 211, 214. In some cases, the lower chassis section 219 may be soldered, brazed, or adhered to the housing components 211, 214 instead of or in addition to welding. The lower chassis section 219 may be conductive and structurally coupled to the housing components 211, 214.

As described herein, the housing components 211, 212, 213, 214, 215, and 216 may provide a robust and impact resistant sidewall for the device 200. In the present example, the housing components 211, 212, 213, 214, 215, and 216 define a flat sidewall that extends around the perimeter of the device 200. The flat sidewall may include rounded or chamfered edges that define the upper and lower edges of the sidewall of the housing structure 210. The housing components 211, 212, 213, 214, 215, and 216 may each have a flange portion or lip that extends around and at least partially covers a respective side of the front and rear covers 202, 272. There may be no interstitial material or elements between the flange portion or lip and the respective side surface of the front and rear covers 202, 272. This may allow forces or impacts that are applied to the housing structure 210 to be transferred to the front and rear covers 202, 272 without affecting the display or other internal structural elements, which may improve the drop performance of the device 200.

As shown in FIG. 2, the device 200 includes multiple antennas that may be adapted to conduct wireless communication using a 5G communication protocol. In particular, the device 200 may include a (side-fired) antenna array 282 that is configured to transmit and receive wireless communication signals through an antenna window 283 or waveguide formed along or otherwise integrated with the sidewall of the housing structure 210. The side-fired antenna array 282 may be coupled to the circuit board assembly 220 via a flexible circuit element or other conductive connection, as described herein, and may include multiple radiating elements (e.g., 5 radiating elements) that send and/or receive wireless signals. The device 200 may also include a rear antenna module that may include one or more (rear-fired) antenna arrays that may be configured to transmit and receive wireless communication signals through the cover 272. The antenna module may be attached to a back or bottom surface of the circuit board assembly 220.

The antenna modules may include multiple antenna arrays. For example, the antenna modules may include one or more millimeter-wave antenna arrays. In the case where the antenna modules include multiple millimeter-wave antenna arrays (each of which may include one or more radiating elements), the multiple millimeter-wave antenna arrays may be configured to operate according to a diversity scheme (e.g., spatial diversity, pattern diversity, polarization diversity, or the like). The antenna modules may also include one or more ultra-wideband antennas.

The antenna arrays may be adapted to conduct millimeter wave 5G communications and may be adapted to use or be used with beam-forming or other techniques to adapt signal reception depending on the use case. The device 200 may also include multiple antennas for conducting multiple-in multiple-out (MIMO) wireless communications schemes, including 4G, 4G LTE, and/or 5G MIMO communication protocols. As described herein, one or more of the housing components 211, 212, 213, 214, 215, and 216 (or portions thereof) may be adapted to operate as antennas for a MIMO wireless communication scheme (or other wireless communication scheme).

Figure 3:
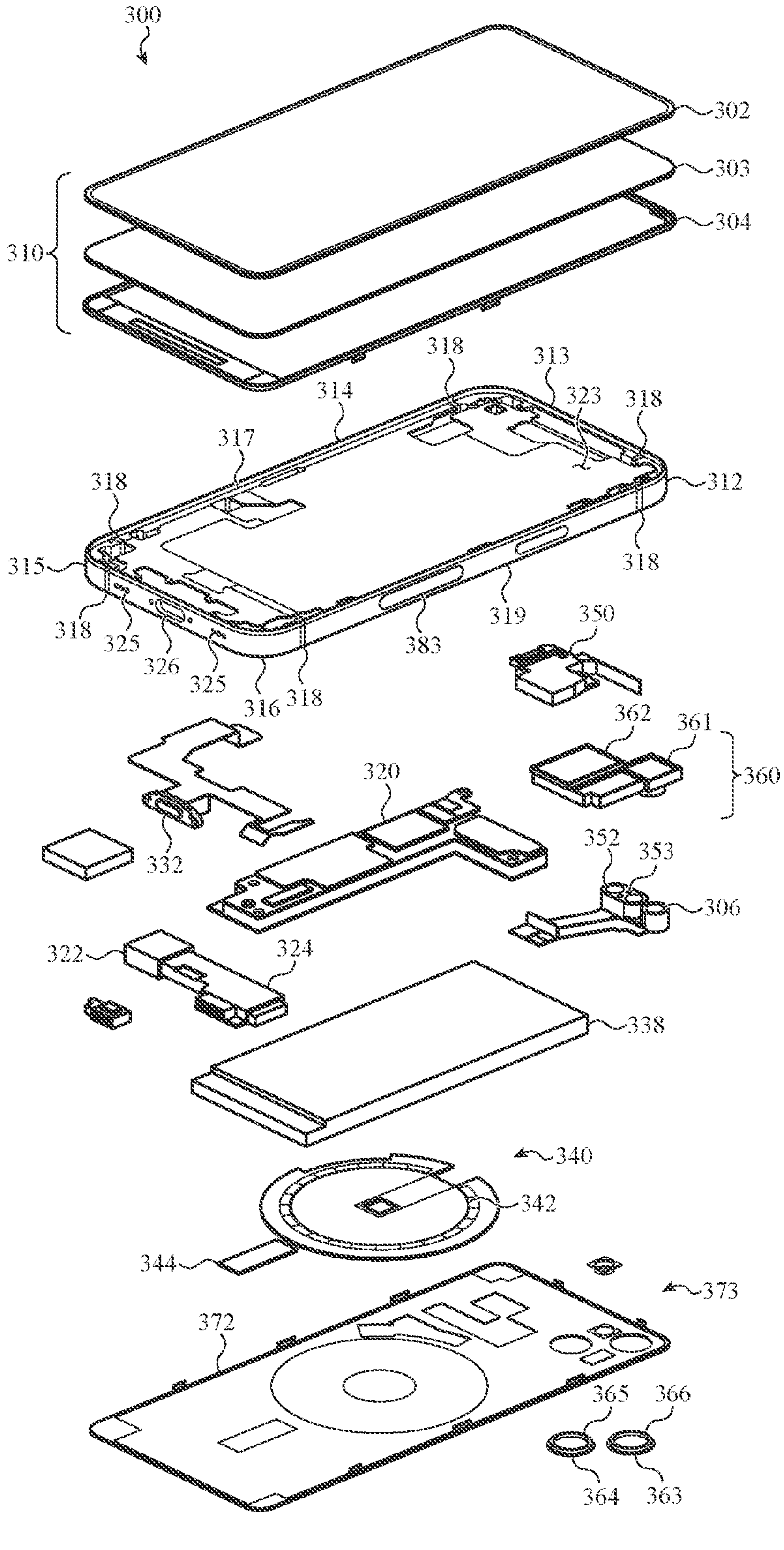
FIG. 3 depicts an exploded view of an example electronic device.

FIG. 3 depicts an exploded view of an example electronic device. In particular, FIG. 3 depicts an exploded view of a device 300, showing various components of the device 300 and example arrangements and configurations of the components. The device 200 may be an embodiment of the device 140, and the description of the various components and elements of device 100 of FIGS. 1A and 1B may also be applicable to the device 300 depicted in FIG. 3. A redundant description of some of the components is not repeated herein for clarity.

As shown in FIG. 3, the device 300 includes a cover 302 (e.g., a front cover), which may be formed from or include a transparent or optically transmissive material. In some cases, the cover 302 is formed from or includes a glass material or other suitable transparent or optically transmissive material (e.g., a silica-based glass material, an aluminosilicate glass, a boroaluminosilicate glass, an alkali metal aluminosilicate glass, a chemically strengthened glass, sapphire, ceramic, glass-ceramic, crystallizable glass materials, or plastic). In this example, the cover 302 may be formed from a glass-ceramic material. A glass-ceramic material may include both amorphous and crystalline or non-amorphous phases of one or more materials and may be formulated to improve strength or other properties of the cover 302. A glass-ceramic material may be a silica-based glass ceramic material, such as an aluminosilicate glass ceramic material or a boroaluminosilicate glass ceramic material. The glass-ceramic material may be chemically strengthened by ion exchange. In some cases, the cover 302 may include a sheet of chemically strengthened material having one or more coatings including an anti-reflective (AR) coating, an oleophobic coating, or other type of coating or optical treatment. In some cases, the cover 302 includes a sheet of material that is less than 1 mm thick. In some cases, the sheet of material is less than 0.80 mm. In some cases, the sheet of material is approximately 0.60 mm or less. The cover 302 may be chemically strengthened using an ion exchange process to form a compressive stress layer along exterior surfaces of the cover 302.

The cover 302 extends over a substantial entirety of the front surface of the device and may be positioned within an opening defined by the housing structure 310. In some cases, the edges or sides of the cover 302 may be surrounded by a protective flange or lip of the housing structure 310 without an interstitial component between the edges of the cover 302 and the respective flanges of the housing structure 310. This configuration may allow an impact or force applied to the housing structure 310 to be transferred to the cover 302 without directly transferring shear stress through the display 303 or frame 304.

As shown in FIG. 3, the display 303 is attached to an internal surface of the cover 302. The display 303 may include an edge-to-edge organic light-emitting diode (OLED) display that measures 15.4 cm (6.1 inches) corner-to-corner. The perimeter or non-active area of the display 303 may be reduced to allow for very thin device borders around the active area of the display 303. In some cases, the display 303 allows for border regions of 1.5 mm or less. In some cases, the display 303 allows for border regions of 1 mm or less. In one example implementation, the border region is approximately 0.9 mm. The display 303 may have a relatively high pixel density of approximately 460 pixels per inch (PPI) or greater. In some cases, the display 303 has a pixel density of approximately 475 PPI. The display 203 may use a low temperature polycrystalline silicon (LTPS) or low temperature polycrystalline oxide (LTPO) backplane The display 303 may have an integrated (on-cell) touch-sensing system. For example, an array of electrodes (or other touch-sensing components) that are integrated into the OLED display may be time and/or frequency multiplexed in order to provide both display and touch-sensing functionality. The electrodes may be configured to detect a location of a touch, a gesture input, multi-touch input, or other types of touch input along the external surface of the cover 302. In some cases, the display 303 includes another type of display element, such as a liquid-crystal display (LCD) without an integrated touch-sensing system. That is, the device 300 may include one or more touch- and/or force-sensing components or layers that are positioned between the display 303 and the cover 302.

The display 303, also referred to as a display stack, may include always-on-display (AOD) functionality. For example, the display 303 may be configurable to allow designated regions or subsets of pixels to be displayed when the device 300 is powered on such that graphical content is visible to the user even when the device 300 is in a low-power or sleep mode. This may allow the time, date, battery status, recent notifications, and other graphical content to be displayed in a lower-power or sleep mode. This graphical content may be referred to as persistent or always-on graphical output. While some battery power may be consumed when displaying persistent or always-on graphical output, the power consumption is typically less than during normal or full-power operation of the display 303. This functionality may be enabled by only operating a subset of the display pixels and/or at a reduced resolution in order to reduce power consumption by the display 303.

The display 303 may include multiple layers, including touch-sensing layers or components, optional force-sensing layers or components, display layers, and the like. The display 303 may define a graphically active region in which graphical outputs may be displayed. In some cases, portions of the display 303 may include graphically inactive regions, such as portions of the display layers that do not include active display components (e.g., pixels) or are otherwise not configured to display graphical outputs. In some cases, graphically inactive regions may be located along the peripheral borders or other edges of the display stack 303.

As shown in FIG. 3, the device 300 may also include a frame member 304, also referred to simply as a frame 304, that is positioned below the cover 302 and that extends around an outer periphery of the display 303. The frame 304 may be attached to a lower or inner surface of the cover 302. A portion of the frame 304 may extend below the display 303 and may attach the cover 302 to the housing structure 310. Because the display 303 is attached to a lower or inner surface of the cover 302, the frame 304 may also be described as attaching both the display 303 and the cover 302 to the housing structure 310. The frame 304 may be formed of a polymer material, a metal material, or a combination of polymer and metal materials. The frame 304 may support elements of the display stack, provide anchor points for flexible circuits, and/or be used to mount other components and device elements. In some cases, the frame 304 includes one or more metal or conductive elements that provide shielding between device components, such as between the display stack (including display components and touch sensor components) and other components like the haptic actuator 322, the speaker system 324, and the like.

The cover 302, display or display stack 303, and frame member 304 may be part of a front cover assembly 301 of the device 300. The front cover assembly 301 (e.g., a front cover of the front cover assembly) may define a front exterior surface of the device. The cover 302 may define an interior surface opposite the exterior surface. The front cover assembly 301 may be assembled as a subassembly, which may then be attached to a housing component. For example, as described herein, the display 303 may be attached to the cover 302 (e.g., via a transparent adhesive), and the frame member 304 may be attached (e.g., via adhesive) to the cover around a periphery of the display stack 303. The front cover assembly 301 may then be attached to a housing component of the device 300 by mounting and adhering the frame member 304 to a ledge defined by the housing component.

The device 300 also includes a speaker module 350 that is configured to output sound via a speaker port. The speaker port may be positioned in and/or at least partially defined by a recess 351 of the cover 302. As described herein, a trim piece may be positioned at least partially in the recess 351 to facilitate the output of sound while also inhibiting the ingress of debris, liquid, or other materials or contaminants into the device 300. Output from the speaker module 350 may pass through an audio passage or acoustic path defined at least in part by the speaker module 350 itself and the trim piece. In some cases, part of the acoustic path (e.g., between the speaker module 350 and the trim piece) is defined by the housing structure 310 and/or a molded material that is coupled to the housing structure 310. For example, a molded material (e.g., a fiber-reinforced polymer) may be molded against a metal portion of the housing structure 310 (e.g., the housing component 313, described herein). The molded material may also form one or more intermediate elements, such as joint structures, that also structurally join housing components together (e.g., the joint structures 318). A port or passage (e.g., a tube-like tunnel) may be defined through the molded material to acoustically couple the speaker module 350 to the trim piece and/or the recess 351 more generally, thereby directing sound from the speaker module 350 to the exterior of the device 300.

As shown in FIG. 3, the device 300 also includes one or more cameras, optical emitters, and/or sensing elements that are configured to transmit signals, receive signals, or otherwise operate along the front surface of the device. In this example, the device 300 includes a front camera 306 that includes a high-resolution camera sensor. The front camera 306 may have a 12 megapixel resolution sensor with optical elements that provide an 85° field of view. The front camera 306 may have an aperture number of f/1.9. The front camera 306 may include autofocus functionality in which one or more of the lens elements move (e.g., up to about 100 microns perpendicular to the cover) in order to focus an image on the camera's sensor. In some cases, the autofocusing front-facing camera is capable of providing continuous autofocus functionality during video capture. The device 300 also includes an optical facial recognition system 352 that includes an infrared light projector (for projecting light) and an infrared light sensor that is configured to sense an array of depth points or regions along the face of the user. The array of depth points may be characterized as a unique signature or bio-identifier, which may be used to identify and/or authenticate the user and unlock the device 300 (and/or authorize functionality on the device 300 like the purchase of software apps or the use of payment functionality provided by the device 300).

The device 300 may also include one or more other sensors or components. For example, the device 300 may include a front light illuminator element for providing a flash or illumination for the front camera 306. The device 300 may also include an ambient light sensor (ALS) that is used to detect ambient light conditions for setting exposure aspects of the front camera 306 and/or for controlling the operation of the display. The device 300 may also include a proximity sensing system 353 for detecting the proximity of a user or other object to the device 300. In some cases, as described herein, the proximity sensing system 353 detects proximity to other objects through an active region of the display. The proximity sensing system 353 and the optical facial recognition system 352 may be integrated in a common module. In some cases, information from both the proximity sensing system and the ambient light sensor is used to determine ambient light conditions and/or the proximity of objects to the device 300. For example, information from the proximity sensing system may be used to determine whether a detection by the ambient light sensor of low ambient lighting is due to low ambient lighting, or an object locally or temporarily covering the ambient light sensor (e.g., a finger providing a touch input or a palm during a typing input). Information from both sensing systems may be used to disambiguate between potentially ambiguous conditions, and generally improve the accuracy with which the device can sense or detect certain conditions.

FIG. 3 also illustrates one or more cameras, optical emitters, and/or sensing elements that are configured to transmit signals, receive signals, or otherwise operate along the rear surface of the device. As depicted in FIG. 3, these elements may be part of a sensor array 360. In this example, the sensor array 360 includes a first camera 361 having a 48.8 megapixel image sensor (optionally with a three-layer sensor arrangement) and a wide angle lens with an aperture number of f/1.6. The sensor array 360 may also include a second camera 362 having a 12 megapixel image sensor and a super-wide angle lens (120° FOV) with an aperture number of f/2.4. The sensor array 360 also includes a light illuminator that may be used as a flash for photography or as an auxiliary light source (e.g., a flashlight). In some cases, the sensor array 360 also includes a microphone, an ambient light sensor, a depth sensing device, and/or other sensors that are adapted to sense along the rear surface of the device 300.

As shown in FIG. 3, the cameras 361 and 362 may be aligned with camera covers 363 and 364, respectively. The covers 363, 364 may be formed from a glass, glass-ceramic, or sapphire material and may provide a clear (e.g., transparent or optically transmissive) window through which the cameras 361, 362 are able to capture a photographic image. In other cases, the covers 363, 364 are optical lenses that filter, magnify, or otherwise condition light received by the respective camera 361, 362. The other sensing or transmitting elements of the sensor array 360 may transmit and/or receive signals through a region of the rear or rear cover 372 or through a separate cover that is coupled to the rear cover 372. As shown in FIG. 3, the covers 363, 364 may extend beyond the exterior surface of the cover 372, and may define a recess along the interior side of the cover 372, such that the lens or other element of the cameras 361 and 362 can extend into the respective recesses. In this way, the device 300 may accommodate a larger lens or other elements of the cameras 361 and 362 than would be possible if the recess were not provided. In some cases, trim assemblies 365, 366 may be coupled to the cover 372 and may support the covers 363, 364.

The device 300 also includes a battery 330. The battery 330 provides electrical power to the device 300 and its various systems and components. The battery 330 may include a 4.40 V lithium ion battery that is encased in a foil or other enclosing element. The battery 330 may include a rolled electrode configuration, sometimes referred to as a "jelly roll" or a folded or stacked electrode configuration. The battery 330 may be recharged via a charging port 332 (e.g., from a charging cable plugged into the charging port 332 through a charging access opening 326), and/or via a wireless charging system 340. The charging port 332 may be or may include a connector module, such as the connector module 1100 described herein. The battery 330 may be coupled to the charging port 332 and/or the wireless charging system 340 via battery control circuitry that controls the power provided to the battery and the power provided by the battery to the device 300. The battery 330 may include one or more lithium ion battery cells or any other suitable type of rechargeable battery element.

The wireless charging system 340 may include a coil that inductively couples to an output or transmitting coil of a wireless charging accessory. The coil may provide current to the device 300 to charge the battery 330 and/or power the device. In this example, the wireless charging system 340 includes a coil assembly 342 that includes multiple wraps of a conductive wire or other conduit that is configured to produce a (charging) current in response to being placed in an inductive charging electromagnetic field produced by a separate wireless charging device or accessory. The coil assembly 342 also includes an array of magnetic elements that are arranged in a circular or radial pattern. The magnetic elements may help to locate the device 300 with respect to a separate wireless charging accessory or other device. In some implementations, the array of magnets also help to radially locate, orient, or "clock" the device 300 with respect to the separate wireless charging device or other accessory. For example, the array of magnets may include multiple magnetic elements having alternating magnetic polarity that are arranged in a radial pattern. The magnetic elements may be arranged to provide a magnetic coupling to the separate charging device in a particular orientation or set of discrete orientations to help locate the device 300 with respect to the separate charging device or other accessory. This functionality may be described as self-aligning or self-locating wireless charging. As shown in FIG. 3, the device 300 also includes a magnetic fiducial 344 for helping to locate the separate wireless charging device or accessory.

In one example, the magnetic fiducial 344 is adapted to magnetically couple to a separate wireless charging device or other accessory. By coupling to the separate wireless charging device/accessory, the rotational alignment of the device 300 and the separate wireless charging device/accessory may be maintained with respect to an absolute or single position. Also, by magnetically coupling the charging device/accessory to the rear surface of the device 300, the charging device or other accessory may be more securely coupled to the device 300.

In some implementations, the wireless charging system 340 includes an antenna or other element that detects the presence of a charging device or other accessory. In some cases, the charging system includes a near-field communications (NFC) antenna that is adapted to receive and/or send wireless communications between the device 300 and the wireless charger or other accessory. In some cases, the device 300 is adapted to perform wireless communications to detect or sense the presence of the wireless charger or other accessory without using a dedicated NFC antenna. The communications may also include information regarding the status of the device, the amount of charge held by the battery 330, and/or control signals to increase charging, decrease charging, start charging and/or stop charging for a wireless charging operation.

The device 300 may also include a speaker system 324. The speaker system 324 may be positioned in the device 300 so that a respective port 325 is aligned with or otherwise proximate an audio output of the speaker system 324. Accordingly, sound that is output by the speaker system 324 exits the housing structure 310 via the respective port 325. The speaker system 324 may include a speaker positioned in a housing that defines a speaker volume (e.g., an empty space in front of or behind a speaker diaphragm). The speaker volume may be used to tune the audio output from the speaker and optionally mitigate destructive interference of the sound produced by the speaker.

The device 300 may also include a haptic actuator 322. The haptic actuator 322 may include a movable mass and an actuation system that is configured to move the mass to produce a haptic output. The actuation system may include one or more coils and one or more magnets (e.g., permanent and/or electromagnets) that interact to produce motion. The magnets may be or may include recycled magnetic material.

When the coil(s) are energized, the coil(s) may cause the mass to move, which results in a force being imparted on the device 300. The motion of the mass may be configured to cause a vibration, pulse, tap, or other tactile output detectable via an exterior surface of the device 300. The haptic actuator 322 may be configured to move the mass linearly, though other movements (e.g., rotational) are also contemplated. Other types of haptic actuators may be used instead of or in addition to the haptic actuator 322.

The device 300 also includes a circuit board assembly 320. The circuit board assembly 320 may include a substrate, and processors, memory, and other circuit elements coupled to the substrate. The circuit board assembly 320 may include multiple circuit substrates that are stacked and coupled together in order to maximize the area available for electronic components and circuitry in a compact form factor. The circuit board assembly 320 may include provisions for a subscriber identity module (SIM). The circuit board assembly 320 may include electrical contacts and/or a SIM tray assembly for receiving a physical SIM card and/or the circuit board assembly 320 may include provisions for an electronic SIM. Where an electronic SIM is used, a SIM tray may be omitted from the device 300 (e.g., the device may not include openings, trays, slots, doors, or other mechanical means to insert or otherwise access a SIM card). The circuit board assembly 320 may be wholly or partially encapsulated to reduce the chance of damage due to ingress of water or other fluid.

The circuit board assembly 320 may be thermally coupled to a mid-chassis section 323 of the housing structure 310. As described herein, the mid-chassis section 323, also referred to simply as a chassis 323, may be part of a housing component 314 (e.g., a middle housing component) that is formed from a unitary structure and that defines the chassis 323 as well as a first wall section 317 that defines a first side exterior surface of the device 300, and a second wall section 319 that defines a second side exterior surface of the device 300. The circuit board assembly 320 may be thermally coupled to the chassis 323 via one or more thermal bridges, such as a graphite structure, a graphite-wrapped foam, or other thermally conductive structure(s). Heat from the circuit board assembly may be transferred to the chassis 323 via the thermal bridges, thereby removing heat from the circuit board assembly 320 (where heat may be detrimental to durability, performance, or the like), and also drawing heat away from exterior surfaces and/or components of the device 300 that come into contact with a user (e.g., the wall sections 317, 319, which define exterior side surfaces of the device and which may be held by a user when the device 300 is in use).

The circuit board assembly 320 may also include wireless communication circuitry, which may be operably coupled to and/or otherwise use the wall sections and/or housing components 312, 313, 317, 315, 316, or 319 (or portions thereof) as radiating members or structures to provide wireless communications. The circuit board assembly 320 may also include components such as accelerometers, gyroscopes, near-field communications circuitry and/or antennas, compasses, and the like. In some implementations, the circuit board assembly 320 may include a magnetometer that is adapted to detect and/or locate an accessory. For example, the magnetometer may be adapted to detect a magnetic (or non-magnetic) signal produced by an accessory of the device 300 or other device. The output of the magnetometer may include a direction output that may be used to display a directional indicia or other navigational guidance on the display 303 in order to guide the user toward a location of the accessory or other device.

The device 300 may also include one or more pressure transducers that may be operable to detect changes in external pressure in order to determine changes in altitude or height. The pressure sensors may be externally ported and/or positioned within a water-sealed internal volume of the housing structure 310. The output of the pressure sensors may be used to track flights of stairs climbed, a location (e.g., a floor) of a multi-story structure, movement performed during an activity in order to estimate physical effort or calories burned, or other relative movement of the device 300.

The circuit board assembly 320 may also include global positioning system (GPS) electronics that may be used to determine the location of the device 300 with respect to one or more satellites (e.g., a Global Navigation Satellite System (GNSS)) in order to estimate an absolution location of the device 300. In some implementations, the GPS electronics are operable to utilize dual frequency bands. For example, the GPS electronics may use L1 (L1C), L2 (L2C), L5, L1+L5, and other GPS signal bands in order to estimate the location of the device 300.

As shown in FIG. 3, the housing may include a cover 372 (e.g., rear or rear cover) that may define a substantial entirety of the rear surface of the device 300. The rear cover 372, the front cover 302, and the housing structure 310 may at least partially define an enclosure of the device 300, which may define an internal volume in which components of the device 300 are positioned. The cover 372 may be formed from or include a transparent or optically transmissive material. For example, the cover 372 may include a substrate formed from or including a glass material or other suitable material (e.g., a silica-based glass material, an aluminosilicate glass, a boroaluminosilicate glass, an alkali metal aluminosilicate glass, a chemically strengthened glass, sapphire, ceramic, glass-ceramic, crystallizable glass materials, or plastic). A glass-ceramic material may be a silica-based glass ceramic material, such as an aluminosilicate glass ceramic material or a boroaluminosilicate glass ceramic material. The glass-ceramic material may be chemically strengthened by ion exchange. The substrate may have portions that are less than 1 mm thick. In some cases, the substrate has portions that are less than 0.80 mm. In some cases, the substrate has portions that are approximately 0.60 mm or less. The cover 372 may have a uniform thickness or, in some cases, may have a thickened or raised portion that surrounds the camera covers 363, 364. The cover 372 may be machined (e.g., ground) into a final shape before being polished and/or textured to provide the desired surface finish. The texture may be specially configured to provide a matte appearance while also being resistant to collecting a buildup of skin, lint, or other debris.

The cover 372 may be formed of a colored optically transmissive material, and may include a coating along an interior side of the cover 372 that, together with the color (or lack of color) of the optically transmissive material, define the color of the rear side of the device. For example, a coating along an interior surface of the cover may include one or more color layers. The color layer may include a colorant such as a pigment or dye and may have a distinct hue or may be near neutral in color. Alternately, or additionally, the coating may include one or more opaque layers applied to the interior surface of the substrate (or otherwise positioned along the interior side of the substrate) to provide a particular appearance to the back side of the device. The opaque layer(s) may include a sheet, ink, dye, or combinations of these (or other) layers, materials, or the like and in some cases may be optically dense.

The cover 372 may be part of a rear cover assembly 373. The rear cover assembly 373 may be coupled to the housing structure 310. In some cases, the rear cover assembly 373 includes components such as camera covers 363 and 364, trim assemblies 365, 366, components of a wireless charging system, structural components (e.g., frames), trim assemblies, mounting clips, and/or other components, systems, subsystems, and/or materials.

Similar to as described above with respect to cover 302, the cover 372 may be positioned at least partially within an opening defined in the housing structure 310. Also similar to as described above with respect to cover 302, the edges or sides of the cover 372 may be surrounded by a protective flange or lip of the housing structure 310 without an interstitial component between the edges of the cover 372 and the respective flanges of the housing structure 310. The cover 372 may be chemically strengthened using an ion exchange process to form a compressive stress layer along exterior surfaces of the cover 372. In some cases, the (rear) cover 372 is formed from the same or a similar material as (front) cover 302.

The rear cover 372 may be removably coupled to the rest of the housing structure 310 such that the rear cover 372 can be removed and/or replaced quickly and efficiently. In some cases, the wireless charging system 340 is the only component that is attached to the rear cover 372 that needs to be electrically coupled to the circuit board assembly 320 (which is coupled to the housing component 314). Accordingly, the rear cover 372 may be completely removed from the device by unfastening the rear cover 372 from the remainder of the housing (e.g., from the housing component 314) and decoupling the wireless charging system's electrical connector(s). In this way, the device 300 may provide improved reparability.

The housing structure 310 may include a housing component 314 (e.g., a middle housing component 314) that includes the wall sections 317 and 319 and the mid-chassis section 323 (e.g., a metal plate-like structure that extends between the wall sections 317 and 319). The chassis 323 may define a mounting structure for components of the device 300. For example, as described herein, components such as the circuit board assembly 320, battery 330, sensor array 360, receiver 350, speaker module 324, haptic actuator 322, and the like, may be coupled to the chassis 323 (e.g., along a rear-facing side of the chassis 323). By coupling components to the chassis 323 instead of the front cover assembly 301 and/or the rear cover 372, the cost and complexity of the front cover assembly 301 and rear cover assembly 373 may be reduced, and removal and/or replacement of the front cover assembly 301 and/or rear cover 372 may be simplified. The chassis 323 may also define one or more holes extending therethrough to facilitate the coupling of components on one side of the chassis 323 (e.g., the display 303 and/or sensors of the front cover assembly 301) to components on the other side of the chassis 323 (e.g., the circuit board assembly 320). Additionally, as noted above, the chassis 323 may also be thermally coupled to components of the device 300, such as the circuit board assembly 320, to conduct heat away from the thermally coupled components.

The housing component 314 may be a unitary structure formed from a single piece of material. For example, the unitary structure of the housing component 314 may be a metal, such as aluminum, steel, titanium, or the like, and may be formed by extrusion, machining, and/or combinations of these and other forming processes. Thus, the wall sections 317 and 319 (which define side exterior surfaces of the device 300) and the chassis 323 may be different portions of a single piece of material. In some cases the housing component 314 is formed of a polymer material, reinforced polymer material (e.g., fiber reinforced), carbon fiber, or other suitable material.

As described above, the housing structure 310 may include housing components 312, 313, 315, and 316 structurally joined together and/or to the housing component 314 (the middle housing component 314) via joint structures 318. The joint structures 318 (e.g., the material of the joint structures) may extend over inner surfaces of the housing components. More particularly, a portion of the joint structures 318 may contact, cover, encapsulate, and/or engage with retention features of the housing components that extend from the inner surfaces of the housing components (including, for example, from the wall sections of the middle housing component 314). As the wall sections 317 and 319 are part of a single unitary structure, the joint structures 318 may also function to structurally join the housing components 312, 313, 315, and 316 to the housing component 314. When coupled via the joint structures 318, the housing component 314, the housing components 312, 313, 315, and 316, and the joint structures 318 may define a main housing assembly that defines the exterior side surfaces of the device 300 as well as the chassis 323 within the device.

Housing components 312, 313, 315, and 316 may also be referred to herein as housing segments and may be formed from aluminum, stainless steel, or other metal. As described herein, the housing components 312, 313, 315, and 316, and the wall sections 317, 319, may provide a robust and impact resistant sidewall for the device 300. In the present example, the housing components 312, 313, 315, and 316 and the wall sections 317, 319 define a flat sidewall that extends around the perimeter of the device 300. The flat sidewall may include rounded or chamfered edges that define the upper and lower edges of the sidewall of the housing structure 310. The housing components 312, 313, 315, and 316 and the wall sections 317, 319 may each have a flange portion or lip that extends around and at least partially covers a respective side of the front and rear covers 302, 372. There may be no interstitial material or elements between the flange portion or lip and the respective side surface of the front and rear covers 302, 372. This may allow forces or impacts that are applied to the housing structure 310 to be transferred to the front and rear covers 302, 372 without affecting the display or other internal structural elements, which may improve the drop performance of the device 300.

As shown in FIG. 3, the device 300 includes multiple antennas that may be adapted to conduct wireless communication using a 5G communication protocol. In particular, the device 300 may include a (side-fired) antenna array that is configured to transmit and receive wireless communication signals through an antenna window 383 or waveguide formed along or otherwise integrated with the side wall of the housing structure 310. The side-fired antenna array may be coupled to the circuit board assembly 320 via a flexible circuit element or other conductive connection, as described herein. The device 300 may also include a rear antenna module that may include one or more (rear-fired) antenna arrays that may be configured to transmit and receive wireless communication signals through the cover 372. The antenna module may be attached to a back or bottom surface of the circuit board assembly 320.

The antenna modules may include multiple antenna arrays. For example, the antenna modules may include one or more millimeter-wave antenna arrays. In the case where the antenna modules include multiple millimeter-wave antenna arrays (each of which may include one or more radiating elements), the multiple millimeter-wave antenna arrays may be configured to operate according to a diversity scheme (e.g., spatial diversity, pattern diversity, polarization diversity, or the like). The antenna modules may also include one or more ultra-wideband antennas.

Each of the antenna arrays (e.g., the antenna array and the millimeter-wave arrays of the antenna module) may be adapted to conduct millimeter wave 5G communications and may be adapted to use or be used with beam-forming or other techniques to adapt signal reception depending on the use case. The device 300 may also include multiple antennas for conducting multiple-in multiple-out (MIMO) wireless communications schemes, including 4G, 4G LTE, and/or 5G MIMO communication protocols. As described herein, one or more of the housing components 312, 313, 315, and 316 and the wall sections 317, 319 (or portions thereof) may be adapted to operate as antennas for a MIMO wireless communication scheme (or other wireless communication scheme).

Figure 4A:
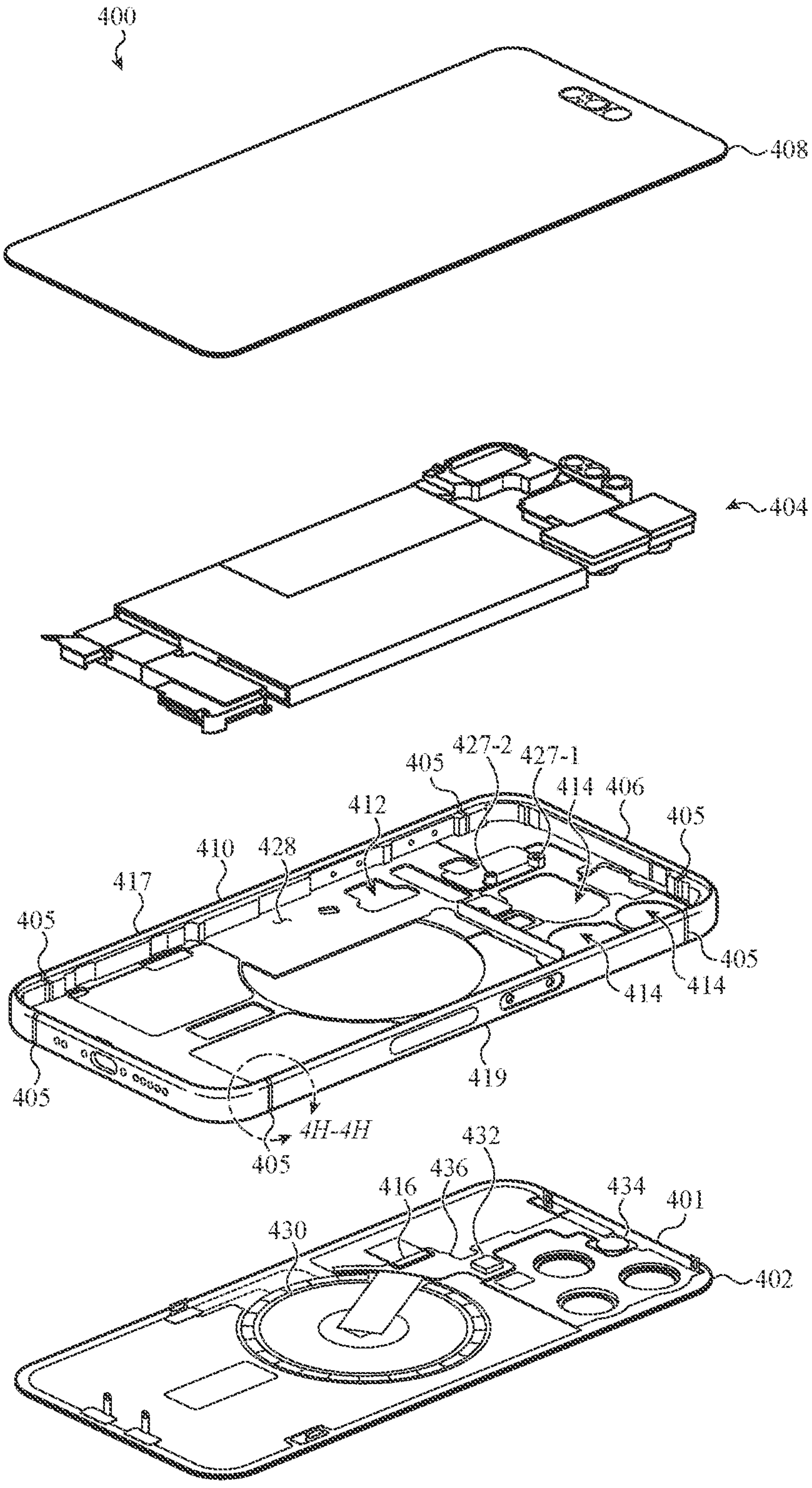
FIG. 4A depicts a partial exploded view of an example electronic device.

FIG. 4A depicts a partial exploded view of an example electronic device 400. The electronic device 400 may correspond to or be an embodiment of the electronic devices 100, 200, or any other device described herein.

As shown in FIG. 4A, the device 400 may include an enclosure that defines an interior cavity and includes a rear cover assembly 402, a housing structure 406, and a front cover assembly 408. The front cover assembly 408 may define a front exterior surface of the enclosure, and the rear cover assembly 402 may define a rear exterior surface of the device. The housing structure 406 may be positioned between the front cover assembly 408 and the rear cover assembly 402.

Figure 4B:
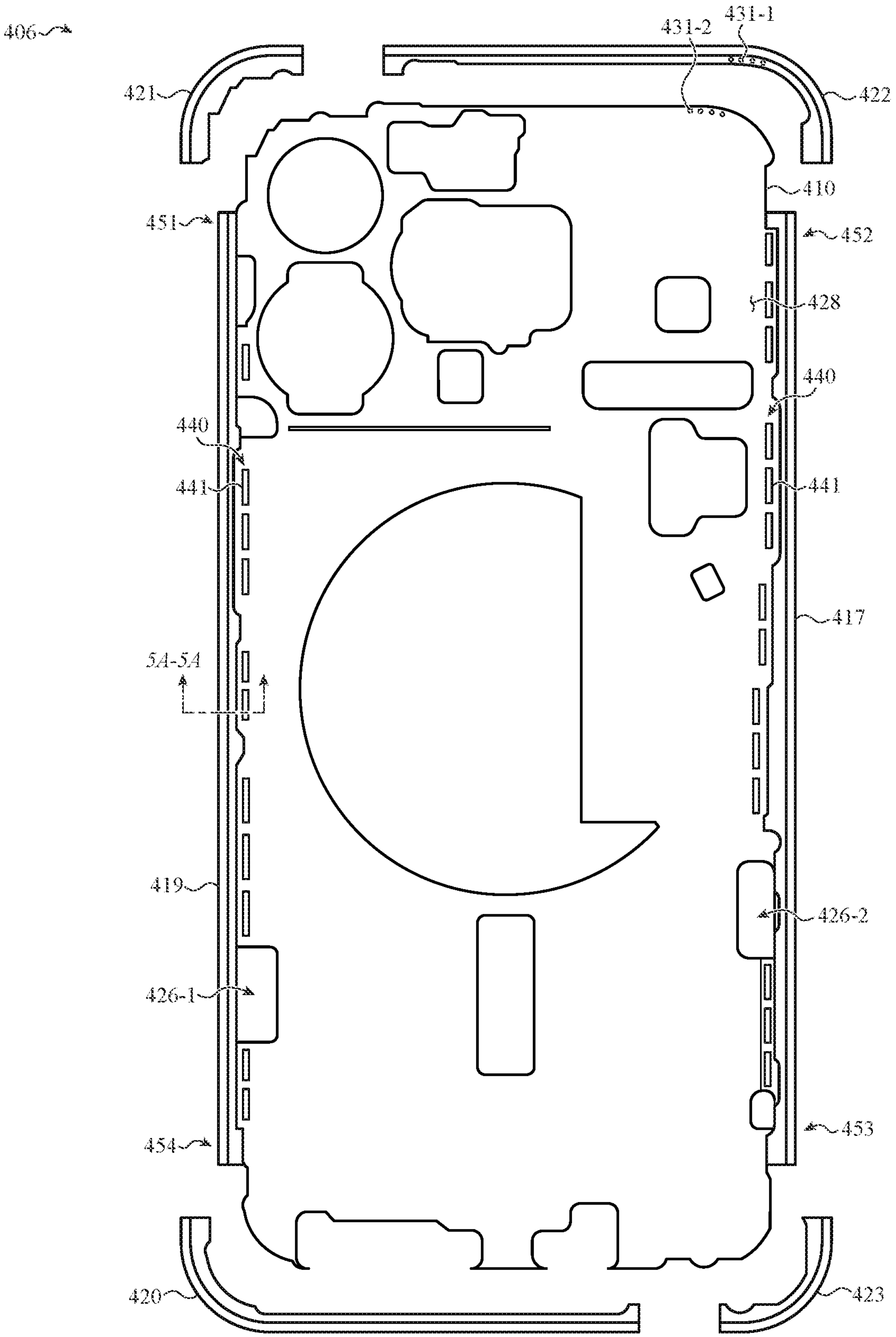
FIG. 4B depicts an exploded view of a housing structure of an example electronic device.

The housing structure 406 includes a housing subassembly 410 and housing components 420, 421, 422, and 423 (FIG. 4B). The housing subassembly 410, which may correspond to or be an embodiment of the housing subassembly 217, includes a lower-chassis section 428, as well as housing components 417 and 419. As described above with respect to the housing subassembly 217, the housing subassembly 410 may be formed by attaching the housing components 417 and 419 to the lower chassis section 428. For example, the housing components 417, 419, which may be clad structures having a core portion and a cladding portion, may be welded to the lower chassis section 428 via a series of welds (e.g., welds 441, FIG. 4B) along interface regions 440 (FIG. 4B) between the housing components 417, 419 and the lower chassis section 428. The interface regions 440 may extend along first and second lateral sides of the lower chassis section 428. The welding may be performed prior to a material removal operation that is performed along the interface regions 440, such that the welds are formed through a thicker stack of metal that is then thinned to a final dimension. In this way, the welding operation may be less likely to produce warping or other damage than may be caused if the material removal operation were performed first (and thus the welding was performed on a thinner stack of metal). The lower chassis section 428 may be formed from aluminum, and may be welded to an aluminum core section of the clad housing components 417, 419. In other cases, the lower chassis section 428 may be formed from steel (e.g., stainless steel), titanium, or another metal. In yet other cases, the lower chassis section 428 is formed from a polymer or a composite material, in which case it may be attached to the housing components 417, 419 via adhesives, mechanical fasteners, or the like.

The lower chassis section 428 may be formed by extruding a metal sheet, and then machining the sheet to form the final shape. The extruded metal sheet may have a non-uniform thickness to reduce material loss during machining.

The housing components 417, 419, 420, 421, 422, and 423 may each define an exterior corner surface of the device. In some cases, the housing components also define a portion of one or more side exterior surfaces. For example, the housing component 420 defines an exterior corner surface, and a portion of each of two side exterior surfaces (e.g., the side exterior surfaces on the right and top of the housing structure 406, as oriented in FIG. 4B). Similarly, the housing component 421 defines a portion of each of two side exterior surfaces (e.g., the side exterior surfaces on the left and top of the housing structure 406, as oriented in FIG. 4B).

The housing structure 406 (e.g., the lower chassis section 428) may define a first cavity along a first side of the housing structure 406 (e.g., a front-facing side), and a second cavity along a second side of the housing structure 406 (e.g., a rear-facing side) opposite the first side. Components such as the component set 404 (and optionally portions of the front cover assembly 408) may be positioned in the first cavity (e.g., between the lower chassis section 428 and the front cover assembly 408), and other components (e.g., portions of the rear cover assembly 402, a charging coil, alignment magnets, NFC or other antennas, etc.) may be positioned in the second cavity.

The front cover assembly 408 may include a front cover, such as the front cover 202 in FIG. 2. The front cover assembly 408 may also include a display stack, and touchand/or force-sensing systems, front-facing sensors such as ambient light sensors, proximity sensing systems, and the like.

The rear cover assembly 402 may include a rear cover 401, which may correspond to or be an embodiment of the rear cover 272 in FIG. 2, or other rear covers described herein. The rear cover assembly 402 may include wireless charging components, such as a wireless charging coil and magnetic coupling and alignment elements. The rear cover assembly 402 may include other components and/or structures as well. For example, the rear cover assembly 402 may also include a mounting structure including mounting tabs or other features, camera covers, optical structures, a microphone, and a flash module.

The device 400 may include a component set 404 positioned at least partially in the interior cavity along a side of a lower chassis section 428 of the housing structure 406. The component set 404 includes components of the device 400. The component set 404 may include a circuit board assembly, a battery, a haptic actuator, speakers, antennas and/or other communication components and systems, cameras (e.g., a rear-facing camera array, such as the array 260 in FIG. 2), microphones, and the like. Components in the component set 404 may be mechanically and/or conductively coupled to components on the rear cover assembly 402 and the front cover assembly 408.

The housing structure 406 provides a mounting and/or support structure for components of the device 400, such as the component set 404, the rear cover assembly 402, and the front cover assembly 408. As described above with respect to FIG. 2, a housing structure such as the housing structure 406 may include a housing subassembly 410 that, together with additional housing components 420, 421, 422, and 423 and joint structures 405 (FIG. 4A), defines peripheral exterior side walls of the device. For example, the peripheral exterior side walls may include or be formed of wall segments, which may be defined by housing components, joint structures, and optionally other components and/or structures.

The housing subassembly 410 also defines a lower chassis section 428 (e.g., corresponding to the lower chassis section 219). In some cases, the lower chassis section 428 (also referred to simply as a chassis) is or includes a plate-like structure that extends from one side wall to another side wall (e.g., from the housing component 417 to the housing component 419). The lower chassis section 428 may define a first side facing a front cover (e.g., a front cover of the front cover assembly 408) and a second side facing a rear cover (e.g., a rear cover of the rear cover assembly 402).

FIG. 4B is an exploded view of the housing structure 406, in which the joint structures are omitted and the housing components are separated from one another and from the lower chassis section 428. As shown in FIG. 4B, the housing subassembly 410 may be formed by attaching the housing components 417, 419 to the lower chassis section 428 to produce a housing subassembly 410 resembling an "H" shape in cross-section. Features such as holes, mounting bosses, recesses, protrusions, and the like, may be formed on the housing subassembly 410. For example, holes that are formed (e.g., via machining or other operations) may accommodate circuit board interconnections, mechanical clips and retention features, buttons, switches, antennas, SIM card trays, and the like.

The housing structure 406 may be formed by structurally joining housing components (e.g., the housing components 420, 421, 422, 423) to the housing subassembly 410 and to adjacent housing components via joint structures 405 (which may correspond to or be embodiments of joint structures 218). The joint structures 405 (e.g., molded polymer structures) may contact, cover, encapsulate, or otherwise engage with interlock structures of the housing components (e.g., interlock structures 463, 464 in FIG. 4F) and/or the housing subassembly 410 (e.g., interlock structures 431 in FIG. 4B), and may retain the housing components to the housing subassembly 410. When coupled via the joint structures 405, the housing subassembly 410, the housing components 420, 421, 422, 423, and the joint structures 405 may define a main housing assembly that defines the exterior side surfaces of the device 400. The joint structures may correspond to other joint structures described herein, and the description of those joint structures will be understood to apply to the joint structures 405. As illustrated in the example of FIG. 4B, the lower chassis section 428 defines interlock structures 431-2 and the housing component 422 defines interlock structures 431-1. As described herein with respect to other interlock features, the material of the joint structures may flow into, around, or otherwise engage with the interlock features to retain the lower chassis section 428 and the housing component 422 together. In the example of FIG. 4B, the interlock structures 431-1, 431-2 are holes, though other interlock structures are also contemplated, including but not limited to posts, threaded holes, threaded features, undercuts, dovetails, recesses, channels, and cutouts. Moreover, the interlock structures of the lower chassis section 428 may be the same as or different than the interlock features of the housing components.

The lower chassis section 428 (also referred to simply as a chassis 428) may provide numerous advantages to the device 400. For example, the chassis 428 may act as a mounting structure for device components, such as the battery, circuit board assembly, front and rear cover assemblies, and the like. In this way, fewer components need to be coupled to the front and rear cover assemblies, thereby reducing the complexity of those modules and reducing the number of interconnections (e.g., electrical connections) that need to be made between the various device subassemblies (e.g., between the front cover assembly, rear cover assembly, and other device assemblies).

Figure 4C:
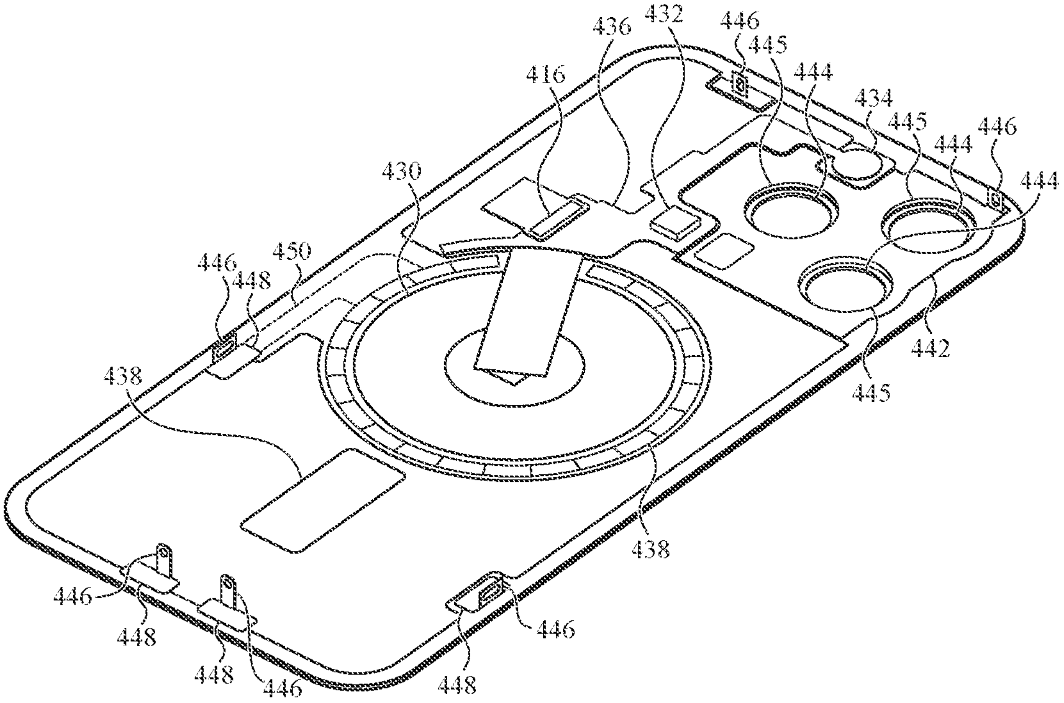
FIG. 4C depicts an example rear cover assembly of an example electronic device.

Device components on one side of the chassis 428 may need access to the other side of the chassis 428. Accordingly, the chassis 428 may include holes extending therethrough to facilitate interconnections and other types of access through the chassis 428. For example, the rear cover assembly 402 may include components such as a charging coil 430, a microphone module 432, and a strobe or flash module 434, that connect (e.g., via flexible circuit boards or other conductive couplings) to components in the component set 404. Similarly, the component set 404 may include devices that require access to the rear cover assembly 402 (and/or the exterior of the device via the front of the device), such as rear-facing cameras, a rear-facing depth sensors, and the like. Accordingly, the chassis 428 may include or define holes, such as holes 412 and 414, to allow access through the chassis 428. For example, components of a rear-facing sensor region (e.g., the rear-facing cameras and a rear-facing depth sensor) that are structurally coupled to the device along one side of the chassis 428 (e.g., the top side, which is shown facing up in FIG. 4A) may access the rear cover assembly 402 through the holes 414, while an electrical connector 416 on the rear cover assembly 402 (for the charging coil 430, microphone module 432, and the flash module 434) may access components on the other side of the chassis 428 via the hole 412. For example, portions of the cameras of a camera array may extend through the holes 414. More particularly, portions of rear-facing cameras (which are positioned between a front cover assembly and the chassis 428) may extend at least partially through the holes 414, and optionally at least partially into holes 445 of the rear cover assembly 402 (FIG. 4C). The holes 414 and the holes 445 may be aligned such that portions of a camera module may extend through a hole 414 and into (and optionally through) a corresponding hole 445.

The chassis 428 (and/or the housing structure) may also include or define holes 426 (426-1, . . . , 426-2). The holes 426 may facilitate mechanical and/or conductive couplings between the front cover assembly 408 and the housing structure 406, between the rear cover assembly 402 and the housing structure 406, and/or between the front cover assembly 408 and the rear cover assembly 402. For example, the holes 426 may define pass-throughs to allow board-to-board connectors, flexible circuit elements, cables, and the like, to conductively couple components on opposite sides of the chassis 428. As another example, spring coupling elements 424 (FIG. 4D) may be coupled to the housing structure 406 and may be positioned in the holes 426, and tabs or other features on the front cover assembly 408 and/or the rear cover assembly 402 may be structurally and conductively coupled to the spring coupling elements.

As noted above, the chassis 428 may define an array of mounting bosses 427 (427-1, . . . , 427-3) integrally formed with a plate structure of the chassis 428. The mounting bosses 427 may be machined from the extruded precursor material that ultimately forms the chassis 428, such that they are integrally formed with the plate structure of the chassis 428. The mounting bosses may be configured to engage fasteners, such as threaded fasteners (e.g., screws, bolts, etc.) that are used to secure components to the chassis 428. For example, a circuit board assembly may be coupled to mounting bosses 427 via a set of threaded fasteners. While FIGS. 4A-4B illustrate one example arrangement of mounting bosses, this is merely one example arrangement, and more or fewer mounting bosses may be provided in a given implementation. The locations of the mounting bosses may also differ from those shown depending on the positioning of the components that are to be attached to the chassis 428 via the mounting bosses.

The housing components of the housing structure 406 (e.g., the housing components 417, 419, 420, 421, 422, 423, or portions thereof) may act as radiating antenna elements of one or more antenna arrays for wireless communications. The nonconductive joint structures 405 (FIG. 4A) may be positioned between the housing components to provide electrical isolation between the housing components as well as to mechanically couple the housing components. In some cases, radiating antenna elements are defined by slots or other features formed in one or more housing components. The housing components may be conductively coupled to radio or other communication circuitry via conductive couplings at certain locations on the housing components (e.g., feed and/or ground points), the locations of which may define the particular frequencies over which that portion of the housing component is configured to communicate. In some cases, a housing component may be configured with multiple feed and/or ground points to facilitate communications over different frequency ranges. In such cases, the communications over those ranges may occur simultaneously, or they may be separated in time.

In some cases, the housing component 421 may be configured as a radiating element for frequencies between about 1800 MHz and about 2800 MHz (e.g., mid-band and high-band frequencies), and/or frequencies between about 3200 MHz and about 5000 MHz (e.g., ultra-high band frequencies).

The housing component 422 may be configured as a radiating element for frequencies between about 600 MHz and about 1000 MHz (e.g., low-band frequencies), frequencies between about 1700 MHz and about 2200 MHz (e.g., mid-band frequencies), and/or frequencies between about 2300 MHz and about 2700 MHz (e.g., high-band frequencies). In some cases, the housing component 422 may include one or more features (e.g., a slot) that operate as a radiating element for frequencies between about 5000 MHz and about 8200 MHz (which may facilitate communications via Wi-Fi protocols (e.g., Wi-Fi 6E), ultra-wideband (UWB) protocols, or the like).

The housing component 420 may be configured as a radiating element for frequencies between about 600 MHz and about 1000 MHz (e.g., low-band frequencies), frequencies between about 1700 MHz and about 2200 MHz (e.g., mid-band frequencies), and/or frequencies between about 2300 MHz and about 2700 MHz (e.g., high-band frequencies).

In some cases, the housing component 423 may be used in multiple modes of operation, where the modes are selectable by conductively coupling or decoupling a selectively couplable auxiliary conductive element (as discussed with respect to FIGS. 10A-10E). In a first mode of operation (e.g., when the selectively couplable auxiliary conductive element is conductively coupled to the housing component 423), the housing component 423 may be configured as a radiating element for frequencies between about 600 MHz and about 1000 MHz (e.g., low-band frequencies). In a second mode of operation (e.g., when the selectively couplable auxiliary conductive element is not conductively coupled to the housing component 423), the housing component 423 may be configured as a radiating element for frequencies between about 1800 MHz and about 2800 MHz (e.g., mid-band and high-band frequencies).

In some cases, the housing component 420 and the housing component 423 may be configured for operation on overlapping frequency ranges (e.g., 600 MHz and about 1000 MHz). In some cases, the device 400 may select between using the housing component 420 or the housing component 423 to communicate over this frequency range based on various conditions, such as an operating condition or mode of the device 400, a detected or predicted signal to noise ratio of one of the housing components, or the like. Further examples of selecting a housing component to use as a radiating element under certain device conditions are described with respect to FIGS. 10A-10E.

In some cases, the housing component 423, or a portion thereof, may be configured as a radiating element for frequencies between about 3200 MHz and about 5000 MHz (E.g., ultra-high band frequencies).

In some cases, portions of the housing components 417, 419 operate as radiating elements. For example, a first radiating portion 451 of the housing component 417 may be configured as a radiating element for frequencies between about 1000 MHz and about 2000 MHz (e.g., for communications via GPS L1, L2, and/or L5 standards). A first radiating portion 452 of the housing component 419 may be configured as a radiating element for frequencies between about 1000 MHz and about 2000 MHz (e.g., for communications via GPS L1, L2, and/or L5 standards). A second radiating portion 453 of the housing component 419 may be configured as a radiating element for frequencies between about 3200 MHz and about 5000 MHz (E.g., ultra-high band frequencies). A second radiating portion 454 of the housing component 417 may be configured as a radiating element for frequencies between about 5000 MHz and about 8200 MHz (which may facilitate communications via Wi-Fi protocols (e.g., Wi-Fi 6E), ultra-wideband (UWB) protocols, or the like).

The above-referenced housing components may be configured as radiating elements for different frequencies than those described above. Moreover, the above described antennas, and/or other antennas within or associated with the device, may be configured to communicate using various standards, protocols, frequency bands, etc., including but not limited to radio frequency cellular communications (e.g., 2G, 3G, 4G, 4G long-term evolution (LTE), 5G, GSM, CDMA, or the like), Bluetooth, Wi-Fi (e.g., for communicating using Wi-Fi communication standards and/or protocols, including IEEE 802.11, 802.11b, 802.11a, 802.11g, 802.11n, 802.11ac, 802.11ax (Wi-Fi 6, 6E), 802.11be (Wi-Fi 7), or any other suitable Wi-Fi standards and/or protocols), ultra-wideband (UWB) interfaces, near-field communications (NFC), etc.

The various radiating elements described above may provide redundant and/or overlapping wireless communications capabilities, which may be used for providing redundant antenna operations (e.g., in case an antenna is blocked or attenuated), for providing spatial diversity, beam-forming operations, or the like. Radiating elements may be used simultaneously or they may be used separately. In some cases, the radiating elements may be used to conduct multiple-in multiple-out (MIMO) wireless communications schemes, including 4G, 4G LTE, and/or 5G MIMO communication protocols.

While FIG. 4B describes a housing structure of a device 400, it will be understood that the same or similar concepts and/or constructions, in which housing components define radiating elements for wireless communications, may be employed by other devices described herein, including but not limited to the devices 100, 140, 200, 300, 400, 600, 1000, 1200, 1400, 1500, 1700, and 2100.

FIG. 4C is a perspective view of the rear cover assembly 402. The rear cover assembly 402 may include a wireless charging coil 430, a microphone module 432, and a flash module 434, and a rear cover 401. The rear cover assembly 402 may also include a flexible circuit element 436 that conductively couples the wireless charging coil 430, microphone module 432, and flash module 434 to a circuit board assembly of the device (e.g., via the connector 416 that extends through a hole in a lower chassis section). The rear cover assembly 402 may also include magnets 438 that assist in alignment and magnetic attachment to an external charging accessory. As shown, rear cover assembly 402 may be positioned on or facing a back or rear side of the lower chassis section that is opposite a front side of the lower chassis section. Accordingly, components that are part of the rear cover assembly 402 may, in an assembled device, be positioned between the lower chassis section and a rear cover.

The rear cover assembly 402 may also include an anchor plate 442 positioned in a corner of the rear cover assembly 402 that corresponds to a rear-facing sensor region of the device 400. The anchor plate 442 defines holes 445 that the lenses of the cameras extend into. The anchor plate 442 may be attached to the rear cover via an adhesive. Trim assemblies 444 for the cameras may be coupled to the anchor plate 442, such as via welds. The anchor plate 442 may provide a primary structural mounting point for the trim assemblies 444. The anchor plate 442 may also provide electrical functionality, such as by providing an electrical ground path for the rear-facing cameras, rear-facing depth sensor, and/or other components of the device. The anchor plate 442 may be formed of metal (e.g., aluminum, steel, titanium), or another suitable material.

The rear cover assembly 402 may include one or more fastening features 446 (e.g., tabs, flanges, bosses, clips, etc.) that serve to couple the rear cover assembly to a housing structure. The fastening features 446 may define base portions 448 that are secured to the rear cover via adhesive or the like, and tabs (e.g., at reference 446) extending from the base portions and configured to engage spring coupling elements 424 (FIG. 4D) that are coupled to the housing (e.g., housing components 417, 419, and/or other housing components). Spring coupling elements may be positioned in holes 426 (FIG. 4B), or otherwise positioned to engage the fastening feature 446.

In some cases, a conductive path 450 may conductively couple one or more of the fastening features 446 to other electrical components and/or the flexible circuit element. The conductive path and the associated fastening feature 446 may be used to define an electrical ground between the rear cover assembly and other portions of the device (e.g., the housing structure 406) through the fastening feature 446. The conductive path may be formed by a flexible circuit element, conductive tape, conductive ink, or another suitable electrical conductor.

Figure 4D:
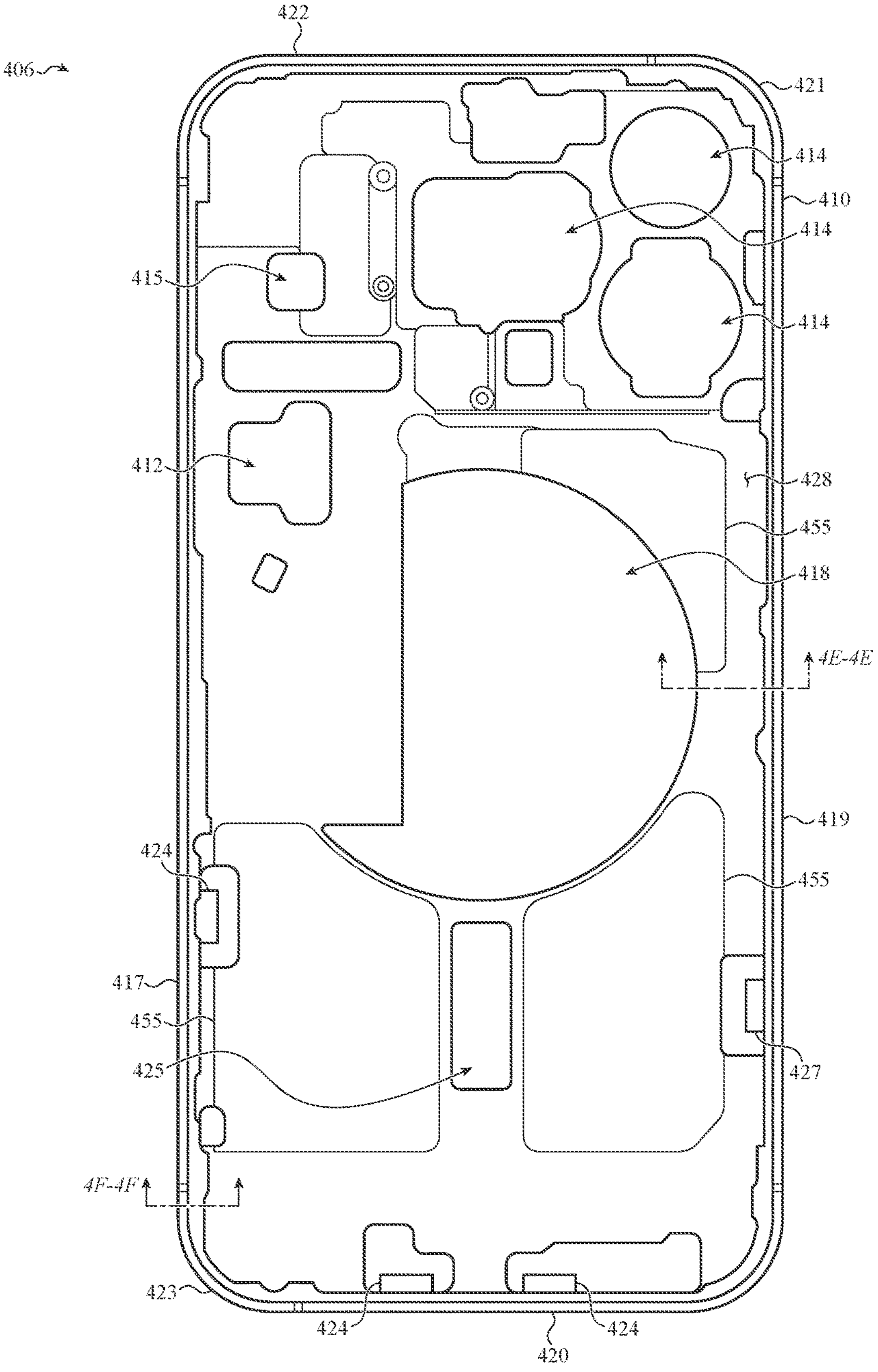
FIG. 4D depicts a housing structure of an example electronic device.

FIG. 4D is a view of the housing structure 406, viewed from the opposite side as shown in FIG. 4B. Further, FIG. 4D shows the housing components 420, 421, 422, and 423 coupled to the housing subassembly 410 (e.g., via joint structures). As shown in FIG. 4D, spring coupling elements 424 may be coupled to the housing and may be positioned in holes in the lower chassis section 428.

Holes 414, 415, 418, and 425 may also be defined through the lower chassis section 428 to provide clearance for cameras (holes 414), board-to-board connectors or other electrical connections (holes 412, 415), the charging coil 430 (hole 418), an alignment magnet for a wireless charging system (hole 425), and the like.

Figure 4E:
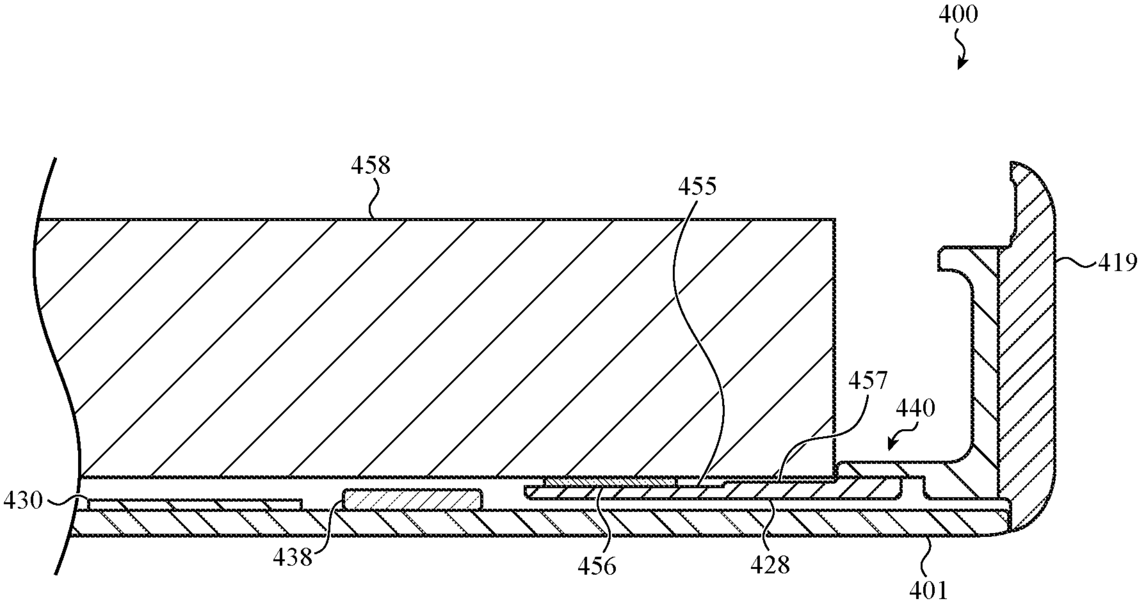
FIG. 4E depicts a partial cross-sectional view of an example electronic device.

The lower chassis section 428 may also be configured to support various components in a nested arrangement, in which mounting surfaces and clearances are strategically provided to allow components to be mounted in close proximity without interfering with each other. For example, as shown in FIG. 4D and FIG. 4E (which is a partial cross-sectional view of the housing structure 406 viewed along line 4E-4E in FIG. 4D), the lower chassis section 428 may define recessed regions 455 (which may re recessed relative to a primary surface 457). The recessed regions 455 may be configured to provide clearance for an adhesive structure 456, which adheres a battery 458 to the lower chassis section 428. The recessed regions 455 allow the battery 458 to be positioned further towards the rear cover 401. Moreover, the hole 418 may provide clearance for components of the wireless charging system. For example, one or more magnetic elements 438 that surround or are positioned around or proximate the wireless charging coil 430 may extend into the hole 418, and may overlap the lower chassis section 428. Even if the magnetic elements 438 do not overlap the lower chassis section 428, the hole 418 may provide a target clearance between the magnetic elements 438 (and the coil 430), while reducing or minimizing the overall thickness of the device.

FIG. 4E also illustrates the interface region 440, along which the lower chassis section 428 may be coupled to the housing component 419. As shown, the lower chassis section 428 and housing component 419 may overlap, and may be welded together along the interface region 440 (or otherwise attached to one another).

Figure 4F:
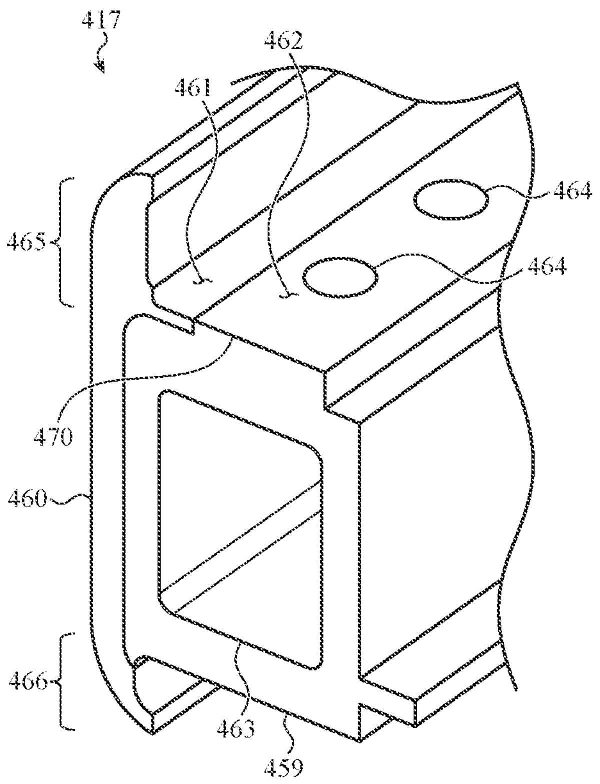
FIGS. 4F-4G depict partial cross-sectional views of a housing component of an example electronic device.
Figure 4G:
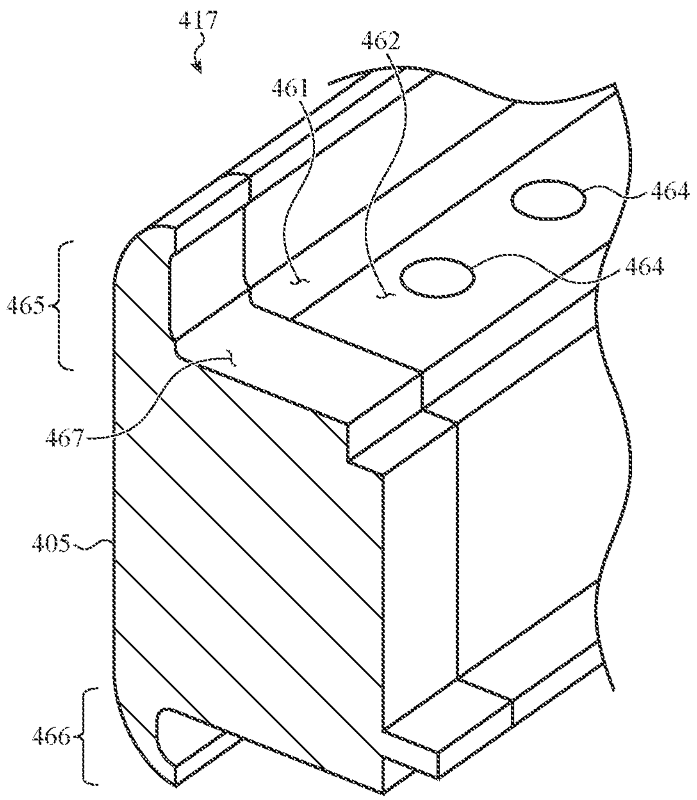
Figure 4H:
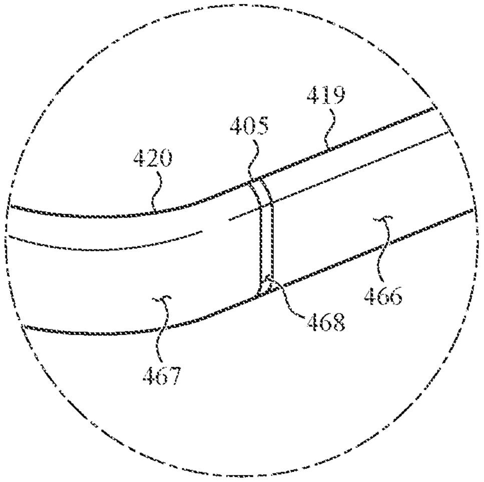
FIG. 4H depicts a portion of a housing structure of an example electronic device.

As described herein, various housing components and subassemblies may be coupled together via joint structures (e.g., molded polymer structures). The joint structures may engage interlock structures defined by the housing components and subassemblies to form a structural coupling. Moreover, where housing components and/or subassemblies are formed from multiple materials (e.g., cladding portions and core portions), various features of the housing (e.g., mounting surfaces, interlock structures) may be defined by the cladding portion alone, the core portion alone, or by both the cladding and core portions. FIGS. 4F-4H illustrate portions of the housing structure 406, showing example configurations of clad housing components that define various surfaces and features, as well as how the joint structures (e.g., intermediate elements) engage the clad housing components and define various surfaces and features of the housing.

Figure 5A:
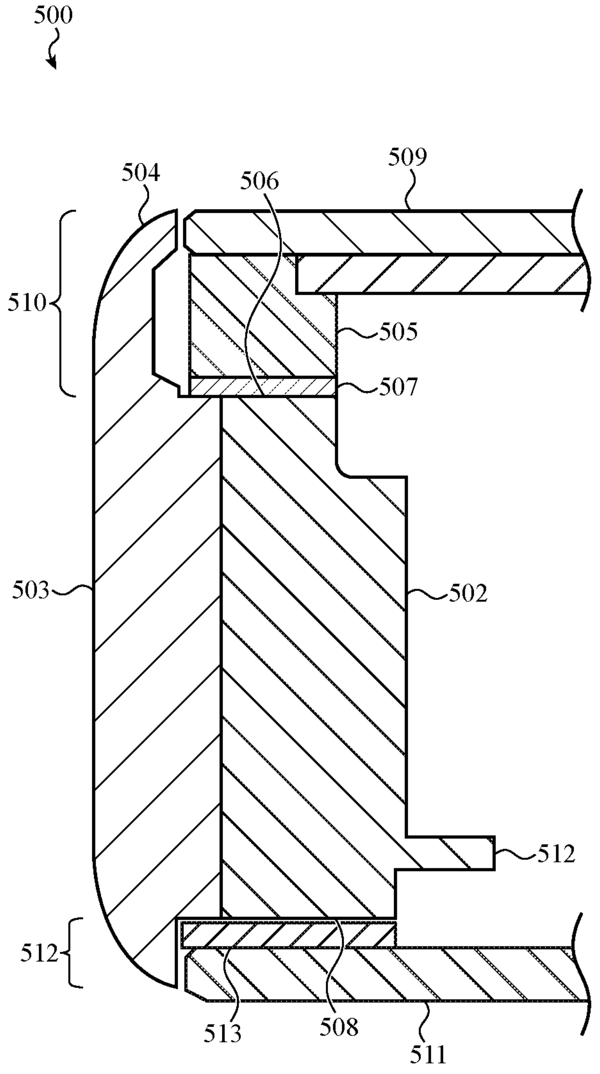
FIGS. 5A-5G depict partial cross-sectional views of housing components of example electronic devices.

As shown in FIG. 4F, which is a partial cross-sectional view of the housing structure 406 viewed along line 4F-4F in FIG. 4D (omitting the joint structure), the housing component 417 includes a core portion 459 and a cladding portion 460, which may correspond generally to the core portion 502 and cladding portion 504 in FIG. 5A. The core portion 459 may be formed from a first metal and the cladding portion 460 may be formed from a second metal different from the first metal, as described herein. The cladding portion 460 may define an exterior surface of the housing, while the core portion 459 may define an interior surface and optionally a portion of an interior cavity of the housing.

Both the core portion 459 and the cladding portion 460 may cooperate to define a mounting surface 470 of the housing component, to which a component (e.g., a front cover assembly) may be coupled. For example, the core portion 459 may define a first portion 462 of the mounting surface 470, and the cladding portion 460 may define a second portion 461 of the mounting surface 470. The mounting surface 470 may be substantially planar, and thus each portion 461, 462 may define a planar portion of the mounting surface 470. An adhesive may be positioned on the mounting surface 470 (e.g., on both the first and second portions 461, 462 of the mounting surface) to adhere the front cover assembly to the housing component 417. While FIG. 4F illustrates only one housing component 417, other housing components may have similar construction (e.g., housing components 419-423). Accordingly, other housing components may similarly include core and cladding portions that each define a portion of the mounting surface 470. In some cases, the mounting surface 470 may extend continuously about a periphery of the housing and may define a single plane, such that the adhesive and the front cover assembly couple to a substantially planar interface surface. In some cases, the core portion 459 and cladding portion 460 may each define part of a second mounting surface 470 (e.g., having the same or similar arrangement as the surfaces 461, 462) on the opposite side of the housing component to define a mounting surface for a rear cover assembly.

The cladding portion 460 also defines portions of flanges that extend along the peripheral sides of the front and back covers of a device. For example, as shown in FIG. 4F, the cladding portion 460 defines a portion of a flange 465 that extends along the peripheral side surface of a front cover (e.g., when a front cover assembly is coupled to the housing component 417). The cladding portion 460 may also define a portion of a second flange 466 that extends along the peripheral side surface of a rear cover (e.g., when a rear cover assembly is coupled to the housing component 417). As described with respect to the mounting surface, other housing components (e.g., housing components 419-423) may similarly include cladding portions that each define a portion of the flanges 465, 466. In some cases, the flanges may extend continuously about a periphery of the housing to fully surround the peripheral side surfaces of the front and rear covers.

The housing components may also define interlock structures with which joint structures may engage to mechanically couple the joint structures to the housing components (and thus couple housing components together). FIG. 4F illustrates example interlock structures 463, 464, which may be defined by the core portion 459 of the housing component 417. In some cases, interlock structures are defined by the cladding portion 460. Some interlock structures may be defined in part by the core portion 459 and in part by the cladding portion 460. As shown, the interlock structures 463, 464 may be holes into which a polymer material may flow (e.g., as a result of an insert molding process). The holes may communicate with one another, and may form a network having a complex geometry that, when filled with the polymer material, interlocks with the polymer material to form a secure mechanical connection. The polymer material may also engage similar interlock structures in another housing component (e.g., the housing component 423) to couple the housing components together. Once hardened, the polymer material forms a molded polymer member (e.g., a joint structure), which retains housing components together and may also serve as an electrical insulator between housing components. Further, as described herein, the joint structure may define certain features of the device housing. While FIG. 4F illustrates example interlock structures, the also represent other types of interlock structures, including, without limitation, posts, threaded holes, threaded features, undercuts, dovetails, recesses, channels, and cutouts.

As described herein, joint structures may be positioned between housing components and may structurally couple housing components together. The joint structures may also define portions of the various surfaces, sides, and features of the housings in which they are included. FIG. 4G illustrates the portion of the housing 406 shown in FIG. 4F with a portion of a joint structure 405 coupled thereto. The joint structure 405 shown in FIG. 4G is engaged with the interlock structures of the housing component 417, and may also be engaged with a corresponding joint structure on another housing component (e.g., the housing component 423).

The joint structure 405 may have a same or similar exterior geometry as the housing components to which they are coupled. In some cases, the joint structure 405 may define a third portion 467 of the mounting surface 470, which may be substantially flush with (e.g., defining a same plane as) the first and second portions 461, 462 of the mounting surface 470. The joint structure 405 also defines portions of the flanges that extend along the peripheral sides of the front and back covers of a device. For example, as shown in FIG. 4G, the joint structure 405 defines a portion of the flange 465 that extends along the peripheral side surface of a front cover (e.g., when a front cover assembly is coupled to the housing component 417), and also defines a portion of the second flange 466 that extends along the peripheral side surface of a rear cover (e.g., when a rear cover assembly is coupled to the housing component 417).

FIG. 4H is a detail view of the area 4H-4H (in FIG. 4A) of the housing 406, illustrating a joint structure 405 that is between (and couples) housing components 419 and 420. As shown in FIG. 4H, defines a portion 468 of the exterior side surface of the housing 406 (e.g., between the portion 466 of the exterior surface side surface defined by the housing component 419 and the portion 467 of the exterior surface defined by the housing component 420). Other joint structures may have the same or similar configuration, and may define portions of mounting surfaces, flanges, and side surfaces of the housing.

FIG. 5A is a partial cross-sectional view of a housing component 500 having a clad construction. The housing component 500 may correspond to any housing component described herein that may have a clad construction, such as the housing components 417, 419, 420, 421, 422, and 423 of the device 400. FIG. 5A may generally correspond to a view along line 5A-5A in FIG. 4B.

The housing component 500 may include a core portion 502 and a cladding portion 504. The core portion 502 may be bonded directly to the cladding portion 504. The housing component 500 may be formed by co-extruding the core portion 502 and the cladding portion 504 to form a clad precursor material. In the clad precursor material, the core portion 502 and the cladding portion 504 may be fused or otherwise bonded together. The fusion may occur along an interface (which may be within the bulk of the clad member). The fusion may be characterized by a diffusion bond between the core portion 502 and the cladding portion 504 at the interface.

The precursor material may then be formed into the housing component 500 (e.g., an extrudate member) using various processes. For example, the precursor material may be forged and/or machined to define the overall shape and the mechanical features of the housing component 500, and then subjected to polishing, texturing, and/or coating operations. The mechanical features may include interlocking features for interlocking with joint structures (e.g., to mechanically couple housing components together), attachment features (e.g., holes for receiving fasteners), mounting surfaces, antenna feed and ground points, and the like.

The cladding portion 504 may define an exterior surface 503 of the housing component 500. The core portion 502 may define an interior surface of a device and/or a housing (e.g., a surface that is not exterior or externally viewable in the completed device). The core portion 502 may also define a mounting feature 519 to which a lower chassis may be attached, and may define at least a portion of an interior cavity of a device, in which components are positioned, as described herein.

The exterior surface 503 defined by the cladding portion may have a surface texture that produces a certain visual appearance and/or tactile feel. For example, the surface texture may have a texture that produces diffuse reflections. The surface texture may be produced by grinding, lapping, machining, ablation, blasting (e.g., sand blasting, bead blasting), etching (via mechanical etching, laser etching, chemical etching, or the like), or any other suitable texturing operation(s). The exterior surface 503 may also include a coating, such as a deposited coating. A deposited coating may be deposited on the housing components via plasma vapor deposition (PVD), chemical vapor deposition (CVD), or the like. In some cases, the cladding portion 504 is polished (before and/or after coating).

The core portion 502 may be aluminum (e.g., an aluminum alloy), and the cladding portion 504 may be titanium (e.g., a titanium alloy). In some cases, the core portion 502 is aluminum and the cladding portion 504 is stainless steel. Other materials are also contemplated for the core and cladding portions.

As described above with respect tot FIGS. 4F-4G, both the core portion 502 and the cladding portion 504 may define a portion of mounting surfaces 506 and 508 on which a front cover assembly and a rear cover assembly, respectively, may be coupled. For example, a frame member 505 of a front cover assembly (which is coupled to the front cover 509) may be attached to the mounting surface 506 via an adhesive 507. As another example, the front cover may be attached directly to the adhesive 507. Similarly, a rear cover 511 may be attached to the mounting surface 508 via adhesive 513. In some cases, a rear cover assembly includes a frame member (similar to the frame member 505) or another component, and the frame member is attached to the mounting surface 508 via the adhesive.

As described above with respect to FIGS. 4F-4G, the cladding portion 504 may also define a flange or lip portion 510 that extends around and at least partially covers the side of a front cover, and a flange or lip portion 512 that extends around and at least partially covers the side of a rear cover. In some cases, the flange or lip portions 510, 512 are substantially flush with the exterior surfaces of the front and rear covers. In some cases, the flange or lip portions 510, 512 are defined only by the cladding portion 504, while in other cases they are at least partially defined by the core portion 502.

Figure 5B:
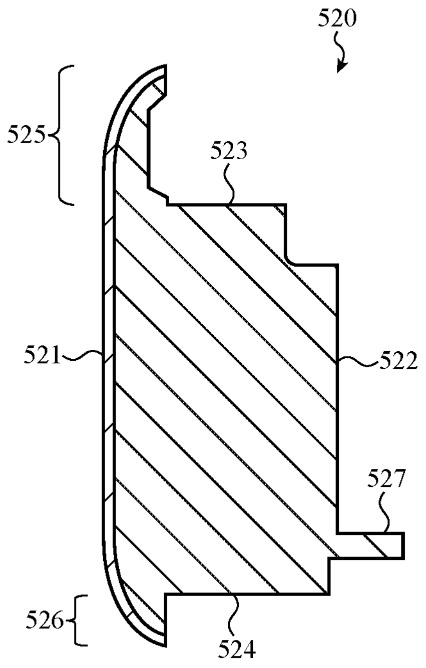

FIG. 5B is a partial cross-sectional view of another example housing component 520 formed from a clad structure that includes multiple materials. The housing component 520 may correspond to any housing component described herein that may have a clad construction, such as the housing components 417, 419, 420, 421, 422, and 423 of the device 400.

The housing component 520 may include a core portion 522 and a cladding portion 521. The housing component 520 may be formed by co-extruding the core portion 522 and the cladding portion 521 to form a clad precursor material. As another example, the housing component 520 may be formed by plating, depositing, welding, or otherwise applying the material of the cladding portion 521 to the core portion 522, such that the cladding portion 521 defines at least a portion of an exterior surface of the housing component 520. The precursor material may then be formed into the housing component 520 using various processes. For example, the precursor material may be forged and/or machined to define the overall shape and the mechanical features of the housing component 520, and then subjected to polishing, texturing, and/or coating operations. The mechanical features may include interlocking features for interlocking with joint structures (e.g., to mechanically couple housing components together), attachment features (e.g., holes for receiving fasteners), mounting surfaces, antenna feed and ground points, and the like. As another example, the core portion 522 may be formed into the general shape of the housing component 520 (to define the corners and general exterior shape of the device housing, the mechanical features, and the like), and the cladding portion 521 may be formed over the pre-shaped core portion 522.

The core portion 522 may be aluminum (e.g., an aluminum alloy), and the cladding portion 521 may be titanium (e.g., a titanium alloy). In some cases, the core portion 522 is aluminum and the cladding portion 521 is stainless steel. Other materials are also contemplated for the core and cladding portions. Moreover, the core and cladding portions of the housing component 520 may have textures, coatings, appearances, and/or be subjected to processes similar to those described with respect to the housing component 500 in FIG. 5A, and those descriptions apply to the housing component 520 as well.

The core and/or cladding portions of the housing component 520 may define various features. For example, flange portions 525 and 526 may be defined by the core portion 522 (which defines sides of the flanges that face the peripheral sides of the front and rear covers), and the cladding portion 521 (which defines part of the exterior surface of the flanges). In the example cladding configuration shown in FIG. 5B, the core portion 522 may define the entireties of the mounting surfaces 523, 524 to which the front and rear cover assemblies, respectively, are coupled, as described herein. The core portion 522 may also define a mounting feature 527 to which a lower chassis may be attached, as described herein.

Figure 5C:
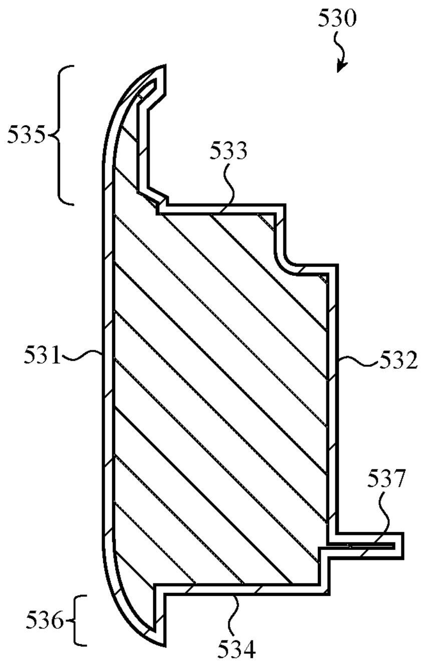

FIG. 5C is a partial cross-sectional view of another example housing component 530 formed from a clad structure that includes multiple materials. The housing component 530 may correspond to any housing component described herein that may have a clad construction, such as the housing components 417, 419, 420, 421, 422, and 423 of the device 400.

The housing component 530 may include a core portion 532 and a cladding portion 531. The housing component 530 may be formed by forming a precursor material using plating operations (e.g., electroplating), vapor deposition (e.g., PVD, CVD, etc.), or other processes to form the cladding portion 531 over the core portion 532. As another example, the precursor material may be formed by co-extruding the core portion 532 and the cladding portion 531. Once the precursor material is formed, it may then be formed into the housing component 530 using various processes. For example, the precursor material may be forged and/or machined to define the overall shape and the mechanical features of the housing component 530, and then subjected to polishing, texturing, and/or coating operations. The mechanical features may include interlocking features for interlocking with joint structures (e.g., to mechanically couple housing components together), attachment features (e.g., holes for receiving fasteners), mounting surfaces, antenna feed and ground points, and the like. As another example, the core portion 532 may be formed into the general shape of the housing component 530 (to define the corners and general exterior shape of the device housing, the mechanical features, and the like), and the cladding portion 531 may be formed over the pre-shaped core portion 532.

The core portion 532 may be aluminum (e.g., an aluminum alloy), and the cladding portion 531 may be titanium (e.g., a titanium alloy). In some cases, the core portion 532 is aluminum and the cladding portion 531 is stainless steel. Other materials are also contemplated for the core and cladding portions. Moreover, the core and cladding portions of the housing component 530 may have textures, coatings, appearances, and/or be subjected to processes similar to those described with respect to the housing component 500 in FIG. 5A, and those descriptions apply to the housing component 530 as well.

In the example shown in FIG. 5C, the cladding portions 531 defines all of the exterior surfaces of the housing component 530. For example, the exterior surfaces of the flange portions 535 and 536 may be defined by the cladding portion 531. Further, the mounting surfaces 533, 534 are defined by the cladding portion 531. The cladding portion 531 may also define an exterior surface of a mounting feature 537 to which a lower chassis may be attached, as described herein. The core portion 532 may also define an interior portion of the mounting feature 537.

In some cases, clad housing components may be configured in order to inhibit galvanic corrosion due to the coupling of different metals. FIGS. 5D-5G illustrate various example techniques for inhibiting corrosion at various locations on a clad housing component.

Figure 5D:
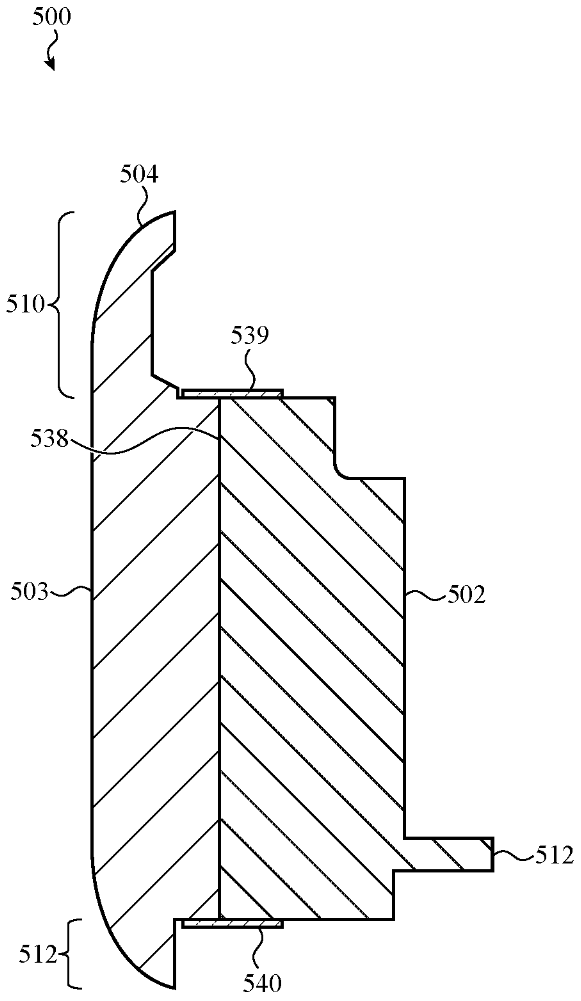

FIG. 5D is a partial cross-sectional view of the housing component 500 of FIG. 5A, illustrating example coatings 539, 540 that may be positioned over a seam or joint between the core portion 502 and the cladding portion 504. For example, the coatings 539, 540 may be applied to the mounting surfaces 506, 508 and cover or span the seam defined by the interface 538 between the core and cladding portions. The coatings 539, 540 may define a moisture barrier that prevents or inhibits water, moisture, or other liquids or contaminants from contacting the core and the cladding portions 502, 504 (e.g., and bridging the core and cladding portions or otherwise acting as an electrolyte for a galvanic corrosion process). In this way, the coatings 539, 540 may inhibit or prevent the initiation and/or progression of galvanic corrosion of the core and/or cladding portions.

The coatings 539, 540 may be a polymer material, such as a polyurethane, acrylic, epoxy, or other suitable material. The coatings 539, 540 may be applied over any exposed seams between the core and cladding portions. In some cases, the coatings 539, 540 have a thickness between about 15 and about 50 microns. The coatings 539, 540 may extend a target distance on either side of the seam, such as between about 20 microns and about 200 microns on either side of the seam. In cases where the coatings 539, 540 are positioned on a mounting surface of the housing (e.g., the mounting surfaces 506, 508) to which other components are coupled (e.g., a front or rear cover assembly), adhesives for coupling the components may be applied directly to the coatings. The coatings 539, 540 may be applied as a liquid and allowed to harden (e.g., via a curing process or other hardening process) to form the final coating.

In some cases, a sealant may be deposited on the housing component along a seam between core and cladding portions, and the sealant may wick or otherwise flow into the seam, and excess sealant may be removed. The sealant may harden or otherwise cure to define a moisture barrier in the seam. In such cases, the sealant may not extend above the mounting surface, or may extend above the mounting surface only a small amount (e.g., about 1 to about 5 microns). The sealant may prevent or inhibit liquids and/or moisture from seeping into the seam, and may therefore inhibit or prevent the initiation and/or progression of galvanic corrosion of the core and/or cladding portions.

Figure 5E:
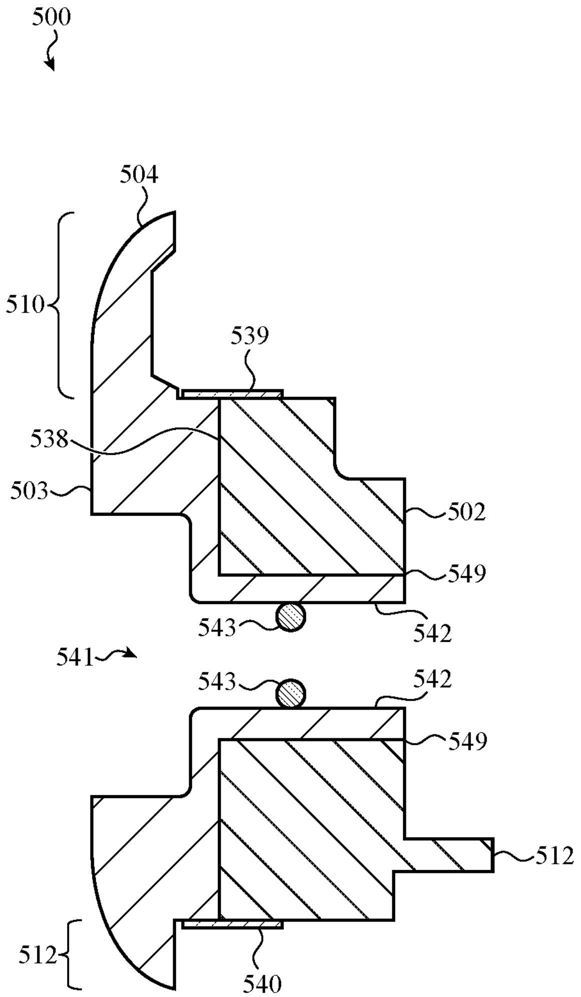

FIG. 5E is a partial cross-sectional view of the housing 500, showing an example structure for inhibiting or preventing galvanic corrosion in the area of a hole 541 that extends through the housing 500. The hole 541 may represent a hole for a charging port, speaker, SIM tray, button, or the like. In this example, the cladding portion 504 may define a sleeve portion 542 that extends into the hole 541 and defines a surface of the hole 541. The sleeve portion 542 may be formed by forging, swaging, drilling, machining, or otherwise causing the material of the cladding portion to define the surface of the hole 541. As one example, the sleeve portion 542 may be formed by a drilling process that forces some of the material of the cladding portion 504 into a hole in the core portion 502.

The sleeve portion 542 may define a single-material surface along an interface that liquid may contact in certain circumstances, such that the liquid does not contact a seam 549 between the core and cladding portions. For example, a component such as a button, SIM tray, speaker, or the like, may extend into the hole 541. A sealing member 543 may be positioned in the hole 541 and may form a seal against the sleeve portion 542, thereby inhibiting ingress of liquid or moisture into the device. Accordingly, liquid is contained to the exterior region where there is no exposed seam between the core and cladding portions. Stated another way, this configuration positions the seam 549 on the inside of the liquid-sealed environment such that the seam is less likely to encounter liquids or moisture and therefore less likely to undergo galvanic (or other) corrosion.

Figure 5F:
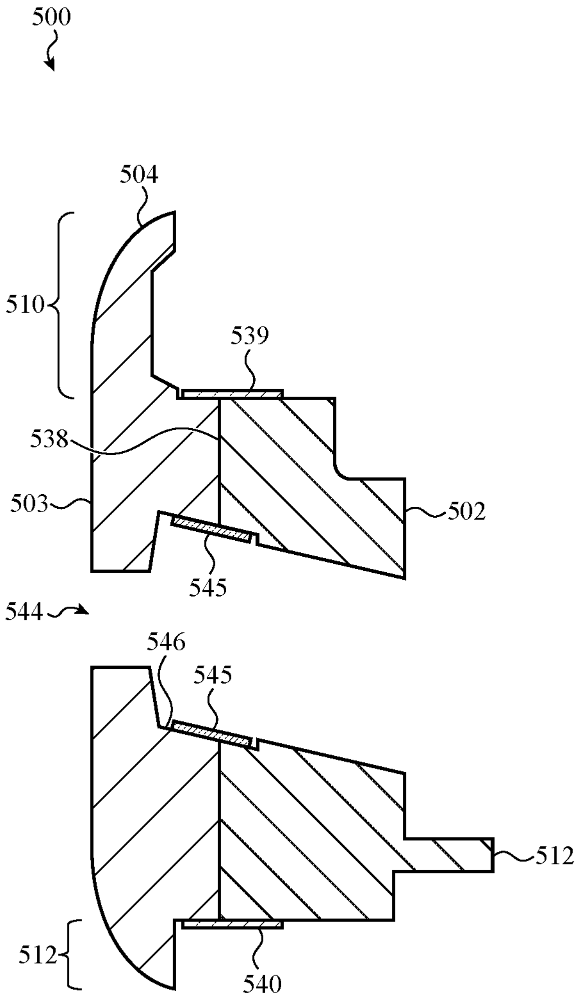

FIG. 5F is a partial cross-sectional view of the housing 500, showing another example structure for inhibiting or preventing galvanic corrosion at a seam that is located in a hole 544 that extends through the housing 500. The hole 544 may represent a hole for a charging port, speaker, SIM tray, button, or the like. In this example, a seam of the interface 538 may be defined within a hole 544, and a coating 545 may be positioned over the seam within the hole. The coating 545 may generally correspond to the coatings 539, 540 in material, size, application, function, and the like, and the description of the coatings 539, 540 will be understood to apply equally to the coating 545. The coating 545 may be dispensed in the hole 544 via a needle, spray nozzle, or other suitable technique. In some cases, the coating 545 may be a sealant, such as described above with respect to FIG. 5D.

Figure 5G:
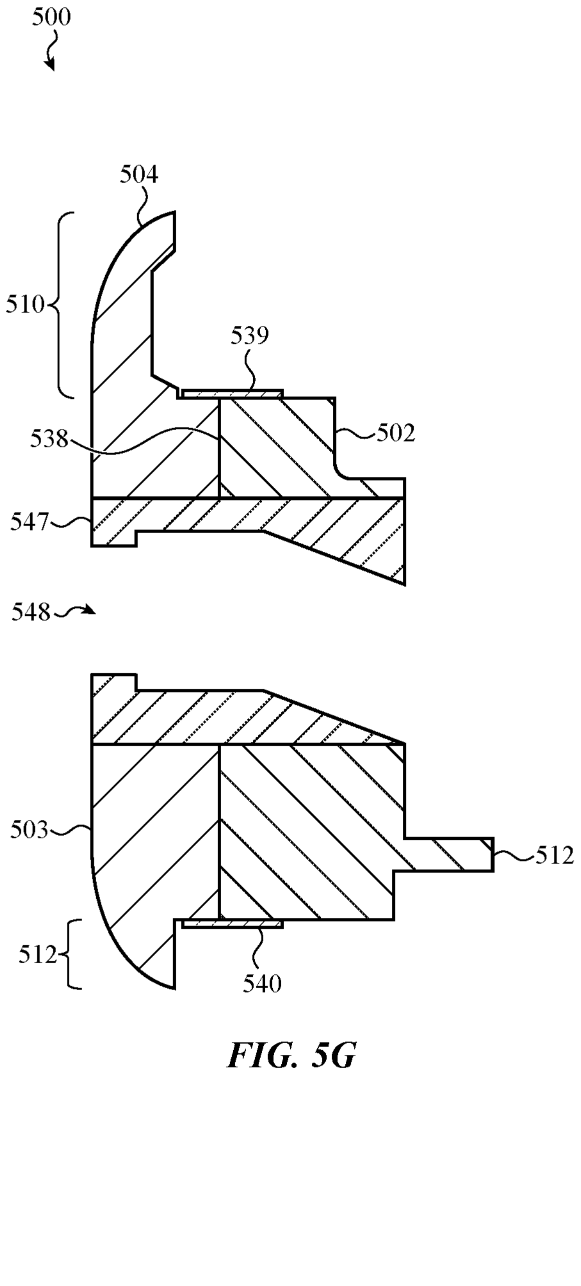

FIG. 5G is a partial cross-sectional view of the housing 500, showing an example structure for inhibiting or preventing galvanic corrosion in the area of a hole 548 that extends through the housing 500. The hole 548 may represent a hole for a charging port, speaker, SIM tray, button, or the like. In this example, an insert 547 may be positioned in a hole formed in the housing (e.g., formed through the core and cladding portions), such that the seam between the core and cladding portions is covered by the insert 547. The insert 547 may then define the surface of the hole. The insert 547 may be formed of various types of materials and may be coupled to the housing in various ways. For example, the insert 547 may be formed of a metal (e.g., a same metal as the cladding portion, such as titanium), and may be welded, brazed, soldered, adhered, or otherwise secured to the cladding and/or core portions such that the seam defined by the interface 538 in the area of the hole 548 is sealed against liquids and/or moisture.

As another example, the insert 547 may be formed from a moldable material, such as a polymer material, and may be molded in place and against the seam in the hole 548, thereby sealing the seam against liquid/moisture. The moldable material may be the same material (and may be formed as part of the same process) that defines a joint structure or a portion thereof. For example, a molding process may be used to inject a moldable material against the housing components to form joint structures and the insert 547. The hole 548 through the insert 547 may be formed as part of the molding process, or via a subsequent operation (e.g., drilling, machining, etc.). The insert 547 may also be formed from a polymer material using a separate process than that used to form the joint structures (e.g., a hole in the housing may be filled with an epoxy, and then the epoxy may be drilled or machined to define the insert 547 and the hole 548.

Figure 6:
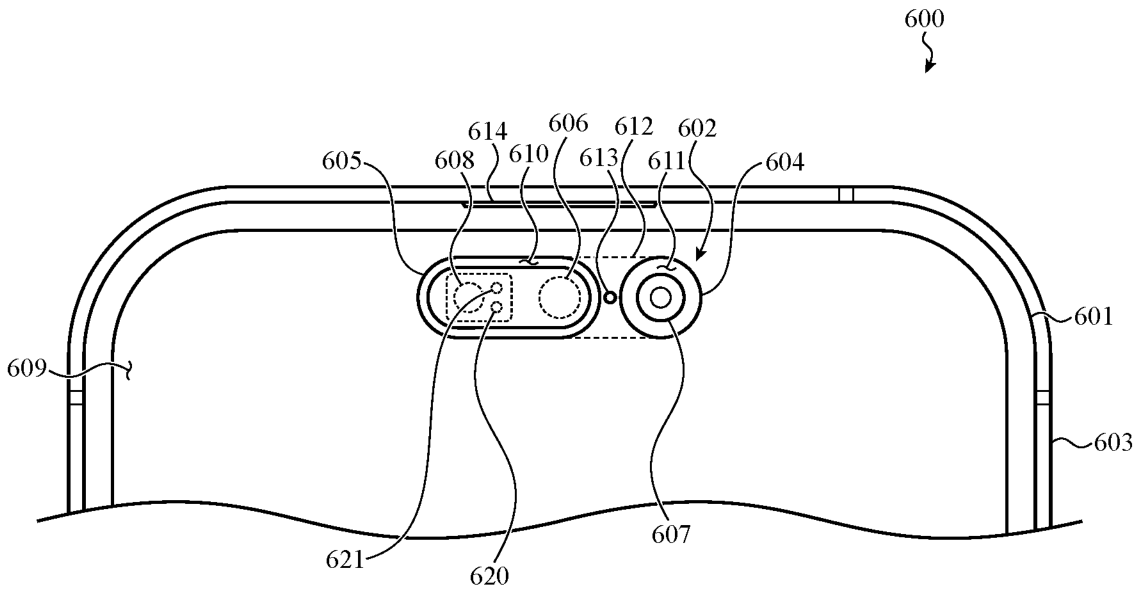
FIG. 6 depicts a portion of an example electronic device.

As noted above, a device may include a front-facing sensor region positioned along a front of a device. FIG. 6 illustrates an example device 600 with such a configuration. The device 600 may correspond to or be an embodiment of the electronic devices 100, 200, or any other device described herein.

The device 600 includes a front-facing sensor region 602, which may correspond to or be an embodiment of the front-facing sensor regions 111, 113 described with respect to FIGS. 1A and 1C. The front-facing sensor region 602 may appear as a pill-shaped region along the display 609 of the device. The front-facing sensor region 602 may appear as an inactive area of the display 609, and may be completely surrounded by active areas of the display.

As described herein, the front-facing sensor region 602 may provide both input and output functionality for the device 600. For example, the front-facing sensor region 602 may include sensors such as a facial recognition system, a proximity sensing system, and a front-facing camera. The front-facing sensor region 602 may provide the functionality of a facial recognition system (e.g., the facial recognition systems 252, 352), such as authenticating a user.

Additionally, as described herein, the front-facing sensor region 602 may include a supplemental display region 612 that appears to be part of the graphically inactive area of the display, but in fact can be used to provide graphical outputs to a user. For example, as described herein, the supplemental display region 612 may be used to selectively produce graphical outputs (such that a graphical output is displayed within the front-facing sensor region 602). When not producing graphical outputs, the supplemental display region 612 in the front-facing sensor region 602 may appear the same as or similar to an inactive region (e.g., a portion of the cover that does not have an underlying display).

The front-facing sensor region 602 may be defined at least in part by one or more holes formed through the display to allow optical access through the display for optical components such as a front-facing camera 607, a facial recognition system, which may include an optical emitter 608 and an optical receiver 606, and a proximity sensing system 703 (FIG. 7A), which may include an optical emitter 620 and an optical receiver 621. For example, a first hole 604 may be formed through the display (e.g., through all or a subset of the layers of a display stack), and a front-facing camera 607 may be positioned relative to the first hole 604 such that the camera 607 can capture images through the front cover 601 of the device 600. A second hole 605 may be formed through the display (e.g., through all or a subset of the layers of the display stack), and the optical emitters and receivers of the facial recognition system and the proximity sensing system 703 may be positioned relative to the second hole 605 such that infrared light can be emitted and received through the front cover 601 of the device 600. As described herein, the optical emitters and optical receivers may operate in the infrared spectrum.

In some cases, the front-facing sensor region 602 may include one or more masks, coatings, and/or other materials or treatments to define the boundaries of the front-facing sensor region 602 and obscure internal components of the device through the front-facing sensor region 602. For example, masks 610, 611 may be applied to the cover 601 to provide a substantially uniform appearance to the front-facing sensor region 602 and/or to block visibility into the device through the front-facing sensor region 602. The masks 610, 611 may be positioned on an interior surface of the front cover 601 in the areas where the first and second holes 605, 604 of the display are positioned. In some cases, the display stack overlaps the masks 610, 611 behind the masks, such that the masks 610, 611 occlude or block the visibility of the openings in the display.

Further, a coating that is substantially opaque visually but at least partially transparent to infrared light may be applied to the cover 601 over the facial recognition system and the proximity sensing system. The front-facing sensor region 602 may be configured so that when the display 609 is inactive (e.g., not illuminated and/or producing a graphical output), the front-facing sensor region 602 and the display appear to be substantially continuous. Stated another way, when the display 609 is inactive, there may be little or no discernable visual difference between the display 609 and the front-facing sensor region 602. To achieve this, the visually opaque, infrared-transmissive coating and the mask 610 may be designed to have similar optical properties (e.g., color, reflectance, opacity, etc.) to the display when the display is inactive.

As described herein, the front-facing sensor region 602 may include sensors such as a facial recognition system, a proximity sensing system, and a front-facing camera. Additionally, as described herein, the front-facing sensor region 602 may include a supplemental display region 612 that appears to be part of the graphically inactive area of the display, but in fact can be used to provide graphical outputs to a user. For example, graphical outputs produced by the display 609 (e.g., graphical user interfaces of the device's operating system and/or applications) may not extend into or be displayed by the supplemental display region 612. However, the supplemental display region 612 may be used to display icons, glyphs, lights, or other graphical outputs to provide information to a user. As one nonlimiting example, an indicator 613 may be displayed in the supplemental display region 612 to notify the user of an event or of a state of the device. For example, the indicator 613 may indicate that a new message (e.g., email, text message, application notification) has been received, or it may indicate that the front-facing camera or facial-recognition sensor is active.

The dotted line in FIG. 6 illustrating the boundary between the supplemental display region 612 and the main active region of the display 609 may be a programmatic boundary (e.g., the display 609 does not display main graphical output within the border), or a physical or optical boundary (e.g., it may be defined by a coating, ink, or the like). In some cases, substantially all of the supplemental display region 612 is defined by a mask that covers and blocks the display, but defines one or more holes that allow light from the display to pass through to produce a graphical output within the supplemental display region 612. For example, the indicator 613 may represent or be defined by a hole through an opaque mask that is positioned above the display. For example, a supplemental display region mask may be positioned between the masks 610, 611 and over an active portion of the display. The supplemental display region mask may define a hole, and when the underlying region of the display is illuminated, the indicator 613 appears illuminated. The supplemental display region mask may be a portion of a continuous mask (which may define the masks 610, 611 and the supplemental display region mask). In other examples, the supplemental display region mask may be a different mask from the masks 610, 611 (e.g., e.g., formed from one or more different materials and/or layers).

Further, the front-facing sensor region 602, or a portion thereof, may be touch- and/or force-sensitive, such that a user can provide touch inputs to the front-facing sensor region 602. For example, touching or tapping on the front-facing sensor region 602 may cause a camera application to launch on the device 600. As another example, touching or tapping on the front-facing sensor region 602 when a notification is active in the supplemental display region 612 may cause an application or other information related to the notification to be displayed on the device.

FIG. 6 illustrates other features of the front of the device 600. For example, the device 600 may include a speaker port 614 positioned between the cover 601 and the housing 603. The speaker port 614, which may correspond to or be an embodiment of the speaker port 110 in FIG. 1A, may be positioned outside of the active area of the display 609, and may be defined along at least a first side by a notch formed in the cover 601, and on at least a second side by the housing 603. A grate element or other protective structure may be positioned within the speaker port 614 to inhibit ingress of debris into the device 600. A speaker assembly may be positioned below the front cover 601 and may be coupled to an audio passage that is configured to transmit audio from the speaker assembly. The device 600 may also include a microphone positioned within the device and configured to receive sound through the speaker port 614. The device may also include an ambient light sensor, which may be positioned outside of the front-facing sensor region 602 and below the display 609 (e.g., such that the ambient light sensor captures light through the display stack in an active area of the display).

Figure 7A:
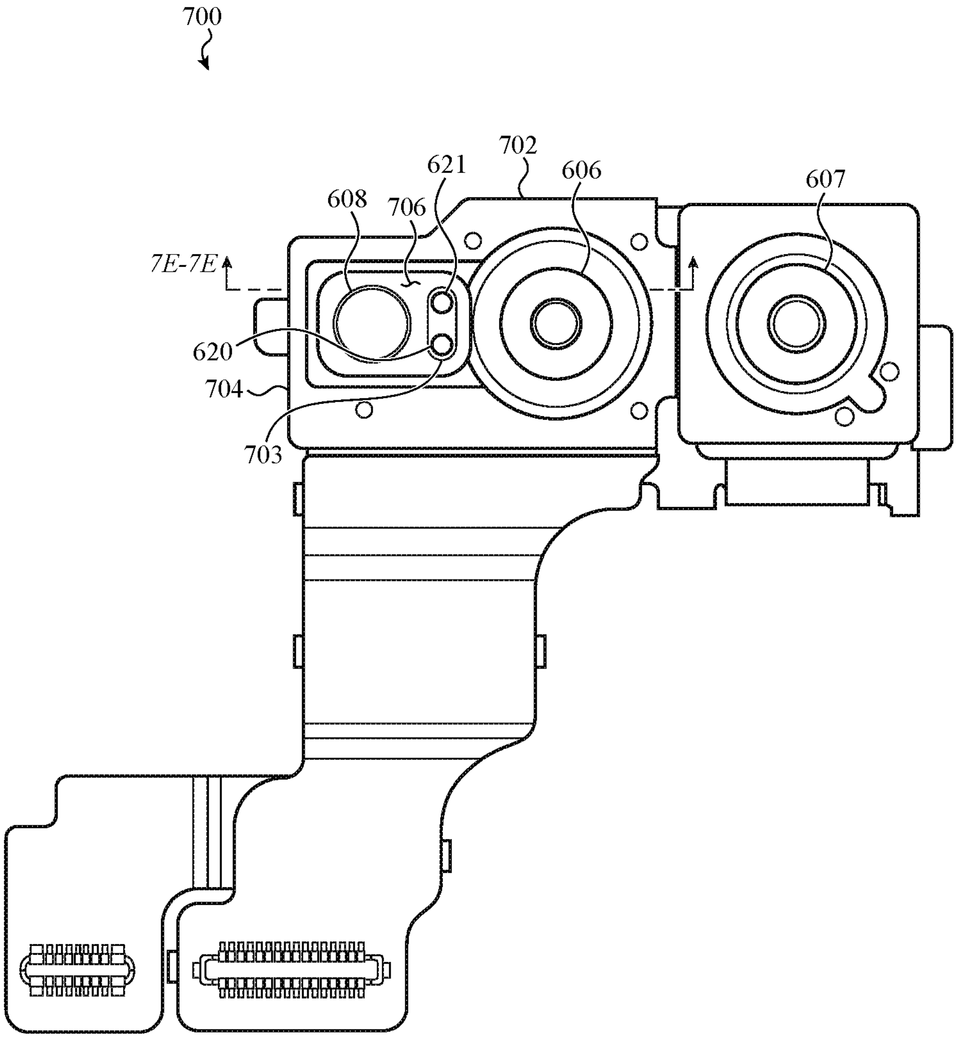
FIG. 7A depicts an example front-facing sensor module of an electronic device.

FIG. 7A illustrates an example front-facing sensor module 700 that may be integrated with the device 600 (or any other device with a front-facing sensor region as described herein). The front-facing sensor module 700 may include the front-facing camera 607, and a facial recognition and proximity sensor module 702 (e.g., to provide functionality of a facial recognition system, such as to biometrically authenticate a user). The facial recognition and proximity sensor module 702 (which is an example of a biometric sensing system) may include the optical emitter 608 and the optical receiver 606 of the facial recognition system, and the optical emitter 620 and the optical receiver 621 of the proximity sensing module. In order to mitigate or reduce cross-talk between emitter and receiver components of the optical sensing systems, internal components of the emitters and receivers may be optically isolated from one another. By positioning the facial recognition system (or other biometric sensing system) and the proximity sensing system 703 in a common module, a common wall 717 (FIGS. 7F-7G) within the module may be used to optically isolate both optical receivers from their corresponding optical emitters. For example, a single wall within the facial recognition and proximity sensor module 702 may be positioned between both the optical emitter 608 and the optical receiver 606, and also between the optical emitter 620 and the optical receiver 621. The single wall may extend along a non-linear path such that it extends between both emitter-receiver pairs. The single wall may be integral with a module housing member 704, as described herein.

The optical emitter and receiver 620, 621 of the proximity sensing system may include light guides positioned within openings in the module housing member 704. The light guides may be optically transmissive plastic (or glass or another suitable material), and may be coupled to the module housing member 704 in the openings.

The optical emitter 608 of the facial recognition sensor and both the optical emitter and receiver 620, 621 of the proximity sensing system 703 may share a common mounting face 706 of the module housing member 704. The mounting face 706 may be configured to couple to a back or interior surface of a front cover of a device, and may be sealed against the interior surface with a foam or other compliant material, which may seal the mounting face against dust and light ingress.

Figure 7B:
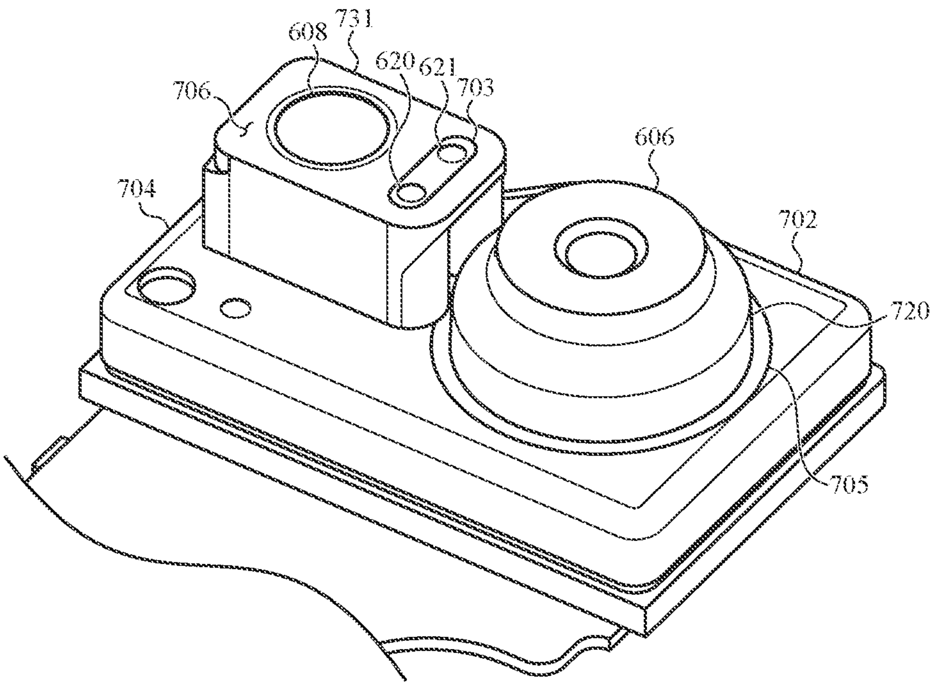
FIG. 7B depicts a perspective view of the front-facing sensor module of FIG. 7A.

FIG. 7B depicts a perspective view of the facial recognition and proximity sensor module 702. As shown in FIG.

7B, the module 702 includes a module housing member 704. The module housing member 704 (which may be formed from a molded polymer structure) may define a hole 705 through which a lens 720 of the optical receiver 606 extends. The module housing member 704 may also include holes in which light guides for the optical emitter 620 and the optical receiver 621 may be positioned, as well as a hole in which a component of the optical emitter 608 (e.g., a lens or cover) may be positioned. The light guides may be coupled to the housing member 704.

Figure 7C:
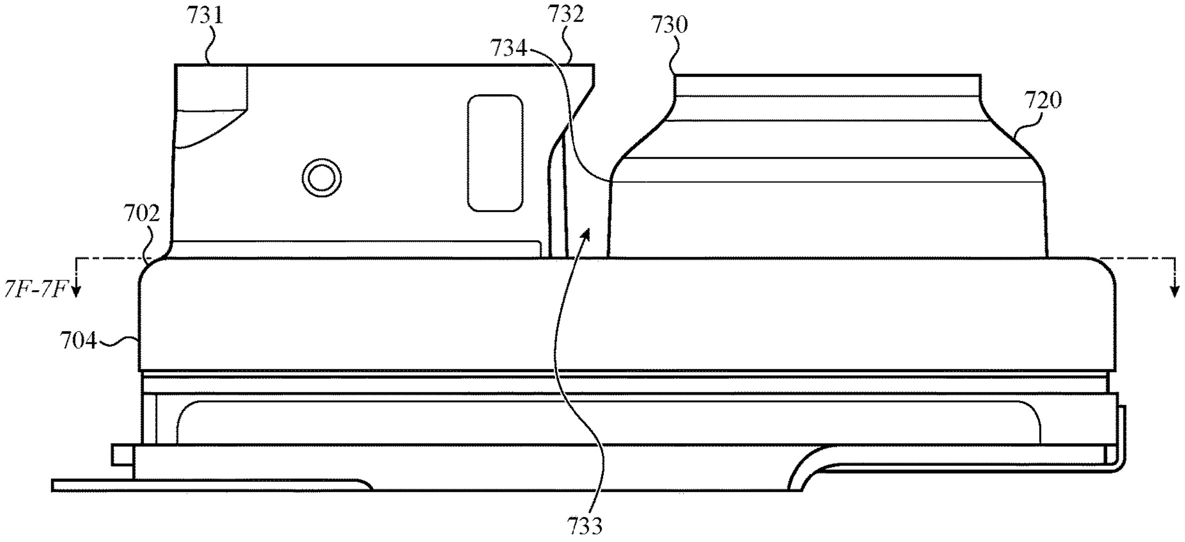
FIG. 7C depicts a side view of the front-facing sensor module of FIG. 7A.

FIG. 7C is a side view of the facial recognition and proximity sensor module 702. The module 702 may be configured with particular clearances and features to allow close positioning of the components of the module 702, thereby reducing the overall footprint of the module 702. For example, the module housing member 704 (e.g., a molded housing member) may define a housing portion 731 that defines the mounting face 706 and supports various components of the module 702 (e.g., light guides, lenses, covers, etc.). The housing portion 731 may define an overhang 732 that extends over and/or defines an undercut region 733 below the overhang 732. The overhang 732 and the undercut region 733 accommodate the shape of the lens 720, which includes a base portion 734 that is larger than a top portion 730. For example, the overhang 732 and the undercut region 733 allow the lens 720 to be positioned closer to housing portion 731 while also providing a target clearance between the components. In some cases, the overhang 732 extends over a portion of the lens 720 (and/or a portion of the lens 720 extends into the undercut region 733).

Figure 7D:
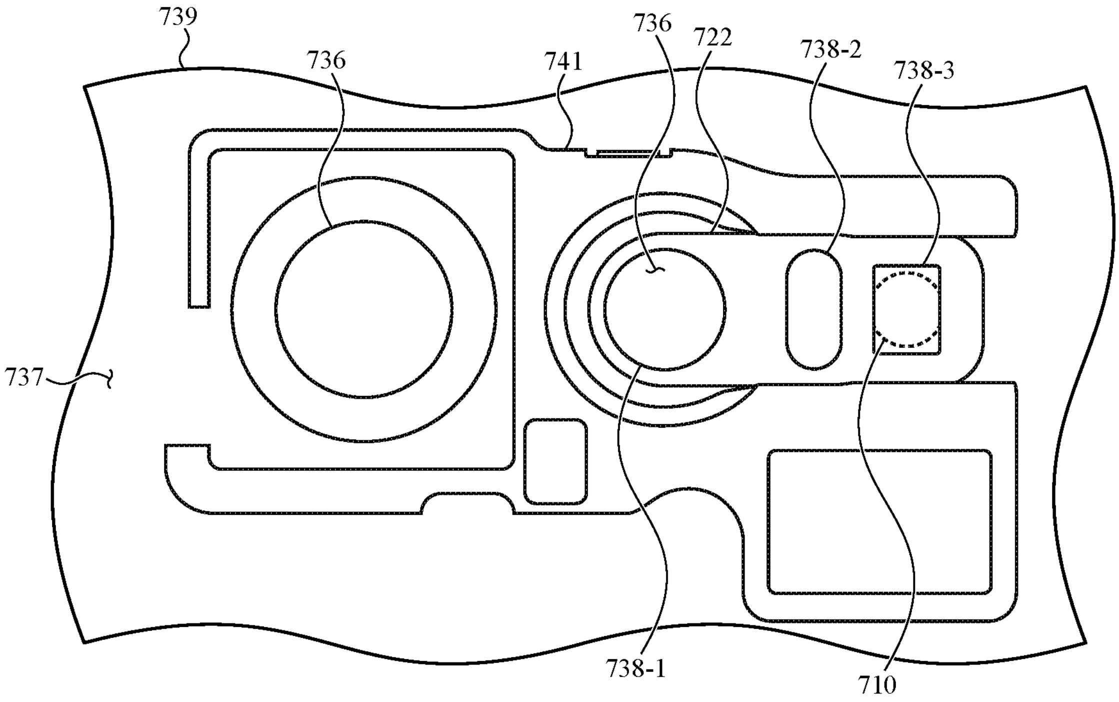
FIG. 7D depicts a portion of an underside of a front cover assembly of an example electronic device.

FIG. 7D depicts a portion of an underside of a front cover assembly 739, illustrating where the front-facing sensor module 700 may couple to the front cover assembly 739. A frame member 741 may be coupled to an interior side of the front cover assembly 739 (e.g., on a bottom surface of a display stack 737) to receive and support the front-facing sensor module 700. The frame member 741 may define a first region that at least partially surrounds a camera window 736 (e.g., a transparent portion of the front cover) and receives a portion of the front-facing camera 607 therein. The frame member 741 also defines a second region that at least partially surrounds a facial recognition and proximity sensor window 736. The window 736 may be optically transmissive in a wavelength range of the facial recognition and proximity sensor systems. In some cases, the window 736 includes a visually opaque, infrared transmissive coating on the front cover.

A gasket member 722 may be positioned on the window 736 and may be configured to receive a portion of the facial recognition and proximity sensor module 702 thereon (e.g., the mounting face 706 and a front surface of the lens 720). The gasket member 722 may be formed from a compliant material (e.g., a foam, elastomer, etc.), and may also be configured to absorb light to prevent or inhibit crosstalk between the various optical receivers and optical emitters of the facial recognition and proximity sensor module 702.

The gasket member 722 may define holes 738 that provide optical passages through the gasket member 722 to the front cover for the optical components of the facial recognition and proximity sensor module 702. For example, a first hole 738-1 may provide an optical passage for the optical receiver 606, a second hole 738-2 may provide an optical passage for the proximity sensing system 703, and a third hole 738-3 may provide an optical passage for the optical emitter 608. The sizes and shapes of the holes 738 may be configured to reduce crosstalk or other interference between emitters and receivers, as described herein.

Figure 7E:
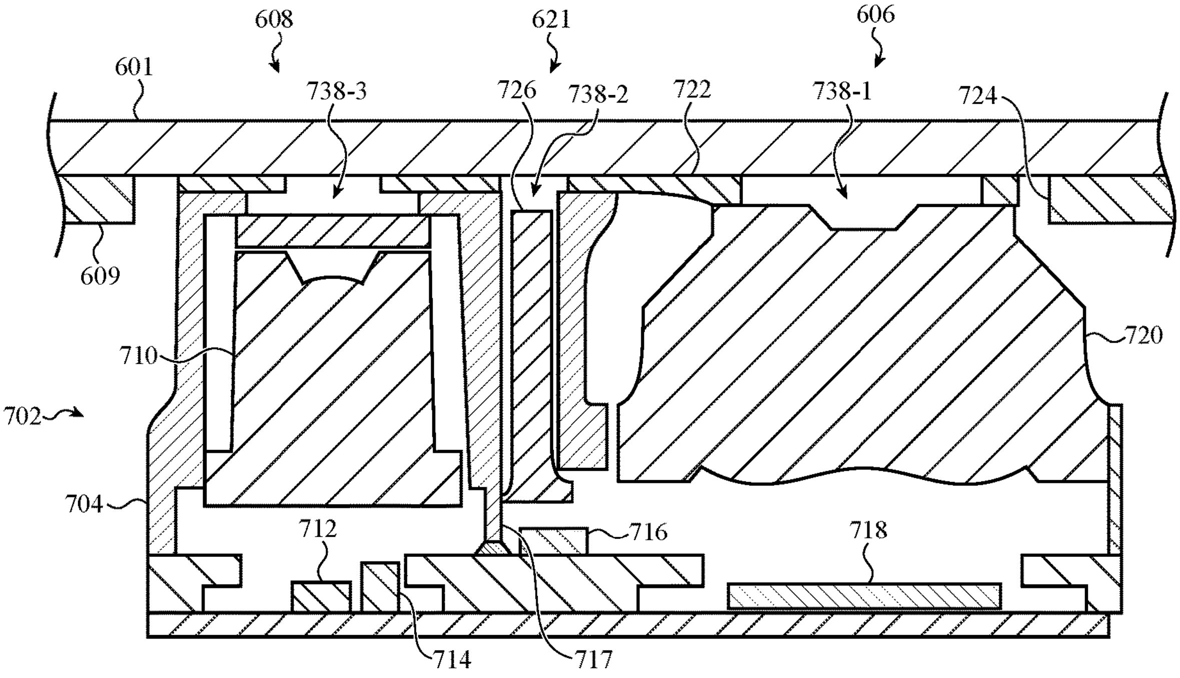
FIGS. 7E-7F depict partial cross-sectional views of the front-facing sensor module of FIG. 7A.

FIG. 7E depicts a partial cross-sectional view of the facial recognition and proximity sensor module 702, viewed along line 7E-7E in FIG. 7A. The facial recognition and proximity sensor module 702 extends through or is otherwise positioned within an opening 724 formed in the display 609, and is sealed against an interior surface of the cover 601 with a gasket member 722 (e.g., a compliant material such as a foam pad). The gasket member 722 may seal the facial recognition and proximity sensor module 702 against ingress of dust or other contaminants, and may also serve as a light absorbing material to inhibit light that is emitted from the optical emitter 608 being propagated through the bulk of the front cover 601 towards the optical receiver 606. More particularly, light from an emitter that is reflected or propagated through the thickness of the front cover 601 (e.g., via internal reflection) may ultimately be received by a receiver along with the light that is reflected by an object (e.g., the light that is intended to be received as a signal). The internally propagated light may produce undesirable crosstalk or otherwise reduce the signal-to-noise ratio of the sensing system, as the receiver cannot distinguish between the signal (e.g., the light that is reflected by an external object) and the crosstalk noise (e.g., the light that is propagated through the bulk of the front cover 601 via internal reflection). Accordingly, the light absorbing material of the gasket member 722 may absorb light that is being internally reflected through the bulk of the front cover 601, thereby reducing the crosstalk.

As shown in FIGS. 7D and 7E, the hole 738-3 in the gasket member 722 that is positioned over a lens 710 of the optical emitter 608 may be sized so that portions of the gasket member 722 extend partially over a front element of the lens 710. These portions of the gasket member 722 may block some of the light that is emitted through the lens 710, thereby reducing the amount of light that is reflected through the bulk of the front cover 601 and that may produce interfering crosstalk with the optical receiver 606. More particularly, the portions of the gasket member 722 that extend over the front element of the lens 710 may selectively block light that is incident on the underside of the front cover 601 at a shallow angle, which may ultimately reduce the amount of light that is internally reflected by the front cover 601. In some cases, the size and shape of the hole 738-3 reduces the field of illumination (e.g., the angle of the cone of illumination that is emitted by the optical emitter 608) by about 5%, about 10%, or about 20% (or another suitable value) along at least one direction.

In some cases, a coating that is positioned over the facial recognition and proximity sensor module 702 on the interior surface of the cover 601 has an index of refraction that is substantially similar to the index of refraction of the front cover 601 (e.g., within about 1%, within about 5%, within about 10%, or within about 20%, though other values are also contemplated). By selecting a material with a similar index of refraction, light being reflected within the material of the cover 601 may be more likely to be transmitted out of the cover 601, rather than be reflected internally. By allowing the light to pass out of the cover 601 (and into the gasket member 722), the amount of light that is ultimately propagated towards and into the optical receiver 606 may be reduced. Other light-absorbing structures and materials may be used instead of or in addition to the index-matched coating and the gasket member 722.

Various properties of the gasket member 722, the optional optical coating, and an adhesive that is used to adhere the gasket member 722 to the front cover 601 may be selected to achieve a target degree of light absorption. For example, the gasket member, coating, and adhesive may have a target light absorbance in a range of wavelengths that corresponds to the light that is emitted by the optical emitter 608 (e.g., infrared light). For example, these components may have an absorbance value in the applicable wavelength range (e.g., infrared light) between about 0.8 and about 5, between about 1 and about 5, between about 2 and about 5, or between about 3 and about 5. Other absorbance values are also contemplated.

FIG. 7E also illustrates the relative positions of the components in the facial recognition and proximity sensor module 702. For example, the proximity sensing system 703 (including both the emitter 620 and receiver 621) may be positioned between the optical emitter 608 and the optical receiver 606 of the facial recognition system.

The optical receiver 606 may include a lens 720 and a light sensor 718, such as an infrared image sensor or other image sensor or optical sensing element, to detect and/or capture images of a user. The light sensor 718 may be configured to capture an image of the user when the user is illuminated by the optical emitter 608. The optical emitter 608 may include a lens 710 and a pair of infrared light emitters 712, 714 configured to emit light through the lens 710. The light emitter 712 may be configured to produce a pattern of infrared light (e.g., a grid or array of infrared dots), and the light emitter 714 may be configured to produce a flood of infrared light (e.g., a substantially uniform illumination field). The device 600 may capture an image of the user's face (e.g., with the light sensor 718) while the user's face is illuminated by the dot pattern and/or the flood of infrared light, and authenticate the user based on the captured image. For example, the device 600 may determine, from the image, a depth map of the user's face using the dot pattern projected onto the user's face, and may authenticate the user based on the depth map.

FIG. 7E also depicts a cross-sectional view of the optical receiver 621 of the proximity sensing system 703. The optical receiver 621 includes a light sensor 716 positioned below a light guide 726. A portion of light emitted by the optical emitter 620 may be reflected from an object, and may travel through the light guide 726 to the light sensor 716. The reflected light may be used to determine the proximity and/or distance of an object (e.g., a user's face) to the device. As described above, the proximity sensing system 703 may estimate a distance between the device and an object or target using time-of-flight calculations, or using other types of proximity sensing techniques. The configuration of the optical receiver 621 shown in FIG. 7E may also represent the configuration of the optical emitter 620. In particular, the light sensor 716 may represent the light emitter 715, and the light guide 726 may represent the corresponding light guide that is positioned above the light emitter 715 and into which light from the light emitter 715 is emitted. The light guides over the light emitter 715 and the light sensor 716 may be transparent at least within a wavelength range of the light emitted by the light emitter 715 (e.g., infrared light, visible light, etc.). The light guides may be formed from optically transparent material (within the wavelength range).

Figure 7F:
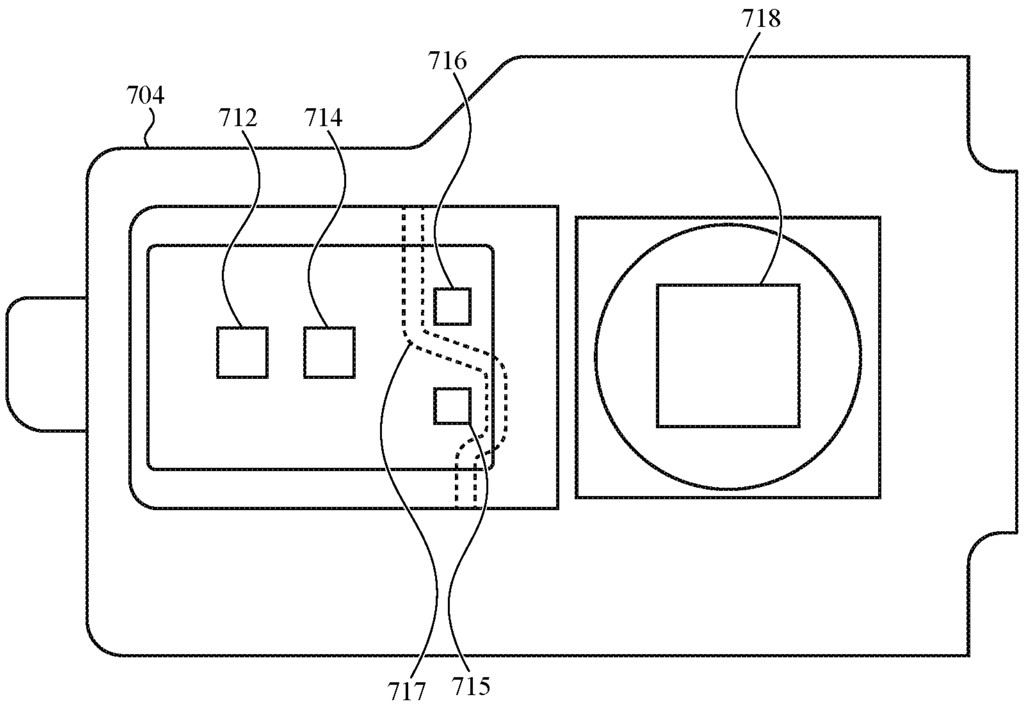

FIG. 7F depicts a partial cross-sectional view of the facial recognition and proximity sensor module 702, viewed along line 7F-7F in FIG. 7C, illustrating a position and configuration of the light-blocking wall 717 that optically isolates the optical receivers of the module 702 from their corresponding optical emitters. In particular, the light-blocking wall 717, which may be formed as an integral part of the module housing member 704, may extend between the light emitters (emitters 712, 714, and 715) and the light sensors (sensors 716, 718). As described herein, the emitters 712 and 714 may be configured as dot projectors and flood projectors, and are configured to illuminate an object (e.g., a face), which is then captured as an image by the light sensor 718. The emitters 712, 714 may project the dot pattern and the flood of illumination through the lens 710.

The light-blocking wall 717, being positioned between the emitters 712, 714 and the sensing element 718, therefore inhibits light emitted from the dot and flood projectors from leaking, through the module 702, to the sensing element 718. Similarly, the emitter 715 may be configured to emit light (e.g., infrared light) onto an object, and reflected light is detected by the sensing element 716 (e.g., to determine a proximity of the object based, for example, on a brightness of the reflected light). The light-blocking wall 717, being positioned between the emitter 715 and the sensing element 716, therefore inhibits light emitted from the emitter 715 from leaking, through the module 702, to the sensing element 716.

Figure 7G:
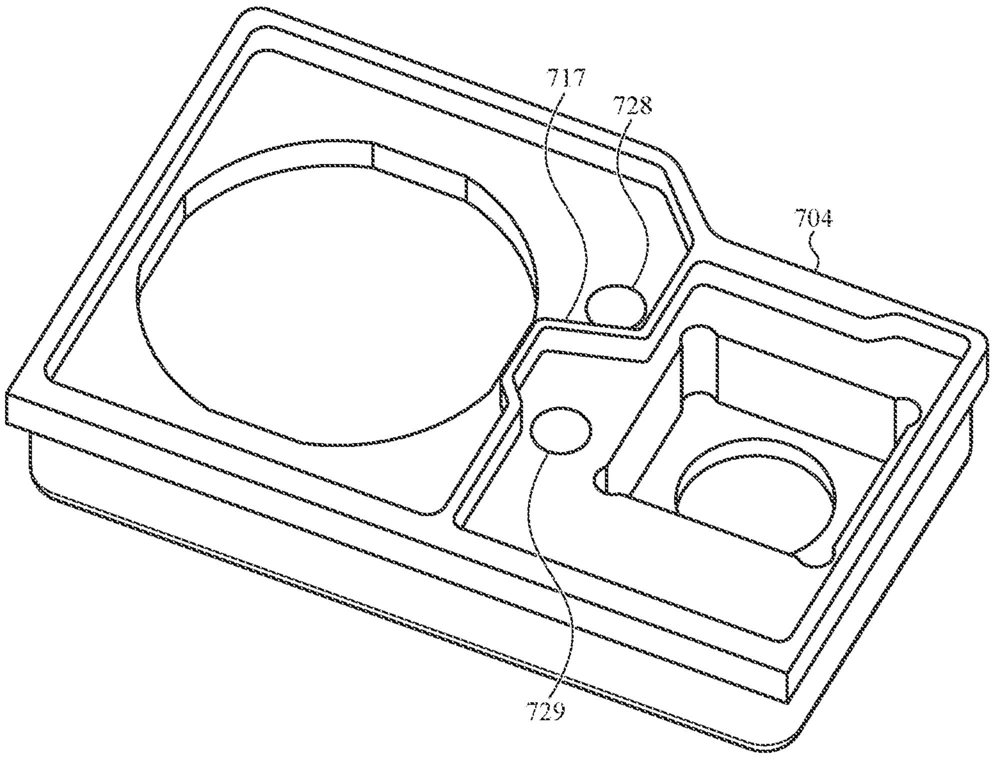
FIG. 7G depicts an underside view of a portion of the front-facing sensor module of FIG. 7A.

FIG. 7G depicts a perspective view of the module housing member 704, viewed from an underside of the housing member. In this example, the light-blocking wall 717 is shown extending between hole 728 and hole 729, which are holes formed through the module housing member 704 and in which the light guides for the proximity sensing system are positioned. More particularly, the hole 729 may receive a light guide that is positioned over and guides light from the optical emitter 715, while the hole 728 may receive a light guide that is positioned over and guides light to the light sensor 716. The light-blocking wall 717 also extends between the areas of the module housing member 704 that receive the optical emitters and the optical sensors for the facial recognition sensing system. The light-blocking wall 717 may be integrally formed with the module housing member 704. For example, the module housing member 704 may be a unitary component (e.g., formed of a molded polymer, metal, etc.) that defines the light-blocking wall 717 as a protruding feature. The housing member 704 may be formed from or include optically opaque material (e.g., optically opaque at least within target wavelengths of light).

Figure 8A:
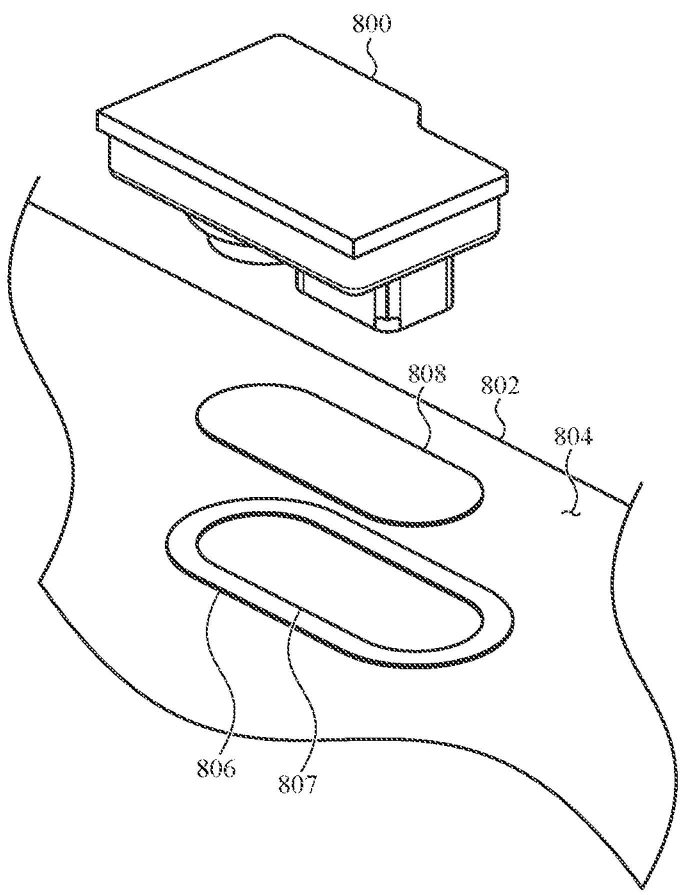
FIGS. 8A-8C depict a portion of a front cover assembly with a front-facing sensor.
Figure 8B:
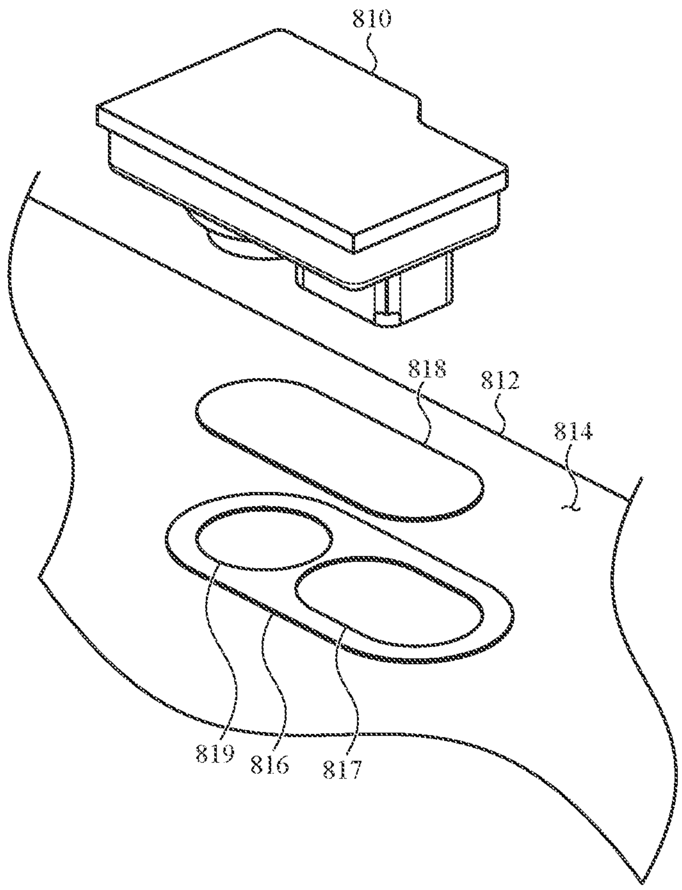
Figure 8C:
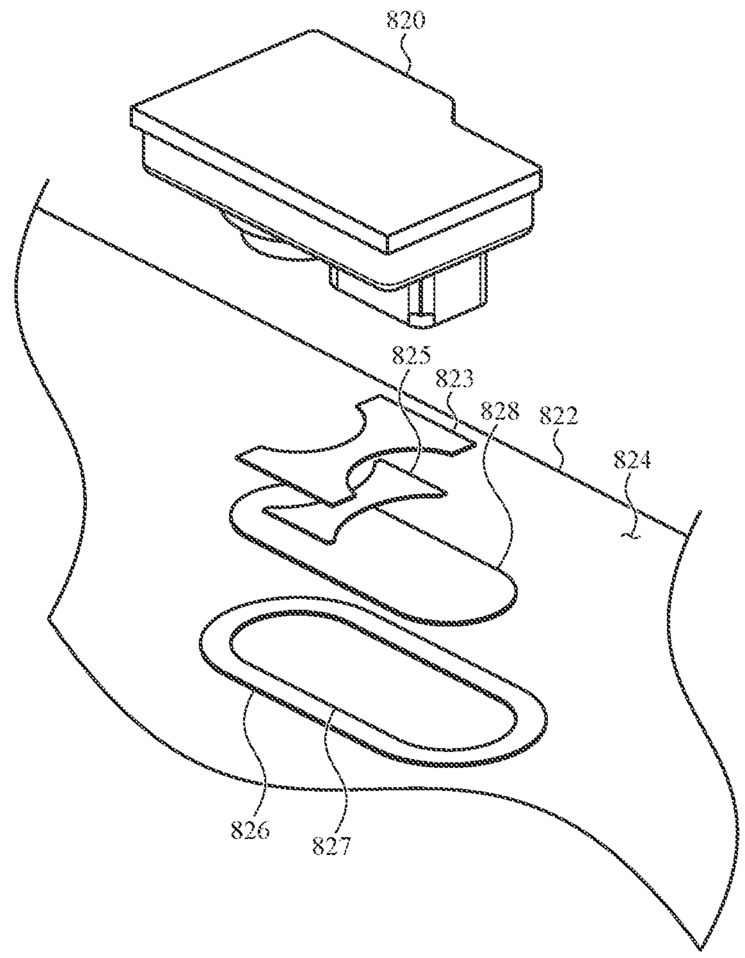

A front cover assembly may include various masks, coatings, and/or other treatments in the area of a front-facing sensor region to provide the target performance of the sensors and imaging components, as well as to provide a target appearance along the front of the device. FIGS. 8A-8C illustrate various example configurations of front cover assemblies with masks and/or coatings in a front-facing sensor region.

FIG. 8A illustrates a facial recognition and proximity sensor module 800 (which may correspond to and/or be an embodiment of the facial recognition and proximity sensor module 702) and a front cover 802 to which the module 800 may be coupled. A mask structure 806 may be positioned on an interior surface 804 of the front cover 802, and may define a hole 807. The hole 807 may be aligned with or otherwise define an optically transmissive region of the front cover assembly, through which light may pass to and from the module 800. The mask structure 806 may be formed from any suitable materials and/or structures, such as one or more layers of ink, films, coatings (e.g., deposited coatings), etc., and may be opaque. For example, the mask structure 806 may be positioned so as to cover (and occlude) the edge of a hole in a display, where the hole provides optical access through the display for the module 800. A coating 808 that is visually opaque but optically transmissive in a wavelength region of the facial recognition and proximity sensor systems may be positioned on the front cover 802 and over or in the hole 807. The coating 808 may occlude the visibility of the underlying components while still allowing light in a target wavelength range to pass through.

FIG. 8B illustrates a facial recognition and proximity sensor module 810 (which may correspond to and/or be an embodiment of the facial recognition and proximity sensor module 702) and a front cover 812 to which the module 810 may be coupled. A mask structure 816 may be positioned on an interior surface 814 of the front cover 812, and may define a first hole 817 and a second hole 819. The first hole 817 may be aligned with or otherwise define an optically transmissive region for one portion of the module 810 (e.g., an optical receiver for a facial recognition sensing system) and the second hole 819 may be aligned with or otherwise define an optically transmissive region for another portion of the module 810 (e.g., optical emitters for a facial recognition sensing system and an optical emitter and receiver for a proximity sensing system). The web or mask portion that extends between the first hole 817 and the second hole 819 may be configured to absorb light from light emitters that may be reflected through the front cover 812 (and which may otherwise be picked up as interfering crosstalk by an associated light receiver). The mask structure 816 may be formed from any suitable materials and/or structures, such as one or more layers of ink, films, coatings (e.g., deposited coatings), etc., and may be opaque. The material of the mask structure 816 may be selected to provide a target light absorption. The mask structure 816 may be positioned so as to cover (and occlude) the edge of a hole in a display, where the hole provides optical access through the display for the module 810. A coating 818 that is visually opaque but optically transmissive in a wavelength region of the facial recognition and proximity sensor systems may be positioned on the front cover 812 and over or in the holes 817, 819. The coating 818 may occlude the visibility of the underlying components while still allowing light in a target wavelength range to pass through.

FIG. 8C illustrates a facial recognition and proximity sensor module 820 (which may correspond to and/or be an embodiment of the facial recognition and proximity sensor module 702) and a front cover 822 to which the module 820 may be coupled. A mask structure 826 may be positioned on an interior surface 824 of the front cover 822, and may define a hole 827. The hole 827 may be aligned with or otherwise define an optically transmissive region of the front cover assembly, through which light may pass to and from the module 820. The mask structure 826 may be formed from any suitable materials and/or structures, such as one or more layers of ink, films, coatings (e.g., deposited coatings), etc., and may be opaque. For example, the mask structure 826 may be positioned so as to cover (and occlude) the edge of a hole in a display, where the hole provides optical access through the display for the module 820. A coating 828 that is visually opaque but optically transmissive in a wavelength region of the facial recognition and proximity sensor systems may be positioned on the front cover 822 and over or in the hole 827. The coating 828 may occlude the visibility of the underlying components while still allowing light in a target wavelength range to pass through.

One or more coatings 823, 825 may be applied to the interior surface 824 of the front cover 822. The coatings 823, 825 may extend between portions of the module 820, and may define a web or mask portion configured to absorb light from light emitters that may be reflected through the front cover 822 (and which may otherwise be picked up as interfering crosstalk by an associated light receiver). The coatings 823, 825 may be formed from any suitable materials, such as one or more layers of ink, films, coatings (e.g., deposited coatings such as PVD or CVD coatings), etc., and may be opaque. The coatings may have an absorbance value in the applicable wavelength range (e.g., infrared light) between about 0.8 and about 5, between about 1 and about 5, between about 2 and about 5, or between about 3 and about 5. Other absorbance values are also contemplated. In some cases, one coating is present (e.g., the coating 823 or the coating 825), while in other cases more than one coating is present (both coatings 823, 825, or additional coatings). The coatings 823, 825 may have a thickness between about 3 microns and about 10 microns.

Figure 9A:
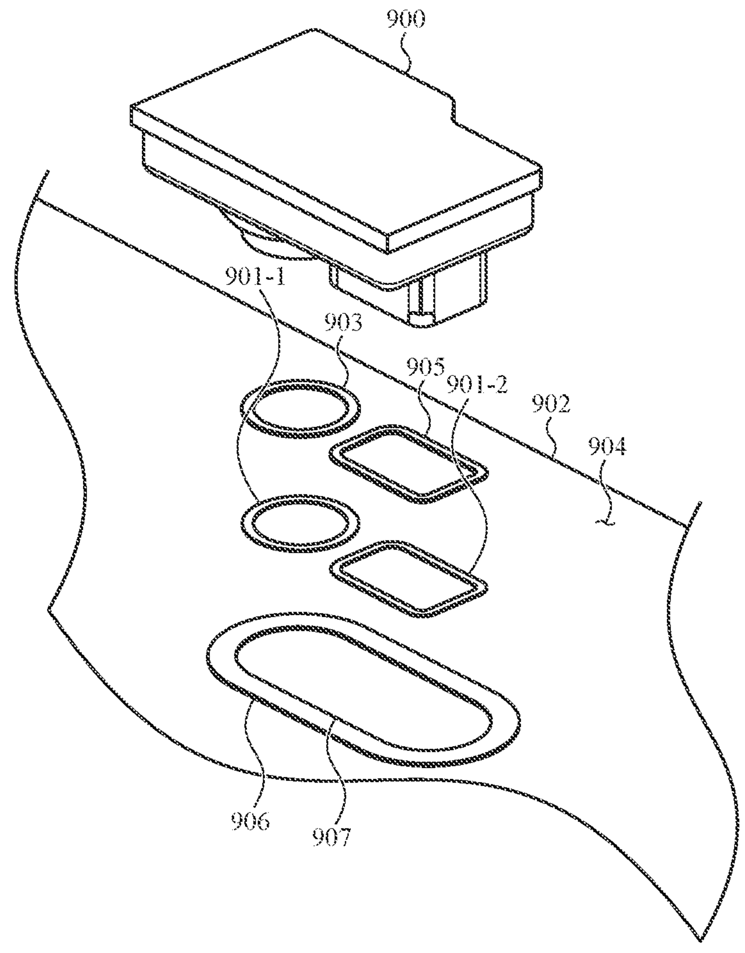
FIGS. 9A-9C depict a portion of a front cover assembly with a front-facing sensor.
Figure 9B:
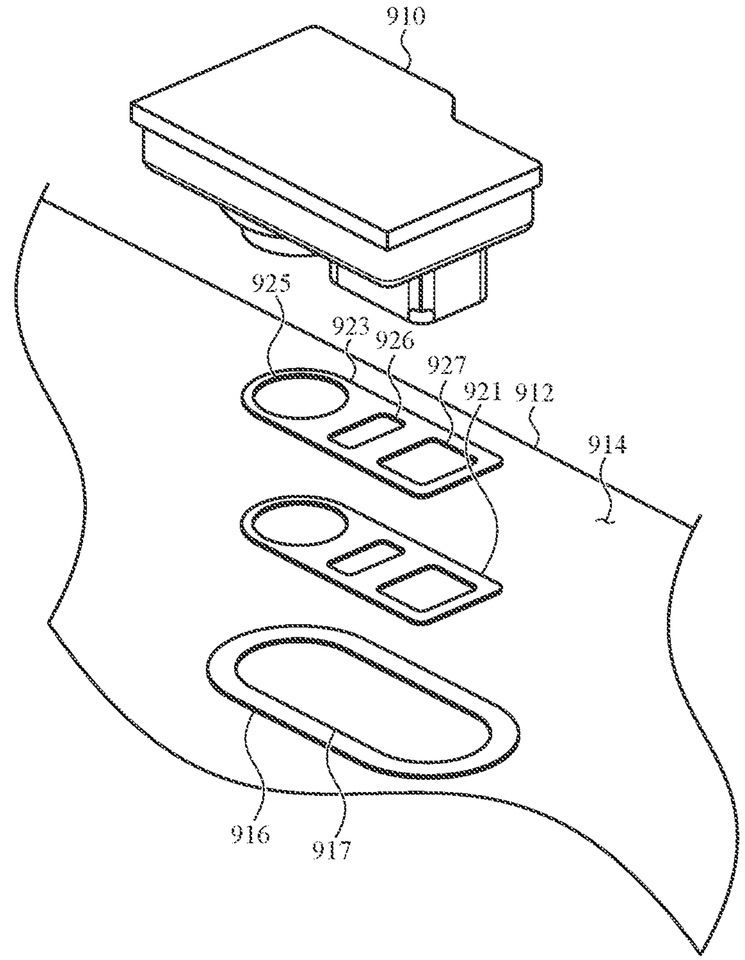
Figure 9C:
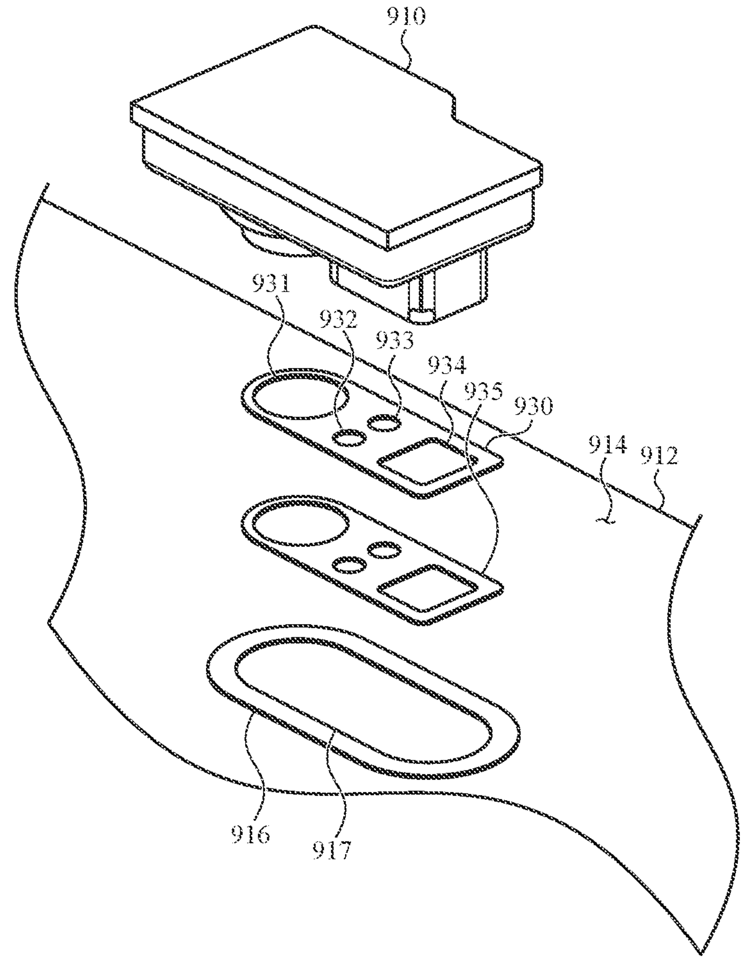

FIGS. 9A-9C illustrate various example configurations of front cover assemblies with compliant structures in a front-facing sensor region to form seals against a front-facing sensor module (e.g., a facial recognition and proximity sensor module) and to provide light-absorbing functionality.

FIG. 9A illustrates a facial recognition and proximity sensor module 900 (which may correspond to and/or be an embodiment of the facial recognition and proximity sensor module 702) and a front cover 902 to which the module 900 may be coupled. A mask structure 906 may be positioned on an interior surface 904 of the front cover 902, and may define a hole 907. The hole 907 may be aligned with or otherwise define an optically transmissive region of the front cover assembly, through which light may pass to and from the module 900. The mask structure 906 may be formed from any suitable materials and/or structures, such as one or more layers of ink, films, coatings (e.g., deposited coatings), etc., and may be opaque. For example, the mask structure 906 may be positioned so as to cover (and occlude) the edge of a hole in a display, where the hole provides optical access through the display for the module 900. A coating that is visually opaque but optically transmissive in a wavelength region of the facial recognition and proximity sensor systems may be positioned on the front cover 902 and over or in the hole 907, as described with respect to FIG. 8A.

Compliant members 903 and 905 may be coupled to the interior surface 904 via adhesives 901-1, 901-2, respectively. Mounting faces of various portions of the module 900 (e.g., corresponding to a face of a lens 720 and a mounting face 706) may be pushed against the compliant members 903, 905 (optionally deforming the compliant members), thereby forming a seal between the compliant member and the module 900. The seal may reduce or inhibit light leakage between the optical components of the module 900, and may seal the module 900 against ingress of dust, liquids, or other contaminants. Moreover, the compliant members may be configured to absorb light from light emitters that may be reflected through the front cover 902 (and which may otherwise be picked up as interfering crosstalk by an associated light receiver).

FIG. 9B illustrates a facial recognition and proximity sensor module 910 (which may correspond to and/or be an embodiment of the facial recognition and proximity sensor module 702) and a front cover 912 to which the module 910 may be coupled. A mask structure 916 may be positioned on an interior surface 914 of the front cover 912, and may define a hole 917. The hole 917 may be aligned with or otherwise define an optically transmissive region of the front cover assembly, through which light may pass to and from the module 910. The mask structure 916 may be formed from any suitable materials and/or structures, such as one or more layers of ink, films, coatings (e.g., deposited coatings), etc., and may be opaque. For example, the mask structure 916 may be positioned so as to cover (and occlude) the edge of a hole in a display, where the hole provides optical access through the display for the module 910. A coating that is visually opaque but optically transmissive in a wavelength region of the facial recognition and proximity sensor systems may be positioned on the front cover 912 and over or in the hole 917, as described with respect to FIG. 8A.

A compliant member 923 may be coupled to the interior surface 914 via an adhesive 921. Whereas FIG. 9A illustrates separate compliant members (and corresponding adhesives), FIG. 9B illustrates an example with a single compliant member that defines multiple holes 925, 926, 927 to allow optical access for different optical systems of the module 900 (e.g., separate holes for the lens 720 and for the mounting face 706). As described with respect to FIG. 7D-7E, the hole 927, which is positioned over a lens of a light emitter, may be configured so that portions of the compliant member 923 block a portion of the emitted light to reduce interfering optical crosstalk.

The mounting faces of the components of the module 900 may be pushed against the compliant member 923 (optionally deforming the compliant member), thereby forming a seal between the compliant member and the module 910. The seal may reduce or inhibit light leakage between the optical components of the module 910, and may seal the module 910 against ingress of dust, liquids, or other contaminants. Moreover, the compliant members may be configured to absorb light from light emitters that may be reflected through the front cover 912 (and which may otherwise be picked up as interfering crosstalk by an associated light receiver).

FIG. 9C illustrates the facial recognition and proximity sensor module 910 and front cover 912 of FIG. 9B, but with a compliant member 930 that defines multiple holes 931, 932, 933, 934 to allow optical access for different optical systems of the module 900. In this example, holes 931 and 934 may define optical access for the light receiver and emitter of a facial recognition system, while the holes 932, 933 define optical access for the light receiver and emitter of a proximity sensing system. By comparison, the compliant member 923 defines a single hole that provides optical access for both the light emitter and receiver of the proximity sensing system. By providing separate holes for the emitter and receiver of the proximity sensing system, more material may be available between the various emitters and receivers of the facial recognition and proximity sensor module 910 to reduce interfering optical crosstalk between the various emitters and receivers.

The compliant members described with respect to FIGS. 9A-9C generally correspond to or be embodiments of the gasket member 722, and the discussion of the gasket member 722 will be understood to apply to the compliant members in FIGS. 9A-9C. For example, the compliant members in FIGS. 9A-9C may be formed of the same or similar materials and have the same or similar optical properties and the same or similar functions as the gasket member 722.

As described herein, and in particular with respect to FIGS. 7D-9C, a coating that is visually opaque but optically transmissive in a wavelength region of the facial recognition and proximity sensor systems may be positioned on the front cover and over the facial recognition and proximity sensor systems (e.g., the coating 808). In some cases, the coating 808 is a polarizing coating or is otherwise configured to block light that is incident on the coating 808 at an oblique angle, while transmitting light that is incident at or near a perpendicular angle to the coating 808. This type of coating may further reduce or inhibit interfering crosstalk between light emitters and light receivers of the facial recognition and proximity sensor systems.

Figure 10A:
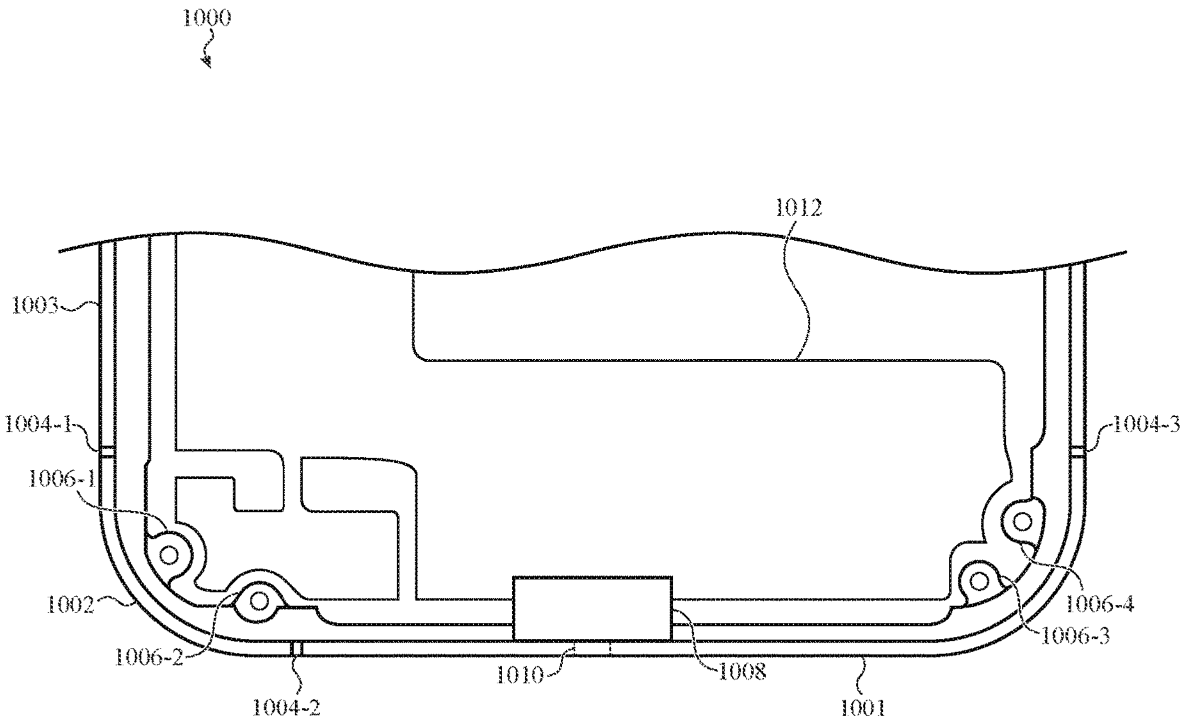
FIG. 10A depicts a portion of an example electronic device with antennas.

FIG. 10A illustrates a portion of a housing structure 1003 (which may correspond to or be an embodiment of the housing structure 406) with a circuit substrate 1012 coupled thereto. As described above, housing components of the housing structure 1003 (e.g., the housing components 1001, 1002) may act as radiating antenna elements for wireless communication systems. Nonconductive joint structures 1004 (e.g., 1004-1-1004-3) may be positioned between the housing components to provide electrical isolation between the housing components as well as to mechanically couple the housing components.

As radiating antenna elements, the dimensions (e.g., the length, which may correspond to or define a conductive length) of the housing components may at least partially define the frequencies at which the antenna elements may operate (or at which they operate with a suitable power and/or efficiency for use in a mobile phone). Accordingly, the housing component 1001 may be configured for operation at a different frequency band (e.g., low band) than the housing component 1002 (which may be configured for operation at mid and/or high bands), due to the different conductive lengths of the housing components 1001, 1002. Stated another way, a shorter housing component (e.g., a housing component having a shorter conductive length) may be configured to resonate at higher electromagnetic frequencies as compared to a longer housing component (e.g., a housing component having a longer conductive length), which resonates at relatively lower frequencies. As shown, the housing components 1001, 1002 define antenna connection features 1006 (e.g., 1006-1-1006-4), where antenna circuitry may be conductively coupled to the housing components.

As shown in FIG. 10A, the device 1000 may include a charging and/or communication cable connector module 1008 that is configured to receive and conductively couple to a charging and/or communication cable. The connector module 1008 may be positioned proximate a hole 1010 formed through the housing component 1001, and a connector end of a cable (e.g., a charging and/or communications cable) may extend into or through the hole 1010 to engage the connector module 1008.

In some cases, when a cable (e.g., a charging and/or communications cable) is plugged into the connector module 1008 and/or electrical current or signals are being passed through the cable and connector module 1008, the antenna operation of the housing component 1001 may be affected. For example, electrical signals passing through the cable or otherwise produced while a cable is plugged in may cause interference or noise on the housing component 1001 that degrades or otherwise negatively affects antenna performance. In such cases, wireless communications via the housing component 1001 (e.g., for low band signals) may be compromised.

Figure 10B:
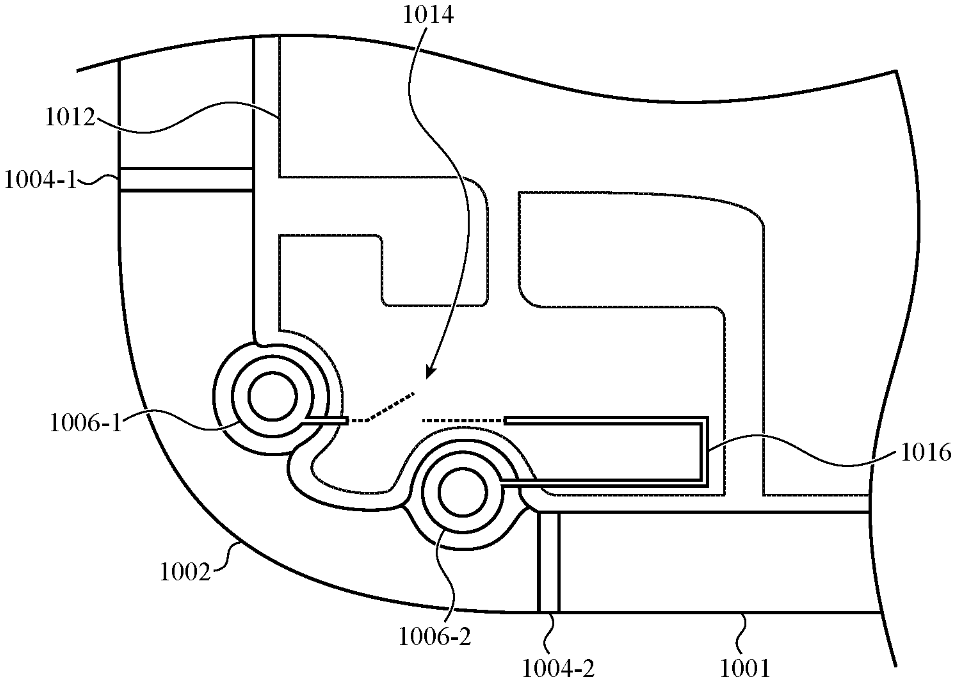
FIG. 10B depicts a portion of the electronic device of FIG. 10A.

In order to maintain low band communication performance, a selectively couplable auxiliary conductive element, also referred to simply as an auxiliary conductive element, may be coupled to the housing component 1002 to provide an extended conductive path that includes both the housing component 1002 and the selectively couplable auxiliary conductive element. FIG. 10B depicts a portion of the housing structure 1003 with a selectively couplable auxiliary conductive element 1016 (auxiliary conductive element 1016). The auxiliary conductive element 1016 may be a conductive trace positioned on the circuit substrate 1012, and may be conductively coupled to the antenna connection feature 1006-2, and selectively conductively coupled to the antenna connection feature 1006-1 (e.g., via a switching component 1014). When the switching component 1014 is engaged, the auxiliary conductive element 1016 combines with the length of the housing component 1002 to communicate via a different frequency range (e.g., a lower frequency range than just the housing component 1002 alone).

The auxiliary conductive element 1016 may be selectively engaged in accordance with a determination that an operational condition of the connector module 1008 is satisfied. The operational condition may correspond, for example, to a cable being connected to the connector module 1008. For example, the auxiliary conductive element 1016 may be engaged (and thus produce a radiating element having a different length and/or tuning) in response to a determination that a cable (e.g., a charging and/or communications cable) is connected to the connector module 1008. In another example, the auxiliary conductive element 1016 may be engaged in response to a particular charging or communication operation being performed at the connector module 1008. For example, the auxiliary conductive element 1016 may be engaged in response to the connector module 1008 communicating via a USB 3.0 protocol (e.g., over a USB cable coupled to the connector module 1008), or via a certain display protocol (e.g., by which the device is providing graphical information via the connector module 1008 to display graphical outputs on an external display). Other operational conditions are also contemplated.

In addition to selectively engaging the auxiliary conductive element 1016 in response to the operational condition being satisfied, the device may also disable operation of the housing component 1001 as a radiating element for a certain frequency band. Thus, the device may essentially use the conductively extended housing component 1002 instead of the housing component 1001 as the radiating element for the particular frequency band.

In some cases, in a first mode of operation (e.g., an operational condition is not satisfied, as described above), a processing system of the device 1000 may cause the housing component 1001 to operate as a radiating element for a first frequency band and cause the housing component 1002 to operate as a radiating element for a second frequency band. In second mode of operation (e.g., an operational condition is satisfied, as described above), the processing system may cause the auxiliary conductive element 1016 to be selectively coupled to the housing component 1002, and may cause the housing component 1002 and the auxiliary conductive element 1016 to be used as a radiating element for the first frequency band. The first mode of operation may correspond to a charging cable being decoupled from a connector module (e.g., the connector module 1008), and the second mode of operation may correspond to the charging cable being coupled to a connector module (e.g., the connector module 1008).

Figure 10C:
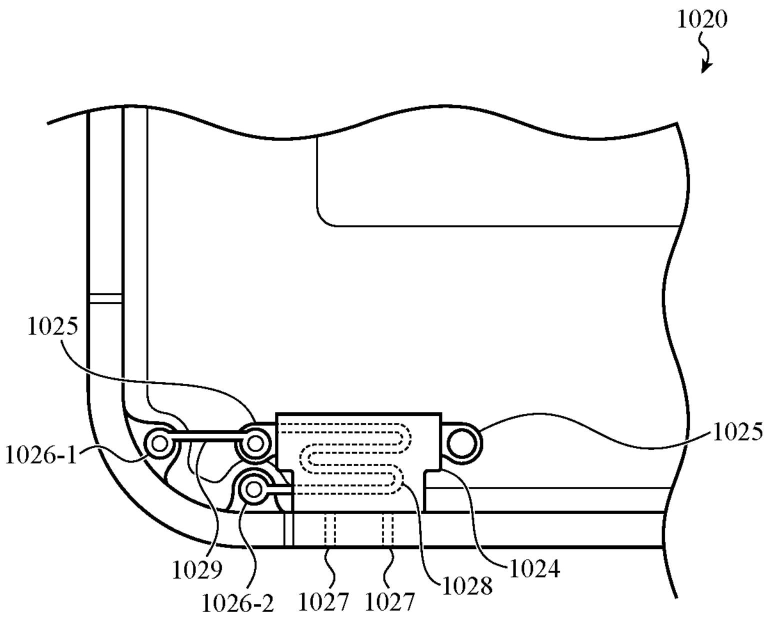
FIG. 10C depicts a portion of an example electronic device with antennas.

FIG. 10C illustrates a portion of an example device 1020 that includes an auxiliary conductive element 1028. The auxiliary conductive element 1028 may operate substantially the same as the selectively couplable auxiliary conductive element 1016, and the discussion of the element 1016 applies equally to the element 1028. The auxiliary conductive element 1028 may be coupled to a separate module, component, or structure within a device. For example, the auxiliary conductive element 1028 may be at least partially encapsulated in a molded polymer structure. In some cases, auxiliary conductive element 1028 (e.g., a metal strip, conductive trace, wire, or other conductive member) may be at least partially (and optionally fully) contained in a housing of another module. In some cases, the auxiliary conductive element 1028 may be at least partially (and optionally fully) encapsulated in a polymer housing material of the module (e.g., via an insert molding process). As one example, the auxiliary conductive element 1028 may be coupled to a speaker module 1024, which contains a speaker and is configured to direct audio output through audio ports 1027 in the housing. The speaker module 1024 may define mounting features 1025, which may be conductive and may also serve as a conductive coupling feature between the auxiliary conductive element 1028 and other components. For example, the auxiliary conductive element 1028 may be conductively coupled to a mounting feature 1025, which is then used to secure the speaker module 1024 to the device housing. A conductive member 1029 may conductively couple to the mounting feature 1025 and to an antenna connection feature 1026-1, thereby conductively coupling the auxiliary conductive element 1028 to the housing member. Another conductive end of the auxiliary conductive element 1028 may couple to another antenna connection feature 1026-2, thereby completing the conductive coupling of the auxiliary conductive element 1028 to the housing. A switching component may be positioned within the module housing, or elsewhere in the antenna circuit, to switch the auxiliary conductive element 1028 in or out of the antenna circuit.

Figure 10D:
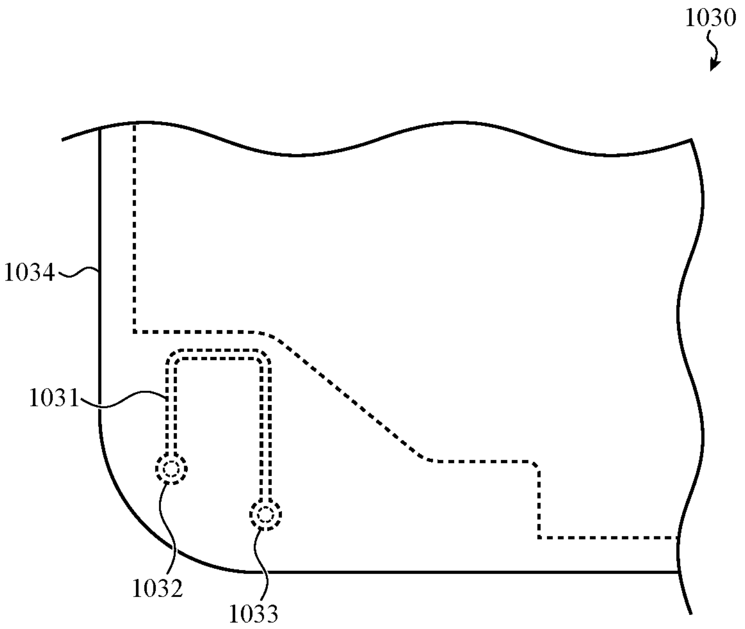
FIG. 10D depicts a portion of a front cover assembly with a conductive member for an antenna.

FIG. 10D illustrates a portion of a front cover assembly 1030, and more particularly, a corner portion of a front cover assembly 1030 that may be positioned over a housing component that is configured to have an auxiliary conductive element selectively coupled thereto. As shown, an auxiliary conductive element 1031 may be positioned on an interior surface of a front cover 1034. When the front cover assembly 1030 is coupled to a housing, conductive connection features 1032, 1033 may conductively couple to antenna connection features of the device. A switching component may be coupled to the front cover 1034 or elsewhere in the antenna circuit to selectively conductively couple the conductive element 1031 to the housing component. The auxiliary conductive element 1031 may be a wire, conductive trace, conductive ribbon, or other conductive component. The auxiliary conductive element 1031 may be coupled to the front cover 1034 via adhesive, plating, deposition processes (e.g., CVD, PVD), mechanical fasteners, or the like. In some cases, the auxiliary conductive element 1031 is at least partially encapsulated in a polymer frame structure that is molded on the front cover 1034. In some cases, the auxiliary conductive element 1031 is a conductive trace on a circuit element that is coupled to the front cover 1034.

While the foregoing examples describe selectively couplable auxiliary conductive elements, such conductive elements may in some cases omit the switching component and may instead remain persistently conductively coupled to the housing components, thus extending the effective conductive length of the housing components for use in a target frequency range. Moreover, the use of the conductive elements described herein decouples the radiating length of the antenna elements from the constraints of the exterior housing dimensions. Thus, for example, for a given housing component size, different conductive lengths (and thus different frequency ranges) can be achieved by selecting different lengths of the conductive element.

Figure 10E:
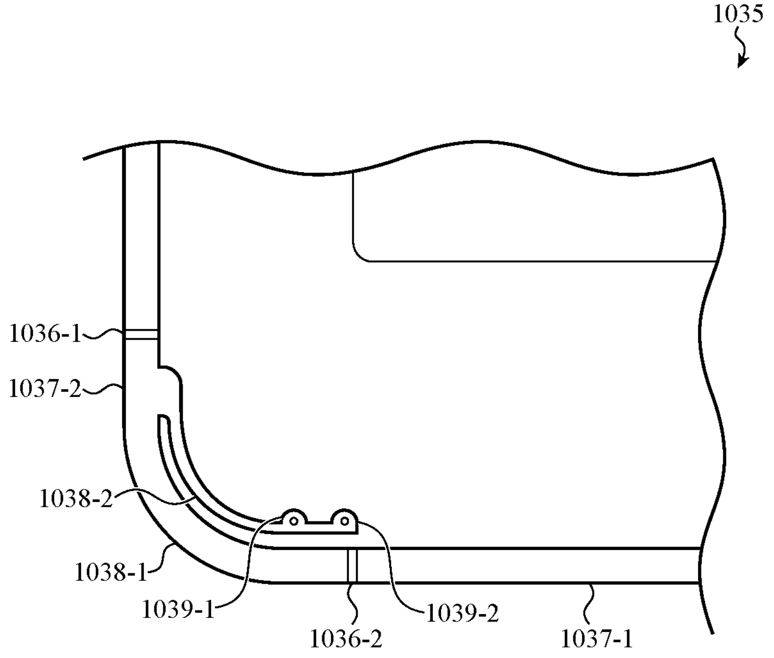
FIG. 10E depicts a portion of an example electronic device with antennas.

FIG. 10E illustrates an example housing structure 1035, in which a housing component may include an internal conductive segment that defines a conductive length that is longer than the dimension of the exterior surface of the housing component. The housing structure 1035 may include housing components 1037-1, 1037-2 that are coupled by a joint structure 1036-2. The housing components 1037-1, 1037-2 may each operate as a radiating antenna element (or in some cases the housing component 1037-1 may not operate as a radiating antenna element). While the length of the exterior surface defined by the housing component 1037-2 may not provide sufficient length to operate as allow band antenna, the housing component 1037-2 includes an internal segment 1038-2 that is separated from an external segment 1038-1 (which defines an exterior surface of the housing) by a gap. Stated another way, an effective conductive length of the housing component 1037-2 may include the lengths of both the internal and external segments 1038-2, 1038-1. This length may facilitate operation of the housing component 1037-2 as a radiating element for a low-band antenna system. The housing component 1037-2 may be conductively coupled to antenna circuitry via conductive couplers 1039-1, 1039-2 (which may act as feed and/or ground points to the radiating element for the antenna circuitry).

Figure 10F:
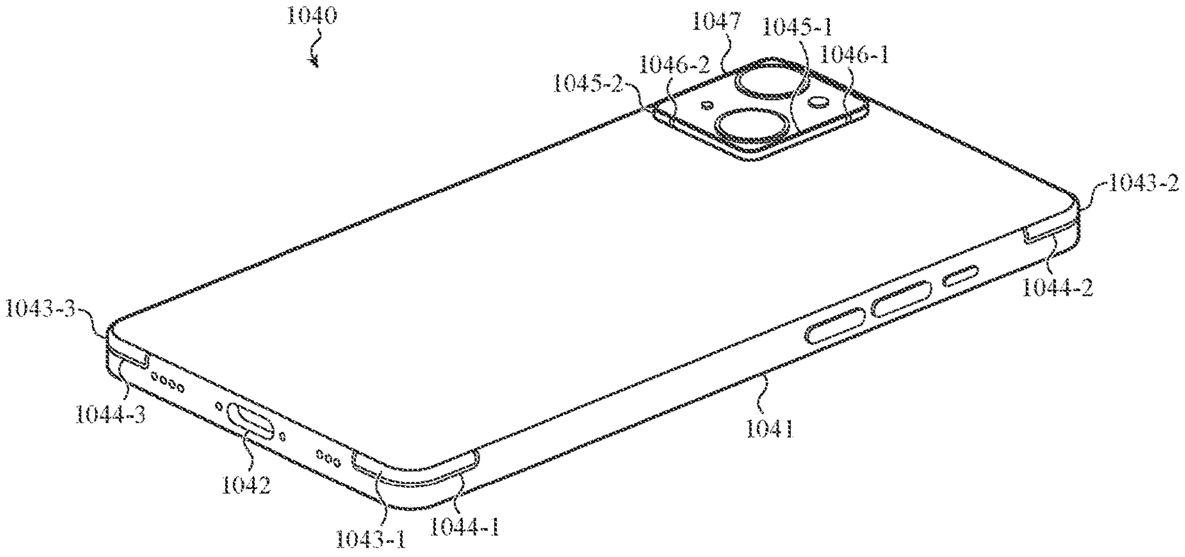
FIGS. 10F-10H depict example electronic devices with housing components joined by joint structures.
Figure 10G:
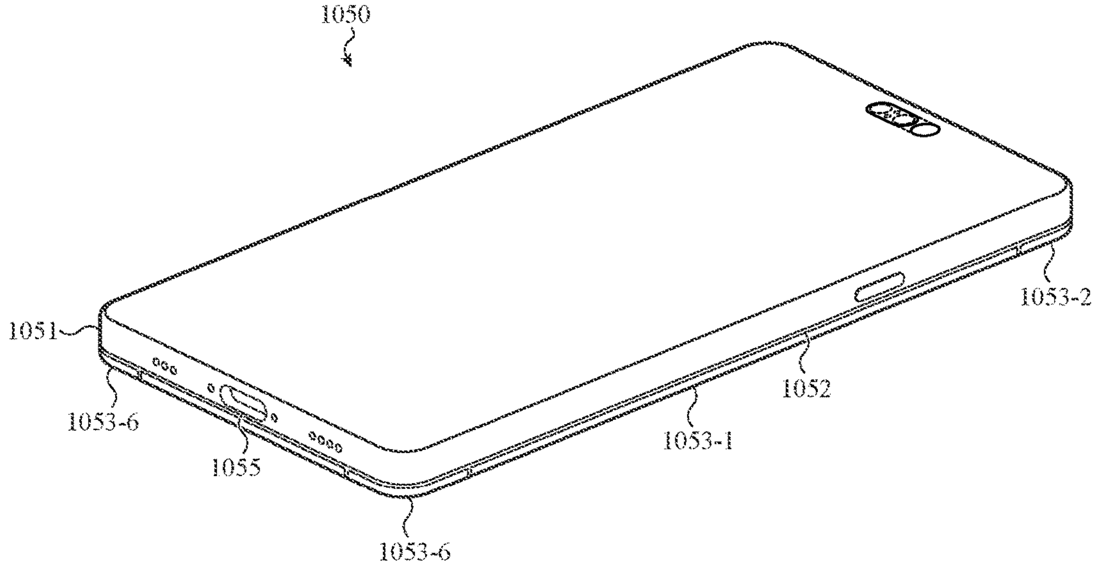

As described herein, housing components may operate as radiating elements for antenna systems. To facilitate the use of housing components as radiating elements, conductive members of the housing structure may be coupled to other housing components via nonconductive joint structures, thereby aiding in defining particular radiating lengths and otherwise configuring the frequency bands in which the conductive members may radiate. However, as noted above, certain components, such as a connector module for charging and communications, may interfere with the antenna operations of a conductive housing component. FIGS. 10F-10G illustrate example housing structures in which conductive housing components are coupled together using nonconductive joint structures to facilitate the use of certain housing components as radiating elements for antennas.

FIG. 10F illustrates an example device 1040 that includes a main housing component 1041. The main housing component 1041 may be a ring-shaped member that defines a portion of each of four peripheral sides of the device 1040. The housing may also include housing components 1043-1-1043-3, which each define a portion of one or more peripheral sides of the device 1040. As shown, the housing components 1043 define portions of the corners of the housing, and thus each define portions of two peripheral sides.

The housing components 1043 may be formed from a conductive material (e.g., a metal such as aluminum, stainless steel, titanium, or another conductive material), and may be conductively coupled to antenna circuitry within the device 1040 to operate as radiating elements. The housing components 1043 may have lengths that are tuned to particular frequency ranges, as described herein, and may define or be coupled to internal conductive members (e.g., selectively couplable auxiliary conductive elements) to provide target conductive lengths.

The housing components 1043 may be coupled to the main housing component 1041 via joint structures 1044-1-1044-3. The joint structures 1044 may be formed from nonconductive materials, and may mechanically couple the housing components 1043 to the main housing component 1041 while also defining an electrical isolation therebetween. The joint structures 1044 may be similar or analogous to other joint structures defined herein (e.g., with respect to the function, structures, interlocking and engagement features, etc.), and those descriptions will be understood to apply equally to the joint structures 1044. While FIG. 10F shows one view of the device 1040 to illustrate several example housing components 1043, the device 1040 may also include other housing components 1043 (e.g., along the sides facing away from the page).

In some cases, the device 1040 may also include conductive structures 1045 at least partially surrounding (and/or defining) a periphery of a rear-facing camera assembly 1047 (which may protrude from a surface of a rear cover). The conductive structures 1045-1 and 1045-2 may be coupled with joint structures 1046-1 and 1046-2, similar to other housing structures and joint structures described herein, and those descriptions will be understood to apply equally to the conductive structures 1045 and joint structures 1046. The sizes, lengths, and positions of the housing structures, conductive structures, and joint structures in FIG. 10F are merely examples, and other sizes, lengths, and positions of these components are also contemplated.

In the example device 1040, a connector module may be positioned proximate a hole 1042, such that a cable can be coupled to the connector module through the hole 1042. By positioning the connector module and the hole 1042 in the main housing component 1041 and using the housing components 1043 as radiating antenna elements (e.g., instead of the main housing component 1041), antenna performance can be maintained without undue interference from the connector module.

FIG. 10G illustrates an example device 1050 that includes a main housing component 1051. The main housing component 1051 may be a ring-shaped member that defines a portion of each of four peripheral sides of the device 1050. The housing may also include housing components 1053 (e.g., 1053-1-1053-6), which each define a portion of one or more peripheral sides of the device 1050.

The housing components 1053 may be formed from a conductive material (e.g., a metal such as aluminum, stainless steel, titanium, or another conductive material), and may be conductively coupled to antenna circuitry within the device 1050 to operate as radiating elements. The housing components 1053 may have lengths that are tuned to particular frequency ranges, as described herein, and may define or be coupled to internal conductive members (e.g., selectively couplable auxiliary conductive elements) to provide target conductive lengths. The housing components 1053 may define portions of side surface of the device 1050, and may generally extend around a peripheral side of a rear cover of the device 1050. While FIG. 10G shows one view of the device 1050 to illustrate several example housing components 1053, the device 1050 may also include other housing components 1053 (e.g., along the sides facing away from the page).

The housing components 1053 may be coupled to the main housing component 1051 via a joint structure 1052. The joint structure 1052 may be formed from nonconductive materials, and may mechanically couple the housing components 1053 to the main housing component 1051 while also defining an electrical isolation therebetween. The joint structure 1052 may be similar or analogous to other joint structures defined herein (e.g., with respect to the function, structures, interlocking and engagement features, etc.), and those descriptions will be understood to apply equally to the joint structure 1052. The joint structure 1052 may define multiple segments that are positioned between multiple different housing components and/or multiple different sides of the housing components. In some cases, the joint structure 1052 may be formed from a unitary polymer structure, and may define part of each side surface of the device 1050 (e.g., it may define a portion of each side surface of the device). For example, a portion of the joint structure 1052 may define a ring that extends around the entire periphery of the device 1050. The joint structure 1052 may also define extension portions that extend from the ring and are positioned between ends of the housing components 1053.

In the example device 1050, a connector module may be positioned proximate a hole 1055, such that a cable can be coupled to the connector module through the hole 1055. By positioning the connector module and the hole 1055 in the main housing component 1051 and using the housing components 1053 as radiating antenna elements (e.g., instead of the main housing component 1051), antenna performance can be maintained without undue interference from the connector module.

In some cases, the device 1050 may also include conductive structures at least partially surrounding (and/or defining) a periphery of a rear-facing camera assembly (e.g., the same as or similar to the conductive structures 1045), which may be coupled with joint structures (e.g., the same as or similar to joint structures 1046). The descriptions of those features will be understood to apply equally to the device 1050. The sizes, lengths, and positions of the housing structures, conductive structures, and joint structures in FIG. 10G are merely examples, and other sizes, lengths, and positions of these components are also contemplated.

Figure 10H:
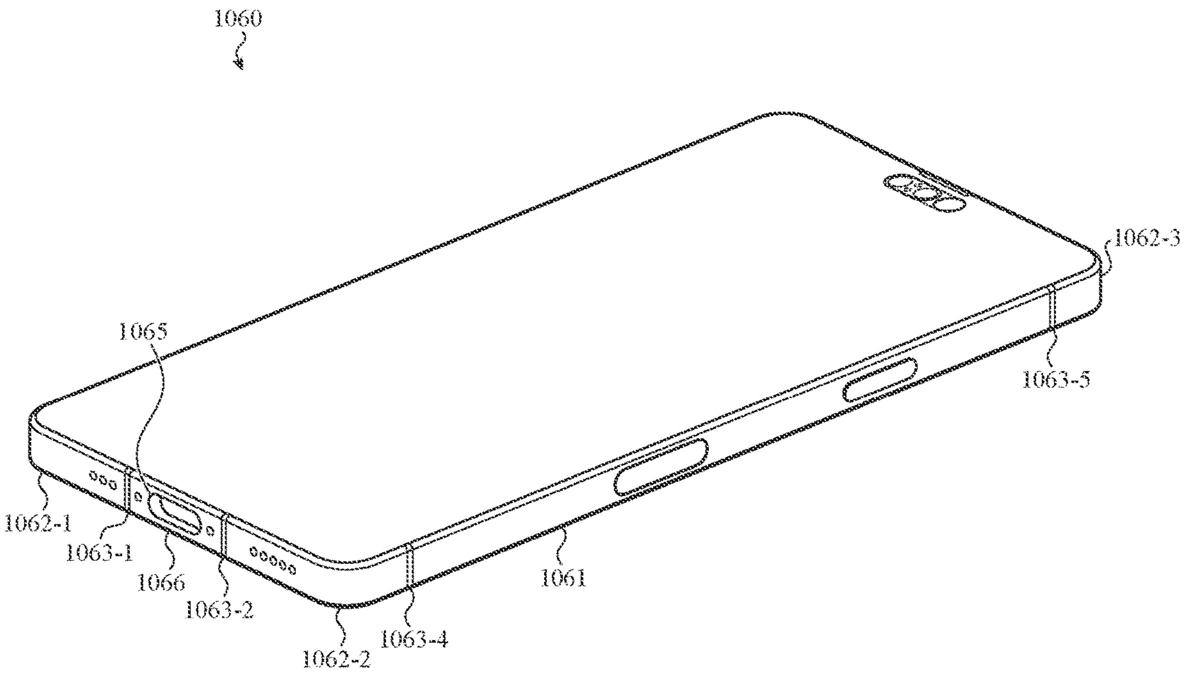

FIG. 10H illustrates an example device 1060 that includes a main housing component 1061, which may define a portion of at least two of the peripheral sides of the devices, as well as housing components 1062 (e.g., 1062-1-1062-3, plus others that are on a hidden side of the device).

At least some of the housing components 1061, 1062 may be formed from a conductive material (e.g., a metal such as aluminum, stainless steel, titanium, or another conductive material), and may be conductively coupled to antenna circuitry within the device 1060 to operate as radiating elements. The housing components 1062 may have lengths that are tuned to particular frequency ranges, as described herein, and may define or be coupled to internal conductive members (e.g., selectively couplable auxiliary conductive elements) to provide target conductive lengths.

The housing components 1062 may be coupled to the main housing component 1061 and to each other via joint structures 1063 (e.g., 1063-1-1063-5, plus others that are on a hidden side of the device). The joint structures 1063 may be formed from nonconductive materials, and may mechanically couple the housing components together while also defining an electrical isolation therebetween. The joint structures 1063 may be similar or analogous to other joint structures defined herein (e.g., with respect to the function, structures, interlocking and engagement features, etc.), and those descriptions will be understood to apply equally to the joint structures 1063. In the example of FIG. 10H, joint structures 1063-1 and 1063-2 may be positioned on opposite sides of a hole 1065 in a housing component 1066. The hole may allow cable access to a connector module for charging and communications functions. As described herein, the connector module may interfere with or reduce the performance of housing components that are configured to operate as radiating antenna elements. Accordingly, by isolating the housing components 1062-1 and 1062-2 from the housing component 1066 (which is coupled to or proximate the connector module) with the joint structures 1063-1, 1063-2, interference between the connector module and the housing components 1062-1 and 1062-2 may be reduced or attenuated. The joint structures 1063-1, 1063-2 may be positioned equidistant from a center of the hole 1065 on either side of the hole 1065. Moreover, the lengths and shapes of the housing components 1062-1, 1062-2 may be tuned for antenna operation at particular frequency bands. In some cases, selectively couplable auxiliary conductive elements may be coupled to one or more of the housing components 1062 to tune the housing components for particular frequency bands.

Figure 11A:
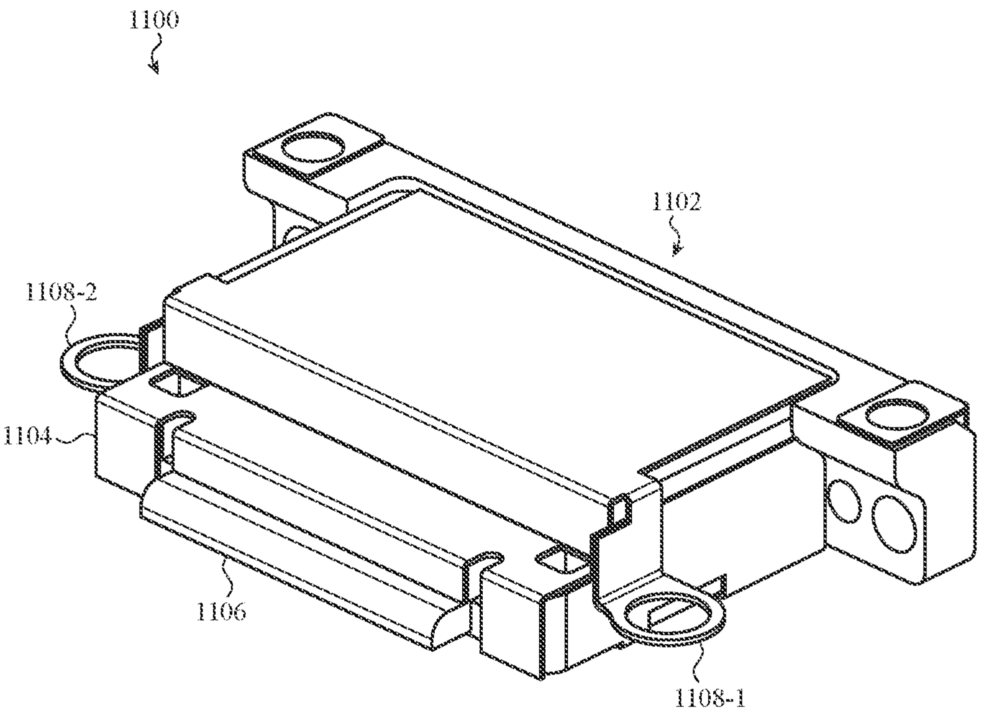
FIGS. 11A-11B depict an example connector module of an electronic device.
Figure 11B:
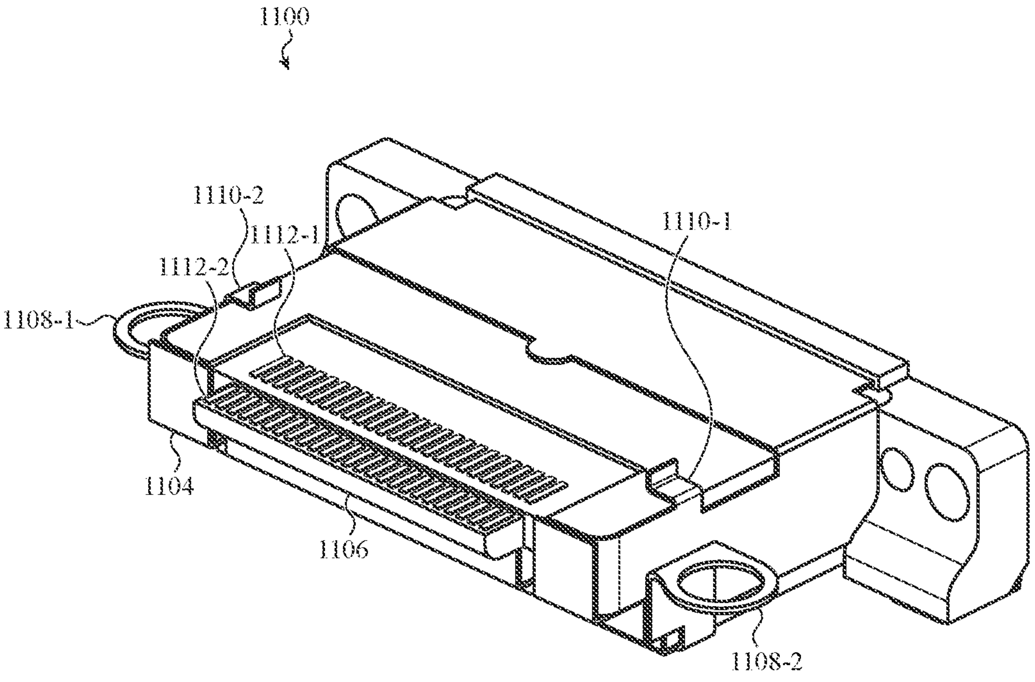

FIGS. 11A-11B illustrate an example connector module 1100 that may be used with a device as described herein. The connector module 1100 may correspond to or be an embodiment of the connector module 1008, connector modules associated with charging ports 112, 232, 332, or other connector modules described herein. The connector module 1100 may include a receptacle 1102 that is configured to receive a plug therein. The receptacle 1102 may be configured to receive a plug corresponding to various configurations, standards, and the like. For example, the receptacle 1102 may be configured to receive a universal serial bus plug (e.g., USB-C, USB-A, mini USB, micro USB, etc.), a Lightning connector, or the like.

The connector module 1100 may be conductively coupled to circuitry within a device, and may facilitate communications (e.g., electronic communications with another device, via a cable), and/or charging (e.g., receiving power from another device or accessory to charge a battery or otherwise provide power to the device). The connector module 1100 may be configured for communications using various protocols, standards, or the like. For example, the connector module 1100 may be configured for communicating via a USB protocol (e.g., USB 1.x, USB 2.0, USB 3.x, USB 4), Lightning protocol, or any other suitable communications protocol.

The connector module 1100 may include a shielding structure 1104 that is configured to electromagnetically shield components of the connector module 1100. For example, the shielding structure 1104 may prevent or inhibit electromagnetic interference between the connector module 1100 and other components within a device (e.g., antennas, processors, memory, etc.). The shielding structure 1104 may be formed from metal (e.g., aluminum, stainless steel, etc.), and may at least partially surround certain components of the connector module 1100. For example, the shielding structure 1104 may include a shroud portion 1106 that at least partially surrounds connection terminals 1112-1, 1112-2. The shielding structure 1104, including the shroud portion 1106, may substantially shield along at least three sides of the connection terminals 1112.

The connection terminals 1112 may be soldered to a circuit element (e.g., a flexible circuit board) to conductively couple the connector module 1100 to other electronic components of a device. In some cases, high-speed data signals are transmitted via the connection terminals 1112, and the shielding structure 1104 may shield the terminals (and/or other components of the connector module 1100) to prevent or inhibit external interference from interfering with the communications, and to prevent or inhibit the communication signals from interfering with other components or systems.

The shielding structure 1104 may include attachment tabs 1108 (1108-1, 1108-2) that are used to secure the connector module 1100 to a device (e.g., via threaded fasteners), and may also conductively couple the shielding structure 1104 to an electrical ground of the device. For example, a housing component of a device may define an electrical ground, and the attachment tabs 1108, which are part of the shielding structure, may conductively couple to the housing component to ground the shielding structure 1104. The shielding structure 1104 may also define connection tabs 1110 (1110-1, 1110-2), which may conductively couple the shielding structure 1104 to another component, such as the flexible circuit board to which the connection terminals 1112 are coupled. The connection tabs 1110 may define a conductive connection to ground on the flexible circuit board (or other component to which the connector module 1100 is coupled).

Figure 11C:
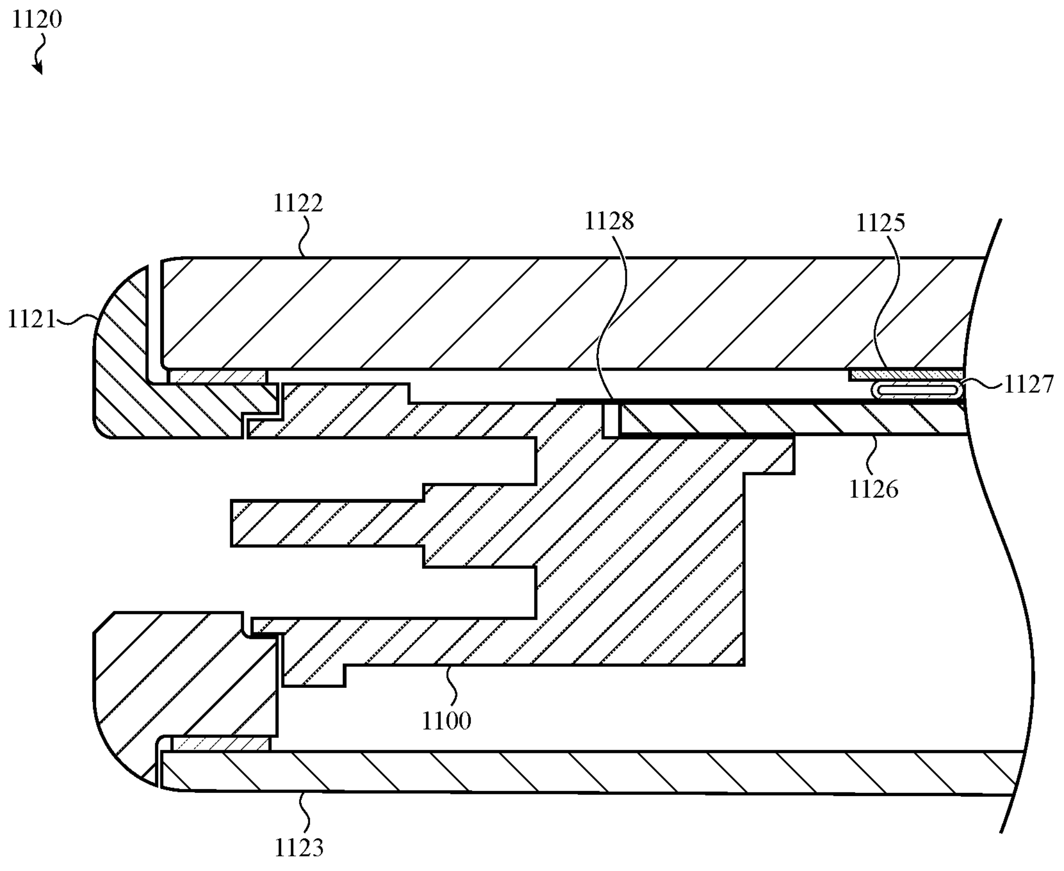
FIG. 11C depicts a partial cross-sectional view of an electronic device with an example connector module.

FIG. 11C is a partial cross-sectional view of an example device 1120, viewed along a line corresponding to 11C-11C in FIG. 1A. FIG. 11C illustrates the connector module 1100 in position in the device 1120. In particular, the connector module 1100 is coupled to a housing component 1121 and is aligned with a hole to receive a connector therethrough. The connector module 1100 is positioned between a front cover assembly 1122 and a rear cover assembly 1123. The connector module 1100 (e.g., a shield component of the connector module 1100) may be conductively coupled to a circuit element 1126 (e.g., a flexible circuit element), which may include conductive traces to conductively interconnect the connector module 1100 to other components within the device (e.g., a main logic board and/or processing system). A conductive member 1128 may also conductively couple the connector module 1100 to the circuit element 1126 and a chassis 1125 of the device. The chassis 1125 may correspond to mid-chassis section or lower-chassis section of a housing, as described herein. The conductive member 1128 may define an electrical ground or ground path for the connector module 1100, the circuit element 1126, and the chassis 1125. The conductive member 1128 may be a conductive tape, ribbon, or sheet, such as a copper tape. In other examples, the conductive member 1128 is a wire or a flexible circuit element with a conductive trace. The conductive member 1128 may be conductively coupled to the chassis 1125 via a conductive loop 1127, which may include a conductive material on a flexible loop. The conductive material may contact the chassis 1125 and the conductive member 1128 to conductively couple them together.

In some cases, the conductive member 1128 may not extend to the chassis 1125, and the conductive coupling to the chassis 1125 and the conductive loop 1127 may be omitted. In such cases, the conductive member 1128 may conductively couple the connector module 1100 to the circuit element 1126.

Figure 12:
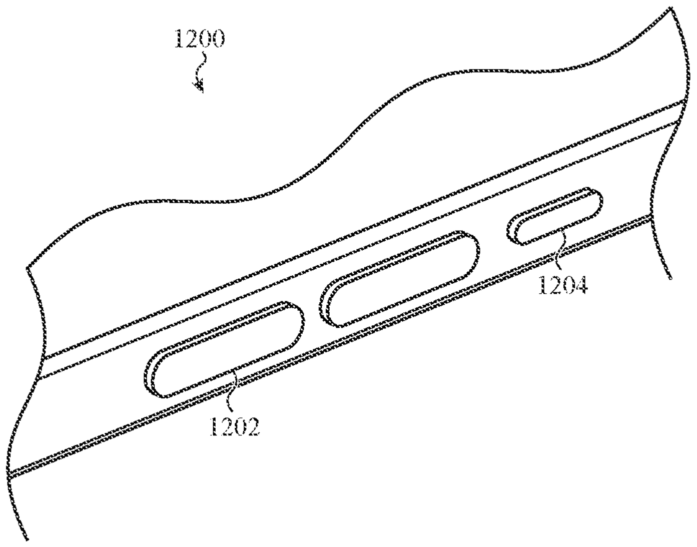
FIG. 12 depicts a portion of an electronic device.

FIG. 12 illustrates a portion of a device 1200 showing example buttons 1202, 1204 that may be provided along a side of the device housing. The buttons may accept user inputs and cause the device 1200 to perform one or more operations in response to the user inputs. For example, the button 1202 may control a volume of the device by allowing a user to press on opposite ends of the button 1202, and the button 1204 may toggle the device between a ring mode (e.g., a first ringer mode) and a silent mode (e.g., a second ringer mode).

In some cases, the button 1204 may be a momentary button or may otherwise be configured to operate as a momentary or binary input. For example, the button 1204 may be biased in an undepressed or unactuated position and may be actuated by a pressing force (or another suitable actuation force). Upon removal of the pressing force, the button 1204 may return to its undepressed or unactuated position. The button 1204 (which may include a button member that a user interacts with as well as other components within the device 1200 that produce signals in response to the user interactions) may be configured to produce a binary or momentary signal in response to actuation, or the device may otherwise be configured to respond to the actuation of the button 1204 in a manner consistent with a momentary button. For example, the button 1204 may include a dome switch that collapses and closes an electrical circuit when the button 1204 is pressed with sufficient force, and that returns to an uncollapsed state (and opens the circuit) when the force is removed. As another example, the button 1204 may include a force sensor, and the device 1200 may initiate an operation in response to detecting that a force exceeding a threshold is applied to the button 1204.

As noted above, when the device 1200 is in some modes of operation, the button 1204 may be used to toggle the device between ringer modes (e.g., the button 1204 may operate as a momentary ringer-control button). For example, pushing the button 1204 when the device is in a first ringer mode (e.g., an "audible" mode), may cause the device 1200 transition to a second ringer mode (e.g., a "silent" mode). Similarly, pushing the button 1204 when the device is in the second ringer mode (e.g., the "silent" mode), may cause the device 1200 to transition to the first ringer mode (e.g., the "audible" mode).

In some cases, in the first ringer mode, an audio output system of the device 1200 produces an audible alert in response to the device 1200 receiving an incoming call, and in the second ringer mode, the audio output system does not produce the audible alert in response to the device 1200 receiving the incoming call.

In the case where the device 1200 has additional ringer modes (e.g., vibrate only, vibrate plus ring, etc.), subsequent actuations of the button 1204 may cycle through the various modes. The button 1204 may operate to toggle or cycle through ringer modes, unless the device is in a mode of operation that overrides the ringer control functions. Modes of operation in which the ringer control functions are overridden may correspond to the device executing a certain application or presenting a certain user interface. As one example, if the device 1200 is in a camera or image capture mode, the button 1204 may be configured as a shutter button. Thus, if the device is in a first mode of operation (e.g., the device 1200 is not executing an application with override permissions), the device may change ringer modes in response to actuation of the button 1204. If the device is in a second mode of operation (e.g., an image capture mode) the device may initiate a different device function in response to detecting the actuation of the button 1204 (e.g., capturing an image). In some cases, the modes of operation in which the button 1204 initiates functions other than changing a ringer mode are limited, so as to avoid confusion about the typical function of the button 1204. Further, while an image capture mode is used as an example of a second mode of operation of the device, other modes, applications, user interfaces, or the like may correspond to the second mode of operation, and the function of the button 1204 may be tailored to the available functions of those modes.

Because the button 1204 is configured as a momentary button, the button 1204 may not provide any visual indication of the ringer mode of the device. By contrast, a two position toggle switch may indicate the ringer mode based on the position of the switch (e.g., up for silent, down for audible), and may even include separate visual indicators (e.g., different colors or symbols may visible in the different positions). However, because the momentary button may not provide a visual indication of the ringer mode, it may be advantageous to provide a visual indication elsewhere on the device. FIGS. 13A-13F illustrate various examples of visual indications that may be provided by the device 1200 to indicate the ringer mode of the device.

Figure 13A:
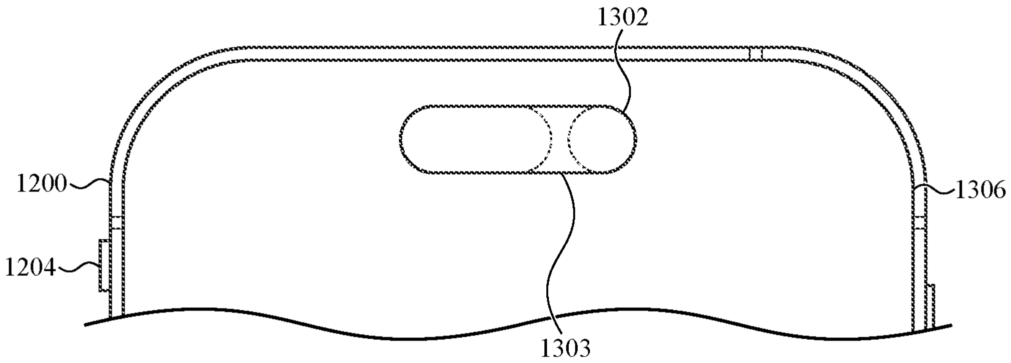
FIGS. 13A-13F depict example graphical outputs on a display of an electronic device.

FIG. 13A illustrates a partial front view of the device 1200 with a front-facing sensor region 1302. The front-facing sensor region 1302 may be at least partially, and optionally completely, surrounded by a primary display region of a display 1306 (e.g., the front-facing display of the device). The device 1200 may include or be configured to display a first supplemental display region 1303 (e.g., in the front-facing sensor region 1302), as described above. The device 1200 may also include or be configured to display a second supplemental display region 1309 (FIG. 13B), which may appear as an expanded or extended region of the front-facing sensor region 1302). FIG. 13A illustrates the device 1200 while no visual indication is provided on the display 1306.

Figure 13B:
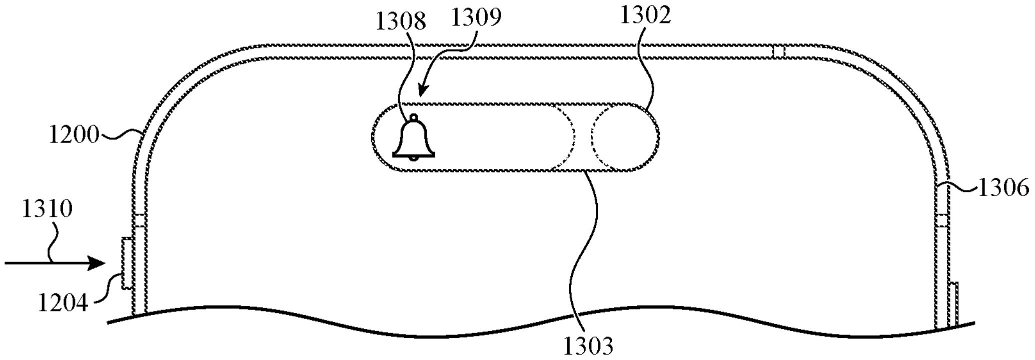

FIG. 13B illustrates the device 1200 after actuation of the button 1204 (e.g., in response to an input force 1310 on the button 1204), and while a first ringer mode of the device is active (e.g., a "silent" mode is active). In particular, in response to detecting the actuation of the button 1204, the device 1200 (e.g., a processing system of the device 1200) may transition device 1200 to a different ringer mode, and may cause a graphical element 1308 indicative of the different ringer mode to be displayed by the display 1306. The graphical element 1308 may be displayed in the second supplemental display region 1309 (as shown in FIG. 13B), or the first supplemental display region 1303. The graphical element 1308 may be transient (e.g., displayed only for a limited amount of time) or it may be persistent (e.g., displayed as long as the device is in that mode). In some cases, the graphical element 1308 may be displayed as an always-on display element and/or by an always-on-display, such that the graphical element 1308 is displayed even when the display is otherwise inactive (e.g., when no graphical content is displayed in a primary display region of the display).

In some cases, the manner in which the graphical element 1308 is displayed depends in part on a mode of operation of the device. For example, if the display is active and/or displaying a graphical user interface or other graphical output in the primary display region (e.g., a first state or first mode of operation), the graphical element 1308 may be displayed temporarily (e.g., for a predetermined time after the actuation of the button). If the display is inactive, blank, and/or not displaying a graphical user interface or other graphical output (e.g., a second state or second mode of operation), the graphical element 1308 may be persistent.

As shown in FIG. 13B, the graphical element 1308 is a bell, indicating that the device is in an audible ringer mode. Other graphical elements may be used instead of or in addition to a bell to indicate an audible ringer mode (or any other mode that the actuation of the button initiated).

Figure 13C:
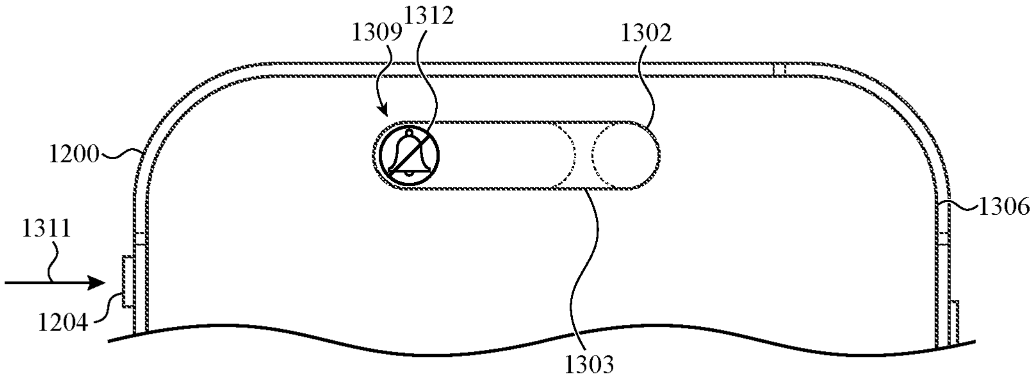

FIG. 13C illustrates the device 1200 after actuation of the button 1204 (e.g., in response to an input force 1311 on the button 1204), and while a second ringer mode of the device is active (e.g., an "audible" mode is active). In particular, in response to detecting the actuation of the button 1204, the device 1200 (e.g., a processing system of the device 1200) may transition device 1200 to a different ringer mode, and may cause a graphical element 1312 indicative of the different ringer mode to be displayed by the display 1306. The graphical element 1312 may be displayed in the second supplemental display region 1309 (as shown in FIG. 13C), or the first supplemental display region 1303. The graphical element 1312 may be transient (e.g., displayed only for a limited amount of time) or it may be persistent (e.g., displayed as long as the device is in that mode). In some cases, the graphical element 1312 may be displayed as an always-on display element and/or by an always-on-display, such that the graphical element 1312 is displayed even when the display is otherwise inactive. In some cases, the manner in which the graphical element 1312 is displayed depends in part on a mode of operation of the device. For example, if the display is active and/or displaying a graphical user interface or other graphical output in the primary display region (e.g., a first mode of operation), the graphical element 1312 may be displayed temporarily (e.g., for a predetermined time after the actuation of the button). If the display is inactive and/or not displaying a graphical user interface or other graphical output (e.g., a second mode of operation), the graphical element 1312 may be persistent.

In some cases, the graphical element for one ringer mode may be persistent, while the graphical element for another ringer mode may be transient. For example, the graphical element 1312 for the silent mode may be persistent, while the graphical element 1308 for the audible mode may be transient. Moreover, in cases where a graphical element is transient, the supplemental display region 1309 may collapse or otherwise cease to be displayed after the graphical element is removed.

As shown in FIG. 13C, the graphical element 1312 is a bell in a circle-backslash, indicating that the device is in a silent ringer mode. Other graphical elements may be used to indicate a silent ringer mode (or any other mode that the actuation of the button initiated).

Figure 13D:
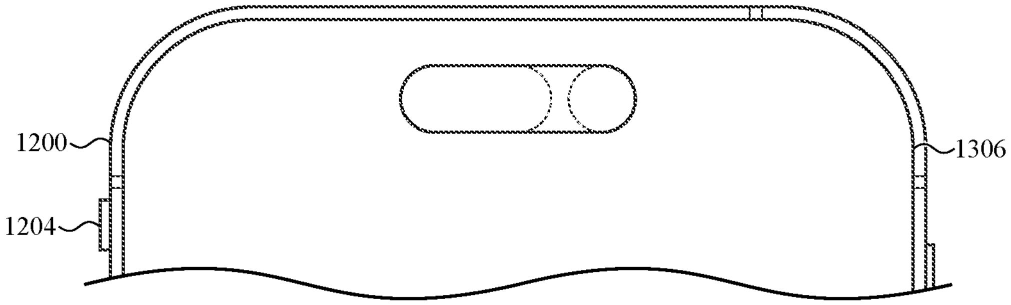
Figure 13E:
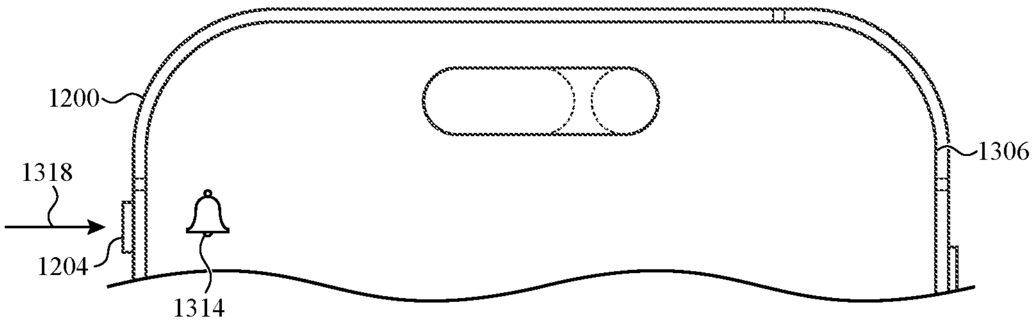
Figure 13F:
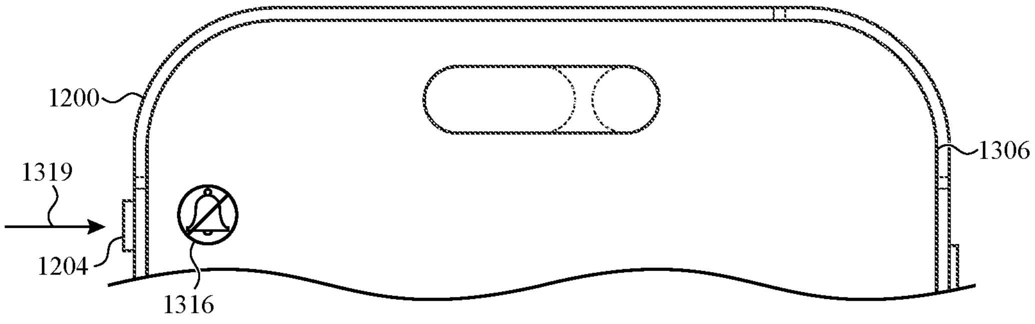

FIGS. 13D-13F illustrate another example manner in which graphical elements may displayed by the device 1200. FIG. 13D illustrates the device 1200 while no visual indication is provided on the display 1306. FIG. 13E illustrates the device 1200 after actuation of the button 1204 (e.g., in response to an input force 1318 on the button 1204), and while a first ringer mode of the device is active (e.g., a "silent" mode is active). In particular, in response to detecting the actuation of the button 1204, the device 1200 (e.g., a processing system of the device 1200) may transition device 1200 to a different ringer mode, and may cause a graphical element 1314 indicative of the different ringer mode to be displayed by the display 1306. The graphical element 1314 may be displayed proximate the button 1204 (or any other suitable region of the display). The graphical element 1314 may be displayed regardless of what the display 1306 is otherwise displaying in the primary region. For example, the graphical element 1314 may be displayed as shown in FIG. 13E when the display 1306 is otherwise inactive, or while the display 1306 is displaying a graphical user interface, image, video, or other graphical output.

The graphical element 1314 may be transient (e.g., displayed only for a limited amount of time) or it may be persistent (e.g., displayed as long as the device is in that mode). In some cases, the graphical element 1314 may be displayed as an always-on display element and/or by an always-on-display, such that the graphical element 1314 is displayed even when the display is otherwise inactive. In some cases, the manner in which the graphical element 1314 is displayed depends in part on a mode of operation of the device. For example, if the display is active and/or displaying a graphical user interface or other graphical output in the primary display region (e.g., a first mode of operation), the graphical element 1314 may be displayed temporarily (e.g., for a predetermined time after the actuation of the button). If the display is inactive and/or not displaying a graphical user interface or other graphical output (e.g., a second mode of operation), the graphical element 1314 may be persistent.

As shown in FIG. 13B, the graphical element 1314 is a bell, indicating that the device is in an audible ringer mode. Other graphical elements may be used instead of or in addition to a bell to indicate an audible ringer mode (or any other mode that the actuation of the button initiated).

FIG. 13F illustrates the device 1200 after actuation of the button 1204 (e.g., in response to an input force 1319 on the button 1204), and while a second ringer mode of the device is active (e.g., an "audible" mode is active). In particular, in response to detecting the actuation of the button 1204, the device 1200 (e.g., a processing system of the device 1200) may transition device 1200 to a different ringer mode, and may cause a graphical element 1316 indicative of the different ringer mode to be displayed by the display 1306. The graphical element 1316 may be displayed proximate the button 1204 (or any other suitable region of the display).

The graphical element 1316 may be transient (e.g., displayed only for a limited amount of time) or it may be persistent (e.g., displayed as long as the device is in that mode). In some cases, the graphical element 1316 may be displayed as an always-on display element and/or by an always-on-display, such that the graphical element 1316 is displayed even when the display is otherwise inactive. In some cases, the manner in which the graphical element 1316 is displayed depends in part on a mode of operation of the device. For example, if the display is active and/or displaying a graphical user interface or other graphical output in the primary display region (e.g., a first mode of operation), the graphical element 1316 may be displayed temporarily (e.g., for a predetermined time after the actuation of the button). If the display is inactive and/or not displaying a graphical user interface or other graphical output (e.g., a second mode of operation), the graphical element 1316 may be persistent.

In some cases, the graphical element for one ringer mode may be persistent, while the graphical element for another ringer mode may be transient. For example, the graphical element 1316 for the silent mode may be persistent, while the graphical element 1314 for the audible mode may be transient.

As shown in FIG. 13F, the graphical element 1316 is a bell in a circle-backslash, indicating that the device is in a silent ringer mode. Other graphical elements may be used to indicate a silent ringer mode (or any other mode that the actuation of the button initiated).

The device 1200 may also include an audio output system and a haptic output system. In some cases, the device 1200 produces audible and/or haptic outputs in response to detecting actuations of the button 1204. The particular audible and/or haptic outputs that are produced in response to certain inputs may depend on the particular mode of operation of the device when the button 1204 is actuated (and thus depends on the function that the actuation of the button 1204 is configured to initiate). The device 1200 may produce an audible and/or haptic output in response to detecting that the button 1204 has been actuated. In some cases, the device 1200 may produce an audible and/or haptic output in response to detecting that the button 1204 has remained depressed for a threshold time. In some cases, the device 1200 may produce an audible and/or haptic output in response to detecting that the button 1204 has been depressed with a force that exceeds a threshold force (e.g., in cases where the button 1204 uses a force sensor that can detect an amount of applied force). The haptic and/or audible outputs may be configured to signify to the user that the actuation of the button 1204 has been detected and/or registered by the device. The haptic and/or audible outputs may be provided in addition to any tactile response that is produced by the button mechanism itself (e.g., in addition to a click response produced by a dome switch of the button 1204).

In some cases, haptic outputs from a haptic actuation system may be used to provide multiple haptic outputs at different actuation forces or actuation distances. For example, if the button 1204 is pressed with a first force (or pressed in a first distance), a first haptic output may be produced, and if the button 1204 is pressed with a second force greater than the first force (or pressed in a second distance greater than the first), a second haptic output may be produced. Additional force/travel thresholds may also be configured.

The particular function that is initiated at each threshold force and/or travel may depend on a mode of operation of a device. Thus, for example, when the device is in a first mode of operation, the button 1204 may respond to only a single threshold, and may initiate a certain operation and produce a certain haptic output (from an actuator, dome switch, etc.) when the threshold is met. When the device is in a second mode of operation, the button 1204 may respond to multiple thresholds, and may initiate certain operations and produce certain haptic outputs when each threshold is met.

In the above examples, certain examples of operations that may be performed in response to button actuation are provided, including transitioning between different ringer modes and capturing images using a camera of the device. Other operations are also contemplated in response to actuation of the button 1204, such as initiating a payment operation (e.g., a wireless payment operation using an NFC system or other wireless system), opening a digital wallet, initiating a voice assistant, initiating a new message draft, or the like. Moreover, the particular operations that are performed in response to a button actuation may depend, at least in part, on a mode of operation of the device. The mode of operation of the device may correspond to various different states and/or contexts of the device. For example, a mode of operation may correspond to the particular graphical user interface that is being displayed by the device, an application that is active or being executed by the device, a display mode (e.g., active or inactive), whether an image capture mode is active, whether a "do not disturb" mode is active or inactive, whether the device is currently in proximity of a payment terminal (as detected by an NFC system of the device), or the like. In some cases, where an active application determines the function of the button 1204, the device may change the function of the button 1204 in response to detecting that the application is active.

Figure 14A:
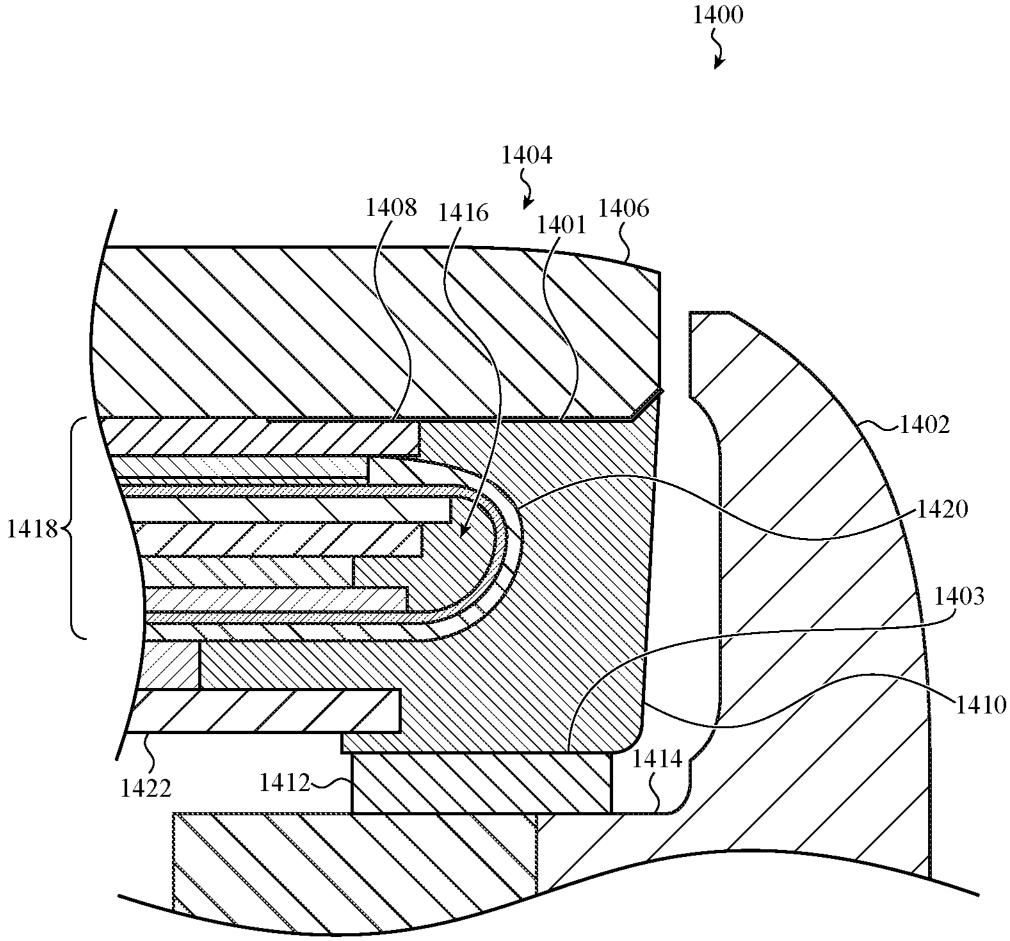
FIGS. 14A-14B depict partial cross-sectional views of a front cover assembly of an electronic device.

FIG. 14A illustrates a partial cross-sectional view of a device 1400, corresponding to a view along line 14A-14A in FIG. 1A, illustrating a portion of a front cover assembly 1404 and a housing 1402. As described herein, the front cover assembly 1404 may include a molded frame member 1410 (e.g., an overmolded frame member) that is positioned below a cover 1406 and at least partially encapsulates the edges of a display stack 1418. The molded frame member 1410 may be formed from a molded polymer material, as described herein.

The molded frame 1410 may be produced by molding a moldable material onto a subassembly that includes the cover 1406, the display stack 1418, and optionally other structural components. The subassembly may be positioned in a mold or other fixture, and a flowable material may be introduced into a mold cavity such that the material flows around the edges of the display stack 1418, contacts an interior surface of the cover 1406, and optionally engages other components of the subassembly (e.g., a support frame 1422, which may also be referred to herein as a back plate) that is below the display stack 1418 and acts as a shield and/or support structure for the display stack 1418). In some cases, the flowable material contacts a portion of the cover 1406 that includes a coating structure 1408 (which may be or may include one or more layers of ink, dye, films, etc.). The coating structure 1408 may be positioned on a peripheral portion of the interior surface of the cover 1406, and may define an opaque border around an active area of a display.

The flowable material then hardens to form the molded frame 1410. The hardening process also secures the material to the cover 1406, the display stack 1418, and any other components against which it flows during the molding process. The hardening operation may include exposing the flowable material to a light source (e.g., blue light, ultraviolet light, or any other suitable light source), heating the flowable material, or other operations or combinations of operations. The molded frame 1410 may define an upper surface 1401 that is coupled to the front cover 1406 (e.g., along the coating structure 1408) and a lower surface 1403 that is coupled to a housing (e.g., along a ledge 1414). As described herein, the ledge 1414 may be defined in part by a core portion and in part by a cladding portion of a housing component.

The mold in which the subassembly is placed and into which the flowable material is introduced may be formed from or include flexible material, such as a silicone rubber (e.g., a liquid silicone rubber), which may contact and seal against surfaces of the subassembly to define the mold cavity for the flowable material. For example, a mold member may include a silicone component that contacts a sealing surface 1435 of the support frame 1422 to define the boundary of the mold cavity and thus the size and/or shape of the molded frame 1410. The mold may seal against other surfaces of the subassembly as well. In some cases, the mold may be formed of a material that is transmissive to light in a curing wavelength of the flowable material, such that the flowable material can be at least partially cured while in the mold by directing suitable light through the mold.

The coating structure 1408 may define an opaque mask, such that the molded frame 1410 is not visible to a user through the front surface of the cover 1406. The coating structure 1408 may include an opaque layer. The molded frame 1410 may be bonded to a first portion of an outer layer of the coating structure 1408, and the display stack 1418 may be coupled to a second portion of the outer layer of the coating structure 1408, as shown in FIG. 14A. In some cases, the coating structure 1408 includes a transparent coating layer that defines the outer layer of the coating structure 1408.

The flowable material may be an epoxy, thermoset polymer, adhesive, or other suitable material. In some cases, the flowable material may be light-cured. For example, the flowable material may be an epoxy that is at least partially curable via light exposure (e.g., ultraviolet light, blue light, etc.).

During the molding operation, the flowable material may extend into a loop portion 1420 of the display stack 1418. The loop portion 1420 may be a flexible circuit element (or any other layer(s) of the display stack 1418) that wraps around a side of the display stack 1418 to electrically couple one or more electrically active layers of the display stack to a circuit element positioned along a bottom of the display stack 1418. The loop portion 1420 may include conductive traces that interconnect electrical components within the display stack 1418 (e.g., cathode and anode layers, electrode layers of touch and/or force sensors, on-cell touch-sensing layers, etc.) to other electrical traces, connectors, processors, or other electrical components.

When the molded frame 1410 is formed (e.g., using the molding operation described above), a portion of the flowable material may flow into a loop volume 1416 defined by the loop portion 1420. Further, as shown in FIG. 14A, the flowable material flows against and encapsulates the outer surface of the loop portion 1420. Thus, the molded frame 1410 may substantially completely encapsulate the loop portion 1420 along both the external and internal portions of the loop portion 1420, thereby defining a rigid support structure that may prevent or inhibit deformation of the loop portion 1420 due to impacts or other damage.

In some cases, the molded frame 1410 is formed of a material having a particular curing wavelength range (e.g., configured to cure when exposed to light within the particular wavelength range, such as ultraviolet, blue, etc.). In such cases, the loop portion 1420 is optically transmissive within the curing wavelength range. Thus, the light can pass through the loop portion 1420 and reach the flowable material that flowed into the loop volume 1416, thereby allowing the material in the loop volume 1416 to cure.

The molded frame 1410 may define a mounting structure by which the front cover assembly 1404 is attached to the housing 1402. For example, a lower surface 1403 of the molded frame 1410 may be coupled to a ledge 1414 defined (at least in part) by the housing 1402, while the upper surface 1401 of the molded frame 1410 may be couple to the cover 1406. The molded frame 1410 may be coupled to the ledge 1414 via an adhesive 1412, such as a pressure sensitive adhesive (PSA), heat sensitive adhesive (HSA), adhesive foam, or the like. The front cover assembly 1404 may also be coupled to the housing 1402 via attachment features such as latches, clips, interlocking structures, fasteners, and the like.

Figure 14B:
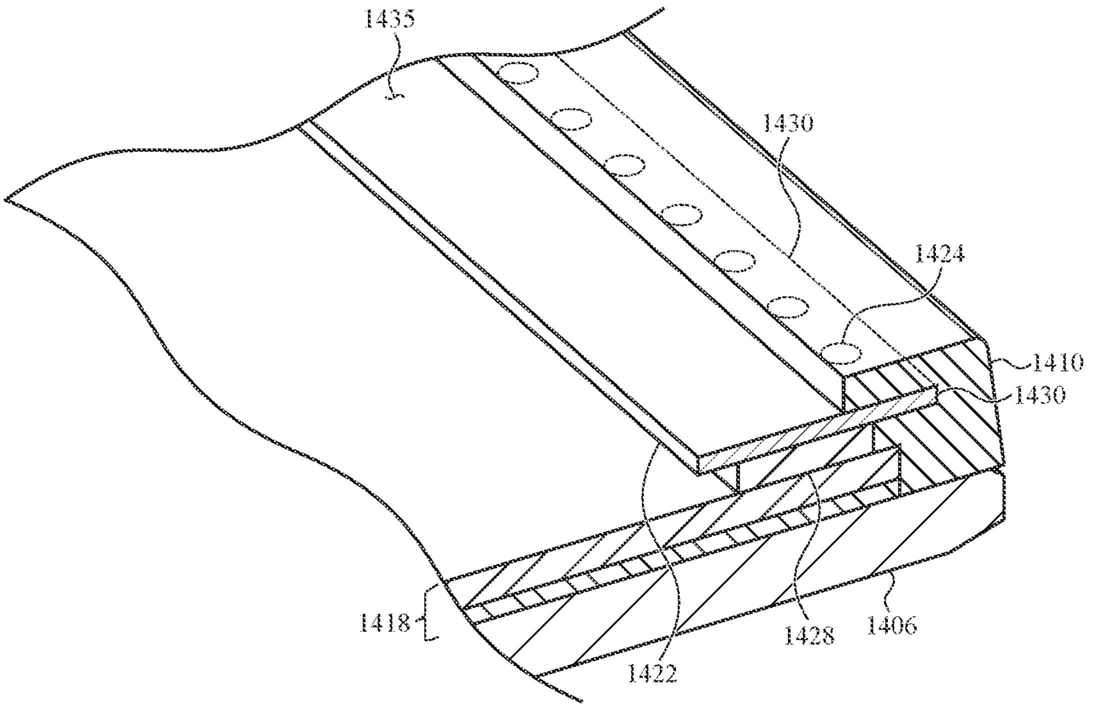

FIG. 14B depicts a perspective cross-sectional view of the front cover assembly 1404, viewed along a line corresponding to line 14B-14B in FIG. 1A. FIG. 14B illustrates the molded frame 1410 at least partially encapsulating a side of the display stack 1418, and at least partially encapsulating and engaging with a flange 1430 that extends outwardly from the support frame 1422. In particular, the support frame 1422, which may be attached to the display stack 1418 via an adhesive 1428, may define a flange 1430 that extends outwardly from the support frame 1422. The support frame 1422 may be a metal structure, or it may be formed of other materials or combinations of materials (e.g., polymers, composites, etc.).

The flange 1430 may define a set of engagement features 1424 that the molded frame 1410 engages with to mechanically interlock the molded frame 1410 to the support frame 1422 (and thus form a secure mechanical connection to the front cover assembly as a whole). The engagement features 1424 may be or may include holes (e.g., through holes, blind holes) into which the flowable material flows during the molding operation. Once the flowable material is hardened, a secure mechanical interlock is formed between the molded frame 1410 and the engagement features 1424 of the flange. Engagement features 1424 may be positioned at various locations along the flange 1430. In some cases, multiple types of engagement features are provided along the flange 1430, such as holes, protrusions, recesses, posts, and the like.

While only a portion of the support frame 1422 is shown in FIG. 14B, the support frame 1422 may extend around the entire periphery of the front cover assembly, defining a continuous ring. The molded frame 1410 may be coupled to the support frame 1422 around the entire periphery.

Figure 14C:
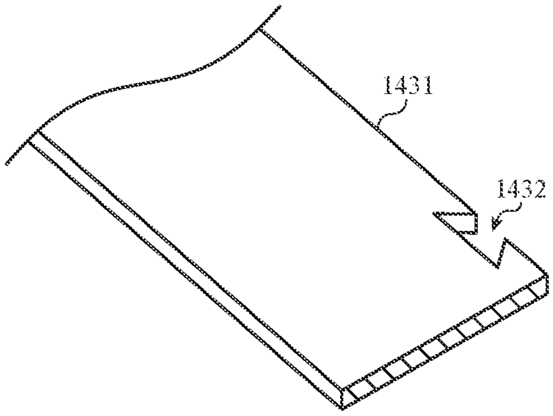
FIGS. 14C-14D depict portions of example flange configurations for a front cover assembly of an electronic device.
Figure 14D:
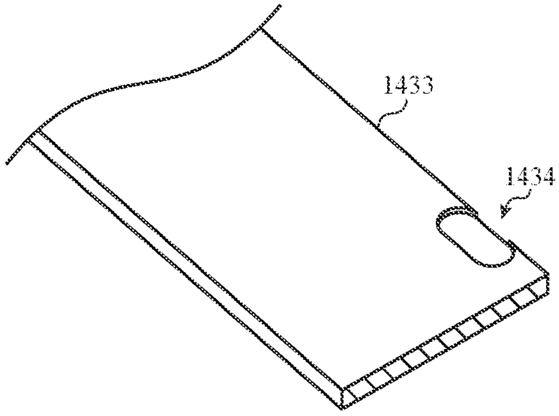

FIGS. 14C-14D illustrate other types of engagement features that may be defined by a flange (or other structures that the flowable material and thus the molded frame ultimately encapsulate). FIG. 14C illustrates a portion of a flange 1431 (which may be an embodiment of or correspond to the flange 1430) that includes a dovetail recess 1432. During the molding operation, the flowable material may flow into the dovetail recess 1432, ultimately defining a corresponding interlocking feature in the molded frame member.

FIG. 14D illustrates a portion of a flange 1433 (which may be an embodiment of or correspond to the flange 1430) that includes a blind recess 1434. During the molding operation, the flowable material may flow into the blind recess 1434, ultimately defining a corresponding interlocking feature in the molded frame member. In both the blind recess 1434 and the dovetail recess 1432, the features define undercut surfaces that ultimately interlock with the molded frame.

As described, the flowable material may form mechanical interlocks with various engagement features of components of the front cover assembly. Additionally, the flowable material may form an adhesive bond to the components that it contacts. The combination of mechanical interlocks and adhesive bond between may securely attach the molded frame.

Figure 14E:
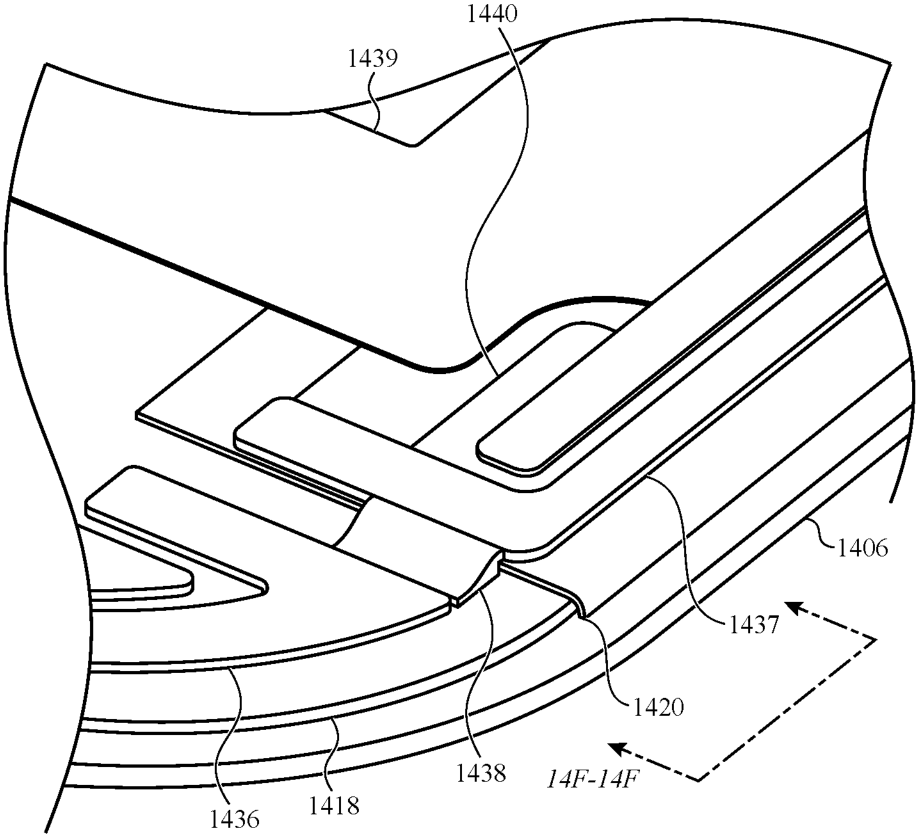
FIGS. 14E-14G depict portions of an example front cover assembly of an electronic device.

FIG. 14E is a perspective view of a portion of the front cover assembly 1404, generally corresponding to the area 14E-14E in FIG. 1A. More particularly, FIG. 14E illustrates an underside of the front cover assembly with the support frame 1422 omitted. As shown in FIG. 14E, the front cover assembly 1404 includes an adhesive member 1436 (e.g., a pressure sensitive adhesive) that extends along a portion of the interior surface of the display stack 1418 and another adhesive member 1437 (e.g., a pressure sensitive adhesive) that extends along another portion of the interior surface of the display stack 1418. The adhesive members 1436, 1437 may secure the support frame 1422 to the front cover assembly, and may also define a barrier to the flowable material that forms the molded frame during the molding operation. In particular, during the molding operation, the flowable material is flowed against the adhesive members prior to the curing operation. Accordingly, the adhesive members prevent or inhibit the flowable material from flowing further along the interior side of the front cover member. In some cases, the flowable material may damage certain components of the front cover assembly, so defining a barrier to prevent the flowable material from reaching certain areas may improve the overall reliability of the device.

Figure 14F:
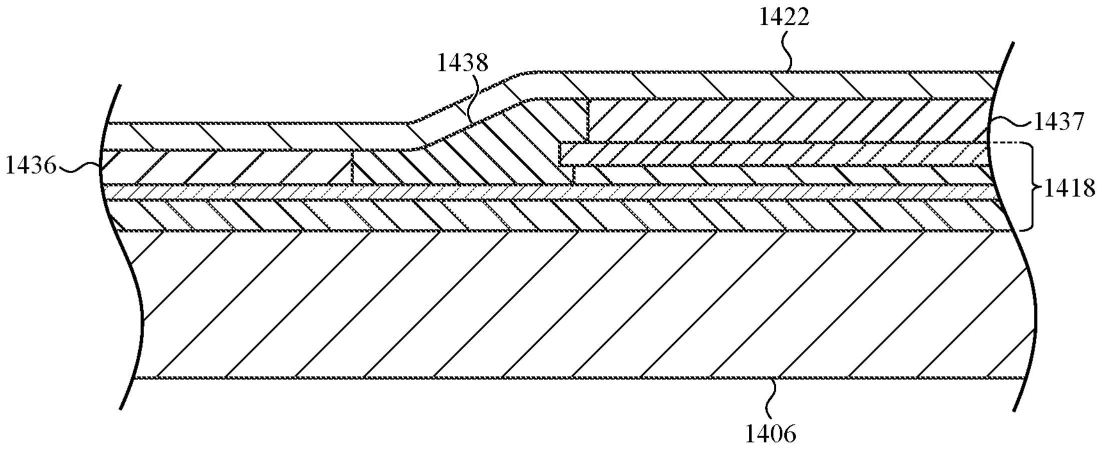

As described herein, a portion of the display stack 1418 may be folded back along the interior side of the display stack 1418 to define a loop portion 1420. Where the loop portion 1420 overlaps the main section of the display stack 1418, the loop portion 1420 may define a stepped region where the height of the display stack 1418 is increased. Accordingly, the adhesive member 1437 may have a different height (in the z direction of the device) than the adhesive member 1436. In order to provide a barrier to the flowable material that bridges the gap between the adhesive members 1436, 1437, and that bridges the different z heights of the adhesive members 1436, 1437, a sealing material 1438 may be introduced in the gap between the adhesive members 1436, 1437. The sealing material 1438 may be a liquid-dispensed polymer material, such as a glue, epoxy, or the like. The sealing material 1438 may be dispensed into the gap, and then the support frame 1422 may be placed on top of the sealing material 1438 as well as the adhesive members 1436, 1437. The sealing material 1438 may therefore conform to the space between the adhesive members 1436, 1437 and the frame member 1422 and seal the gap, thereby preventing or inhibiting the flowable material of the molded frame from passing through the gap. FIG. 14F is a side view of the front cover assembly with the support frame 1422 attached, showing the sealing material 1438 conforming to the support frame 1422 and the sides of the adhesive members 1436, 1437 to fill and seal the void.

The molding operation that forms the molded frame may be performed after the sealing material 1438 is cured or otherwise hardened. In some cases, the sealing material 1438 may be a foam or other deformable material (optionally with adhesive surfaces) that is compressed between the display stack 1418 and the support frame 1422 to form the seal.

In some cases, an optional sealing tape 1440 may be applied to portions of the flexible circuit element that defines the loop portion 1420 to inhibit any flowable material that leaked through the sealing structures from contacting sensitive portions of the circuit element (e.g., conductive traces for touch and/or display components of the display stack 1418). The sealing tape 1440 may be a PET film with one or more adhesive surfaces, or any other suitable material for covering portions of the flexible circuit element and preventing contact with the flowable material.

Figure 14G:
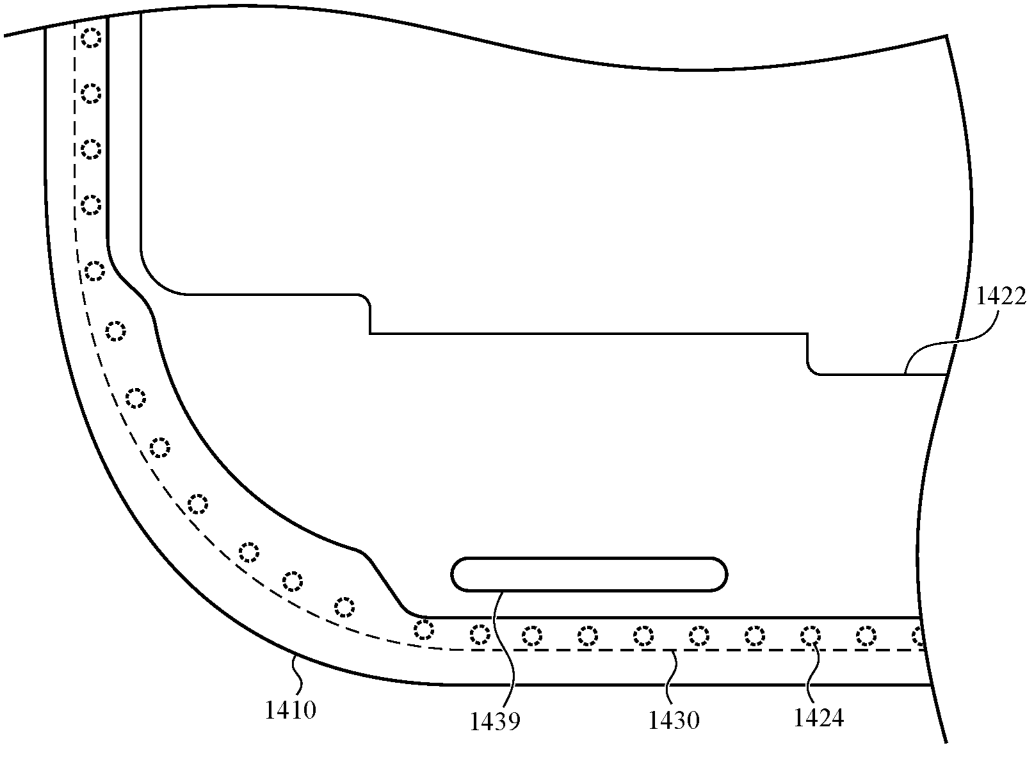

FIG. 14G is a plan view of the front cover assembly 1404 with a variation of the support frame 1422 with an access port 1439. The access port 1439 may be a hole formed through the support frame 1422 in proximity to the gap between the sealing members 1436, 1437 (and/or proximate the sealing material 1438). The access port 1439 may allow visual inspection of the area under the support frame 1422 where the material of the molded frame may reach should it breach the sealing material 1438 and/or the sealing members 1436, 1437. Upon visual inspection, if the flowable material has breached the sealing structure, further operations may be taken with respect to the component, such as rejection of the component, removal of the flowable material, or further curing operations. For example, a curing light may be directed onto the flowable material through the access port 1439 to cure the material (as cured material may not be damaging to the components of the front cover assembly).

Figure 15A:
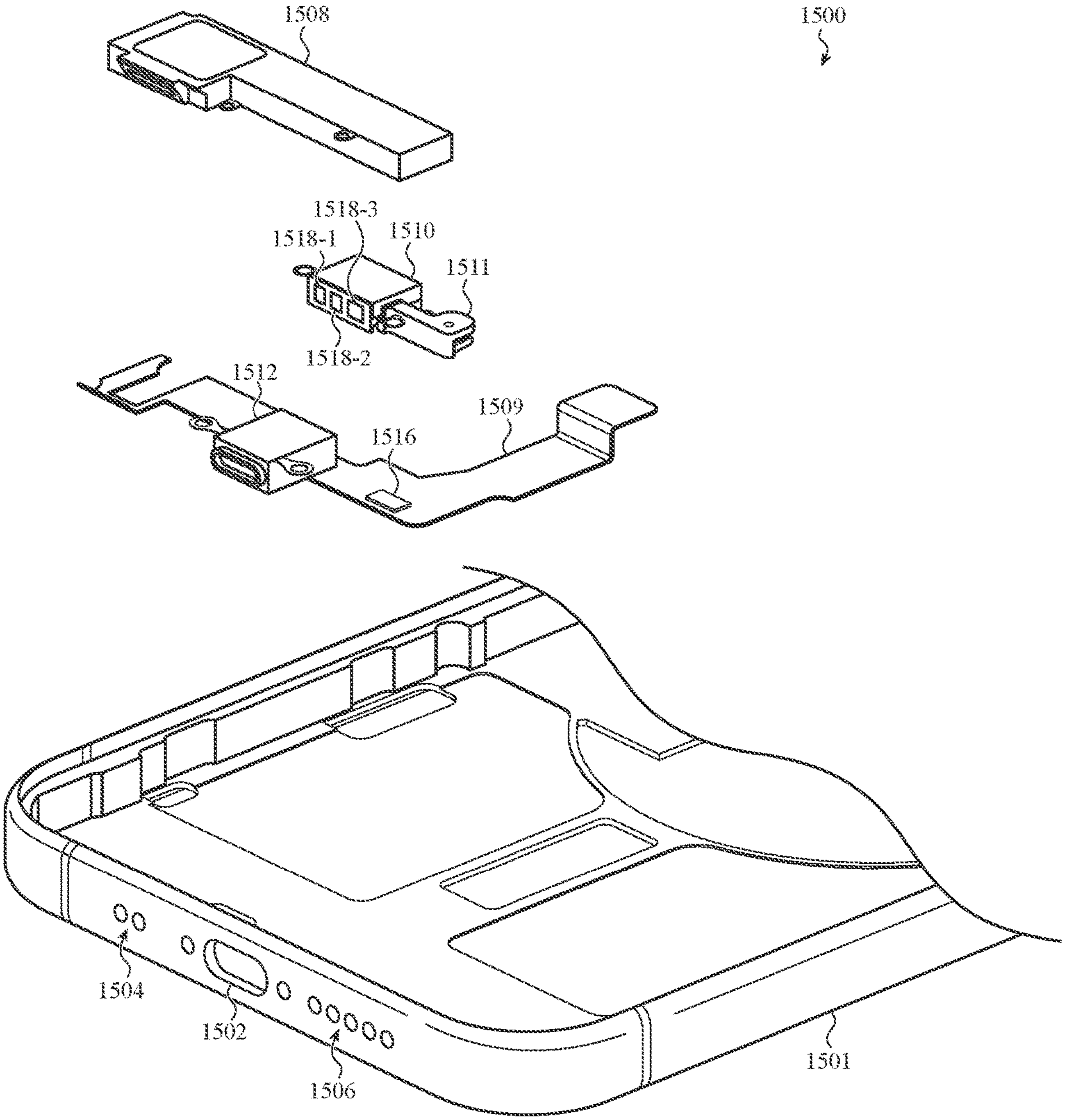
FIG. 15A depicts a partial exploded view of an example electronic device.

FIG. 15A illustrates an example device 1500 that includes various modules that require access through a housing 1501 to the external environment. The device 1500 may correspond to or be an embodiment of other devices described herein. The device 1500 includes a speaker module 1508, a sensor subassembly 1510, and a connector module 1512. The speaker module 1508 may be positioned proximate speaker port 1504 (e.g., one or more holes formed through a housing component of the housing 1501), and may be configured to output sound through the speaker port 1504. The connector module 1512 may be positioned proximate port 1502 (e.g., a hole formed through a housing component of the housing 1501), and may be configured to receive a connector plug therethrough. The sensor subassembly 1510 may be positioned proximate port 1506 (e.g., one or more holes formed through a housing component of the housing 1501), and may be configured to provide environmental access through the housing 1501 to facilitate operation of the systems on the sensor subassembly 1510.

The speaker module 1508, sensor subassembly 1510, and connector module 1512 may be coupled to a circuit element 1509, which may be a flexible circuit board. The circuit element 1509 may conductively couple the speaker module 1508, sensor subassembly 1510, and connector module 1512 together via conductive members (e.g., traces).

The sensor subassembly 1510 may provide various functions to the device 1500. For example, the sensor subassembly 1510 may include a pressure sensor, a barometric venting system, and a microphone, each of which may be associated with one or more openings 1518 in a housing of the sensor subassembly 1510 and one or more holes of the port 1506 in the housing 1501. In some cases, the sensor subassembly 1510 also includes an antenna portion 1511, which may include a conductive element (1538, FIG. 15B) mounted to a housing of the sensor subassembly 1510, as well as conductive connectors for conductively coupling the conductive element to other components of the device. The conductive element may operate as a radiating element of an antenna, as described herein, and may be selectively conductively coupled to housing components to dynamically change the radiating length of the housing component. The sensor subassembly 1510 may be assembled separately from the circuit element 1509, and may include a flexible circuit element that is conductively coupled to the pressure sensor and microphone and is conductively coupled to the circuit element 1509 via a circuit board connector 1516.

Figure 15B:
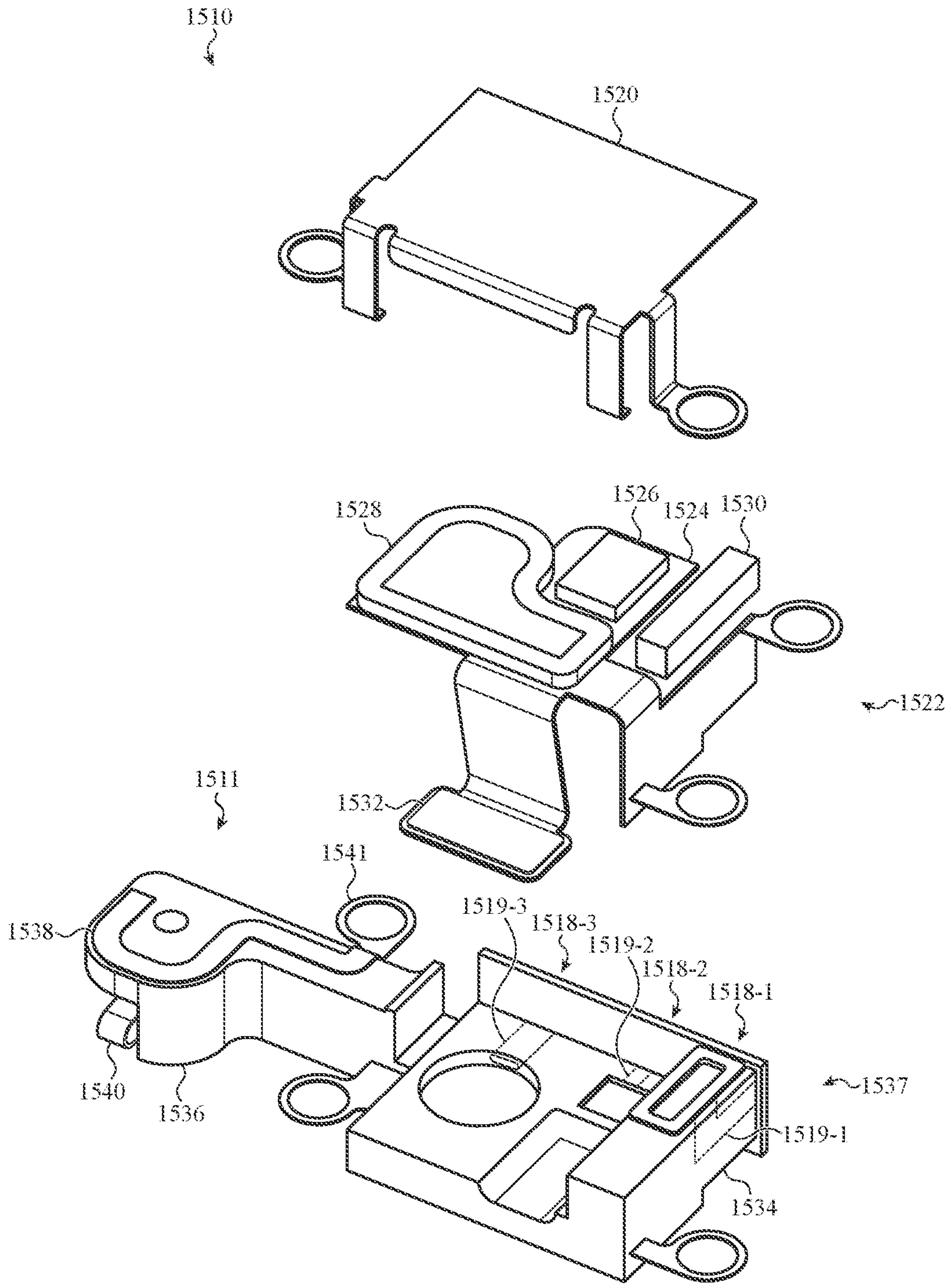
FIG. 15B depicts an exploded view of an example sensor subassembly.

FIG. 15B depicts an exploded view of the sensor subassembly 1510. The sensor subassembly 1510 may include a base structure 1537 to which various sensors and/or components are mounted. The base structure 1537 may be a molded polymer structure, and may be a single monolithic component. The base structure 1537 may include a first portion 1534 (also referred to as a manifold portion) and a second portion 1536. The manifold portion 1534 may define passages 1519-1-1519-3 that provide paths between the openings 1518-1-1518-3, respectively, and components that are mounted to the sensor subassembly 1510 (e.g., a pressure sensor module 1528, a microphone module 1526, and a barometric vent module 1530, respectively). The second portion 1536 may serve as a mounting structure for conductive element 1538, which may be a selectively couplable auxiliary conductive element that operates as a radiating element (or portion thereof) of an antenna. In some cases, the second portion 1536 at least partially encapsulates the conductive element 1538 (e.g., the conductive element 1538 may be insert molded with the second portion 1536). In other cases, it may be adhered, fastened, or otherwise attached to the second portion 1536.

The sensor subassembly 1510 may include a pressure sensor module 1528 and a microphone module 1526. The manifold portion 1534 may define passages 1519-1, 1519-2 that fluidly couple the pressure sensor module 1528 to an external environment via opening 1518-3 and fluidly couple the microphone module 1526 to the external environment via opening 1518-2. The pressure sensor module 1528 and the microphone module 1526 may be mounted on a flexible circuit element 1524 prior to assembly of the sensor subassembly 1510. When the flexible circuit element 1524 is coupled to the manifold portion 1534, the pressure sensor module 1528 and the microphone module 1526 may be aligned with their respective passages (or other features) that fluidly couple the modules to their respective ports. Further, as described above, the flexible circuit element 1524 includes a circuit board connector 1532 that couples to a corresponding circuit board connector on the circuit element 1509, thereby conductively coupling the modules to the circuit element 1509. The flexible circuit element 1524 may also include other connection elements, such as tabs, rings, etc., which may be used to secure the sensor subassembly 1510 to the circuit element 1509 and/or conductively couple the sensor subassembly 1510 to the circuit element 1509 (e.g., for grounding).

The sensor subassembly 1510 also includes a barometric vent module 1530. The manifold portion 1534 may define a passage 1519-3 that fluidly couples the barometric vent module 1530 to an external environment via opening 1518-1. The barometric vent module 1530 may be coupled to the manifold portion 1534.

The sensor subassembly 1510 also includes a cover member 1520. The cover member 1520 may be positioned over the pressure sensor module 1528, the microphone module 1526, and the barometric vent 1530, and may optionally provide a capturing force to retain the components (as well as the flexible circuit element 1524) in place. For example, the cover member 1520 may compress the components between the cover member 1520 and the manifold portion 1534. The cover member 1520 may be retained to the manifold portion 1534 via mechanical interlocks (clips defined by the cover member 1520), adhesives, fasteners, or the like. The cover member 1520 may also include other connection elements, such as tabs, rings, etc., which may be used to secure the sensor subassembly 1510 to the circuit element 1509 and/or conductively couple the sensor subassembly 1510 to the circuit element 1509 (e.g., for grounding). The cover member 1520 may be formed of or include metal.

The second portion 1536 of the base structure 1537 may have a conductive element 1538 coupled thereto. As noted above, the conductive element 1538 may be coupled to the second portion 1536 by an injection molding process, in which the conductive element 1538 may be at least partially encapsulated by the material of the second portion 1536. The conductive element 1538 may include tabs, rings, and/or other connection elements configured to structurally and conductively couple the conductive element 1538 to other components, such as a housing component, antenna circuitry, etc. A spring contact 1540 may also be coupled to the second portion 1536 and conductively coupled to the conductive element 1538. The spring contact 1540 may conductively couple to another component, such as a conductive pad on the circuit element 1509, a housing component, or another component of the device.

The sensor subassembly 1510 as described herein may be physically assembled separately from the circuit element 1509, and then later conductively coupled to the circuit element 1509 via a circuit board connector. Accordingly, the manufacturing and assembly of the device may be simplified by reducing the complexity of the assembly process for the circuit element 1509, and by generally reducing the number of physical modules that are coupled to the circuit element 1509 prior to its assembly into the housing 1501.

Figure 15C:
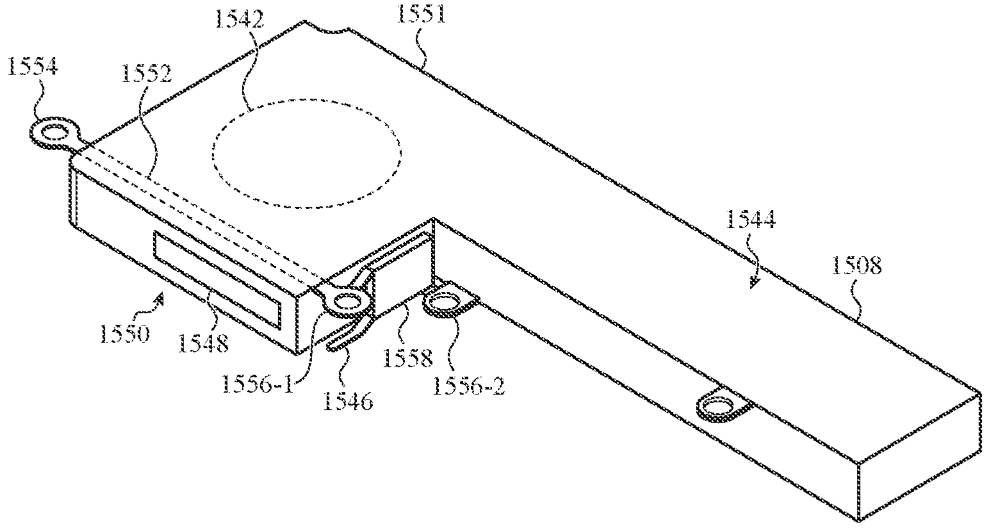
FIG. 15C depicts an example speaker module.

FIG. 15C illustrates the speaker module 1508. The speaker module 1508 includes a speaker module housing 1551 that at least partially encloses a speaker, and the speaker includes a diaphragm 1542. the speaker module housing 1551 defines a first acoustic volume 1544 on a first side of the diaphragm 1542 and a second acoustic volume 1550 on a second side of the diaphragm 1542. The speaker module housing 1551 also defines an acoustic port 1548 that acoustically couples the second volume 1550 to one or more holes formed in the housing 1501 (e.g., the speaker port 1504). The first acoustic volume 1544 may be referred to as a back volume of the speaker, and may be configured to provide a particular acoustic response for the diaphragm 1542. In order to maximize the size of the first acoustic volume 1544 for a given speaker module housing size, the first acoustic volume 1544 may lack depressions or recesses along the exterior sides of the speaker module housing, so as to avoid protrusions into the first acoustic volume 1544 that would reduce the internal volume. Moreover, the speaker module 1508 may omit external components coupled to the speaker module housing 1551 along the second acoustic volume 1544, which could otherwise require the second acoustic volume 1544 to be reduced to accommodate those components.

The speaker module 1508 may also include a connector assembly 1558 that is coupled to the speaker module housing 1551 and which conductively couples various components of an antenna system. The connector assembly 1558 includes a first connection element 1556-1 that is conductively coupled to a first housing component (e.g., via conductive member 1552, which may be at least partially encapsulated in the speaker module housing 1551, and connection element 1554) and a second connection element 1556-2 that is conductively coupled to antenna circuitry (e.g., via a flexible circuit element on which antenna circuitry is coupled). The conductive connector also includes a spring connector 1546. The spring connector 1546 may be welded or otherwise conductively and/or structurally coupled to a conductive member of the speaker module 1508, and may be conductively coupled to one or more of the connection elements 1556 (e.g., via a conductive coupling such as a flexible circuit element). The spring connector 1546 may contact (and be biased against) a conductive pad on a circuit element (e.g., a flexible circuit element) to which antenna circuitry is coupled. In some cases, the first connection element 1556-1 corresponds to a feed point for an antenna, the second connection element 1556-2 corresponds to a ground point for the antenna, and the spring connector 1546 corresponds to a control signal for the antenna. The connection elements 1556-1, 1556-2 may be conductively coupled to other circuitry, components, housing components, conductive members, other than or in addition to those described above.

In some cases, front cover assemblies may include various masks (e.g., ink masks) that define borders around holes in a display (e.g., windows for sensors or cameras), borders around the outer perimeter of the display, of other features. The masks may be configured to occlude or block the visibility of borders of the display and/or other internal components or materials of the device. In some cases, the masks may acquire electrical charge due to the normal operation of the device. In order to dissipate the charge, the masks may be conductively coupled to other components, such as a back plate of a display.

Figure 16A:
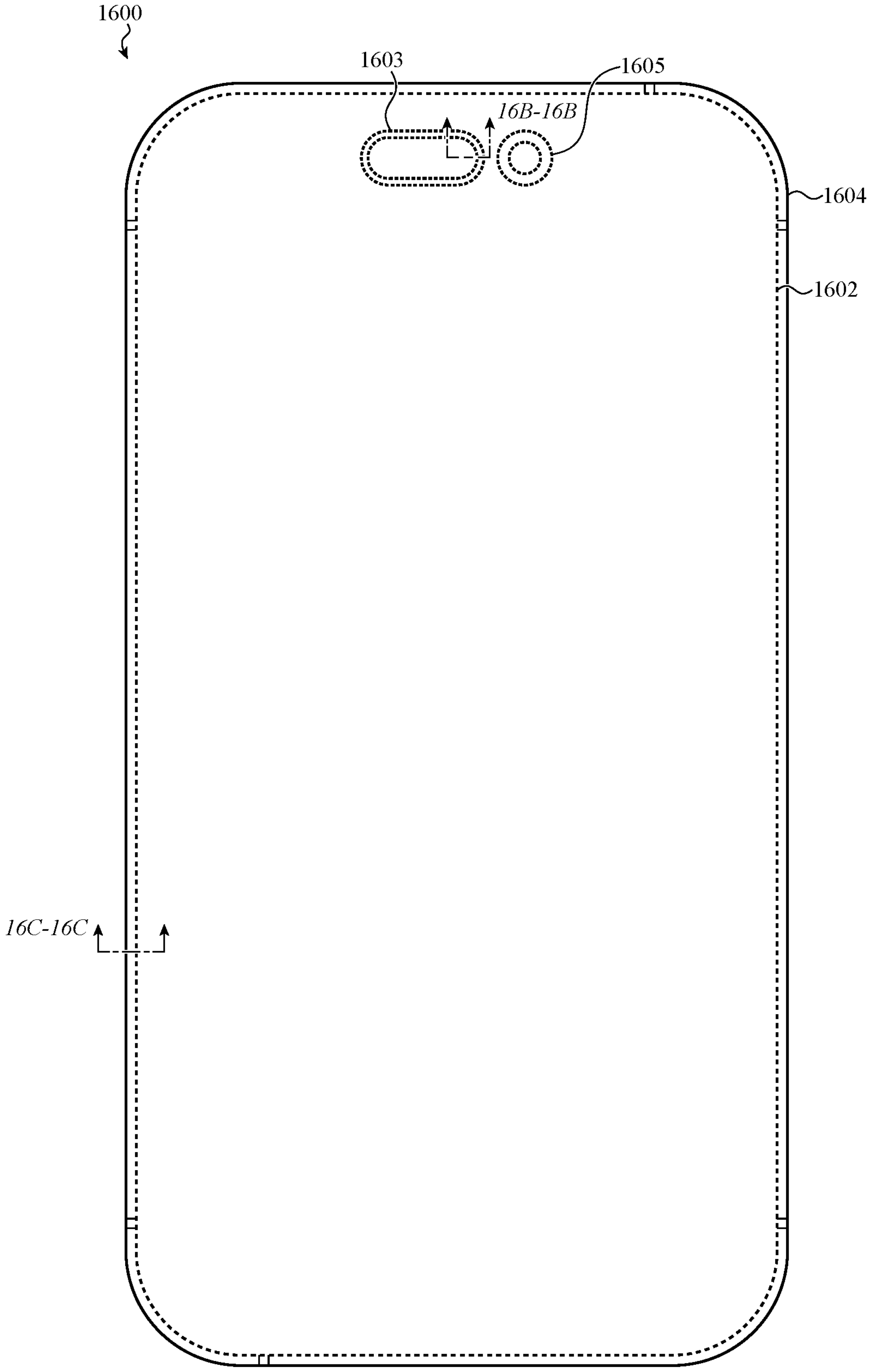
FIG. 16A depicts a front view of an example front cover assembly of an electronic device.

FIG. 16A illustrates an example front cover assembly 1600, which may correspond to or be an embodiment of other front cover assemblies described herein. The front cover assembly 1600 may include a display 1602 and a front cover 1604. The front cover assembly 1600 may include masks around the outer perimeter of the display 1602, and around the perimeters of the holes 1603, 1605 that are defined through the display 1602 for front-facing sensors.

Figure 16B:
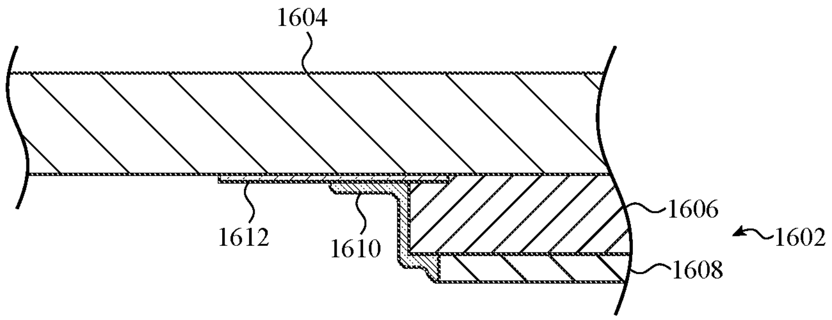
FIGS. 16B-16C are partial cross-sectional views of the front cover assembly of FIG. 16A.

FIG. 16B is a partial cross-sectional view of the front cover assembly 1600, viewed along line 16B-16B in FIG. 16A. As shown in FIG. 16B, a mask 1612 may be positioned on the front cover 1604 and positioned to cover an edge of the display 1602. The mask 1612 may be an embodiment of or correspond to other masks described herein (and the details of those masks also apply to the mask 1612). The mask 1612 may be conductively coupled to a display 1602 via a conductive material 1610 that contacts the mask 1612 and the display 1602 (e.g., a back plate 1608 of the display 1602). The conductive material 1610 may also cover a peripheral side of an optical stack 1606 of the display (e.g., layers of the display that produce and/or guide light). The conductive material 1610 may be opaque or otherwise configured to block light, thereby inhibiting light within the optical stack 1606 from entering the front-facing cameras and/or sensors, or otherwise leaking from the side of the display. The conductive material 1610 may be formed from a conductive ink paint, polymer coating, or the like. The conductive material 1610 may be applied in a liquid or other flowable state. In some cases, the conductive material 1610 may include conductive particles (e.g., metal particles, silver nanotubes, carbon nanotubes) in a matrix material.

Figure 16C:
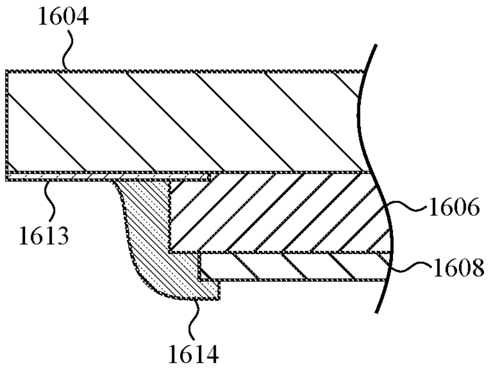

FIG. 16C is a partial cross-sectional view of the front cover assembly 1600, viewed along line 16C-16C in FIG. 16A. As shown in FIG. 16C, a mask 1613 may be positioned on the front cover 1604 and positioned to cover an edge of the display 1602. The mask 1613 may be an embodiment of or correspond to other masks described herein (and the details of those masks also apply to the mask 1613). The mask 1613 may be conductively coupled to the display 1602 via a conductive material 1614 that contacts the mask 1613 and the display 1602 (e.g., the back plate 1608 of the display 1602). The conductive material 1614 may also cover a peripheral side of an optical stack 1606 of the display (e.g., layers of the display that produce and/or guide light). The conductive material 1614 may be opaque or otherwise configured to block light, thereby inhibiting light within the optical stack 1606 from leaking from the side of the display. The conductive material 1614 may be formed from a conductive ink paint, polymer coating, or the like. The conductive material 1614 may be applied in a liquid or other flowable state. In some cases, the conductive material 1614 may include conductive particles (e.g., metal particles, silver nanotubes, carbon nanotubes) in a matrix material.

The conductive materials 1610, 1614 (which may have the same or different compositions) may define conductive paths from the masks 1612, 1613 to the back plate 1608. These conductive paths may define a discharge path for electrical charges that might otherwise accumulate on the masks. For example, without the discharge path defined by the conductive materials, electrical charges may accumulate on the masks, which may interfere with the function of the display (e.g., graphical output functions, touch-sensing functions), or other components of the system. Accordingly, the conductivity of the conductive materials allows the conductive materials to perform multiple functions, including blocking light from the display and mitigating or eliminating electrical charge accumulation on the masks.

Figure 17A:
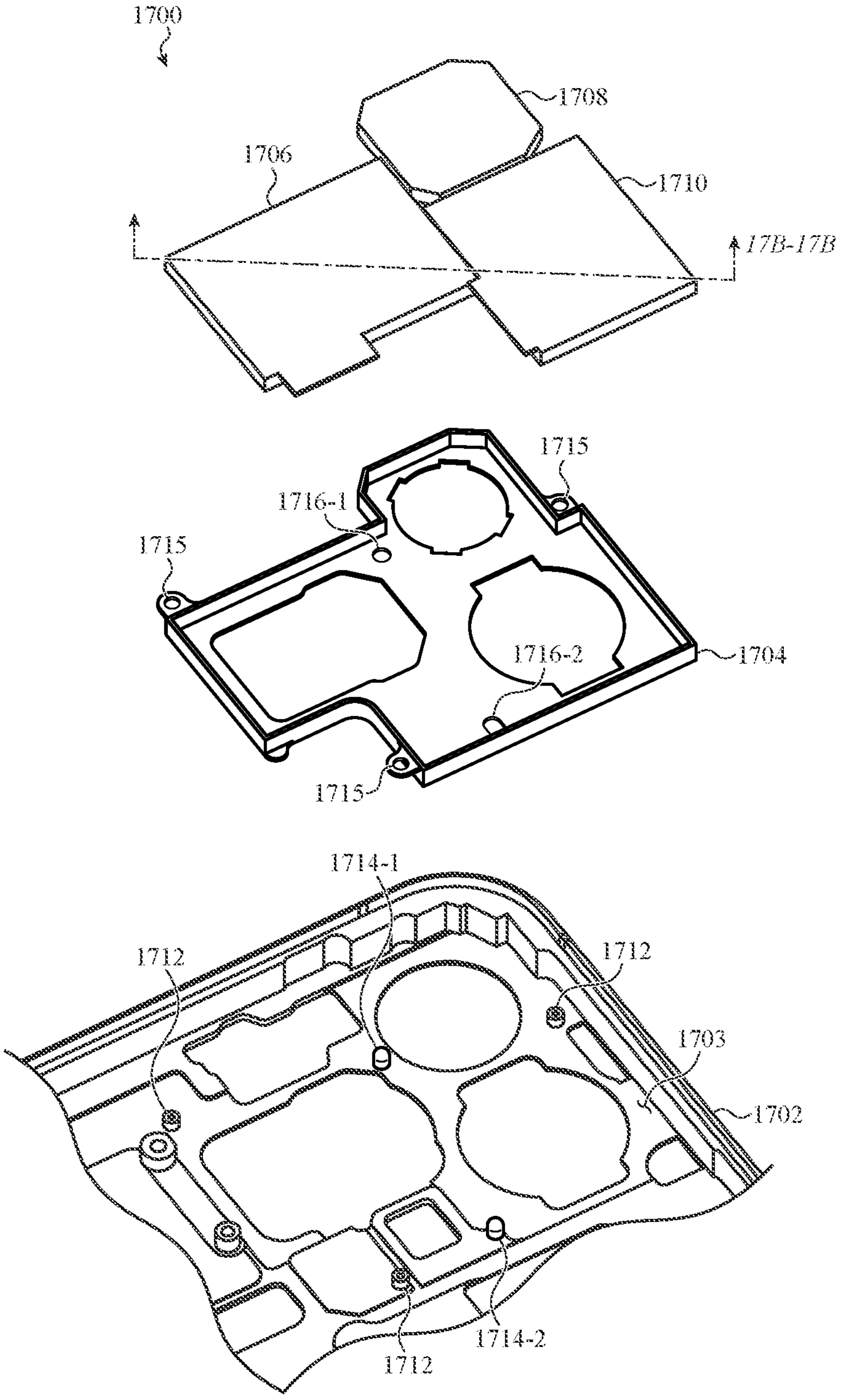
FIG. 17A depicts a partial exploded view of an electronic device with a rear-facing sensor array.

FIG. 17A is an exploded view of a portion of a device 1700, showing components of a rear-facing sensor region. For example, the device 1700 includes a housing 1702, a camera bracket 1704, and cameras 1706, 1708, and 1710. The cameras 1706, 1708, and 1710 may correspond to or be embodiments of the cameras 263, 261, and 262 in FIG. 2 (or other cameras described herein). The cameras may be mounted in the bracket 1704, and coupled to the housing 1702, and more particularly, to a lower chassis section 1703 of the housing 1702. The lenses of the cameras may extend through holes defined in the bracket 1704 and through holes defined through the lower chassis section 1703. As described above, the lenses may further extend through holes defined through an anchor plate on a rear cover assembly, and ultimately into holes defined through a rear cover.

The camera bracket 1704 may be coupled to the housing 1702 via a set of attachment features 1712, such as bosses. The attachment features 1712 may be machined features of the lower chassis section 1703. Fasteners, such as screws, may extend through mounting features 1715 of the camera bracket 1704 and engage the attachment features 1712 (e.g., via threads) to secure the camera bracket 1704. The attachment features 1712 may define the position of the camera bracket 1704 along the z direction of the device. In particular, the interface between the top surfaces of the attachment features 1712 and the camera bracket 1704 may define the position of the camera bracket 1704 (and thus the cameras 1706, 1708, and 1710) in the z direction within the device.

The camera bracket 1704 may be aligned in the x and y directions, relative to the housing 1702 (e.g., a lower chassis section 1703 of the housing 1702) via a set of alignment features, such as alignment pins 1714, and corresponding alignment holes 1716. For example, the camera bracket 1704 may define an alignment hole 1716-1 that is configured to receive a first alignment pin 1714-1 therein, and a second alignment hole 1716-2 that is configured to receive a second alignment pin 1714-2 therein. The first alignment hole 1716-1 may be substantially circular or otherwise configured to define the position of the camera bracket 1704 in the x and y directions, while the second alignment hole 1716-2 may be elongated (e.g., a slot), such that the engagement between the second alignment hole 1716-2 and the second alignment pin 1714-2 defines an angular or rotational position of the camera bracket 1704 (within the x-y plane), while accommodating manufacturing tolerances in the relative positions of the alignment pins 1714.

Figure 17B:
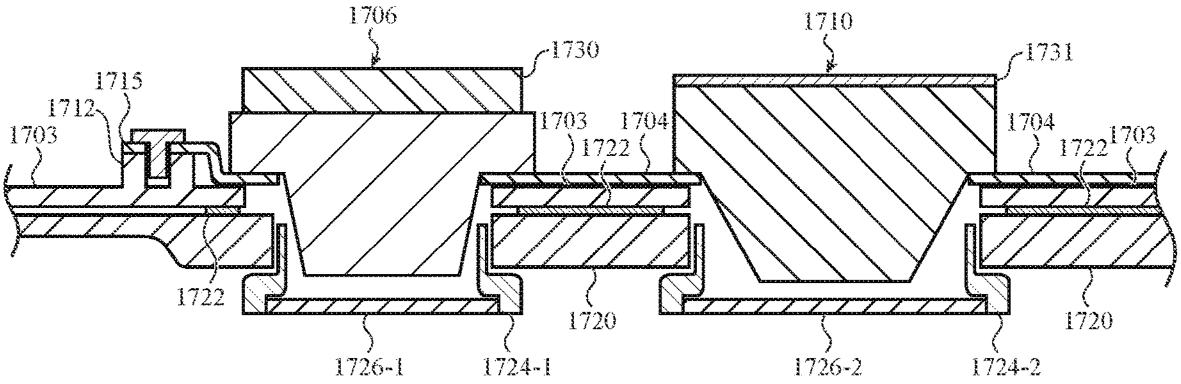
FIG. 17B depicts a partial cross-sectional view of the electronic device of FIG. 17A.

FIG. 17B is a partial cross-sectional view of the device 1700, viewed along line 17B-17B in FIG. 17A, and shows components of a rear-facing sensor system. As described herein, cameras of a rear-facing sensor system may be coupled to a camera bracket 1704, and the camera bracket 1704 may be coupled to a lower chassis section 1703 in order to secure the cameras to the device. More particularly, the cameras themselves may not contact or be affixed directly to the lower chassis section 1703 or to a rear cover 1720 of the device 1700. Rather, the cameras are attached to the camera bracket 1704, and the secure attachment of the camera bracket 1704 to the lower chassis section 1703 may serve to couple the cameras to the lower chassis section 1703.

Because the cameras are attached to the camera bracket 1704, the positioning of the camera bracket 1704 relative to other components in the system defines the positioning of the cameras within relative to other components in the system. As note above, the position of the camera bracket 1704 relative to the lower chassis section and the rear cover is defined by the interfaces between the mounting features 1715 of the camera bracket 1704 and the attachment features 1712 of the lower chassis section 1703, and between the alignment holes 1716 of the camera bracket 1704 and the alignment pins 1714 of the lower chassis section 1703. While the alignment pins and alignment holes define the position of the camera bracket 1704 in the x and y directions, the attachment features and mounting structures define the position of the camera bracket 1704 along the z direction. FIG. 17B shows the interface between a mounting features 1715 and an attachment features 1712, illustrating how these components define the position of the camera bracket 1704 in the z direction. While FIG. 17B illustrates one mounting features and attachment feature, it may be representative of all of the mounting and attachment features for coupling the camera bracket 1704 to the lower chassis section.

FIG. 17B also illustrates compliant members 1730 and 1731 that may be positioned on the cameras 1706, 1710, respectively. The compliant members 1730 and 1731 may have different thicknesses, such that the top surfaces of the cameras 1706, 1710 are coplanar. In some cases, a camera cowling may be positioned over the top of the cameras 1706, 1710, and may compress or otherwise contact the compliant member 1730, 1731, thereby imparting a retaining force on the cameras. The compliant members 1730, 1731 may or may include foams, elastomers, polymers, springs, or other compliant materials.

FIG. 17B also illustrates a coupling between the rear cover 1720 (e.g., a glass or other material sheet) and the lower chassis section 1703. An intermediate structure 1722 may be positioned between and in contact with the lower chassis section 1703 and the rear cover 1720. The intermediate structure 1722 may be or may include a compliant material (e.g., a foam, elastomer, compliant polymer), an adhesive, a conductive layer, or the like.

Figure 18:
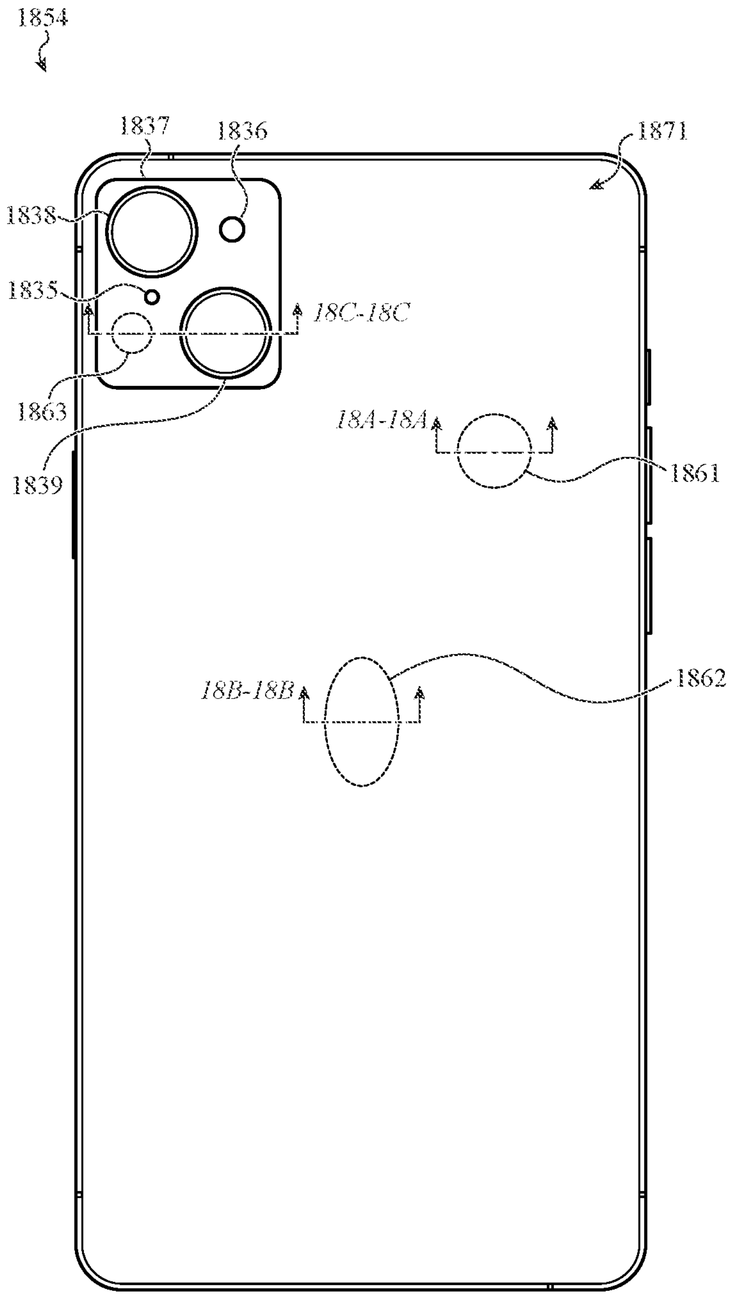
FIG. 18 depicts an example rear cover of an electronic device.

FIG. 18 depicts an example rear cover 1854 for an electronic device. The rear cover 1854 may be an example of the rear cover 154 shown in FIG. 1D. As previously discussed with respect to the rear cover 154, the rear cover 1854 may include a rear cover member 1871 formed from or including an optically transmissive material. The optically transmissive material may be colored, such as a colored glass material. The color of the optically transmissive material may be an achromatic color such as black or a chromatic color such as blue, green, yellow, red, pink, and the like. The color of the optically transmissive material may be characterized by one or more color space coordinates, as described in more detail below.

The rear cover 1854 defines a protrusion 1837, which may define a sensor array region in a similar fashion as was previously described with respect to the protrusion 137 of FIG. 1D. Accordingly, the protrusion 1837 defines openings (e.g., holes) for various components of a sensor array. In some embodiments, the openings 1838 and 1839 are openings for cameras, the opening 1836 is an opening for a flash, and the opening 1835 is an opening for a microphone. The cameras may be similar to the cameras 138 and 139, the flash may be similar to the flash 136, and the microphone may be similar to the microphone 135 described with respect to FIG. 1D and those details are not repeated here. The protrusion may have the same or a similar construction as the protrusion 137 or the protrusion 151.

The rear cover 1854, alternately referred to herein as a substrate, may include a coating on the exterior surface of the rear cover member 1871, on the interior surface of the rear cover member 1871, or both. The coating may contribute to the appearance, such as the color, of the rear cover 1854. For example, a coating along an interior surface of the rear cover member 1871 may include one or more color layers as described below with respect to FIGS. 19A through 19E. In some cases, the color of the coating along the interior surface of the rear cover member 1871 and the color of the rear cover member 1871 itself (e.g., the color of the optically transmissive material defining the rear cover substrate) together define the apparent color of the rear cover 1854. Examples of rear covers including interior coatings are shown and described with respect to the partial cross-sectional views of FIGS. 19A through 19E.

In some cases, different portions of the rear cover 1854 may have different values of one or more optical properties, different values of one or more texture parameters, different values of one or more electromagnetic properties, and the like, as discussed in more detail below. FIG. 18 depicts three different portions 1861, 1862, and 1863 of the rear cover 1854. Each of the portions 1861, 1862, and 1863 may extend through a thickness of the cover 1854. The portion 1863 partially defines the protrusion 1837 and may have a thickness that is greater than a thickness of each of the portions 1861 and 1862. In some examples, the portion 1862 visually contrasts with the portion 1861 and defines a logo, graphic, image, or the like. FIGS. 19A through 19E show examples of partial cross-sectional views through different portions of a rear cover.

In embodiments described herein, different portions of the rear cover 1854 have a different optical property. In some embodiments, different portions of the rear cover 1854 and/or the rear cover member 1871 may have a different color. In some embodiments, different portions of the rear cover 1854 and/or the rear cover member 1871 may have a different gloss value. The difference in the optical properties of the rear cover 1854 may be due at least in part to a difference in the color, the light transmission, and/or the gloss value of different portions of the rear cover member 1871. In some cases, portions of the rear cover member 1871 having different thickness, curvature, and the like may produce differences in the perceived color of the rear cover 1854. As an example, the portion 1861 and/or the portion 1862 may have a different color than the portion 1863 due at least in part to the greater thickness of the rear cover member 1871 in the portion 1863. An example of a rear cover member having a thinner and a thicker portion is shown in the partial cross-sectional view of FIG. 19E. Changes in viewing angle may also produce differences in the perceived color of the rear cover 1854.

In some embodiments, a first portion of the rear cover 1854 has a different color than a second portion. For example, the portion 1861 may be characterized by a first color and the portion 1863 may be characterized by a second color that is different from the first color. The difference in color may be due to different color values of a first portion and a second portion of the rear cover member 1871, differences in the coating applied to the first and the second portions of the rear cover member 1871, differences in texture applied to the first and the second portions of the rear cover member 1871, or combinations of these.

The color of a portion of a rear cover member or a rear cover may be characterized in several ways, such as by coordinates in CIEL*a*b* (CIELAB) color space, coordinates in L*C*h color space, or both. In CIEL*a*b* (CIELAB) color space, L* represents brightness, a* the position between red/magenta and green, and b* the position between yellow and blue. Alternately or additionally, the color of the rear cover member or rear cover may be characterized by coordinates in L*C*h* color space, where C* represents the chroma and $h_{ab}$ represents the hue angle (in degrees). The chroma C* is related to a* and b* as $C^*=\sqrt{(a^*)^2+(b^*)^2}$. In addition, the hue angle $h_{ab}$ is related to a* and b* as $$h_{ab} = \tan^{-1}\frac{b*}{a*}.$$

The symbol h* as used herein may refer to $h_{ab}$. A broadband or semi-broadband illuminant may be used to determine the color of a portion of the rear cover member or rear cover. For example, a CIE illuminant or other reference illuminant may be used. In some cases, the color of a rear cover member may be determined from light transmitted through the rear cover member. In additional cases, the color of the rear cover member may be determined from light reflected back through the rear cover member (e.g., using a white background). The CIELAB or L*C*h coordinates for a given illuminant can be measured with a device such as a colorimeter or a spectrophotometer or calculated from transmission or reflectance spectra. The color may be measured on a polished or a textured region of the surface of the rear cover member. The color of an interior coating may be characterized by making a color measurement of the interior coating through a substantially clear cover member. The color of a combination of a colored cover member with an interior coating can also be characterized (e.g., determined from light reflected back through the cover member).

In some examples, a color of a cover member such as the rear cover member 1871 is characterized by an a* value having a magnitude (alternately, absolute value) greater than or equal to 0.25, greater than or equal to 0.5, greater than or equal to 0.75, or greater than or equal to 1. In additional examples, the color of the rear cover member is characterized by a b* value having a magnitude greater than or equal to 1, greater than or equal to 1.5, or greater than or equal to 2. In further examples, the color of the rear cover member such as the rear cover member 1871 may have an L* value of at least 80, at least 85, or at least 90. In addition, the color of the rear cover member may be characterized by having a C* value greater than 1.75, greater than 2, or greater than 2.5. In some cases, the color measurement may be made on a portion of the cover member 1871 that at least partially defines the protrusion (e.g., the portion 1863) while in other cases the color measurement may be made on a portion of the cover member 1871 that does not define the protrusion (e.g., portion the 1861 or the portion 1862).

In some examples, the difference in color of a cover member or a cover can be characterized by the differences in one or more individual parameters such as ΔL*, Δa*, Δb*, ΔC*, or Δh*. In embodiments, the L* value of the thicker portion may be less than the L* of the thinner portion. As examples, a difference in the L* values between the thicker and the thinner portions is at least 5, at least 10, at least 15, at least 20, or from 10 to 40. In additional embodiments, the C* value of the thicker portion may be greater than the C* of the thinner portion. As examples, the C* value of the thicker portion may be at least 5, at least 10, at least 15, at least 20, at least 25, at least 30, at least 35, or at least 40. A chroma difference (ΔC*) between the two portions may be at least 2.5, at least 5, at least 10, at least 15, at least 20, at least 25, ranging from 2.5 to 10, or ranging from 15 to 50. Examples of color differences between two regions of a cover that have about the same thickness are discussed below.

The difference in color between different portions of the rear cover member 1871 or the cover 1854 may also be characterized in additional ways. For example, the color difference in the L*a*b* color space may be characterized by the single value $$\Delta E^*_{ab}$$

as specified in Equation 1.

$$\Delta E^*_{ab} = \sqrt{(\Delta L^*)^2 + (\Delta a^*)^2 + (\Delta b^*)^2} \quad \text{Equation 1}$$

In addition, the color difference in the L*C*h* color space may be characterized by the hue difference $$\Delta H^*_{ab}$$

as specified in Equation 2.

$$\Delta H^*_{ab} = \sqrt{(\Delta E^*)^2 - (\Delta L^*)^2 - (\Delta C^*)^2} \quad \text{Equation 2}$$

In some embodiments, a hue difference (Δh*) between the portions (and the two colors) is less than 15 degrees or less than 10 degrees. A relatively small difference in hue, such as difference of 15 degrees or less, less than or equal to 10 degrees, from greater than zero degrees to 10 degrees, or from greater than zero degrees to 5 degrees in hue magnitude between different portions of the cover member (and cover) can produce a harmonious effect.

As previously described, different portions of the cover may have different colors. In some cases, the portion 1861 of the rear cover 1854 may be characterized by a first color and the portion 1862 and/or the portion 1863 may be characterized by a second color that is different from the first color. In some embodiments, color parameters of the two different regions may fall within the following ranges: an L* value ranging from 75 to 95, an a* value having a magnitude ranging from 0.1 to 10, a b* value having a magnitude ranging from 0.2 to 20, and a C* value ranging from 2 to 20. In additional embodiments, the rear cover 1854 may have a L* value ranging from 20 to 40, an a* value having a magnitude ranging from 0.01 to 5 and a b* value having a magnitude ranging from 1 to 10. In some examples, the difference in L* between the portion 1861 and the portion 1862 may be in a range from 0.2 to 5, the difference in C* between the portion 1861 and the portion 1862 may be in a range from 1.0 to 10, from 50% to 200%, from 50% to 70%, from 70% to 90%, from or from 100% to 200%. A magnitude of the difference in h* between the portion 1861 and the portion 1862 may be less than 15 degrees, less than or equal to 10 degrees, in a range from 0.05 degrees to 10 degrees, from 0.5% to 5%, or from 1% to 3%. When the portions 1861 and 1862 have about the same thickness, the difference in color parameters may be due to differences in the coatings and/or texture of the portions 1861 and 1862.

In an example, the portion 1861 may have an L* value ranging from 81.8 to 85.7, an a* value ranging from 4.7 to 6.6, and a b* value ranging from −0.9 to 1.8. The portion 1862 may have an L* value ranging from 78.8 to 83.4, an a* value ranging from 7.7 to 11.7, and a b* value ranging from 0.2 to 2.5. At least one of the L*, a*, or b* values of the portion 1862 may differ from at least one of the L*, a*, or b* values of the portion 1861. In some cases, the portion 1862 may have an L* value that is 2% to 4% less than the L* value of the portion 1861, may have an a* value that is 80% to 90% greater than the a* value of the portion 1861, and/or may have a b* value that is 80% to 90% greater than the b* value of the portion 1861. The portion 1862 may have a C* value that is from 100% to 200% greater and an h* value that is from 0.5% to 3% greater than the portion 1861.

In another example, the portion 1861 may have an L* value ranging from 87.6 to 90.9, an a* value ranging from −1.9 to −1.2, and a b* value ranging from 9.0 to 11.5. The portion 1862 may have an L* value ranging from 86.7 to 90.2, an a* value ranging from −2.5 to −1.6, and a b* value ranging from 15.6 to 18.7. At least one of the L*, a*, or b* values of the portion 1862 may differ from at least one of the L*, a*, or b* values of the portion 1861. In some cases, the portion 1862 may have an L* value that is 0.1% to 1.0% less than the L* value of the portion 1861, may have an a* value that is from 35% to 45% less than the a* value of the portion 1861, and/or may have a b* value that is from 75% to 85% greater than the b* value of the portion 1861. The portion 1862 may have a C* value that is from 70% to 90% greater and an h* value that is from 0.5% to 3% less than the portion 1861.

In another example, the portion 1861 may have an L* value ranging from 83.3 to 86.6, an a* value ranging from −3.8 to −2.7, and a b* value ranging from 3.3 to 5.0. The portion 1862 may have an L* value ranging from 81.2 to 84.5, an a* value ranging from −5.8 to −4.5, and a b* value ranging from 5.5 to 7.2. At least one of the L*, a*, or b* values of the portion 1862 may differ from at least one of the L*, a*, or b* values of the portion 1861. In some cases, the portion 1862 may have an L* value that is from 2% to 3% less than the L* value of the portion 1861, may have an a* value that is from 50% to 60% less than the a* value of the portion 1861, and/or may have a b* value that is from 60% to 70% greater than the b* value of the portion 1861. The portion 1862 may have a C* value that is from 50% to 70% greater and an h* value that is from 0.5% to 3% less than the portion 1861.

In another example, the portion 1861 may have an L* value ranging from 84.7 to 88.2, an a* value ranging from −1.6 to −0.5, and a b* value ranging from −3.9 to −2.0. The portion 1862 may have an L* value ranging from 82.5 to 85.8, an a* value ranging from −3.0 to −1.5, and a b* value ranging from −5.9 to −3.2. At least one of the L*, a*, or b* values of the portion 1862 may differ from at least one of the L*, a*, or b* values of the portion 1861. In some cases, the portion 1862 may have an L* value that is from 1% to 3% less than the L* value of the portion 1861, may have an a* value that is from 110% to 120% less than the a* value of the portion 1861, and/or may have a b* value that is from 50% to 60% less than the b* value of the portion 1861. The portion 1862 may have a C* value that is from 50% to 70% greater and an h* value that is from 0.5% to 3% less than the portion 1861.

In another example, the portion 1861 may have an L* value ranging from 26.6 to 29.3, an a* value ranging from −2.5 to −0.05, and a b* value ranging from −3.1 to −1.6. The portion 1861 may have a C* value in a range from 2 to 4. In some cases, the visual contrast between the portion 1861 and the portion 1862 may be due primarily to a difference in the gloss value of the two portions and the L*, a* and b* may be substantially the same for the two portions.

In some cases, the colored optically-transmissive material derives its color from elements which are incorporated into a glass phase and/or a crystalline phase of the material. The coloring element(s) may be configured to produce a desired color when visible light is transmitted through the material (e.g., the coloring element(s) may be in a suitable oxidation state and present in a suitable amount). Suitable elements for coloring (also referred to as tinting) of the optically-transmissive material include, but are not limited to, rare earth elements and transition metal elements. Transition metal elements include, but are not limited to, titanium, chromium, vanadium, manganese, iron, cobalt, nickel, copper, silver, gold, and the like. The rare earth or transition metal element may be incorporated into a glass phase as a glass network modifier, a glass network former, or a combination thereof.

The rare earth or transition metal element may be incorporated into a crystalline phase of a glass ceramic.

Alternatively or additionally, the colored optically-transmissive material derives its color from one or more elements which form a distinct nanophase within a glass and/or a crystalline phase of the material. The coloring element(s) may be configured to produce a desired color when visible light is transmitted through the material (e.g., the nanophase may be of a suitable composition and size and present in a suitable amount). For example, when the nanophase is in the form of a nanoparticle, one or more of the size, shape, and concentration of the nanoparticles can influence the color of a cover member or other part formed from the colored optically-transmissive material. Suitable elements for forming distinct nanophases within the optically-transmissive material include, but are not limited to, transition metals such as titanium, chromium, vanadium, manganese, iron, cobalt, nickel, copper, silver, gold, and the like or rare earth elements such as lanthanides (e.g., cerium, praseodymium, neodymium), which may be present in a rare earth oxide. When the element is a metal, the nanophase may take the form of metallic nanoparticles. In some additional cases, one or more of these elements may be combined with oxygen, nitrogen, or both to form a compound such as a metal oxide or a metal nitride. As referred to herein, a nanophase or nanoparticle may have a size less than 1 micrometer, such as from 10 nm to less than 1 micrometer, from 15 nm to 200 nm, from 15 nm to 150 nm, from 15 nm to 100 nm, from 20 nm to 100 nm, from 50 nm to 150 nm, from 50 nm to 200 nm, or from 100 nm to 200 nm. The nanoparticles may be present at a concentration from 0.01 mol % to 2 mol %, from 0.5 mol % to 2 mol %, from 0.5 mol % to 5 mol % or in some cases up to 10 mol %. These concentration values may refer to concentration of a metal of the metallic nanoparticles.

In some embodiments, the optically-transmissive material includes multiple nanophases. For example, the optically-transmissive material may include two or more nanophases which differ in composition, such as a first set of nanoparticles formed from a first metal and a second set of nanoparticles formed from a second metal different from the first metal. As additional examples, the optically-transmissive material may include first and second nanophases which generally have the same composition, but which differ in one or more of size, shape, or concentration. As a specific example, two different sets of nanoparticles formed from the same metal but having different shapes may produce different colors in an article formed from the optically-transmissive material. The two different sets of nanoparticles may be located in different regions of the article formed from the optically-transmissive material, in overlapping regions of the article, or in the same region of the article. In some cases, the first set of nanoparticles may have a generally spherical shape and the second set of nanoparticles may have a different shape, such as an elongated shape.

In embodiments, the distribution of the nanoparticles within the optically-transmissive material is substantially uniform. For example, the concentration of the nanoparticles may be similar through the thickness of an article formed from the optically-transmissive material. Such a concentration profile may be obtained at least in part by using a heat treatment process that heats the entire article formed from the optically-transmissive material for a sufficient time to allow substantially uniform formation of the nanoparticles.

The composition of the colored optically-transmissive material may affect not only the color of a rear cover member but may also affect another optical property and/or an electromagnetic property and/or a mechanical property. In some cases, the properties of the optically-transmissive material including one or more "coloring" elements may be compared to those of a "base" optically-transmissive material that is similar in composition but does not include the coloring element(s). As an example, inclusion of the coloring element(s) (e.g., transition metal elements included in the glass phase and/or forming metal nanoparticles within the glass phase) may modify the dielectric constant of the optically-transmissive material as compared to a "base" optically-transmissive material. In some cases, the dielectric constant of the colored optically-transmissive material is higher than that of the "base" optically-transmissive material, so that adding more of the coloring element(s) to the base composition can unduly increase the dielectric constant. Optically-transmissive material compositions useful for the rear cover members described herein may provide a balance between desired color (e.g., chroma) and/or other optical properties and desired electromagnetic properties. In some cases, the dielectric constant has a value from 3 to 7, 4 to 8, 4 to 6.5, 5 to 7, 5 to 6.5, 5.5 to 7.5, 5.5 to 7, or 6 to 7 in a radio frequency band (e.g., from about 5 GHz to about 45 GHz or 25 GHz to 39 GHz). In these cases, the C* chroma value may have a value greater than 1.75, greater than 2, or greater than 2.5.

In embodiments, the nanophase can improve the toughness of the colored optically-transmissive material as compared to a "base" optically-transmissive material. In some cases, enhanced toughness may be obtained with increased particle size and/or reduced spacing between the particles. However, when the nanophase includes metallic particles, increasing the concentration of the nanoparticles may also increase the dielectric constant. Therefore, the optically-transmissive material compositions useful for the rear cover members described herein may provide a balance between desired color (e.g., chroma) and/or other optical properties, desired electromagnetic properties, and desired mechanical properties.

The transmission value may be measured over a visible wavelength range or an infrared (IR) wavelength range. For example, the colored optically-transmissive rear cover member may have a transmission that is less than 95%, less than or equal to 90%, or less than or equal to 85%, or ranging from 35% to 95%, from 35% to 90%, from 60% to 95%, or from 65% to 90% over a visible light range (e.g., 360 nm to 740 nm). In some cases, the average transmission is measured for a thickness of about 2.4 mm. Each of these transmission values may be average transmission values. In some cases, the colored optically-transmissive rear cover member has an IR transmission value suitable for use over an optical module configured to operate over an IR wavelength range. For example, the rear cover member may have a transmission ranging from 35% to 95%, from 35% to 90%, from 60% to 95%, or from 65% to 90% over an IR light range.

In some cases, the colored glass material is chemically strengthened by ion exchange. For example, an ion-exchangeable glass material may include monovalent or divalent ions such as alkali metal ions (e.g., $Li^+$, $Na^+$, or $K^+$) or alkaline earth ions (e.g., $Ca^{2+}$ or $Mg^{2+}$) that may be exchanged for other alkali metal or alkaline earth ions. If the glass material comprises sodium ions, the sodium ions may be exchanged for potassium ions. Similarly, if the glass material comprises lithium ions, the lithium ions may be exchanged for sodium ions and/or potassium ions. Exchange of smaller ions in the glass material for larger ions can form a compressive stress layer along a surface of the glass or glass ceramic material. Formation of such a compressive stress layer can increase the hardness and impact resistance of the glass material. In some cases, a chemically strengthened component formed from a colored glass material is configured to have a composition stable under typical use conditions of the electronic device and under processing conditions experienced subsequent to chemical strengthening (e.g., during a subsequent coating operation). By the way of example, a chemically strengthened cover member may include a compressive stress layer having a surface compression stress from 400 MPa to 700 MPa or 500 MPa to 700 MPa and an overall depth of compression from 75 microns to 150 microns or from 100 microns to 175 microns. In some cases, an ion-exchanged region of the cover member is enriched in potassium near the surface and enriched in sodium at greater depths and the resulting compressive stress layer comprises a region of higher compressive stress near the surface that may be relatively shallow (e.g., a depth from about 3 microns to about 20 microns).

Figure 19A:
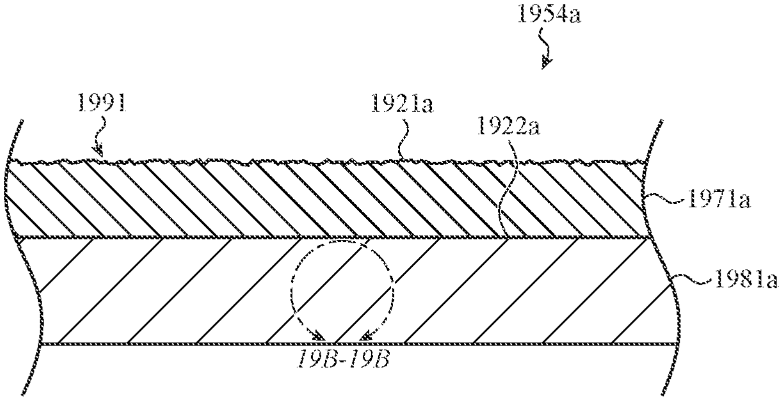
FIG. 19A depicts an example partial cross-sectional view of a rear cover.

FIG. 19A depicts an example partial cross-sectional view of a rear cover for an electronic device. The view of FIG. 19A may be an example of a cross-section through portion 1861 of the rear cover 1854 along 18A-18A. The rear cover 1954*a* includes a rear cover member 1971*a* and a coating 1981*a* along the interior surface 1922*a* of the rear cover member 1971*a*. The coating 1981*a* may be a multilayer coating.

As previously described, different portions of the rear cover may have different surface textures. The exterior surface 1921*a* of the rear cover member 1971*a* defines a texture 1991. The texture 1991 may be configured to provide a matte appearance to this portion of the rear cover member 1971*a* and the rear cover 1954*a*. The texture may also be configured to provide suitable tactile properties and/or cleanability of the textured surface. As examples, the gloss value of the rear cover member 1971*a* or the rear cover 1954*a* may be less than about 20 gloss units, less than about 15 gloss units, from 2 gloss units to 8 gloss units, from 5 gloss units to 20 gloss units, or from 10 gloss units to 20 gloss units as measured at 60 degrees. The measurement may be made prior to application of the coating 1981*a* or after application of the coating 1981*a*. In some cases, the gloss of the textured region may be measured using commercially available equipment and according to ASTM or ISO standard test methods. The angle measurement may refer to the angle between the incident light and the perpendicular to the textured region of the surface.

Surface texture parameters include areal surface texture parameters such as amplitude parameters, spatial parameters, and hybrid parameters. Surface filtering may be used to exclude surface noise and/or surface waviness before determining the surface texture parameters. As examples, the root mean square height of the texture 1991 may be from about 0.1 microns to about 2 microns, from about 0.1 microns to about 1.5 microns, from about 0.1 microns to about 1.25 microns, from about 0.1 microns to about 1.0 micron, from about 0.25 microns to about 2 microns, from about 0.25 microns to about 1.5 microns, from about 0.25 microns to about 1.25 microns, from about 0.25 microns to about 1.0 micron. Alternately or additionally, the texture 1991 may be characterized by the root mean square slope (Sdq), also referred to as the root mean square gradient. In some embodiments, the root mean square slope may be greater than zero and less than about 1.25, greater than zero and less than about 1, from about 0.1 to less than about 1, from about 0.25 to less than about 1, from about 0.25 to about 0.75, or from about 0.1 to about 0.5. Surface texture parameters and methods for determining these parameters (including filtering and segmentation) are described in more detail in International Organization for Standardization (ISO) standard 25178 (Geometric Product Specifications (GPS)—Surface texture: Areal). These surface texture parameters may be measured using commercially available equipment.

Figure 19B:
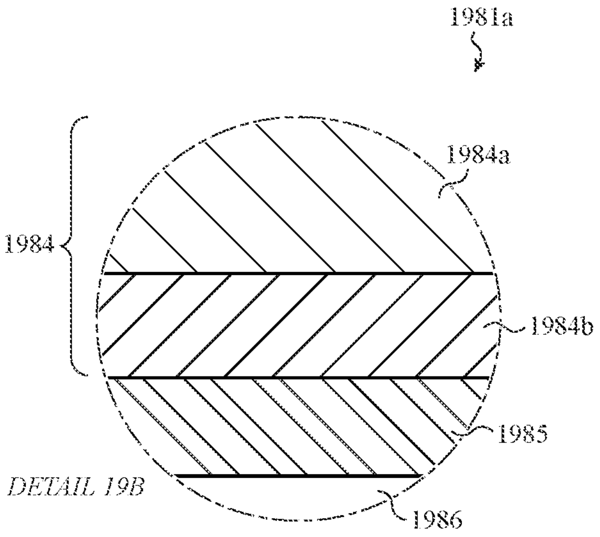
FIG. 19B depicts an enlarged view of detail 19B-19B of FIG. 19A.

FIG. 19B depicts an enlarged view of detail 19B-19B of FIG. 19A. The enlarged view of FIG. 19B shows that the coating 1981*a* includes multiple layers. In some examples, the overall coating thickness is in a range from 30 micrometers to 75 micrometers. In some cases, different coating thicknesses may be applied to different colors of rear cover members. For example, a rear cover member having a higher L* value may be paired with a coating that is thicker than a coating paired with a rear cover member having a lower L* value, as described in more detail below. When the rear cover member is formed of one of a set of compositions that produce different L* values for a given thickness, the preferred coating thicknesses may vary across the set of compositions. In some cases, the thickness of the rear cover member may be varied so that the combined thickness of the rear cover member 1971*a* and the coating 1981*a* falls within a specified range. For example, a rear cover member having a higher L* value may be thinner than a rear cover member having a lower L* value in order to accommodate the thicker coating.

The coating 1981*a* includes one or more color layers. In the example of FIG. 19B, the coating 1981*a* includes a set of color layers 1984 disposed on an interior surface of the rear cover member 1971*a*. As used herein, a color layer may have a distinct hue or may be near neutral in color (with a* and b* near zero, e.g., white or black). As an example, a "white" color layer having a high L* value may be used when the rear cover member 1971*a* has a distinct hue and a "black" color layer having a lower L* value may be used when rear cover member 1971*a* appears dark or "black" in color. When the coating 1981*a* includes a set of color layers, each color layer need not have exactly the same color, opacity, or composition. Each of the color layers may be relatively thin, having a thickness greater than 2 micrometers and less than 10 micrometers. For simplicity, the example of FIG. 19B shows two color layers 1984*a* and 1984*b*. In embodiments, the set of color layers includes from 2 to 8 color layers. In some examples, the set of color layers 1984 has a total thickness from about 20 micrometers to about 60 micrometers. In some cases, a set of color layers 1984 having a higher L* value may be thicker than a set of color members having a lower L* value. In some embodiments, a color layer may be applied around a perimeter of the rear cover member. In some embodiments, the coating 1981*a* may be configured so that a portion of the cover has a hue that is different from a corresponding portion of the rear cover member (e.g., the portion of rear cover member included in the portion of the cover). The color layer, which may also be referred to herein as an ink layer, may include a colorant such as a pigment and/or dye and a polymeric binder as previously discussed with respect to the rear cover 154.

One or more backing layers may be disposed on the one or more color layers. In the example of FIG. 19B, a backing layer 1985 is disposed on the set of more color layers. In some examples, one or more backing layers includes from 1 to 4 layers. The backing layers may provide opacity and may also provide separation between the color layer(s) and an adhesion layer. The one or more backing layers may be near neutral in color (e.g., gray). One or more of the backing layers may be thicker than the color layers. In some examples, the backing layers may include an optically dense layer having an optical density greater than or equal to 1, greater than or equal to 2, from 2 to 5, or greater than or equal to 3. In some embodiments, a clear adhesive 1986 may be disposed on the one or more backing layers 1985.

Figure 19C:
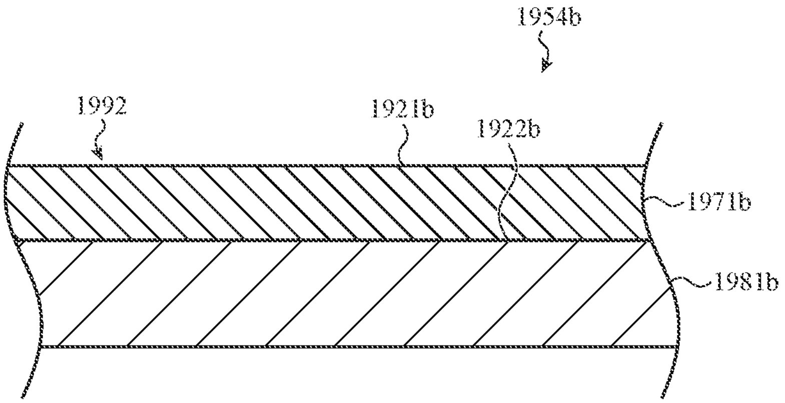
FIG. 19C depicts another example partial cross-sectional view of a rear cover.

FIG. 19C depicts another example partial cross-sectional view of a rear cover. The view of FIG. 19C may be an example of a cross-section through portion 1862 of the rear cover 1854 along 18B-18B. As previously discussed, the portion 1862 may contrast with the portion 1861 and in some examples may define a logo or graphic for the device. The rear cover 1954*b* includes a rear cover member 1971*b* and a coating 1981*b* disposed along the interior surface 1922*b* of the rear cover member 1971*b*. The coating 1981*b* may be similar in composition and structure to the coating 1981*a* previously described with respect to FIGS. 19A and 19B.

The exterior surface 1921*b* of the rear cover member 1971*b* defines a texture 1992 that is smoother than that of the texture 1991 shown in FIG. 19A. In some cases, the texture 1992 is a polished texture that is configured to provide a glossy appearance to the portion of the rear cover member 1971*b* and the rear cover 1954*b*. In some examples, the visual contrast between matte and glossy portions of the rear cover member can be used to define a logo or graphic. In some examples, the gloss value of the rear cover member 1971*a* may be greater than about 70 gloss units, greater than about 80 gloss units, greater than about 90 gloss units, greater than about 100 gloss units, from 80 gloss units to less than 160 gloss units, from 90 gloss units to 150 gloss units, or from 100 gloss units to 140 gloss units, as measured at 60 degrees. The gloss value may be measured in a similar manner as previously described with respect to FIG. 19A and that description is not repeated here. In some cases, the root mean square height of the texture 1992 may be from about 1 nm to about 125 nm, from about 1 nm to about 100 nm, from about 1 nm to about 75 nm, from about 1 nm to about 50 nm, from about 1 nm to about 25 nm, or from about 1 nm to about 10 nm.

Figure 19D:
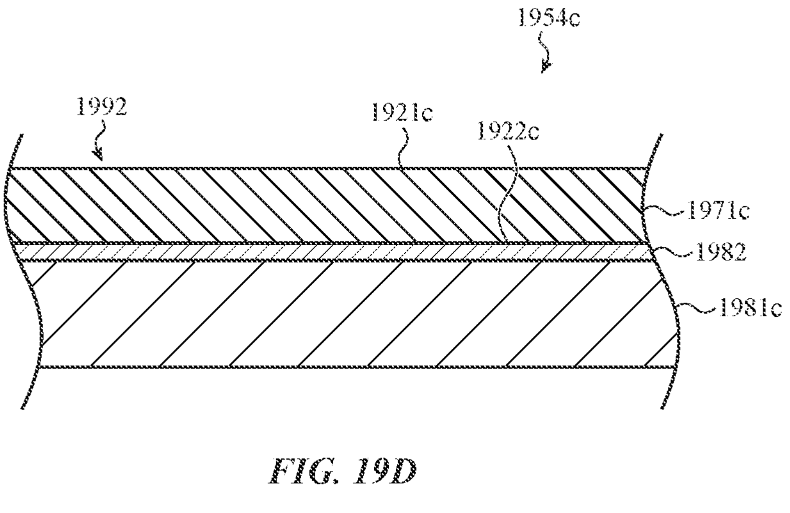
FIG. 19D depicts another example partial cross-sectional view of a rear cover.

FIG. 19D depicts another example partial cross-sectional view of a rear cover. The view of FIG. 19D may be another example of a cross-section through portion 1862 of the rear cover 1854 along 18B-18B. As previously discussed with respect to FIG. 19C, the portion 1862 may visually contrast with the portion 1861 and in some examples may define a logo or graphic for the device.

The rear cover 1954*c* includes a rear cover member 1971*c*. The exterior surface 1921*c* of the rear cover member 1971*c* defines a texture 1992 similar to that described with respect to FIG. 19C. In some cases, the texture 1992 is a polished texture that is configured to provide a glossy appearance to the portion of the rear cover member 1971*c* and the rear cover 1954*c*. In some examples, the visual contrast created by a combination of different colors and/or gloss values of different portions of the rear cover member can at least partially define a logo or graphic.

The rear cover 1954*c* includes an additional coating, the coating 1982, as compared to the rear cover 1954*b*. The coating 1982 may provide an additional color layer along the interior surface 1922*c* of the rear cover member 1971*c*. The coating 1982 can have a chroma value and/or hue angle value that is different from a chroma value and/or a hue angle of the coating 1981*c* and can therefore be used to modify the color of the rear cover 1954*c* as compared to the color of the rear cover 1954*b*. In some cases, the rear cover 1954*c* has a C* value that is higher than the C* value of the rear cover 1954*b* due at least in part to the coating 1982. The rear cover 1954*c* may also have a L* value that is somewhat lower than the L* value of the rear cover 1954*b* and a h* value that is somewhat different than the h* value of the rear cover 1954*b*.

The rear cover 1954*c* may have a greater number of coating layers as compared to the rear cover 1954*a* when the coating 1982 provides an additional color layer. In embodiments, the coating 1982 helps to modify the color of the rear cover 1954*c* as compared to the color of the rear cover 1954*a*. In embodiments, the rear cover 1954*c* may have a C* value that is higher than the C* value of the rear cover 1954*a*, a L* value that is somewhat lower than that of the rear cover 1954*a*, and an h* value that is somewhat different than an h* value of the rear cover 1954*a*. The difference in color parameters between the rear cover 1954*c* and the rear cover 1954*a* may be due to both the additional color layer 1982 and the difference in the exterior surface texture and gloss value. The difference in the L* values, C* values, and h* values between the rear cover 1954*c* and the rear cover 1954*a* may be similar to those previously discussed with respect to the portions 1862 and 1861 of the rear cover 1854. Therefore, including an additional coating such as the coating 1982 in the set of may contribute to the visual contrast between two different portions of a rear cover, such as the portions 1862 and 1861.

The coating 1982 is disposed along the interior surface 1922*c* of the rear cover member 1971*b* and the coating 1981*c* is disposed along the coating 1982. In some cases, the color of the combination of the coating 1982 and the 1981*c* can be compared to the color of the coating 1981*c*, via measurements of coating colors through a substantially clear glass cover or a colored glass cover. The coating 1981*c* may be similar in composition and structure to the coating 1981*a* previously described with respect to FIGS. 19A and 19B.

Figure 19E:
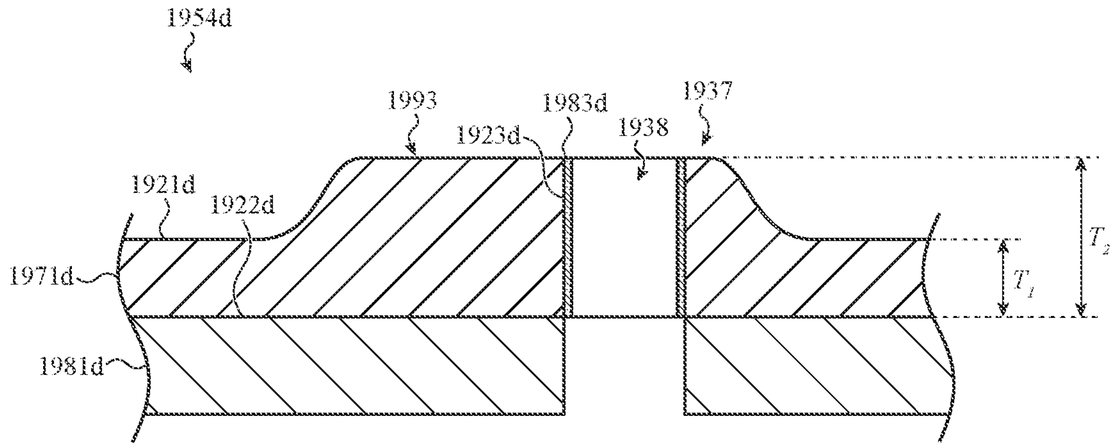
FIG. 19E depicts another example partial cross-sectional view of a rear cover.

FIG. 19E depicts another example partial cross-sectional view of a rear cover. The view of FIG. 19E may be an example of a cross-section through portion 1863 of the rear cover 1854 along 18C-18C. The rear cover 1954*d* defines a protrusion 1937, which may be similar to the protrusion 137 previously described with respect to FIG. 1D. The rear cover 1954*d* includes a rear cover member 1971*d* and a variation in the thickness of the rear cover member 1971*d* helps to define the protrusion. The rear cover member 1971*d* defines an opening 1938 that extends through the thickness $T_2$ and surfaces 1923*d* define a boundary of the opening 1938.

In the example of FIG. 19E, the rear cover member 1971*d* has a thickness $T_2$ at the protrusion and a thickness of Ti away from the protrusion. In some cases, a thicker portion of a rear cover member 1971*d* will have a different optical and/or electromagnetic property as compared to a thinner portion. The thickness Ti may be greater than about 0.3 mm and less than about 0.75 mm or greater than about 0.5 mm and less than about 1 mm. The thickness $T_2$ may be greater than about 1 mm and less than or equal to about 3 mm or greater than or equal to about 2 mm and less than or equal to about 2.5 mm. As previously discussed, the thickness of the rear cover member may be varied so that the combination of a thickness of the rear cover member and the interior coating(s) falls within a specified range. In some cases, the thickness variation of the rear cover member may be greater than 1% and less than or equal to 5% to compensate for variation in the interior coating thickness.

The rear cover 1954*d* includes a coating 1981*d* disposed along the interior surface 1922*d* of the rear cover member 1971*d*. The coating 1981*d* may be similar in composition and structure to the coating 1981*a* described with respect to FIGS. 19A and 19B. The rear cover 1954*d* also includes a coating 1983*d* disposed along the surface 1923*d* that partially defines the opening 1938. The coating 1983*d* may provide increased opacity near the opening 1938 and may be neutral in color (e.g., white, gray, or black).

The exterior surface 1921*d* of the rear cover member 1971*d* defines a texture 1993 that is smoother than that of the texture 1991 shown in FIG. 19A. In some cases, the texture 1993 is a polished texture that is configured to provide a glossy appearance to the portion of the rear cover member 1971*d* and the rear cover 1954*d*. The texture 1993 may produce similar gloss properties and/or have similar texture parameters to the texture 1992 but need not produce exactly the same gloss value or have exactly the same texture parameters.

In some cases, a rear cover member or other component of the electronic device is formed from one of a set of compositions of the colored optically transmissive material. Each composition of the set of compositions may produce a different color of rear cover member. The set of compositions may be selected so that the rear cover member has another optical property (e.g., IR transmission), an electromagnetic property (e.g., dielectric constant), or both that is uniform within a specified range. The uniformity of the optical and/or electromagnetic property allows differently colored rear cover members to have similar performance when placed over an internal component, such as a component of a wireless communication or charging system or an IR sensor.

Figure 20:
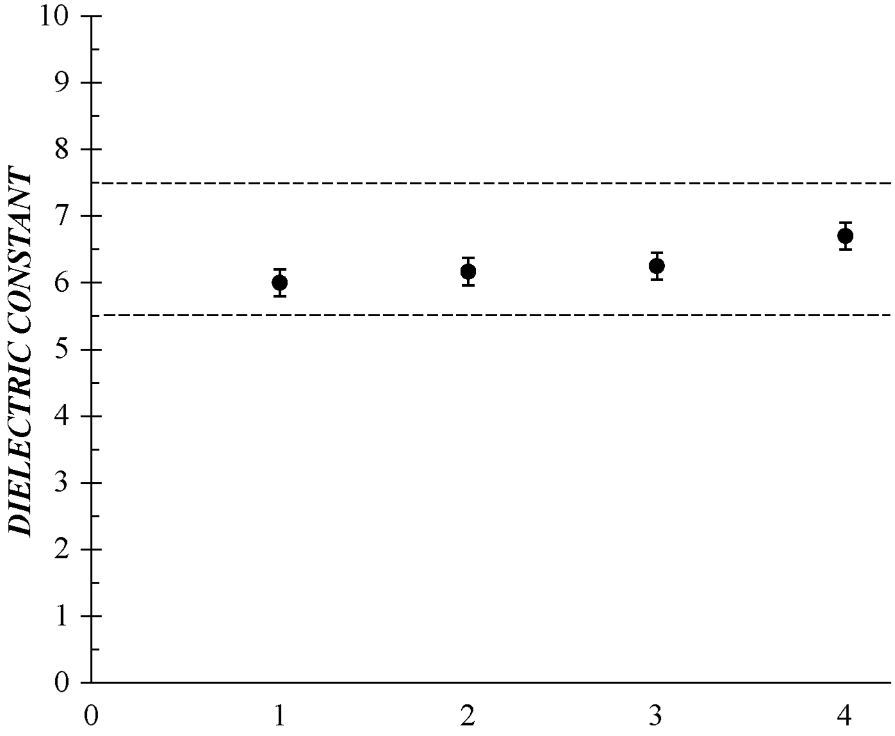
FIG. 20 schematically depicts dielectric constant values for a set of colored glass compositions suitable for use in rear cover members.

FIG. 20 schematically depicts dielectric constant values for a set of colored glass compositions suitable for use as a rear cover member. Each glass composition of the set of glass compositions produces a rear cover member having a different color and a dielectric constant falling within the range indicated by the dashed horizontal lines. The uniformity of the dielectric constant allows differently colored rear cover members to have similar performance when placed over an internal component such as a component of a wireless communication system (e.g., a radio-frequency (RF) antenna assembly). The description of wireless communication system components provided with respect to the device 100 is generally applicable here and is not repeated here.

In the example of FIG. 20, each glass composition (1 through 4) of the set of glass compositions has been adjusted to produce a different color and a dielectric constant in a range from 5.5 to 7.5. As previously discussed, these dielectric constant values may be applicable for a frequency range from about 5 GHz to about 45 GHz. In some cases, there can be some variation in the dielectric constant value over the frequency range. In the example of FIG. 20, the solid data point indicates a median dielectric constant in the middle of the frequency range and the bars extending from the data point indicate the maximum and minimum dielectric constant values within the frequency range. The range shown in FIG. 20 is exemplary rather than limiting and in additional examples the dielectric constant may range from 3 to 7, 4 to 8, 4 to 6.5, 5 to 7, 5 to 6.5, 5.5 to 7, or 6 to 7.

Figure 21:
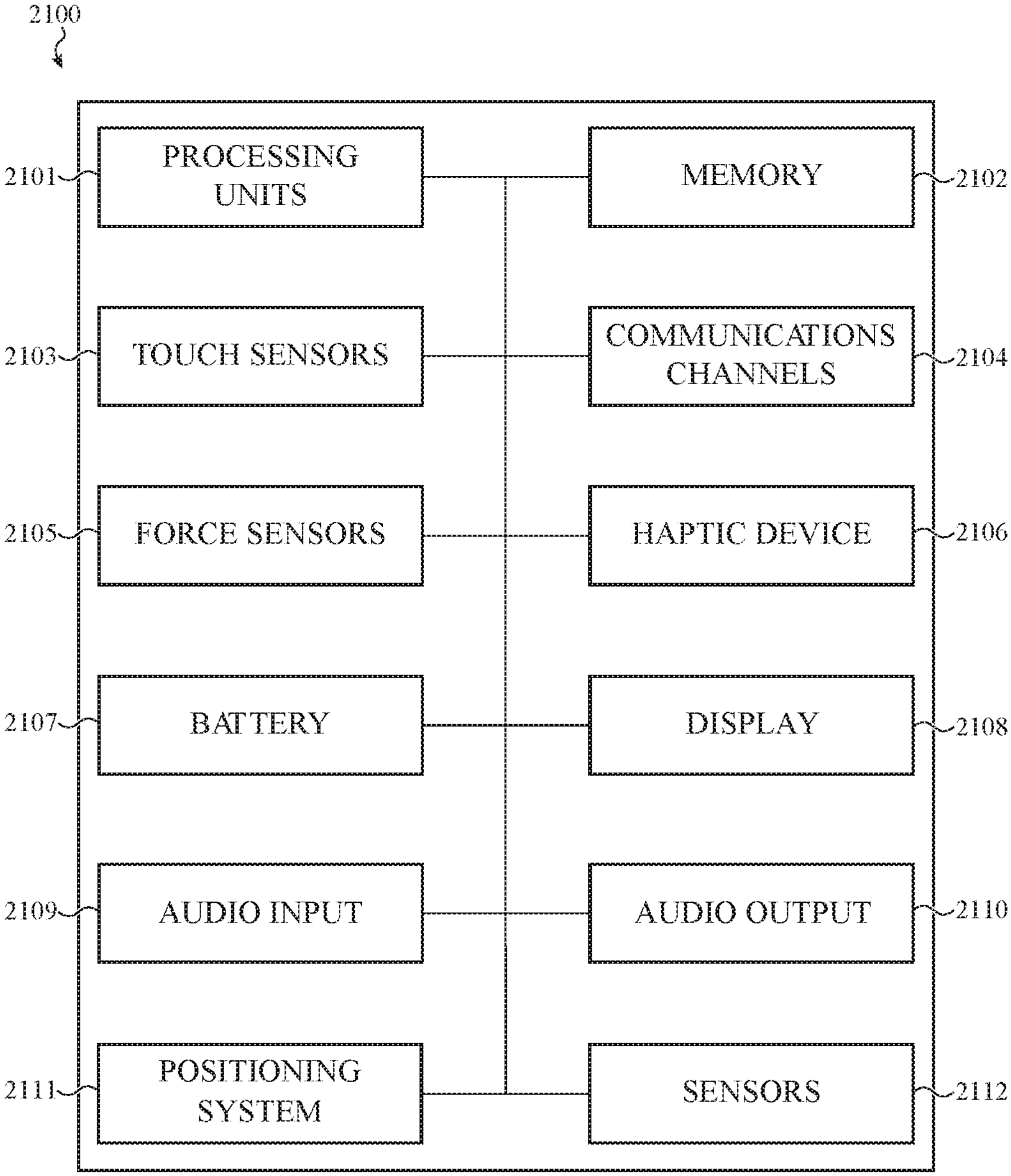
FIG. 21 depicts a schematic diagram of an example electronic device.

FIG. 21 depicts an example schematic diagram of an electronic device 2100. The electronic device 2100 may be an embodiment of or otherwise represent the device 100 (or other devices described herein, such as the devices 100, 140, 200, 300, 400, 600, 1000, 1200, 1400, 1500, and 1700). The device 2100 includes one or more processing units 2101 that are configured to access a memory 2102 having instructions stored thereon. The instructions or computer programs may be configured to perform one or more of the operations or functions described with respect to the electronic devices described herein. For example, the instructions may be configured to control or coordinate the operation of one or more displays 2108, one or more touch sensors 2103, one or more force sensors 2105, one or more communication channels 2104, one or more audio input systems 2109, one or more audio output systems 2110, one or more positioning systems 2111, one or more sensors 2112, and/or one or more haptic feedback devices 2106.

The processing units 2101 of FIG. 21 may be implemented as any electronic device capable of processing, receiving, or transmitting data or instructions. For example, the processing units 2101 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements. The processing units 2101 may be coupled to a circuit board assembly, such as the circuit board assemblies described herein.

The memory 2102 can store electronic data that can be used by the device 2100. For example, a memory can store electrical data or content such as, for example, audio and video files, images, documents and applications, device settings and user preferences, programs, instructions, timing and control signals or data for the various modules, data structures or databases, and so on. The memory 2102 can be configured as any type of memory. By way of example only, the memory can be implemented as random access memory, read-only memory, Flash memory, removable memory, or other types of storage elements, or combinations of such devices. The memory 2102 may be coupled to a circuit board assembly, such as the circuit board assemblies described herein.

The touch sensors 2103 may detect various types of touch-based inputs and generate signals or data that are able to be accessed using processor instructions. The touch sensors 2103 may use any suitable components and may rely on any suitable phenomena to detect physical inputs. For example, the touch sensors 2103 may be capacitive touch sensors, resistive touch sensors, acoustic wave sensors, or the like. The touch sensors 2103 may include any suitable components for detecting touch-based inputs and generating signals or data that are able to be accessed using processor instructions, including electrodes (e.g., electrode layers), physical components (e.g., substrates, spacing layers, structural supports, compressible elements, etc.), processors, circuitry, firmware, and the like. The touch sensors 2103 may be integrated with or otherwise configured to detect touch inputs applied to any portion of the device 2100. For example, the touch sensors 2103 may be configured to detect touch inputs applied to any portion of the device 2100 that includes a display (and may be integrated with a display). The touch sensors 2103 may operate in conjunction with the force sensors 2105 to generate signals or data in response to touch inputs. A touch sensor or force sensor that is positioned over a display surface or otherwise integrated with a display may be referred to herein as a touch-sensitive display, force-sensitive display, touchscreen display, or touchscreen.

The force sensors 2105 may detect various types of force-based inputs and generate signals or data that are able to be accessed using processor instructions. The force sensors 2105 may use any suitable components and may rely on any suitable phenomena to detect physical inputs. For example, the force sensors 2105 may be strain-based sensors, piezoelectric-based sensors, piezoresistive-based sensors, capacitive sensors, resistive sensors, or the like. The force sensors 2105 may include any suitable components for detecting force-based inputs and generating signals or data that are able to be accessed using processor instructions, including electrodes (e.g., electrode layers), physical components (e.g., substrates, spacing layers, structural supports, compressible elements, etc.), processors, circuitry, firmware, and the like. The force sensors 2105 may be used in conjunction with various input mechanisms to detect various types of inputs. For example, the force sensors 2105 may be used to detect presses or other force inputs that satisfy a force threshold (which may represent a more forceful input than is typical for a standard "touch" input). Like the touch sensors 2103, the force sensors 2105 may be integrated with or otherwise configured to detect force inputs applied to any portion of the device 2100. For example, the force sensors 2105 may be configured to detect force inputs applied to any portion of the device 2100 that includes a display (and may be integrated with a display). The force sensors 2105 may operate in conjunction with the touch sensors 2103 to generate signals or data in response to touch- and/or force-based inputs.

The device 2100 may also include one or more haptic devices 2106 (e.g., the haptic actuator 222, 322 of FIGS. 2-3). The haptic device 2106 may include one or more of a variety of haptic technologies such as, but not necessarily limited to, rotational haptic devices, linear actuators, piezoelectric devices, vibration elements, and so on. In general, the haptic device 2106 may be configured to provide punctuated and distinct feedback to a user of the device. More particularly, the haptic device 2106 may be adapted to produce a knock or tap sensation and/or a vibration sensation. Such haptic outputs may be provided in response to detection of touch and/or force inputs, and may be imparted to a user through the exterior surface of the device 2100 (e.g., via a glass or other surface that acts as a touch- and/or force-sensitive display or surface).

The one or more communication channels 2104 may include one or more wireless interface(s) that are adapted to provide communication between the processing unit(s) 2101 and an external device. The one or more communication channels 2104 may include antennas (e.g., antennas that include or use housing components as radiating members), communications circuitry, firmware, software, or any other components or systems that facilitate wireless communications with other devices. In general, the one or more communication channels 2104 may be configured to transmit and receive data and/or signals that may be interpreted by instructions executed on the processing units 2101. In some cases, the external device is part of an external communication network that is configured to exchange data with wireless devices. Generally, the wireless interface may communicate via, without limitation, radio frequency, optical, acoustic, and/or magnetic signals and may be configured to operate over a wireless interface or protocol. Example wireless interfaces include radio frequency cellular interfaces (e.g., 2G, 3G, 4G, 4G long-term evolution (LTE), 5G, GSM, CDMA, or the like), fiber optic interfaces, acoustic interfaces, Bluetooth interfaces, infrared interfaces, USB interfaces, Wi-Fi interfaces (e.g., for communicating using Wi-Fi communication standards and/or protocols, including IEEE 802.11, 802.11b, 802.11a, 802.11g, 802.11n, 802.11ac, 802.11ax (Wi-Fi 6, 6E), 802.11be (Wi-Fi 7), or any other suitable Wi-Fi standards and/or protocols), TCP/IP interfaces, network communications interfaces, or any conventional communication interfaces. The one or more communications channels 2104 may also include ultra-wideband (UWB) interfaces, which may include any appropriate communications circuitry, instructions, and number and position of suitable UWB antennas.

As shown in FIG. 21, the device 2100 may include a battery 2107 that is used to store and provide power to the other components of the device 2100. The battery 2107 may be a rechargeable power supply that is configured to provide power to the device 2100. The battery 2107 may be coupled to charging systems (e.g., wired and/or wireless charging systems) and/or other circuitry to control the electrical power provided to the battery 2107 and to control the electrical power provided from the battery 2107 to the device 2100.

The device 2100 may also include one or more displays 2108 configured to display graphical outputs. The displays 2108 may use any suitable display technology, including liquid crystal displays (LCD), organic light-emitting diodes (OLED), active-matrix organic light-emitting-diode displays (AMOLED), or the like. The displays may use a low temperature polycrystalline silicone (LTPS) or low temperature polycrystalline oxide (LTPO) backplane. The displays 2108 may display graphical user interfaces, images, icons, or any other suitable graphical outputs. The display 2108 may correspond to a display 103, 203, or other displays described herein.

The device 2100 may also provide audio input functionality via one or more audio input systems 2109. The audio input systems 2109 may include microphones, transducers, or other devices that capture sound for voice calls, video calls, audio recordings, video recordings, voice commands, and the like.

The device 2100 may also provide audio output functionality via one or more audio output systems (e.g., speakers) 2110, such as the speaker systems and/or modules described herein. The audio output systems 2110 may produce sound from voice calls, video calls, streaming or local audio content, streaming or local video content, or the like.

The device 2100 may also include a positioning system 2111. The positioning system 2111 may be configured to determine the location of the device 2100. For example, the positioning system 2111 may include magnetometers, gyroscopes, accelerometers, optical sensors, cameras, global positioning system (GPS) receivers, inertial positioning systems, or the like. The positioning system 2111 may be used to determine spatial parameters of the device 2100, such as the location of the device 2100 (e.g., geographical coordinates of the device), measurements or estimates of physical movement of the device 2100, an orientation of the device 2100, or the like.

The device 2100 may also include one or more additional sensors 2112 (also referred to as sensing systems) to receive inputs (e.g., from a user or another computer, device, system, network, etc.) or to detect any suitable property or parameter of the device, the environment surrounding the device, people, or things interacting with the device (or nearby the device), or the like. For example, a device may include temperature sensors, biometric sensing systems (e.g., fingerprint sensors, facial recognition systems, photoplethysmographs, blood-oxygen sensors, blood sugar sensors, or the like), eye-tracking sensors, proximity sensors, depth sensors (e.g., time-of-flight based depth or distance sensors), ambient light sensors, retinal scanners, humidity sensors, buttons, switches, lid-closure sensors, or the like.

To the extent that multiple functionalities, operations, and structures described with reference to FIG. 21 are disclosed as being part of, incorporated into, or performed by the device 2100, it should be understood that various embodiments may omit any or all such described functionalities, operations, and structures. Thus, different embodiments of the device 2100 may have some, none, or all of the various capabilities, apparatuses, physical features, modes, and operating parameters discussed herein. Further, the systems included in the device 2100 are not exclusive, and the device 2100 may include alternative or additional systems, components, modules, programs, instructions, or the like, that may be necessary or useful to perform the functions described herein.

As described above, one aspect of the present technology is the gathering and use of data available from various sources to improve the usefulness and functionality of devices such as mobile phones. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to locate devices, deliver targeted content that is of greater interest to the user, or the like. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above, below, over, under, left, or right (or other similar relative position terms), do not necessarily refer to an absolute position relative to an external reference, but instead refer to the relative position of components within the figure being referred to. Similarly, horizontal and vertical orientations may be understood as relative to the orientation of the components within the figure being referred to, unless an absolute horizontal or vertical orientation is indicated.

Features, structures, configurations, components, techniques, etc. shown or described with respect to any given figure (or otherwise described in the application) may be used with features, structures, configurations, components, techniques, etc. described with respect to other figures. For example, any given figure of the instant application should not be understood to be limited to only those features, structures, configurations, components, techniques, etc. shown in that particular figure. Similarly, features, structures, configurations, components, techniques, etc. shown only in different figures may be used or implemented together. Further, features, structures, configurations, components, techniques, etc. that are shown or described together may be implemented separately and/or combined with other features, structures, configurations, components, techniques, etc. from other figures or portions of the instant specification. Further, for ease of illustration and explanation, figures of the instant application may depict certain components and/or sub-assemblies in isolation from other components and/or sub-assemblies of an electronic device, though it will be understood that components and sub-assemblies that are illustrated in isolation may in some cases be considered different portions of a single electronic device (e.g., a single embodiment that includes multiple of the illustrated components and/or sub-assemblies).

What is claimed is:

1. A mobile phone comprising:
an enclosure comprising:
a front cover assembly defining a front exterior surface of the enclosure;
a rear cover assembly defining a rear exterior surface of the enclosure; and
a housing subassembly positioned between the front cover assembly and the rear cover assembly and comprising:
a first housing component defining a first side exterior surface of the enclosure;
a second housing component defining a second side exterior surface of the enclosure opposite the first side exterior surface of the enclosure; and
a lower chassis section extending between the first housing component and the second housing component, the lower chassis section at least partially defining a through hole;
a spring coupling element coupled to the housing subassembly and positioned at least partially in the through hole:
a camera array coupled to the lower chassis section and positioned in an interior cavity defined between the lower chassis section and the front cover assembly, the camera array including at least one camera that extends through the lower chassis section and toward the rear cover assembly; and
a display coupled to the front cover assembly,
wherein the rear cover assembly comprises:
a rear cover;
an electrical component coupled to the rear cover;
a fastening feature coupled to the rear cover and releasably engaged with the spring coupling element; and
a conductive element coupled to the rear cover and conductively coupling the fastening feature to the electrical component, thereby conductively coupling the electrical component to the spring coupling element.

2. The mobile phone of claim 1, wherein:
the mobile phone further comprises a battery positioned in the interior cavity defined between the lower chassis section and the front cover assembly;
the lower chassis section defines:
a first side facing the front cover assembly; and
a second side facing the rear cover assembly;
the camera array is coupled to the first side of the lower chassis section; and
the battery is coupled to the first side of the lower chassis section.

3. The mobile phone of claim 2, wherein:
the rear cover assembly comprises a rear cover; and
the mobile phone further comprises a charging coil positioned between the rear cover and the second side of the lower chassis section, the charging coil configured to wirelessly couple to a charging accessory to receive power for the mobile phone.

4. The mobile phone of claim 2, wherein:
the lower chassis section defines:
a first camera hole extending therethrough;
a second camera hole extending therethrough; and
a third camera hole extending therethrough; and
the camera array comprises:
a first camera extending at least partially through the first camera hole;
a second camera extending at least partially through the second camera hole; and
a third camera extending at least partially through the third camera hole.

5. The mobile phone of claim 2, wherein:
the lower chassis section further defines an alignment feature; and
the camera array further comprises:
a camera bracket configured to engage with the alignment feature to align the camera bracket relative to the lower chassis section; and
a camera coupled to the camera bracket.

6. The mobile phone of claim 1, wherein the lower chassis section is welded to the first housing component and to the second housing component.

7. The mobile phone of claim 1, wherein:
the rear cover assembly defines a first camera hole extending therethrough, the rear cover assembly further comprising, metal anchor plate positioned on an interior side of the rear cover and defining a second camera hole aligned with the first camera hole; and
a camera of the camera array extends through the second camera hole and at least partially into the first camera hole.

8. A portable electronic device comprising:
a display;
wireless communication circuitry;
a battery;
an enclosure enclosing the display, the wireless communication circuitry, and the battery, the enclosure comprising:
a housing subassembly comprising:
a first wall section defining at least a portion of a first side exterior surface of the portable electronic device;
a second wall section defining at least a portion of a second side exterior surface of the portable electronic device opposite to the first side exterior surface; and
a lower chassis section welded to the first wall section along a first side of the lower chassis section and welded to the second wall section along a second side of the lower chassis section, the lower chassis section at least partially defining a through hole;

a first housing component coupled to a first end of the housing subassembly and defining a first exterior corner surface of the portable electronic device;

a second housing component coupled to the first end of the housing subassembly and defining a second exterior corner surface of the portable electronic device;

a front cover coupled to the housing subassembly and defining a front exterior surface of the portable electronic device; and a rear cover coupled to the housing subassembly and defining a rear exterior surface of the portable electronic device;

a spring coupling element coupled to the housing subassembly and positioned at least partially in the through hole;

a fastening feature coupled to the rear cover and releasably engaged with the spring coupling element;

an electrical component coupled to the rear cover; and a conductive element coupled to the rear cover and conductively coupling the fastening feature to the electrical component, thereby conductively coupling the electrical component to the spring coupling element.

9. The portable electronic device of claim 8, wherein the first wall section comprises:

a core portion formed from a first metal and defining a portion of an interior surface of the portable electronic device; and a cladding portion bonded to the core portion and defining the first side exterior surface of the portable electronic device.

10. The portable electronic device of claim 9, wherein the lower chassis section is welded to the core portion of the first wall section.

11. The portable electronic device of claim 10, wherein:

the core portion comprises aluminum alloy;

the lower chassis section comprises aluminum alloy; and the cladding portion comprises titanium alloy.

12. The portable electronic device of claim 9, wherein:

the lower chassis section defines a first side facing the front cover and a second side facing the rear cover;

the battery is coupled to the first side of the lower chassis section and positioned between the lower chassis section and the front cover; and the portable electronic device further comprises a charging coil coupled to the rear cover and positioned between the lower chassis section and the rear cover.

13. The portable electronic device of claim 9, wherein:

the lower chassis section defines a first interlock structure;

the first housing component defines a second interlock structure; and the portable electronic device further comprises a molded polymer structure engaged with the first interlock structure and the second interlock structure and retaining the first housing component to the lower chassis section.

14. The portable electronic device of claim 13, wherein:

the molded polymer structure is a first molded polymer structure; and the portable electronic device further comprises a second molded polymer structure positioned between an end of the first wall section and an end of the first housing component and defining a portion of the first side exterior surface of the portable electronic device.

15. An electronic device comprising:

an enclosure comprising:

a front cover assembly comprising:

a transparent cover defining a front exterior surface of the enclosure; and a display positioned below the transparent cover;

a rear cover assembly comprising a dielectric member defining a rear exterior surface of the enclosure;

a housing subassembly comprising:

a lower chassis section at least partially defining a first cavity between the lower chassis section and the front cover assembly and at least partially defining a second cavity between the lower chassis section and the rear cover assembly, the lower chassis section at least partially defining a through hole extending from the first cavity to the second cavity;

a first wall positioned at a first side of the lower chassis section and defining a first side exterior surface of the enclosure; and a second wall positioned at a second side of the lower chassis section and defining a second side exterior surface of the enclosure;

a spring coupling element positioned at least partially in the through hole;

a battery positioned in the first cavity; and a charging coil positioned in the second cavity, wherein the rear cover assembly comprises:

a rear cover:

an electrical component coupled to the rear cover:

a fastening feature comprising a base portion coupled to the rear cover and configured to releasably couple to the spring coupling element; and a conductive element coupled to the rear cover and conductively coupling the base portion of the fastening feature to the electrical component, thereby conductively coupling the electrical component to the spring coupling element.

16. The electronic device of claim 15, wherein:

the first wall is welded to the lower chassis section along a first lateral side of the lower chassis section; and the second wall is welded to the lower chassis section along a second lateral side of the lower chassis section opposite the first lateral side.

17. The electronic device of claim 15, wherein:

the lower chassis section defines:

a first side facing the front cover assembly and a second side facing the rear cover assembly; and a camera hole extending from the first side of the lower chassis section to the second side of the lower chassis section; and the electronic device further comprises a camera positioned on the first side of the lower chassis section and extending through the camera hole in the lower chassis section.

18. The electronic device of claim 17, wherein:

the camera hole is a first camera hole;

the rear cover assembly comprises:

a rear cover defining a second camera hole; and an anchor plate coupled to the rear cover and defining a third camera hole; and the camera extends through the third camera hole and at least partially through the second camera hole.

19. The portable electronic device of claim 8, wherein:

the fastening feature defines:

a base portion coupled to the rear cover; and
a tab extending from the base portion; and
the tab of the fastening feature is releasably engaged with the spring coupling element.

20. The portable electronic device of claim 19, wherein the base portion is adhered to the rear cover.

* * * * *